US009241000B2

(12) United States Patent
Erdal

(10) Patent No.: US 9,241,000 B2
(45) Date of Patent: Jan. 19, 2016

(54) TRUSTED SOCIAL NETWORK

(76) Inventor: Abdullah Celik Erdal, Santa Cruz, CA (US)

(*) Notice: Subject to any disclaimer, the term of this patent is extended or adjusted under 35 U.S.C. 154(b) by 470 days.

(21) Appl. No.: 13/200,548

(22) Filed: Sep. 22, 2011

(65) Prior Publication Data

US 2012/0179764 A1 Jul. 12, 2012

Related U.S. Application Data

(60) Provisional application No. 61/385,450, filed on Sep. 22, 2010.

(51) Int. Cl.
G06F 21/00 (2013.01)
H04L 29/06 (2006.01)
G06Q 50/00 (2012.01)
G06F 15/16 (2006.01)

(52) U.S. Cl.
CPC .............. H04L 63/101 (2013.01); G06Q 50/01 (2013.01)

(58) Field of Classification Search
CPC .............................. H04L 63/101; G06Q 50/01
USPC ........................................................... 709/206
See application file for complete search history.

(56) References Cited

U.S. PATENT DOCUMENTS

| 2005/0246420 | A1* | 11/2005 | Little, II ........................ 709/204 |
| 2006/0031313 | A1* | 2/2006 | Libbey et al. ................. 709/206 |
| 2007/0203997 | A1* | 8/2007 | Ingerman et al. ............. 709/206 |
| 2007/0271607 | A1* | 11/2007 | Roskind .......................... 726/15 |
| 2008/0005064 | A1* | 1/2008 | Sarukkai ........................... 707/3 |
| 2009/0177744 | A1* | 7/2009 | Marlow et al. ................ 709/204 |
| 2009/0249451 | A1* | 10/2009 | Su et al. ............................ 726/5 |
| 2009/0319619 | A1* | 12/2009 | Affronti et al. ............... 709/206 |
| 2010/0030858 | A1* | 2/2010 | Chasin ........................... 709/206 |

* cited by examiner

Primary Examiner — Brian J Gillis
Assistant Examiner — Juan C Turriate Gastulo
(74) Attorney, Agent, or Firm — Blakely, Sokoloff, Taylor & Zafman LLP

(57) ABSTRACT

A technique for trusted social networking involves enabling parties to join a social network and provide a list of trusted content sources. The system can maintain folders associated with each of the trusted content sources for a first member. If one of the trusted content sources is a second member that indicates the first member is trusted, then the system can maintain a master folder for the first and second member.

20 Claims, 111 Drawing Sheets

1100 ⟶

[THEME]

SETTINGS

You have previously subscribed to one or more themes. We can copy over your settings from a theme selected below to your new theme.

If you continue using your existing USERID and EMAIL, you will continue accruing credits and user rating and ranking will remain the same. Both USERID and EMAIL must be unique.

| Select a Theme | [THEME 1]<br>[THEME 2]<br>... |
|---|---|

For each item below, select YES or NO and then click MERGE NOW.

| Merge User Settings | YES | NO |
|---|---|---|
| Userid: | Email: | |
| Merge Usage Settings | YES | NO |
| Merge Personal Folders | YES | NO |
| Merge MyPrivateList | YES | NO |
| Merge Block User List | YES | NO |
| Merge Follow User List | YES | NO |

( MERGE NOW )

[THEME]  DISPLAY

PERSONAL CATEGORIES

← HOME    | T | B |    SETTINGS →

| AF | DATE | RANK | CAT NAME | CLASS | STATUS | TYPE | SCOPE | RATING | DS |
|----|------|------|----------|-------|--------|------|-------|--------|-----|
|    | 05/27 |     | INBOX    |       | 12/280 |      |       |        |     |
|    | 5/27  |     | OUTBOX   |       | 3      |      |       |        |     |
|    | 05/27 |     | SENTBOX  |       | 140    |      |       |        |     |
|    | 05/26 |     | NOTEBOX  |       | 20     |      |       |        |     |
|    | 5/26  |     | CREDITBOX |      | 3/10   |      |       |        |     |
|    | 05/26 |     | ALERTBOX |       | 24     |      |       |        |     |
|    | 05/26 |     | POSTBOX  |       | 312    |      |       |        |     |
|    | 05/26 |     | RATEBOX  |       | 24     |      |       |        |     |
|    | 05/26 |     | SHAREBOX |       | 45     |      |       |        |     |
|    | 05/26 |     | TEXTMBOX |       | 34     |      |       |        |     |
|    | 5/26  |     | TEMPBOX  |       | 5      |      |       |        |     |
|    | 5/26  |     | READBOX  |       | 7      |      |       |        |     |
|    | 05/26 | 25  | CAT1     | MPUB  | DISCON | TUTOR | INT  | 1.5    |     |
|    | 05/25 | 2   | CAT2     | PRI   | INVITE | HUMOR | LOC  | 3.2    |     |
|    | 05/25 | 10  | CAT3     | MPRI  | 3/10   | RESEA | NAT  | 4.0    |     |

( ADD NEW CAT )  ( DELETE CAT )  ( MY CATS )  ( INVITED CATS )  ( ALL CATS )  ( UPDATE MY INVITATION )

(MESSAGE) ( _____ )  ( ← FIND → )

| CATEGORY | TOP USA | FAVORITE | PERSONAL | SEARCH |

PERSONAL CATEGORIES
CREATE NEW CATEGORY

LIST BUILDER

USERID OR EMAIL

LIST NAME

SAVE  DELETE

| LIST NAME | |
| USERID | |
| EMAIL | |

CATEGORY NAME:
CATEGORY CLASS: (PUB, PRI, SPO)
CATEGORY TYPE:
CATEGORY SCOPE: (INT, NAT, STA, CITY)
ENTER SCOPE NAME:
(Country if NAT, State if STA, City if CITY)

CANCEL                    ACCEPT/DONE

MESSAGE

[THEME]

SEARCH
HOME　　　　　　　　　　SETTINGS

SELECT SEARCH ▽　　SAVE SEARCH
SEARCH CAT/ART/USER/SPON ▽　　DELETE SEARCH

SEARCH CURRENT PAGE ONLY | SEARCH ALL PAGES

| RANKING | CLASS | STATUS | TYPE | SCOPE | RATING |
|---|---|---|---|---|---|
| ALL | ALL | ALL | ALL | ALL | ALL |
| TOP10 | NP | N | ▽ | INT | ***** |
| TOP20 | PUB | NR |  | NAT | **** |
| TOP50 | PRI | R |  | STATE | *** |
| TOP100 | SPUB | F |  | CITY | ** |
|  |  | DS |  |  | * |

ENTER ID# OR KEYWORDS

CANCEL　　　　　　　　　SEARCH

| CATEGORY | TOP USA | FAVORITE | PERSONAL | SEARCH |

[THEME]

PERSONAL CATEGORIES
CREATE NEW CATEGORY

ADDITIONAL INFORMATION FOR SPONSORS

| TOTAL DISTRIBUTED CREDITS SO FAR | 324 |

ENTER THE AMOUNTS OF CREDIT TO BE DISTRIBUTED TO EACH USER:

| | |
|---|---|
| For each Referral | 1 |
| For each Telling | 1 |
| For each Invited | 1 |
| For each Sharing | 1 |
| For each Rating | 1 |
| For each Postings/Replies/Forwards | 1 |
| For accepting to receive Ads from sponsors | 2 |
| For reading sponsored Ad in a Category | 2 |

( CANCEL )  ( DONE )

MESSAGE

[THEME]

CATEGORY1
SUBJECT1

SELECT ONE:

| REPLY | POST |

SPONSOR MESSAGE ☐

COPY TO

| LIST NAME | ▽ |
| USERID | ▽ |
| EMAIL | ▽ |

YOU EARN # CREDITS FOR EACH REPLY OR POSTING
THIS MESSAGE IS SAVED IN POSTBOX

| SUBJECT: RE: SUBJECT1 | FROM: USERID2 |

MESSAGE

| ORIGINAL MESSAGE | FROM: USERID1 |

CANCEL          SEND

FIG. 94

10000 → eMail System description:

1. email message is sent to multiple users and locations
    a. additional storage for different mail servers
    b. potential security issue
    c. each user has to be copied with the individual emails
2. email attached file is sent to multiple users and locations
    a. additional storage for different mail servers
3. chances of email being lost is high
    a. for whatever the reason, people do not receive them
4. you might be getting email from anyone
    a. anyone knows your email, and anyone who has access to an email service can send an email to you
5. you may not even know those people
    a. you receive hundreds of junk/unwanted mail
6. all emails come to same inbox
    a. even though emails can be put into folders, they typically must be first sorted, deleted, categorized, etc. by the user

Communication using the Proposed System and Methods
1. private category friends A,B,C,D is created by user A, who also defines all the authorized/approved users like B,C and D 2. message is posted into one private category for those who are in the category
   a. no additional storage needed for different mail servers
   b. no potential security issue within the system
   c. no other registered user needs to be copied
   d. once a message is posted, no confirmation is needed from other users 3. file is created in one location using a data server, and link is posted to the category
   a. no additional storage needed for each file for each user
   b. just one file for all users to view or download 4. no chances of message being lost
   a. no more lost emails/messages
   b. message is posted in the private category and all the users can see that there is a new message in that category, and can setup alerts to be notified if there is a new message in that category 5. user will not be getting email/message from anyone outside the private category
   a. others may know your userid, but only those authorized/approved can post a message to the private category
   b. user can also block any other user to send a message, or user can create a list of authorized/approved member list that can send messages 6. only those people people authorized by the user can post or send a message
   a. no more junk mail
   b. in a private category, only those authorized/approved can access and post messages 7. user can create multiple private categories for communication with other users where (a) each posting is done to its designated private category, which requires no separate sorting or organization of messages 8. all previously send messages are kept in private categories for future reference
   a. no more loosing/deleting previous messages
   b. no more need to include past message, or to remember to do it
   c. no need for additional storage for emails with previous messages

Examples of some possible Communication using the Proposed System and Methods Description:

1. User A creates a category MyFamily and invites users, B,C and D.
2. User A creates a category myFriends and invites users, G and H.
3. User A creates a category GolfBuddy and invites users, B,G and I.
4. User A creates a category myFriends and invites users, G and H.
5. A Theme, mycompany.com was created and anyone with the email @mycompany.com can participate in the theme
6. User A creates a category myTeam and invites users, J, K and L, who are also part of the mycompany.com theme.
7. User A creates a category myTennisClub, a public Category, where anyone who is also part of the mytennis.com group can participate.
8. User A creates a category myFriend-X and invites user X. This is an example of one-to-one communication.
9. User A sets up his personal folder such that he receive messages to their INBOX only from those listed in MyPRIList file, like X, B, etc.
10. User A sets up his personal folder such that he receive messages to their INBOX, from anyone registered to the theme, except user Y has been blocked.
11. User A sets up his personal folder such that he does not receive messages from anyone to their INBOX.

1. User A executes three communications all at once:

a) post a message to a private category "friends" in a Theme with members A, B, C, and D, and where all members of the category can read and reply.

b) include the message to another registered user E in the theme. Because user E is not authorized for category "friends", the message will go to the INBOX of user E, as long as user A is allowed to send message to user E (set by user E).

c) include the message to another person who is not a registered member of the Theme, and the message goes the email address of the person.

Example of Replying/Sending a content using the Proposed System and Methods Description:

User B replies to the post by A. Similar to user A action in Figure 103., user B also includes the message to user E as well as non-user outside the Theme. Again, other users can read the posting by B as well as any other previous posting in this private category "friends".

FIG. 104

TRUSTED SOCIAL NETWORK

BACKGROUND

Since their introduction, blogs (like Mashable, Lifehacker, The Huffington Post) and social network sites (like MySpace, Facebook, and Twitter) have attracted millions of users, many of whom have integrated these sites into their daily practices. There are now hundreds of social networks and thousands of blogs supporting a wide range of interests and topics. However, if you are interested in follow or participate any number of these blogs or social network sites, you would have to go to their individual URL one by one and access to the content. This presents another problem, and that is users now have to be familiar with multiple user interfaces. In addition data is accessed in different ways which also makes it difficult for users learn all these different sites.

There are some alternatives like social network aggregators, but they do not provide social network capability of their own. Still others provide social network capability, but only for separate groups or organizations made up of small unconnected social network groups, but does not have the power of combined networks. In addition, there are no solutions to manage information on these blogs and social network sites all together, like searching, sorting, organizing, accessing, etc. in a combined manner. Users have to do that one by one in every site. Furthermore, most social network sites do not provide sufficient capability to users for categorizing content based on some general topics which makes relevant data spread around and make it difficult for searching and finding.

In these blogs and social network sites, user typically do not have the ability to send a message to only one person, or only to those select group of people. Typically information open to anyone and user has very little control on who to communicate with. To address this problem, instead, individuals and businesses also have been using emails for communication, which provides control over who to communicate with. However, emails do have number of drawbacks as well. For example, when an email is sent to five people, five copies of the original email is sent increasing the overall storage requirements substantially. Another problem with emails is the lost emails. Many users complain that they did not receive the email. For number of reasons emails do not arrive at their intended destinations. Some of them end up in so called "junk mail" folders, which some people do not look at or check only rarely. Another problem with emails is that anyone who knows your email address can send and email and you cannot effectively control that. So, users end up with hundreds of emails in their inbox that they have to review and delete, which wastes time and causes distraction. Another problem with email is that all emails come to your only email inbox. It takes time and effort to review and sort them based on content or who it is coming from.

Another problem with these sites is that they provide only one way of communication like, either posting, or text messaging, etc. User cannot use posting, text messaging, emailing, and private messaging for communication in one site. Another problem with these blogs and social network sites is generally users do not know if there is a message or communication or content until user logs in to the sites individually one by one.

Another problem is the privacy issue. In many of these blogs and social network sites, information is open to the public and shared. This aspect of the social networks limits use of social networks for businesses, government agencies, educational institutions, etc. Blogs and social networks, as the name suggest, are primarily connecting people in a social environment, but not meant to be used in a business environment where privacy and security are important.

Another problem with these sites that they do not have rating or ranking of content or users. Not having such capabilities typically promotes content that is not desirable by many users. In addition, these sites do not provide incentives to users for participation and contribution. As a result, quality of the content created in these sites may suffer.

Therefore, there is a strong need for a system and methods for creating, managing, searching, categorizing, sharing, collecting, aggregating and communicating public and private content and personal messages through multiplicity of communication channels like posting, personal email, and text, audio, and video messaging. Furthermore, system and methods for connecting users to multiplicity of content like social networks, blogs, events, discussion boards, news and for enabling users to access content through wireless as well as wired networks, utilizing portable and non-portable electronic hardware device. Furthermore, system and methods for providing a unified hierarchical user interface for content display, management, access and communication. Furthermore, system and methods for incentivizing users for participation and quality content by use of credits, and ranks and ratings of users and content. Furthermore, system and methods for enabling sponsors to engage with users by sponsoring categories or target users at specific categories based on user interest and by providing incentives to those users for their participations. Furthermore, system and methods for enabling business managing their content and internal communications in a private and secure environment.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A system for providing a trusted network includes a one-way trust lists data store loaded in the memory including a first one-way trust list of a first member and a second one-way trust list of a second member. The first one-way trust list stores information identifying a first set of members related to the first member that reciprocally trust each other and the second one-way trust list information identifying a second set of members related to the second member that reciprocally trust each other. In order to become a reciprocal trusted member between two members, both members have to send a specific message to the other counterpart member to specifically agree to be a trusted member of the other counterpart member. The system further includes a master reciprocated trust folders data store loaded in the memory to store a plurality of reciprocated trusted folders, each of the reciprocated trusted folders storing content exchanged amongst corresponding members that reciprocally trust each other. The system further includes a reciprocated trust management engine loaded in the memory and executed by the processor, the reciprocated trust management engine being coupled to the one-way trust lists data store and to the master reciprocated trust folders data store.

The reciprocated trust management engine receives first content exchanged between the first member and the second member; in response to the first content, matches a first entry in the first one-way trust list with the second member to determine whether the first member trusts the second member, where the first entry includes identifying information of the second member if the first member trusts the second member; matches a second entry in the second one-way trust list with the first member to determine whether the second member trusts the first member, wherein the second entry includes identifying information of the first member if the second member trusts the first member; creates a first reciprocated trust folder for a group of members including the first member and the second member only if the first entry of the first one-way trust list matches the second member and the second entry of the second one-way trust list matches the first member; stores the first content as trusted content in the first reciprocated trust folder; maintains the first reciprocated trust folder in the master reciprocated trust folders datastore as one of the plurality of reciprocated trust folders stored therein; only both the first member and the second member have access to the trusted content from the first reciprocated trust folder, including modifying the trusted content stored in the first reciprocated trust folder; and the first reciprocated trust folder stores a single instance of the trusted content that is shared between the first member and the second member.

BRIEF DESCRIPTION OF THE DRAWINGS

FIGS. 10-25 depict conceptual examples of screenshots of a device a member is using to indicate settings in a trusted social network system.

FIG. 38 depicts a conceptual diagram of a screen shot of an example of a personal main page.
Examples of pages that can be displayed in association with a personal folder are illustrated in FIGS. 39-50.
FIG. 41 depicts a conceptual diagram of a screenshot of an example of a create new category screen shot.
FIG. 51 depicts a conceptual diagram of a screenshot of an example of a search main page screen shot.

Figure 82:
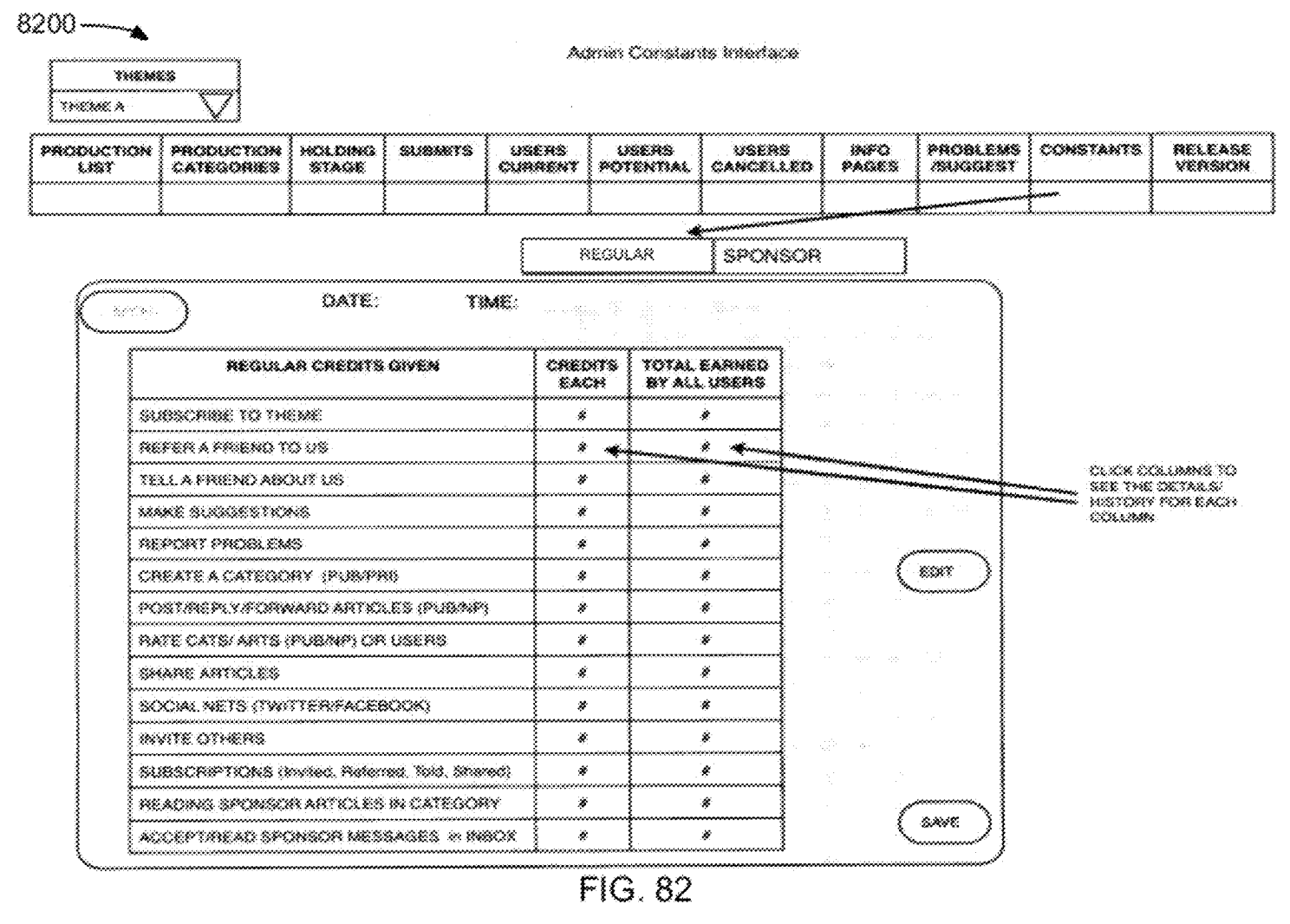

FIG. 82 shows an example of an administrative constants interface of a trusted social network.

FIG. 87 shows an example of a personal categories screen of a trusted social network.

FIG. 94 shows an example of a content forwarding screen of a trusted social network.

FIG. 100 shows an example of a method for using an eMail system in accordance with a trusted social network.

FIG. 101 shows an example of a method for communication using a trusted social network.

FIG. 102 shows an example of possible communication methods using a trusted social network.

FIG. 103 shows an example of a method for posting/sending content using a trusted social network.

FIG. 104 shows an example of a method for replying/sending content using a trusted social network.

DETAILED DESCRIPTION

Figure 1:
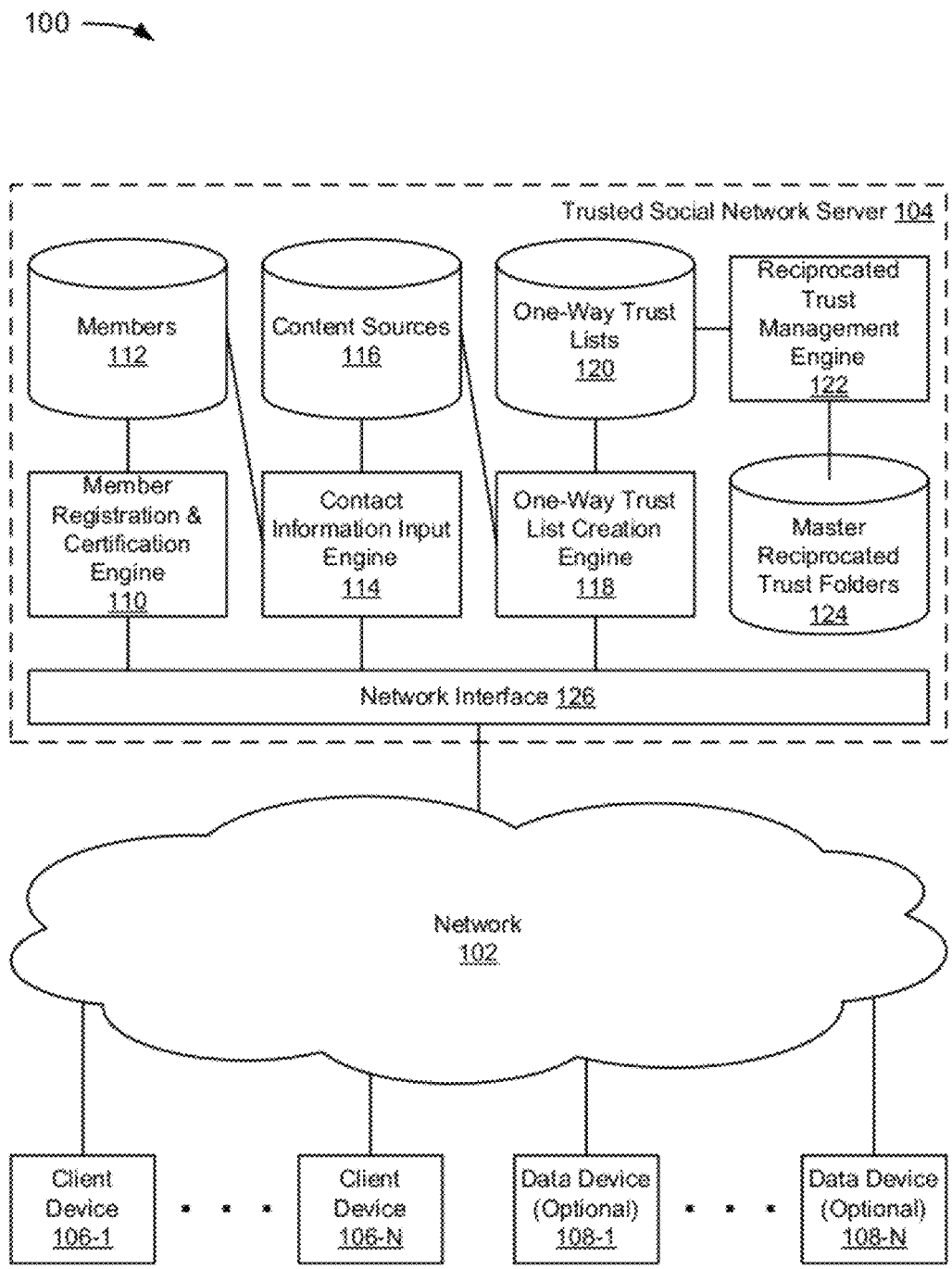
FIG. 1 depicts an example of a trusted social network system.

FIG. 1 depicts an example of a trusted social network system 100. In the example of FIG. 1, the system 100 includes a network 102, a trusted social network server 104, client devices 106-1 to 106-N (collectively, the client devices 106), and data devices 108-1 to 108-N (collectively, the data devices 108). The trusted social network server 104, client devices 106, and data devices 108 are coupled to the network 102.

In the example of FIG. 1, the network 102 can include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the network 102 broadly includes, as understood from relevant context, anything from a minimalist coupling of the components illustrated in the example of FIG. 1, to every component of the Internet and networks coupled to the Internet.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. The memory can include, by way of example but not limitation, random access memory (RAM), such as dynamic RAM (DRAM) and static RAM (SRAM). The memory can be local, remote, or distributed. The term "computer-readable storage medium" is intended to include physical media, such as memory. The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to the interface. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. File management systems are typically stored in non-volatile storage and cause the processor to execute the various acts required by the operating system to input and output data and to store data in the memory, including storing files on the non-volatile storage. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. Another example of operating system software with associated file management system software is VM (or VM/CMS), which refers to a family of IBM virtual machine operating systems used on IBM mainframes System/370, System/390, zSeries, System z, and compatible systems, including the Hercules emulator for personal computers.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs to configure the general purpose systems in a specific manner in accordance with the teachings herein, or it may prove convenient to construct specialized apparatus to perform the methods of some embodiments. The required structure for a variety of these systems will appear from the description below. In addition, the techniques are not described with reference to any particular programming language, and various embodiments may thus be implemented using a variety of programming languages.

Referring once again to FIG. 1, in the example of FIG. 1, the trusted social network server 104 includes a member registration and certification engine 110, a members datastore 112, a contact information input engine 114, a content sources datastore 116, a one-way trust list creation engine 118, a one-way trust lists datastore 120, a reciprocated trust management engine 122, a master reciprocated trust folders datastore 124, and a network interface 126.

The trusted social network server 104 can be implemented on a known or convenient computer system. Only one trusted social network server 104 is illustrated in FIG. 1, but it should be understood that a single entity could have multiple distinct devices with server software implemented thereon, and multiple entities could be coupled to the network 102 and part of a collaborative social network service. Moreover, partial functionality might be provided by a first device and partial functionality might be provided by a second device, where together the first and second devices provide the full functionality attributed to the trusted social network server 104. It should be further noted that some of the functionality attributed to the trusted social network server 104 could be carried out on a client device (e.g., a one-way trust list could be created at a client device and sent to the trusted social network server 104 after it is created).

The exact configuration of the trusted social network server 104 can vary depending upon the entity that is offering the service. Businesses are likely to be more controlling of member activities, and may include automatic reciprocated trust for employees, or automatic one-way trust for certain employees (e.g., all employees automatically include CXO contact information in their one-way trust lists, but the CXOs do not necessarily include all employees in their one-way trust lists). Employees may also have more restrictions on establishing trust with parties outside of the business due to the business' concerns about accepting malware from outside sources or enabling employees to spend time with non-business contacts.

The member registration and certification engine 110 and other engines described in this paper include computer-readable media coupled to a processor. The computer-readable media have data, including executable files, that the processor can use to transform the data and create new data. An engine can include a dedicated or shared processor and firmware or software modules (implemented in memory) that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The member registration and certification engine 110 is configured to register members in the trusted social network associated with the trusted social network server 104. The members can be input through an administrative procedure using data that is available within a business concern (e.g., by a systems administrator), through a member-facing registration procedure (e.g., through a web page interface), or in some other applicable fashion. At a minimum, a member will need to provide or be assigned contact information. The contact information used can be considered implementation-specific, but a likely implementation will include an electronic address (e.g., email address) or a phone number, which can be used for calls, SMS, or as a unique identifier for a member. Certification is often desirable to ensure that members are legitimate, and can include procedures such as authentication (e.g., password, security question, or the like), validation of the device (e.g., one of the client devices 106), use of a certification authority, or another applicable certification process. This can reduce the risk that members are not who they say they are.

Data associated with members can be stored in the members datastore 112, which is coupled to the member registration and certification engine 110. The members datastore 112, and other datastores described in this paper, can be implemented, for example, as software embodied in a physical computer-readable medium on a general- or specific-purpose machine, in firmware, in hardware, in a combination thereof, or in an applicable known or convenient device or system. This and other datastores described in this paper are intended, if applicable, to include any organization of data, including tables, comma-separated values (CSV) files, traditional databases (e.g., SQL), or other known or convenient organizational formats.

In an example of a system where a datastore is implemented as a database, a database management system (DBMS) can be used to manage the datastore. In such a case, the DBMS may be thought of as part of the datastore or as part of a broader system (e.g., the trusted social network server 104), or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

Member data that is stored in the members datastore 112 can be considered implementation-specific, but will generally at least include contact information for the member. Generally, larger amounts of data improve the ability of the system to certify the member, customize the member experience, or the like. Businesses will often have a great deal of information about employees, while non-business concerns will typically have less. Where the social network includes a market-place, member data can also include financial information, such as credit card numbers or other commerce-related data.

The contact information input engine 114 is configured to facilitate input of contact information of a member, receive input of the contact information, or in some other manner obtain and store the contact information in the content sources datastore 116. The contact information input engine 114 can facilitate input of contact information from a member (e.g., a member using one of the client devices 106), from a systems administrator (e.g., through an input device or from one of the client devices 106), or from some other human or artificial agent. The format of the contact information can be considered implementation-specific. Examples include an Outlook address book, a comma-delimited list, a Facebook friends list, or some other applicable format. The contact information input engine 114 can, depending upon the implementation, obtain contact information in an identified location, accept manual input, or accept the contact information in some other applicable manner.

Some contact information input by a first member might be contact information of a second member. A physical delineation between the members datastore 112 and the content sources datastore 116 is not critical, and the contact information for members could be stored in the same physical datastore as the contact information for non-members. For illustrative purposes, the content sources datastore 116 is generally treated as a repository for all contact information of contacts for each user and other sources of messages (or, more generally, content), while the members datastore 112 is generally treated as a repository of member-specific information (provided by the member or input by a systems administrator) excluding the content sources. To the extent there is overlap, the discussions in this paper can appear to suggest logical redundancy of, for example, an email address of a second member that is part of the members datastore 112 and the same email address that a first member provides as contact information stored in the content sources datastore 116, but storage of the data may or may not be physically redundant. It may be noted that "member information" can include both data from the members datastore 112 for the member, and data in the content sources datastore 116 for, e.g., contacts of the member. Where a distinction is desired, the member information can be referred to explicitly as, for example, "member registration data" and "member contacts data."

Although the example described with reference to FIG. 1 primarily focuses on contact information as content sources, other content sources can be used. For example, a member could indicate a blog is a trusted content source. The treatment of such a content source may vary depending upon the system. For example, in a corporate environment, certain sources of information may be particularly relevant to a group of members; so such information might be stored in the reciprocated trust folders of a group. As another example, a member may have a personal blog, and the blog could be treated as one type of allowable input to a reciprocated trust folder in which the member is a participant. In general, content sources will generally need to be incorporated into a member identity because the social network associated with the trusted network server 104 is a network of members, but the definition of a member can vary depending upon the implementation- or configuration-specific constraints put on a system. It is expected that in many cases, an email address will be an acceptable content source for a particular member, but a decision regarding whether, e.g., an RSS feed, is an acceptable content source for a particular member might vary depending upon the deciding party.

It should be noted that there can be a hierarchy of membership, as well. For example, a three-level hierarchy could include members, trusted sources, and non-trusted sources. If a member vouches for a content source, it can be treated as a trusted source without the content source becoming a part of the member's identity. Other members, a systems administrator, or some other relevant party can decide whether the content source is trusted, as well. A reciprocated trust folder for members that all trust a content source could, if properly implemented and/or configured, store content for the content source.

The one-way trust list creation engine 118 is configured to identify contacts for which trust exists, create a list of the trusted contacts, and store the list of trusted contacts in the one-way trust lists datastore 120. The trust is "one-way" because members are not normally capable of forcing other members to trust them. (As is discussed elsewhere in this paper, in certain cases, trust may be assumed, such as trust for a boss member by employee members.) The format of the one-way trust list can be considered implementation-specific. In one implementation, the one-way trust list is a list of addresses from which messages are receivable. If an address is not on the list, any messages are not delivered (or are directed to some location other than the applicable inbox). In a specific implementation, each contact of a member is stored as a record, and the contacts are approved by indicating as much in a trust field of the record associated with the contact. Depending upon the implementation, all or a subset of the addresses of the contact can be approved (e.g., either the contact has a single trust field that covers all addresses of the contact or one or more addresses of the contact have discrete trust fields).

The reciprocated trust management engine 122 is configured to match a first member to a second member where the one-way trust list of the first member includes the second member and the one way trust list of the second member includes the first member, and create a private communication environment for the first member and the second member. When a match occurs, the second member has indicated a reciprocated trust for the first member (and vice versa). The reciprocated trust management engine 122 then manages a reciprocated trust folder for the first member and the second member. Any messages sent from the first member to the second member are stored in the reciprocated trust folders, as well as any attachments, documents, or other data that is sent to the private environment. The reciprocated trust folders are described in detail later.

Messages and other data in a reciprocated trust folder can be treated as part of a master reciprocated trust folders datastore 124. The folders are "centralized" in the sense that the data can be stored in a single location for all parties to the private environment. However, as is generally the case for datastores described in this paper, the data can actually be stored in a distributed fashion. In order to avoid confusion associated with the term "centralized storage," the private repository is referred to as "master storage." The parties to the private environment can delete or perhaps not even receive messages or data that is in the master storage, or can potentially have messages or data redundantly stored on client devices as well as in the master storage (assuming applicable hardware and an appropriate implementation and/or configuration). This organization has benefits, such as improved search, read notifications, etc., which are described later in this paper.

The network interface 126 is coupled to the network 102. The network interface 126 can facilitate appropriate connections to, e.g., the Internet, wireless networks, or the like. For illustrative simplicity, it is assumed that an application programming interface (API), if applicable, is part of the network interface 126, and that an API could also be provided to a client or data device for implementation thereon.

In the example of FIG. 1, the client devices 106 are coupled to the network 102. The client devices can include applicable portable or non-portable electronic hardware devices, such as smart phones, desktop computers, a device that can use 802.11, 3G, Wi-Max and/or another known or convenient wireless protocol, or the like. The client devices 106, or a subset thereof, may or may not be capable of carrying out certain functionality that has been attributed to the server 104. For example, one or more of the client devices 106 may or may not be capable of maintaining a contact information datastore and generating a one-way trust list therefrom. In an implementation in which one or more of the client devices 106 include such functionality, the server may or may not be redundantly capable of receiving contact information and creating one-way trust lists therefrom, but in any case will in addition be capable of receiving one-way trust lists from the client devices 106 in order to be able to identify reciprocated trust.

In the example of FIG. 1, the data devices 108 are coupled to the network 102. The data devices 108 are intended to illustrate that the server 104 can optionally store some or all of the contents of the various datastores at a remote location (e.g., in the cloud or in a third party repository). Where the datastores are maintained within a network maintained by an entity (e.g., a private network), the data devices 108 are not necessary. Where a datastore is maintained in a remote location, unless indicated by the context, the "datastore" will include only the data that is currently stored within the network maintained by the entity in question, which will be a subset of the "distributed datastore." If it is desirable to refer to a datastore that is maintained at the data devices 108, reference to the data devices 108 will be explicit (or the datastore will explicitly be referred to as a "distributed datastore") unless the intention is sufficiently clear from the context.

The system 200 can be combined with other similar systems to create trusted social network silos. Alternatively, the system 200 can be combined with other similar systems to create a trusted social network hierarchy.

Figure 2:
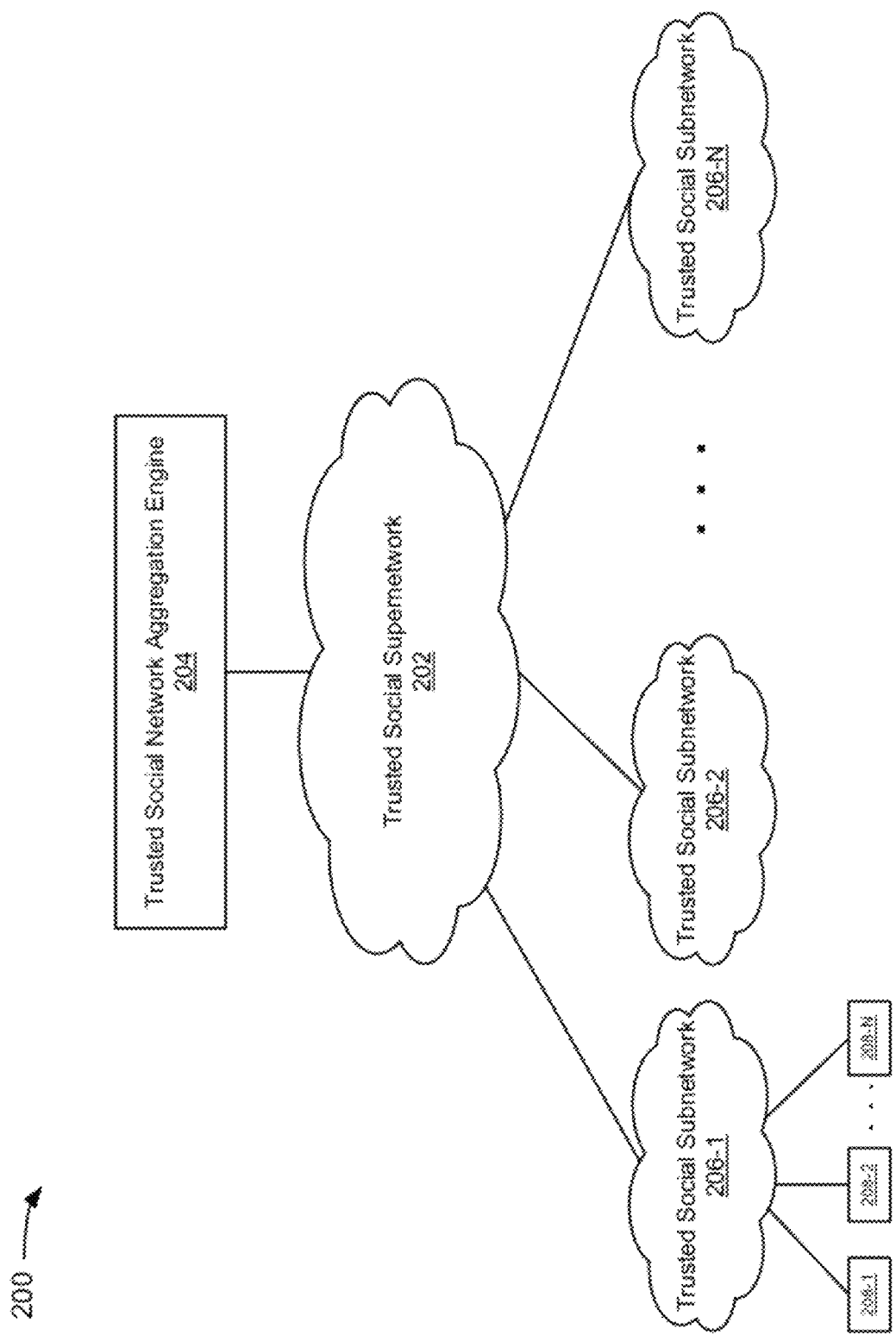
FIG. 2 depicts an example of a system having a trusted social network hierarchy.

FIG. 2 depicts an example of a system 200 having a trusted social network hierarchy. The system 200 includes a trusted social supernetwork 202, a trusted social network aggregation engine 204, trusted social subnetworks 206-1 to 206-N (referred to collectively as the trusted social subnetworks 206), and devices 208-1 to 208-N (referred to collectively as the devices 208). The combination of the supernetwork 202 and the subnetworks 206 can be referred to as "a hierarchical trusted social network." The term "trusted social network" can include both hierarchical and non-hierarchical trusted social networks, and where context does not make the distinction relevant, one or the other term can be used to explicitly refer to one or the other type of trusted social network.

In the example of FIG. 2, the trusted social supernetwork 202 can be associated with a trusted social network server, such as the trusted social network server 104 depicted in the example of FIG. 1. The trusted social supernetwork 202 can, in addition, have an associated trusted social network aggregation engine 204. The trusted social network aggregation engine 204 aggregates social networks and at least in part incorporates the social networks into the trusted social supernetwork 202. In this way, the trusted social subnetworks 206 can have distinct subnetwork memberships, and the members of the trusted social subnetworks 206 will also be members of the trusted social network comprising the trusted social supernetwork 202. The trusted social subnetworks 206 can support devices 208 of subnetwork members and, depending upon the implementation and/or configuration, the devices 208 can themselves be associated with sub-subnetworks (not shown in the example of FIG. 2). Thus, the trusted social network hierarchy can have an arbitrarily large number of hierarchical levels. A trusted social subnetwork of the trusted social subnetworks 206 can have a trusted social network aggregation engine (not shown in the example of FIG. 2), or the trusted social network aggregation engine 204 can instead be responsible for aggregating sub-subnetworks of the trusted social subnetworks 206.

In a specific implementation, the trusted social network 202 can be managed by a first private party, such as a social network provider. The trusted social subnetworks are initially individual networks managed by second private parties, such as corporate entities. The trusted social network aggregation engine 204 can add the individual networks to the social network by an automated procedure and/or in accordance with an agreement with the second private parties. When the trusted social subnetworks 206 become part of the hierarchical trusted social network, the members of the trusted social subnetworks 206 can become members of the trusted social supernetwork 202. Administrative controls or member settings can control the degree to which members of the trusted social supernetwork 202 are trusted by members of the various trusted social subnetworks 206, and it is expected that certain second private parties will desire to treat members of other trusted social subnetworks as potential security risks (e.g., a first company will likely trust its own employee members, but is not necessarily going to trust employee members of a second company to the same degree). However, it may still be useful to a first of the second private parties to know that a second of the second private parties have members that are certified, authenticated, or otherwise vetted in accordance with the member registration procedures of the trusted social network.

Figure 3:
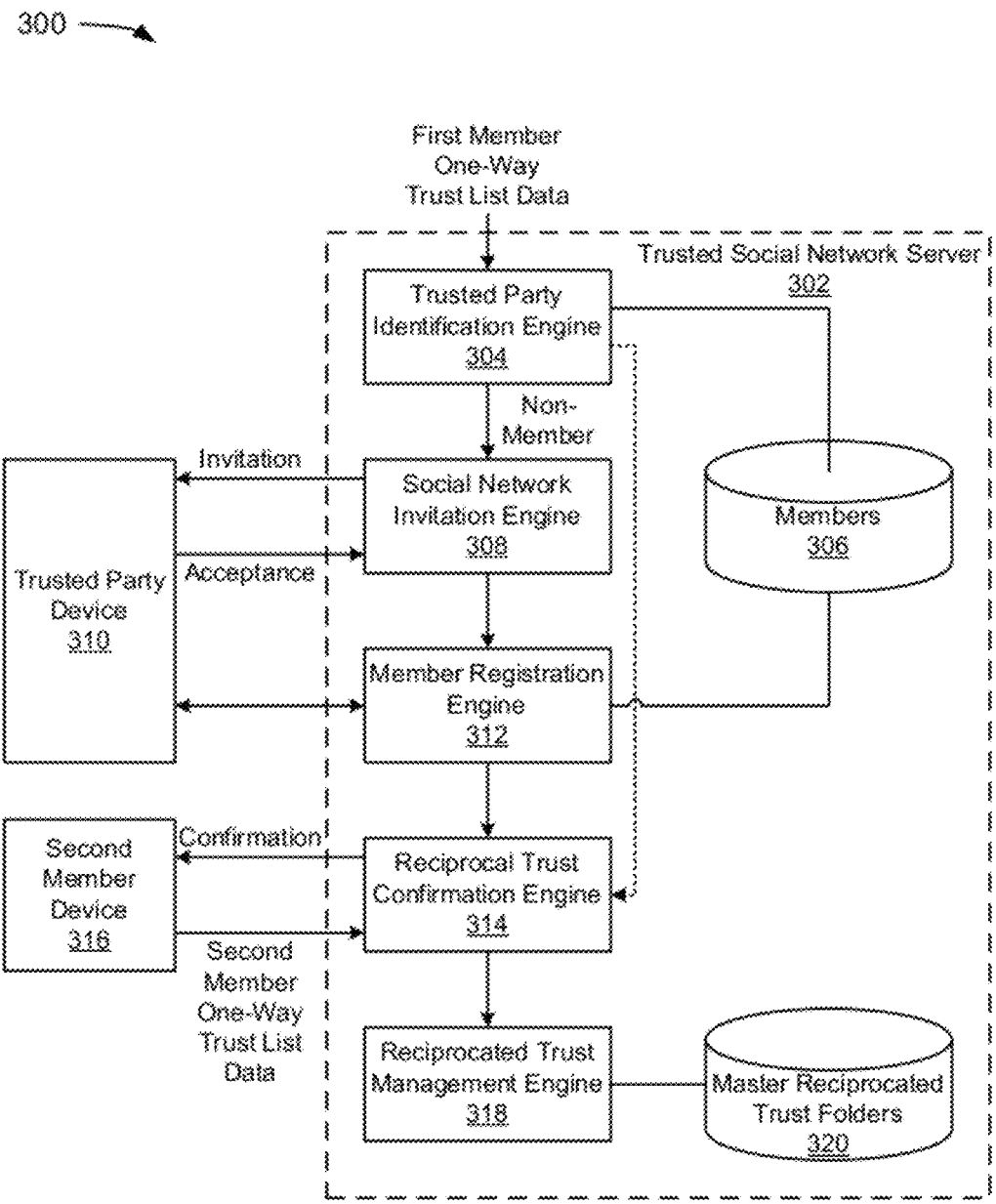
FIG. 3 depicts an example of a trust reciprocation system.

FIG. 3 depicts an example of a trust reciprocation system 300. The system 300 includes a trusted social network server 302, a trusted party device 310, and a second member device 316. In the example of FIG. 3, the trusted social network server 302 includes a trusted party identification engine 304, a members datastore 306, a social network invitation engine 308, a member registration engine 312, a reciprocal trust confirmation engine 314, a reciprocated trust management engine 318, and a master reciprocated trust folders datastore 320. The trusted party device 310 and the second member device 316 may or may not be the same device.

In the example of FIG. 3, the trusted party identification engine 304 receives first member one-way trust list data. The first member one-way trust list data can include data sufficient to identify a party (referred to alternatively in this example as a "trusted party" and a "second member") as trusted by the first member. In a specific implementation, the first member one-way trust list data is derived from a one-way trust list of the first member, a portion of the one-way trust list of the first member, a master list of trusted parties, or some other applicable listing of parties that the first member, or members of a group of which the first member is a part, have indicated or are presumed to trust.

In the example of FIG. 3, the trusted party identification engine 304 may be unable to determine that the party that the first member has indicated is trusted is a member of the social network associated with the trusted social network server 302. If the trusted party cannot be identified in the members datastore 306, which for illustrative purposes is assumed to include data sufficient to identify each member of the social network, the trusted party is presumed to be a non-member. In this case, the social network invitation engine 308 sends an invitation to a trusted party device 310. In a specific implementation, the social network invitation engine 308 uses the first member one-way trust list data or contact information derived therefrom to send the invitation to the trusted party (e.g., an email message) that the trusted party can access through, typically, one of many devices (e.g., a smart phone or a web browser on a home desktop or work computer). The precise contact information used (e.g., email, phone number, etc.) and the precise identity of the trusted party device 310 are generally implementation- and/or configuration-specific.

In the example of FIG. 3, the social network invitation engine 308 receives an acceptance from the trusted third party device 310 to join the social network. It should be noted that just as the trusted party can receive the invitation on, often, more than one device, the trusted party can indicate an acceptance of the invitation on more than one device, and the device at which the invitation is received and the device from which acceptance is indicated are probably, but not necessarily, the same device. (E.g., a user could receive an SMS message on a smart phone and type an email on a desktop that indicates acceptance.) In some cases, the invitation will be received on more than one device (e.g., the invitation is received on a work computer through a browser, but the user waits until returning home to access the invitation through a browser on a home computer, at which time the user indicates acceptance of the invitation).

In the example of FIG. 3, when the social network invitation engine 308 receives an indication that the trusted party has accepted the invitation to join the social network, the member registration engine 312 registers the trusted party as a member, and can store information associated with the trusted party (the "second member") in the members datastore 306.

In the example of FIG. 3, the reciprocal trust confirmation engine 314 attempts to determine whether the second member also trusts the first member. If the trusted party was not initially a member, the reciprocal trust confirmation engine 314 can attempt to determine whether the second member trusts the first member after the trusted party has been registered. In the example of FIG. 3, the reciprocal trust confirmation engine 314 provides a confirmation message to the second member device 316. The second member device 316 may or may not be the same as the trusted party device 310. Because more information is generally known about the second member after registration than before, the confirmation message could be provided through a channel that was not available to the social network invitation engine 308 (e.g., the trusted party could have been identified by a phone number, and during registration the trusted party indicated a preferred email address). Members could also be provided a social network address through which communications are directed to members (e.g., members of the social network could be given new email addresses within a domain associated with the social network, such as a business email address). It may be noted that the confirmation message may or may not be provided in the same message as the invitation message, facilitating a single transaction in which the trusted party can register as the second member and confirm that the first member is trusted. In any case, the reciprocal trust confirmation engine 314 receives second member one-way trust list data sufficient to identify the first member as trusted by the second member. (It is assumed for illustrative purposes that the second member so indicates, though it is also possible for the second member to not so indicate, resulting in a lack of reciprocal trust.) The second member one-way trust list data can include an indication that the second member trusts the first member, or it could have the same characteristics as the first member one-way trust list data as described above, but for the second member instead of the first member. Because the example of FIG. 3 illustrates an example in which the first member is a known member of the social network, it is not necessary for the trusted social network server 302 to identify the first member (though an identification process could be included in certain implementations), and the reciprocal trust confirmation engine 314 can determine that the first member trusts the second member (as was previously determined from the first member one-way trust list data in this example) and the second member trusts the first member (as was determined from the second member one-way trust list data).

In some instances, the trusted party can be identified as a member ("the second member") of the social network by the trusted party identification engine 304. In such instances, the social network invitation engine 308 and the member registration engine 312 can be skipped, as is represented in the example of FIG. 3 by the dotted arrow from the trusted party identification engine 304 to the reciprocal trust confirmation engine 314. It need not be the case that a confirmation message is generated for the second member (e.g., the reciprocal trust could be established automatically when both the first member and the second member indicate reciprocal trust without informing the first member and the second member). In a specific implementation, the reciprocal trust confirmation engine requests confirmation from the second member that the first member is reciprocally trusted, and obtains second member one-way trust list data, for example, as was described previously.

In the example of FIG. 3, when reciprocal trust between the first member and the second member has been confirmed, the reciprocated trust management engine 218 creates a private communication environment for the first member and the second member, which may be referred to in this paper as a "folder." For illustrative purposes, the folder is maintained in the master reciprocated trust folders datastore 320.

Alternatively, if the second member was identified as a member by the trusted party identification engine 304, the social network invitation engine 308 and the member registration engine 312 can be bypassed, which is represented in FIG. 3 as the dashed arrow from the trusted party identification engine 304 to the reciprocal trust confirmation engine 314.

Figure 4:
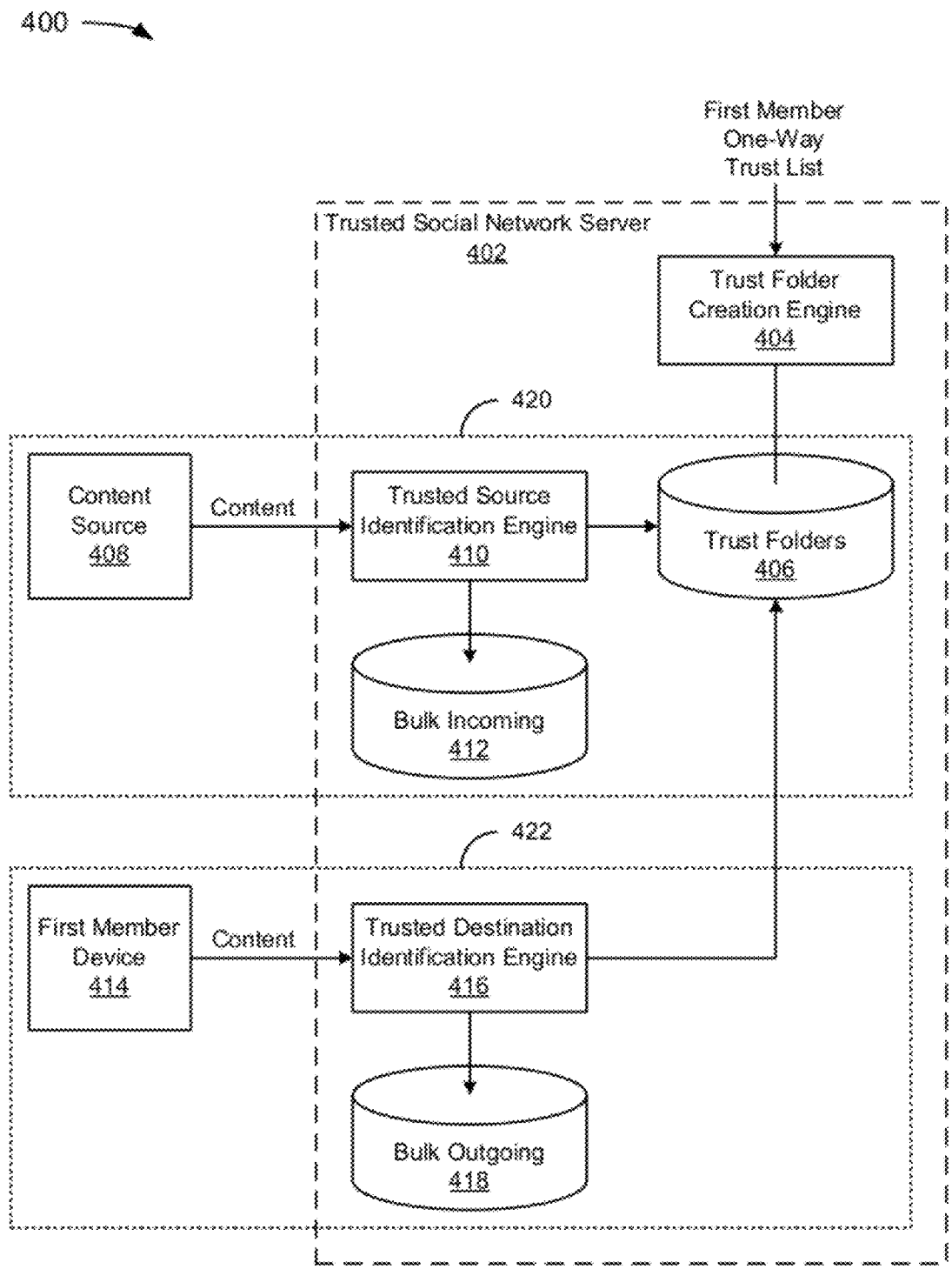
FIG. 4 depicts an example of a system including trust folders.

FIG. 4 depicts an example of a system 400 including trust folders. The system 400 includes a trusted social network server 402, a content source 408, and a first member device 414. The trusted social network server 402 includes a trust folder creation engine 404, a trust folders datastore 406, a trusted source identification engine 410, a bulk incoming datastore 412, a trusted destination identification engine 416, and a bulk outgoing datastore 418.

In the example of FIG. 4, the trust folder creation engine 404 creates a folder for a first member in accordance with a first member one-way trust list. In a specific embodiment, the trust folder creation engine 404 creates a folder for each content source in the first member one-way trust list. That is, for each content source that the first member identifies as trusted, the trust folder creation engine creates a trust folder, which is maintained in the trust folders datastore 406.

In the example of FIG. 4, an incoming content scenario is conceptually correlated to the dotted box 420. In the incoming content scenario, the trusted source identification engine 410 receives content from the content source 408. If the content source 408 is identifiable as being represented in the first member one-way trust list, then the trust folder creation engine 404 will have created a trust folder associated with the content source 408 into which the content from the content source 408 is stored (i.e., the content is stored in the trust folders datastore 406). If, on the other hand, the content source 408 is not identifiable as being represented in the first member one-way trust list, then the trust folder creation engine 404 will not have created a trust folder associated with the content source 408, and the content is instead stored in the bulk incoming datastore 412. It should be noted that for the purpose of this example, if an administrator has indicated that the content source 408 is constructively trusted by the first member, the content source 408 is treated as identifiable in the first member one-way trust list. It should be further noted that the content source 408 can be associated with a member or a non-member, and in the case of a non-member, the content source 408 can be associated with an entity that is capable of becoming a member (e.g., a human or artificial entity) or a content source that cannot be made a member (e.g., an RSS feed). In alternative implementations, the bulk incoming datastore 412 can be, for example, treated much like a junk mail folder (or a standard email inbox where trusted content is stored in the trust folders), temporary (e.g., while a member transitions into a social network, but before the member has had a chance to update the first member one-way trust list with trusted content sources), or automatically deleted (e.g., in accordance with rules in a corporate network in which only trusted sources of content are accepted).

In the example of FIG. 4, an outgoing content scenario is conceptually correlated to the dotted box 422. In the outgoing content scenario, the trusted destination identification engine 416 receives content from the first member device 414. If the destination is identifiable as being represented in the first member one-way trust list, then the trust folder creation engine 404 will have created a trust folder associated with the destination into which the content from the first member is stored (i.e., the content is stored in the trust folders datastore 406). If, on the other hand, the destination is not identifiable as being represented in the first member one-way trust list, then the trust folder creation engine 404 will not have created a trust folder associated with the destination, and the content is instead stored in the bulk outgoing datastore 418. It should be noted that the destination is identified in the first member one-way trust list as a trusted source (not necessarily as a trusted destination). However, content from the first member that is directed to the destination will be stored in the same trust folder (or perhaps in an associated folder) as the trusted content source. This will enable the first member to manage all incoming and outgoing content associated with the trusted source in a master location.

The trust folders described in association with the example of FIG. 4 may or may not be reciprocated trust folders. If a second member who is a trusted content source of the first member indicates that the first member is a trusted content source, the trust folder of the first member can be converted into a reciprocated trust folder to which both the first member and the second member have access. It may or may not be the case that historical data (prior to the second member indicating reciprocal trust) is made available to both the first member and the second member through the reciprocated trust folder. For example, a new member to a trust folder might be granted access to content timestamped on or after the new member became part of the group associated with the trust folder, and access to older content may or may not be granted on a case-by-case basis that can be considered implementation- and/or configuration-specific.

In a specific implementation, a member will have the ability to modify the contents, format, and other characteristics of the member's trust folders, but trusted content sources will not have the same control over the trust folder unless the trust folder is converted to a reciprocal trust folder. Until the trust folder is converted, content sources may only have the ability to send content, such as messages.

Figure 5:
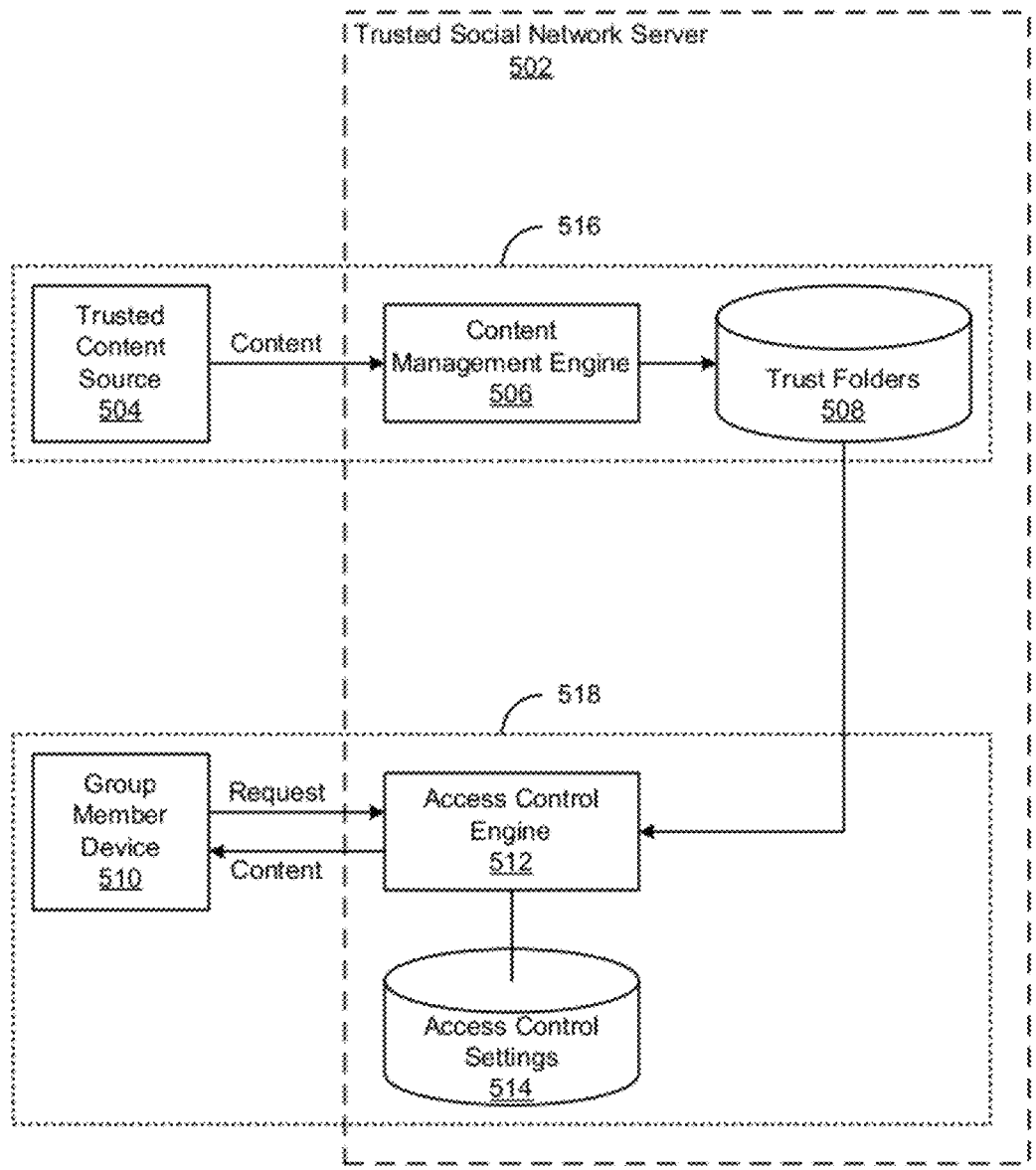
FIG. 5 depicts an example of a system for controlling access to a trust folder.

FIG. 5 depicts an example of a system 500 for controlling access to a trust folder. The system 500 includes a trusted social network server 502, a trusted content source 504, and a group member device 510. The trusted social network server 502 includes a content management engine 506, a trust folders datastore 508, an access control engine 512, and an access control settings datastore 514.

In the example of FIG. 5, an incoming content scenario is conceptually correlated to the dotted box 516. In the incoming content scenario, the content management engine 506 receives content from the trusted content source 504. In a specific implementation, the content management engine 506 includes a trusted source identification engine, such as the trusted source identification engine 410 (FIG. 4). In another specific implementation, the content management engine 506 includes a trusted destination identification engine, such as the trusted destination identification engine 416 (FIG. 4). For illustrative purposes, since the content source from which the content is received is presumed to be trusted, the content management engine 506 puts the content in a trust folder of the trust folders datastore 508. In a specific implementation, the content management engine can include a content blocking rule sliding scale ranging from blocking no content sources to blocking all content sources that are not identifiable from the first one-way trust list.

In the example of FIG. 5, a content access request scenario is conceptually correlated to the dotted box 518. In the content access request scenario, the access control engine 512 receives a request for content from a group member device 510. For illustrative purposes, the request is presumed to come from a group member of the relevant trust folder. The access control engine 512 checks access control settings in the access control settings datastore 514 for the group member, which presumably means the group member is granted access to the trust folder. Accordingly, the access control engine 512 enables access to the content. If a request was from a member who did not have access rights, the access control engine 512 would instead deny the request. In a specific implementation, the request may or may not be explicit in the sense that a member can see folders to which the member has access, but cannot see folders to which the member does not have access. In such an implementation, the request for content can be considered part of the transaction that involves, e.g., opening content that is visible to the member. In a specific implementation, different group members may or may not have different access rights for certain content. For example, one group member might have read-only access to some or all content in a trust folder or the access control settings could implement document versioning controls to grant read/write access to a first member who opens content, but read-only access to a second member who opens the same content. Access control settings can also be constrained by parameters, such as time, file type, author, etc. For example, a content source could send a message that must be read within 24 hours or the message is no longer available for viewing (an example of a time-constrained access control), or some or all contents of a trust folder might only be accessible during normal business hours (another example of a time-constrained access control), or only authors of content can open the content in read/write mode (an example of a file characteristic-constrained access control).

In the example of FIG. 5, the access control engine 512 can also facilitate modification of access control settings in the access control settings datastore 514. A group member associated with a trust folder may be given access to a user interface or instructions could be provided through other means (e.g., by sending an email message to a system mailbox with control parameters in the message). Systems administrators may also be able to adjust access control settings using the access control engine 512.

Advantageously, the access control engine 512 can include an access certification engine that indicates when a member of a group has received a message in the trust folder. Access certification is enabled by master storage of the contents of the trust folder, and a need for members to access content from the master storage. (Depending upon access control rules, it may or may not be possible to copy content to a location outside of master storage, as well.) The system may or may not require that a member enter a password or some other identifying information before opening certain content to ensure that the member has indeed opened the content, rather like a user must sign for certified mail before receiving the certified mail.

In the example of FIG. 5, the access control engine 512 can control access by group members to content in the applicable trust folder. For example, a member may have read and write permissions to content, but still not be allowed to forward the content to an untrusted destination. Since messages between group members are content, this can include prohibiting group members from cc'ing untrusted destinations, because that would entail sending content (the message) to a non-group member. Access control could also take the form of alerts. For example, if a first group member sends a message to the group and cc's a non-group member, the first group member could receive a warning that the message is being sent to a non-group member, giving the first group member the opportunity to reconsider. Communications to non-group members could also involve heightened security processes, such as requiring metadata cleaning, preventing the sending of certain types of content, limiting the size of the content, restricting the times when the content can be sent, or the like.

Figure 6:
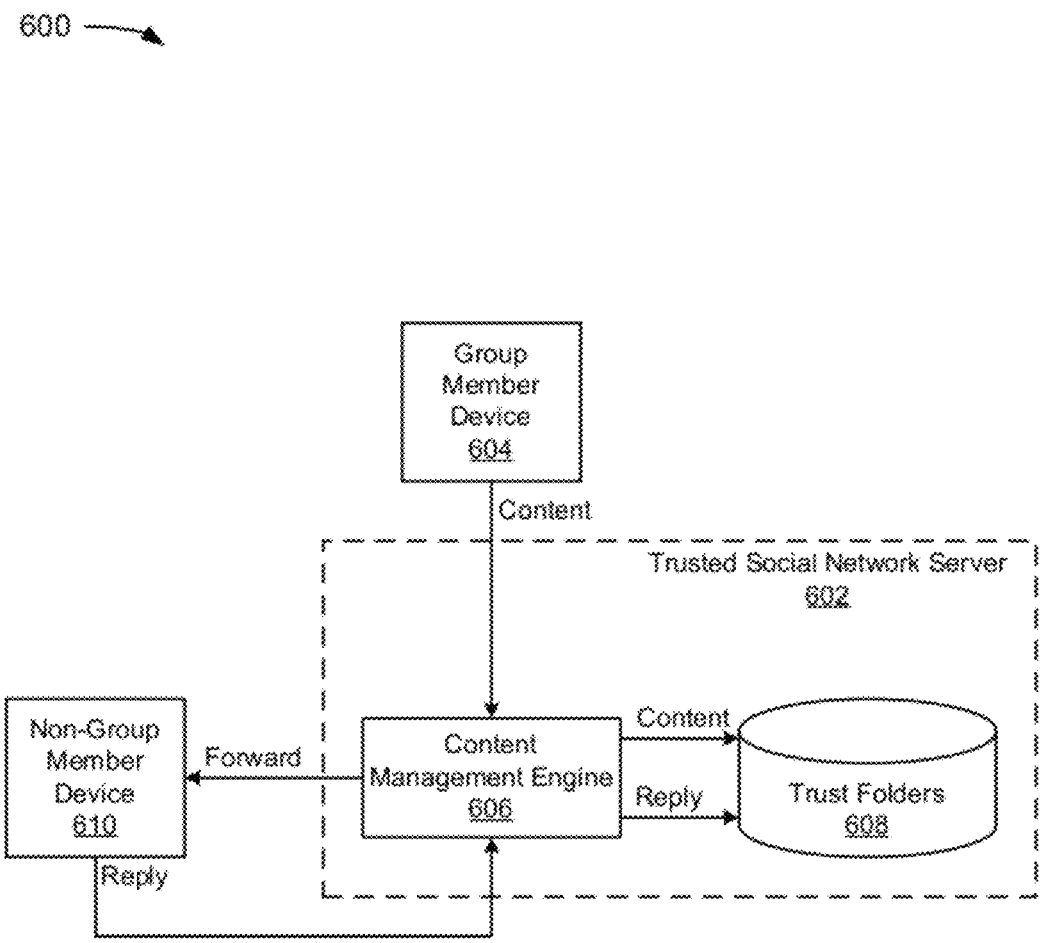
FIG. 6 depicts an example of a system capable of forwarding content to and receiving replies from a destination that does not have access to a trust folder.

FIG. 6 depicts an example of a system 600 capable of forwarding content to and receiving replies from a destination that does not have access to a trust folder. The system 600 includes a trusted social network server 602, a group member device 604, and a non-group member device 610. The trusted social network server 602 includes a content management engine 606 and a trust folders datastore 608.

In the example of FIG. 6, the content management engine 606 receives content from a group member device 604, which it puts in the trust folder of the trust folders data store 608 that is associated with the applicable group. For illustrative purposes, it is assumed that the content includes both the group as a destination and another destination that is not associated with a group member. For example, a corporate team may be working with a third party contractor who is not granted access to the contents of the trust folder for the group, but is involved in certain aspects of a project. In the example of FIG. 6, the content from a group member is put in the trust folder for the group, but since non-group members do not have access to the trust group, the content is also forwarded to the non-group member for receipt at the non-group member device 610.

Continuing the example of FIG. 6, the non-group member to which content was forwarded may reply to a forwarded message. In a specific implementation, the content management engine 606 can use message characteristics, such as knowledge that content put in a trust folder was forwarded to a destination that is identified as the source of the reply message, to determine that the reply should be put in the same trust folder. In this way, communications that extend to parties that are outside of a group can be managed in the relevant master location.

Figure 7:
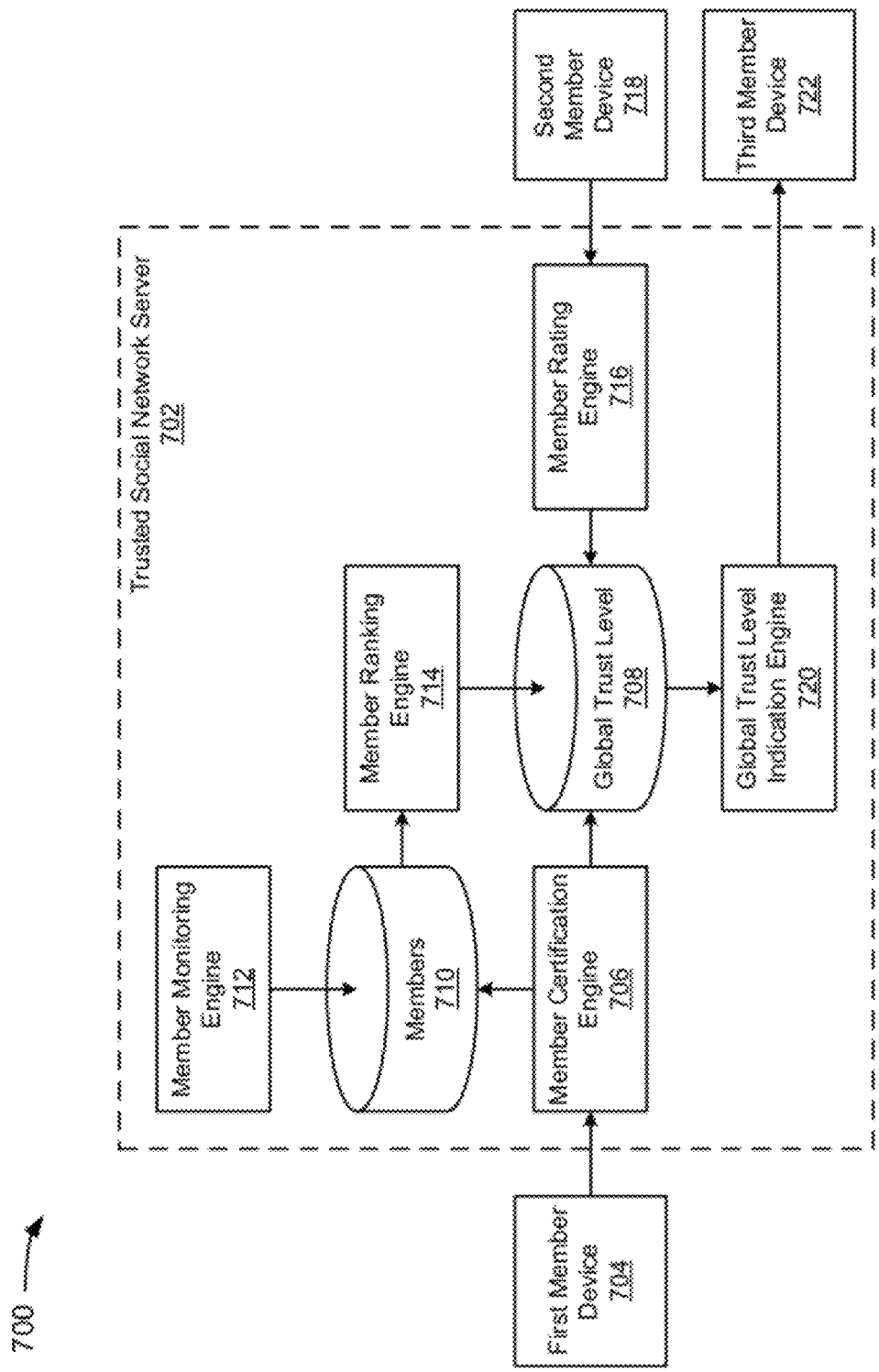
FIG. 7 depicts an example of a system for determining and indicating a global trust level for a member of a trusted social network.

FIG. 7 depicts an example of a system 700 for determining and indicating a global trust level for a member of a trusted social network. The system 700 includes a trusted social network server 702, a first member device 704, a second member device 718, and a third member device 722. The trusted social network server 702 includes a member certification engine 706, a global trust level datastore 708, a members datastore 710, a member monitoring engine 712, a member ranking engine 714, a member rating engine 716, and a global trust level indication engine 720.

In the example of FIG. 7, the member certification engine 706 receives data from the first member device 704. The data can be in association with a registration procedure during which a party becomes a member of a social network associated with the trusted social network server 702. The member certification engine 706 can use techniques such as authentication (e.g., setting and requiring use of a password by the first member, determining answers to security questions that must at times be answered by the first member), device validation, a certification authority, or the like to ensure that first member activities can be properly attributed to the first member. The member certification engine 706 can also verify email addresses, request data (in general, the more data, such as home address, phone number, credit card number, etc., the stronger the certification can be). In general, the amount and quality of data that can be received from the first member device 704 is at least in part determinative of the global trust level that is stored in the global trust level datastore 708 for the first user. Some or all of the data can also be stored in the members datastore 710 and, depending upon the implementation, an increase in the amount or quality of the data may result in the member certification engine 706 reevaluating the base global trust level for the first member.

In the example of FIG. 7, the member monitoring engine 712 monitors activity associated with the first member. Such activity can include the number of members that trust the first member, the number of invitations the first member sent to other parties, the number of rejections of the first member's invitations, or the like. In general, if there are many members that trust the first member, the first member sends relatively few invitations, and the first member receives relatively few rejections, the member ranking engine 714 will increase the global trust level of the first member in the global trust level datastore 708. Conversely, if there are few members that trust the first member, the first member sends excessive numbers of invites (which may be characteristic of a spammer), and the first member invitations are frequently rejected (which may also be characteristic of a spammer), the member ranking engine 714 may decrease the global trust level of the first member in the global trust level datastore 708.

In the example of FIG. 7, the member rating engine 716 can receive an explicit trust ranking of the first member from the second member device 718. High explicit trust ratings from other members can cause the member rating engine 716 to increase the global trust level of the first member in the global trust level datastore 708, while low explicit trust ratings from the other members can cause the member rating engine 716 to decrease the global trust level of the first member in the global trust level datastore 708.

In the example of FIG. 7, the global trust level indication engine 720 can provide an indication of the global trust level of the first member to a third member device 722. This can assist the third member in a determination whether to trust the first member. In a specific implementation, a global trust level indicator is provided in association with the first member when the first member's profile is viewed. Alternatively, the global trust level of members can be indicated next to usernames for members (or other readily apparent locations) if it is desirable to make the global trust level more ubiquitous.

Figure 8:
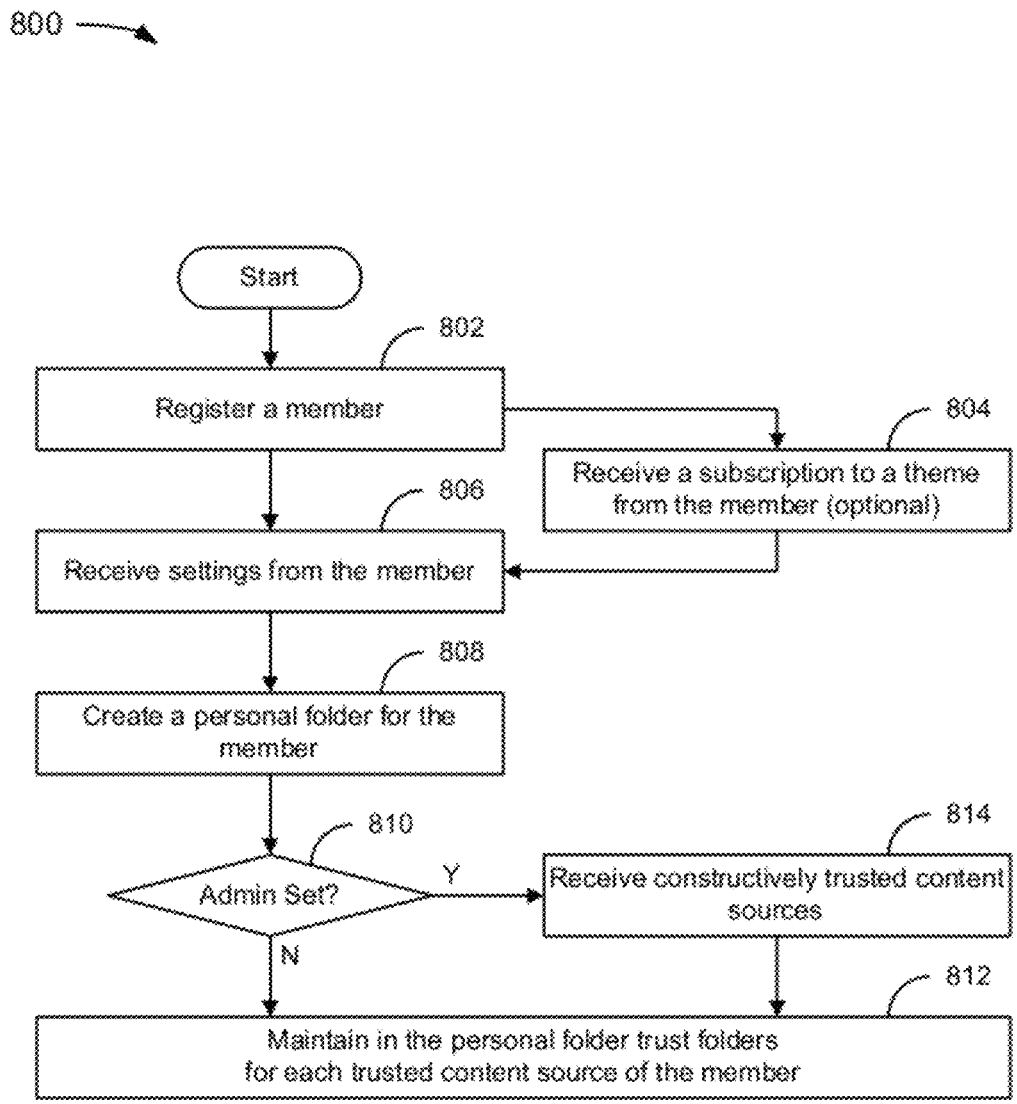
FIG. 8 depicts a flowchart of an example of a method for maintaining a trust folder.

FIG. 8 depicts a flowchart 800 of an example of a method for maintaining a trust folder. This method and other methods are depicted as serially arranged modules. However, modules of the methods may be reordered, or arranged for parallel execution as appropriate. In the example of FIG. 8, the flowchart 800 starts at module 802 with registering a member. Member registration can include member certification to establish an initial global trust level for the new member, based upon the perceived effectiveness of the data provided by the member, or otherwise collected, to identify the member as who the member purports to be. In a specific implementation, a systems administrator may register members using, for example, employee data.

In the example of FIG. 8, the flowchart 800 continues to optional module 804 with receiving a subscription to a theme from the member. A theme is a social network to which the member is allowed to subscribe. Where multiple social networks are available, the multiple social networks can be referred to as "themes" in accordance with the terminology of a particular reduction to practice. Registration can entitle a member to certain theme subscriptions. Registration and subscription to a theme can, in an alternative, be accomplished in a single subscription transaction. In a specific implementation, themes can represent departments or teams within an enterprise, and subscriptions may or may not be done on behalf of members by systems administrators or managers.

Figure 9:
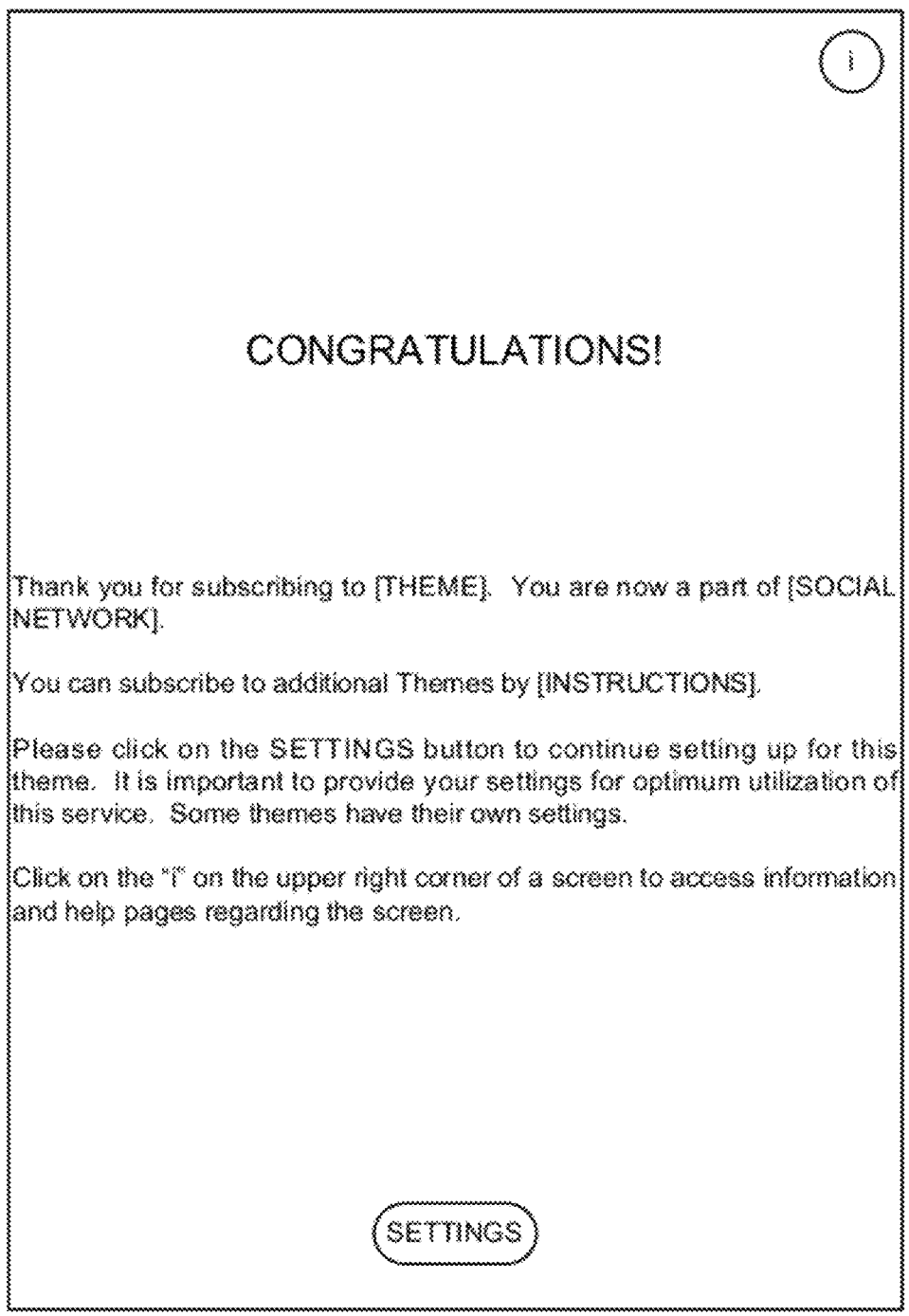
FIG. 9 depicts a conceptual example of a is a screenshot following subscription to a theme.

Upon registration, a member could receive a screen shot similar to that provided by way of example and not limitation in FIG. 9. The screen shot 900 of FIG. 9 is a simple congratulatory message that might be appropriate for a small hand-held device such as an iphone following subscription to a theme. (In an implementation that does not include themes, the screen shot could be modified to refer to registration instead.) A different screen shot may be desirable in other cases, such as when the member registers using a desktop computer or when the member is automatically registered by a systems administrator.

In the example of FIG. 8, the flowchart 800 continues to module 806 with receiving settings from the member. In some instances, a member may be required to provide at least some settings, while in others default settings may be provided. Members may or may not be required to provide new settings with each subscription to a theme. In a specific implementation, there are global member settings that are applicable across themes (provided when the member registers) and theme settings that must be set each time a member subscribes to a new theme. In another specific implementation, some or all of the settings are set on behalf of a member by a systems administrator.

Figure 10:
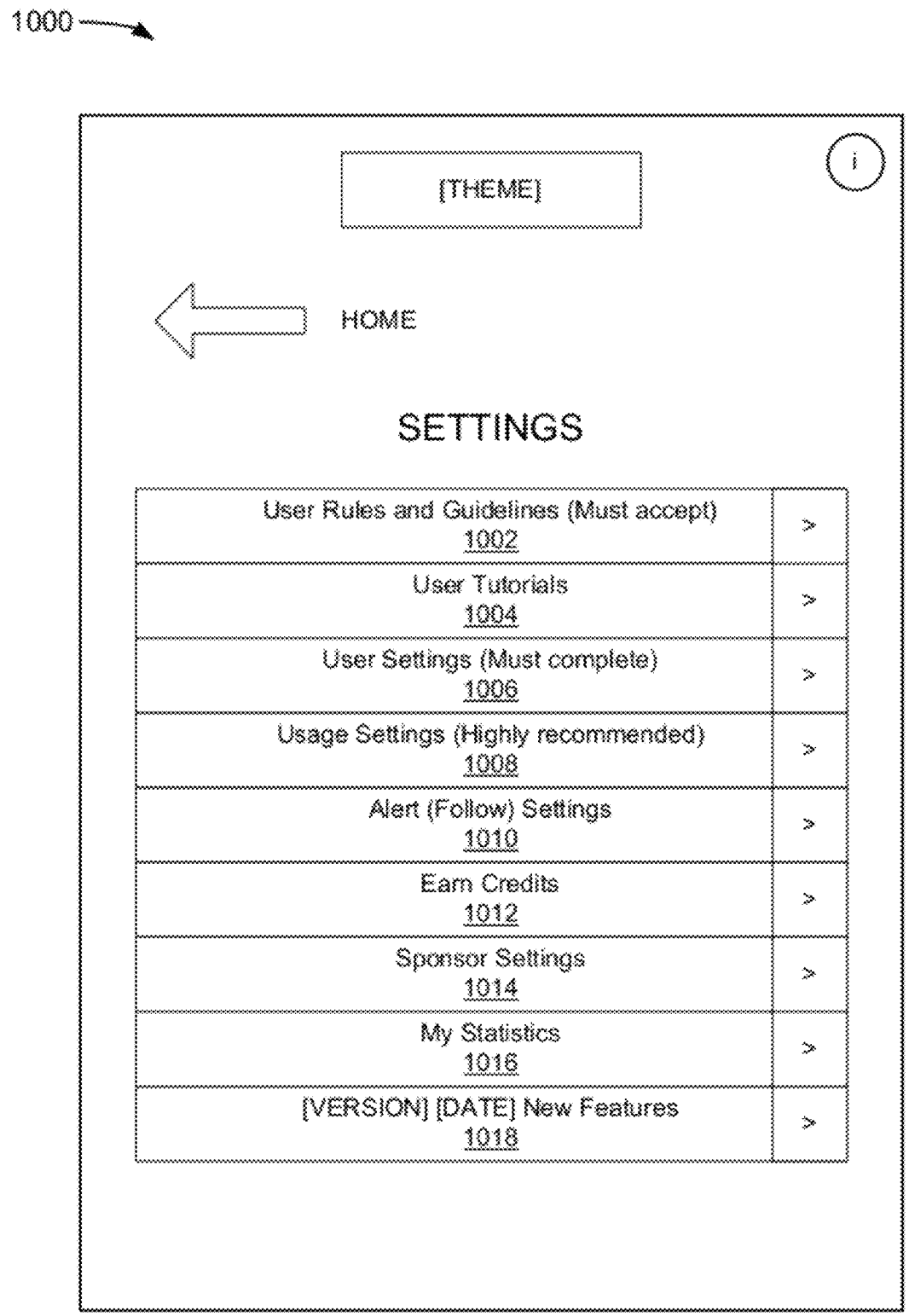

To facilitate receiving settings from the member, the member could receive a screen shot similar to that provided by way of example and not limitation in FIG. 10. The screen shot 1000 of FIG. 10 is a simple settings list that might be appropriate for a small hand-held device. Screen shots 11-25 correspond to settings selections 1002, 1004, 1006, 1008, 1010, 1012, 1014, 1016, and 1018 of FIG. 10.

When a current registered user registers to a new theme, then a new screen is presented to the user for option of transferring setting information, for example usage settings, myprilist, users blocked, and users and categories followed. See, e.g., FIG. 11. If a current registered user is subscribing to a new Theme, they are first directed to this page. Here a member has the option to copy some items from the previously registered Theme, for example USER SETTINGS and USAGE SETTINGS as well as merge PERSONAL FOLDER, MYPRILIST, BLOCK USER list, and FOLLOW USER list from one of the previously setup Themes.

If user is not interested in copying any settings from another Theme, user can select NO on any of the options and enter a new USERID and new EMAIL. If user is going to use the previously registered Theme to setup their new Theme, then user first selects the Theme that they will use to copy from the pulldown menu, then select YES or NO on and of the options and then click MERGE NOW.

IMPORTANT NOTE: If user continues to use an existing USERID and EMAIL, user will continue accruing credits combined from all those Themes using the same userid and email, and the USER RATING and RANKING will also be shared. If user creates a new USERID and EMAIL, then credits for the new Theme and rating and ranking for this user will start from scratch.

USER RULES AND GUIDELINES 1002: This screen provides the description of the rules and guidelines for all members and the terms of use. In a specific implementation, members must accept the agreement by clicking on a check box. In such an implementation, if the rules and guidelines are not accepted, a user cannot become a member. See, e.g., FIG. 12.

USER TUTORIALS 1004: User guidelines, tips, examples.

USER SETTINGS 1006: This screen allows you to enter general user information. See, e.g., FIGS. 13 and 14.

USAGE SETTINGS 1008: This screen allows you to set preferences. See, e.g., FIGS. 15 and 16. Default home page can be set to the five main folders described in many of the examples in this paper, Categories, Top Articles, Favorites, Personal, or Search. Display status enables members or administrators to display or hide content that has a certain status, such as new, not read, read, favorite, or don't display. In an embodiment in which a member is not "always on" it can be desirable to enable the member to select data sync frequency (e.g., every 15 minutes, 30 minutes, 60 minutes, or manually). Default line display is a relatively simple display configuration, which is representative of display configurations.

On this screen you need to make a decision on one of the important question about private messages. You have the option to select No Private, meaning no private messages are allowed to your INBOX, Open to Everyone (which is the default setting), meaning any user can send you a private message, or My Private List Only, meaning you create a Private List using the LIST BUILDER, which limits the private messages to those userids included in the Private List. You can block any user sending you a private message.

In the My Private List Members, you can include the USERIDs, EMAIL addresses, and DOMAIN LIST. In order for anyone to send you private message, they have to be subscriber to the Theme. However, if you do not know their userid, but their email address that they have used to subscribe to the Theme, you can enter the EMAIL and the system will crosscheck and include those users as part of your MYPRILIST. In addition, you can allow a domain list to send you a private message by entering, for example, company.com. In this case, any user with a subscription email company.com will be able to send a private message to you. You can take notes here regarding your MYPRILIST to remind yourself actions you have taken or need to take.

Figure 17:
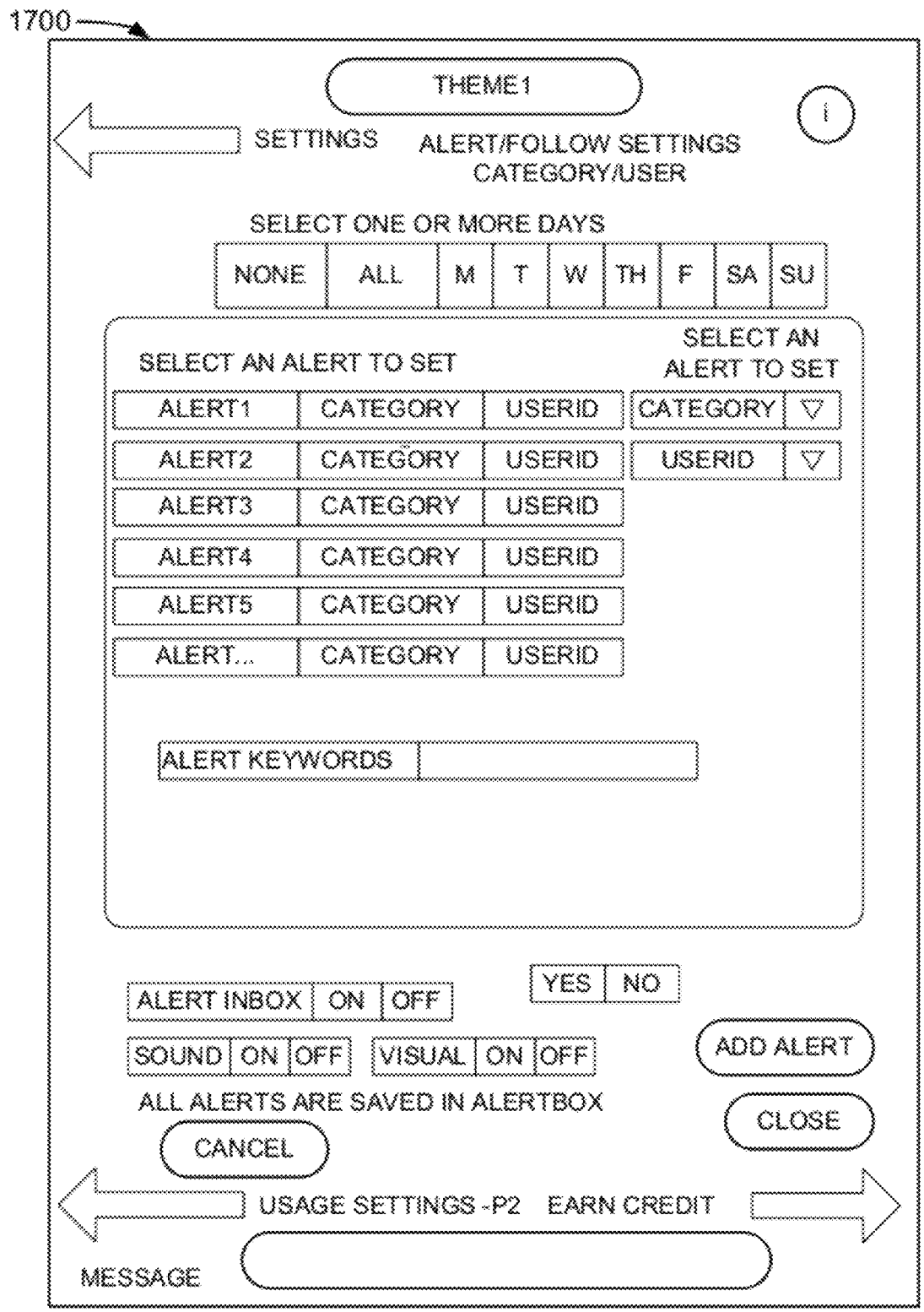
Figure 18:
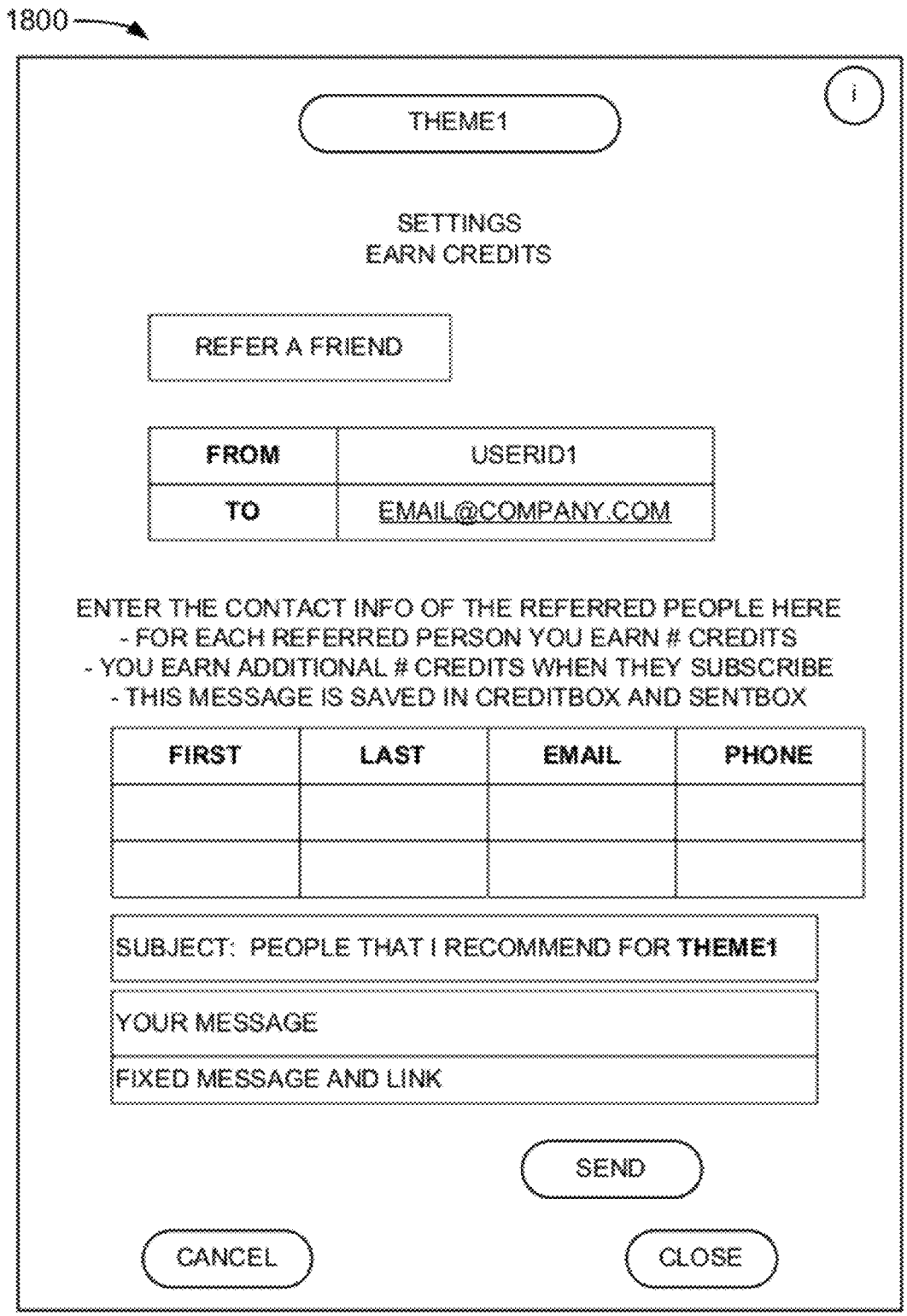

ALERT SETTINGS 1010: This screen allows you to set alerts when there is a posting in a given category or there is a posting by a user. See, e.g., FIG. 17. A member can set alerts and follow activities in categories or activities by a content source. If the member is interested in following a category of a content source, the first option in this example is to decide receiving alerts any day of the week or just specific days. The member selects a first alert by clicking, which highlights the alert. Then, the member selects a Category within the CATEGORY box, or selects ALL and a content source within the USERID box, or selects ALL. Here are some sample combinations:

CATEGORY USERID KEYWORD COMMENTS: ALL USERID1 Following all activities of USERID1 in all categories; CATEGORY1 ALL Following all activities in CATEGORY1 for all users.

CATEGORY USERID KEYWORD COMMENTS: CATEGORY2 USERID2 Following all activities of USERID2 in CATEGORY2; ALL ALL KEYWORD Following keyword in all categories; CATEGORY1 ALL KEYWORD Following keyword in CATEGORY1.

The member can also receive an alert whenever a message comes to the INBOX of the member. The member can turn ON or OFF the following options:

SOUND: Receive an audio alarm
VISUAL: Receive a visual alarm
PRI: Receive a personal message in your INBOX If you click on FOLLOW CAT or FOLLOW USER button in another page, clicking CLOSE will take you back to the page you came from.

EARN CREDITS 1012: Explanation of how users can earn credits. See, e.g., FIGS. 18-23.

REFER A FRIEND: You will fill out a form to send us the contact information of the person you would like to refer to us as a potential subscriber to our Application and this Theme. We will inform that you have referred them to us.

TELL A FRIEND: You will fill out a form to send directly to your contact person you would like to refer as a potential subscriber to our Application and this Theme.

MAKE SUGGESTIONS: We welcome your suggestions to improve our Application and service. Even if it was an idea that was suggested by another user, we still give you a credit for taking the effort, and we appreciate that.

REPORT PROBLEMS: We welcome any problems you can report to us so that we can continue providing an exceptional service to all of our subscribers. You can also earn credits by POSTING/REPLYING articles to Non-Private categories such as PUBLIC (PUB) and Non-Personal (NP) categories. For example, by posting and replying to articles/messages for PRI and MPRI class categories you will not earn credits. Furthermore, you can earn more credits by creating new CATEGORIES, Private or Public. You can create a category within the PERSONAL Main Screen. However, in order to earn your credit, you need to invite at least one person to this category. In fact, the more people you invite the more credit you will earn. Please note that an author of a new Category must create the first article like an Introduction to the Category so that other users who might be interested in participating know the purpose and boundaries of the category.

You automatically earn credits by subscribing to Themes directly through payments.

You can use these credits toward the subscription of other Themes.

SPONSOR SETTINGS 1014: Explanation of how users can earn credits by receiving and reading advertisements from sponsors. On this screen, user can turn on accepting advertisements from sponsors and earn credits. User can set the maximum number of daily advertisements that will be delivered to the INBOX. User can turn off receiving any advertisement by selecting NONE, or select MAX3, MAX5 or MAX10, indicating maximum of 3, 5, or 10 advertisements per day.

In addition, user can disable a sponsor by clicking on DS column in the list below for that sponsor, indicating that user will not be delivered any advertisement from that sponsor. On the other hand, user can click on AF for a sponsor indicating that user would be interested in receiving advertisements specifically from this sponsor.

Typically, user will be delivered private messages form sponsor based on their most active/participated categories. For example, if user selected to receive maximum of three messages, then the sponsors of the top three categories that the user is most active will be able to send messages to the user. Similarly, if user selected to receive maximum of five messages, then the sponsors of the top five categories that the user is most active will be able to send messages to the user. Incase where user has selected a sponsor as AF who is not one of the top category sponsors, then the last category sponsor is replaced by the sponsor AF selected by the user. Similarly, if user is selected a sponsor as DS who is one of the top category sponsors, then the DS sponsor will be replaced by the next most active category sponsor.

Complete list of all Sponsors in this Theme are listed on this screen. User can review the list and click on SPONSOR NAME, USERID or CAT to get more information about the sponsor, the user representing the sponsor and the category being sponsored.

Figure 24:
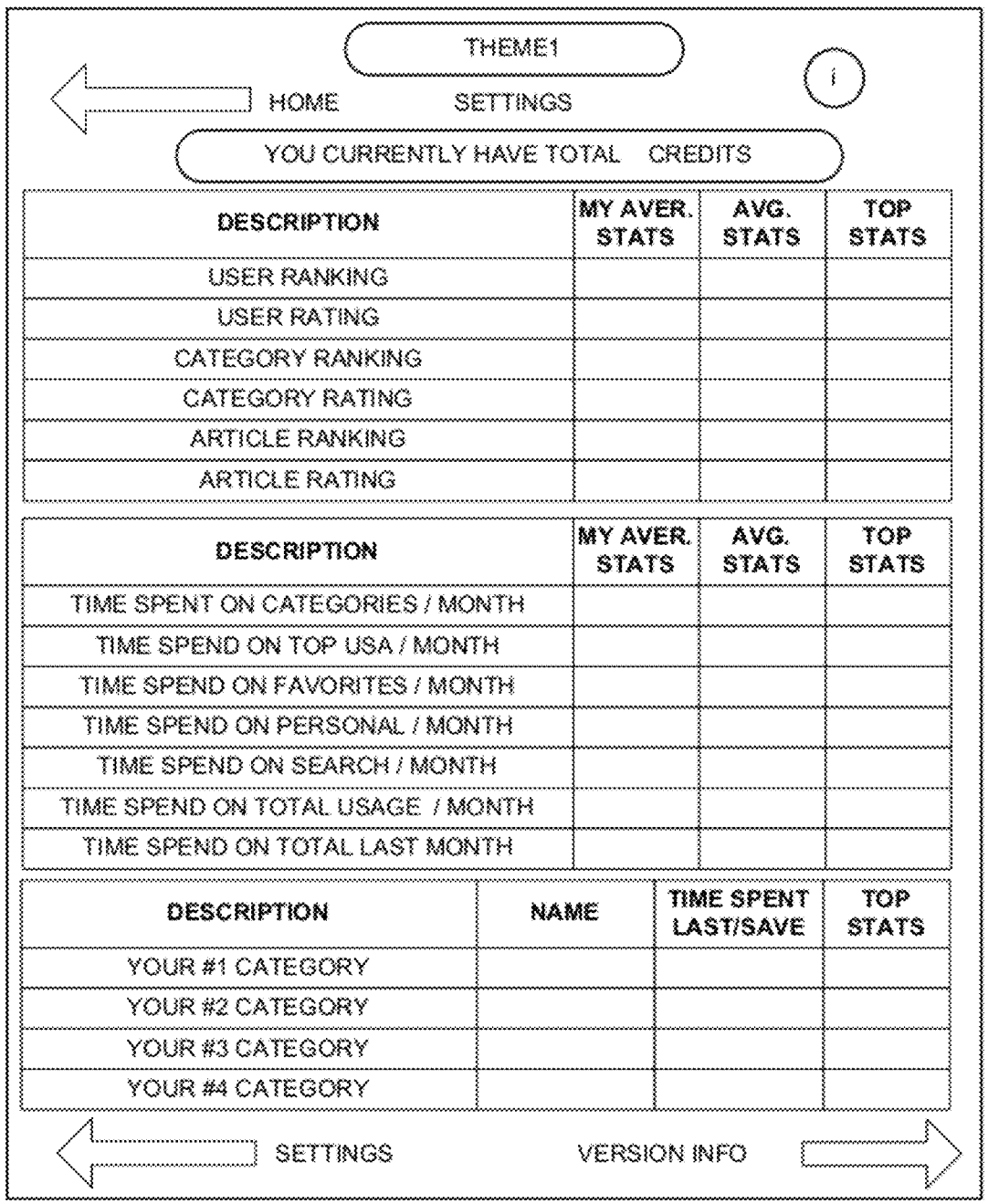
Figure 25:
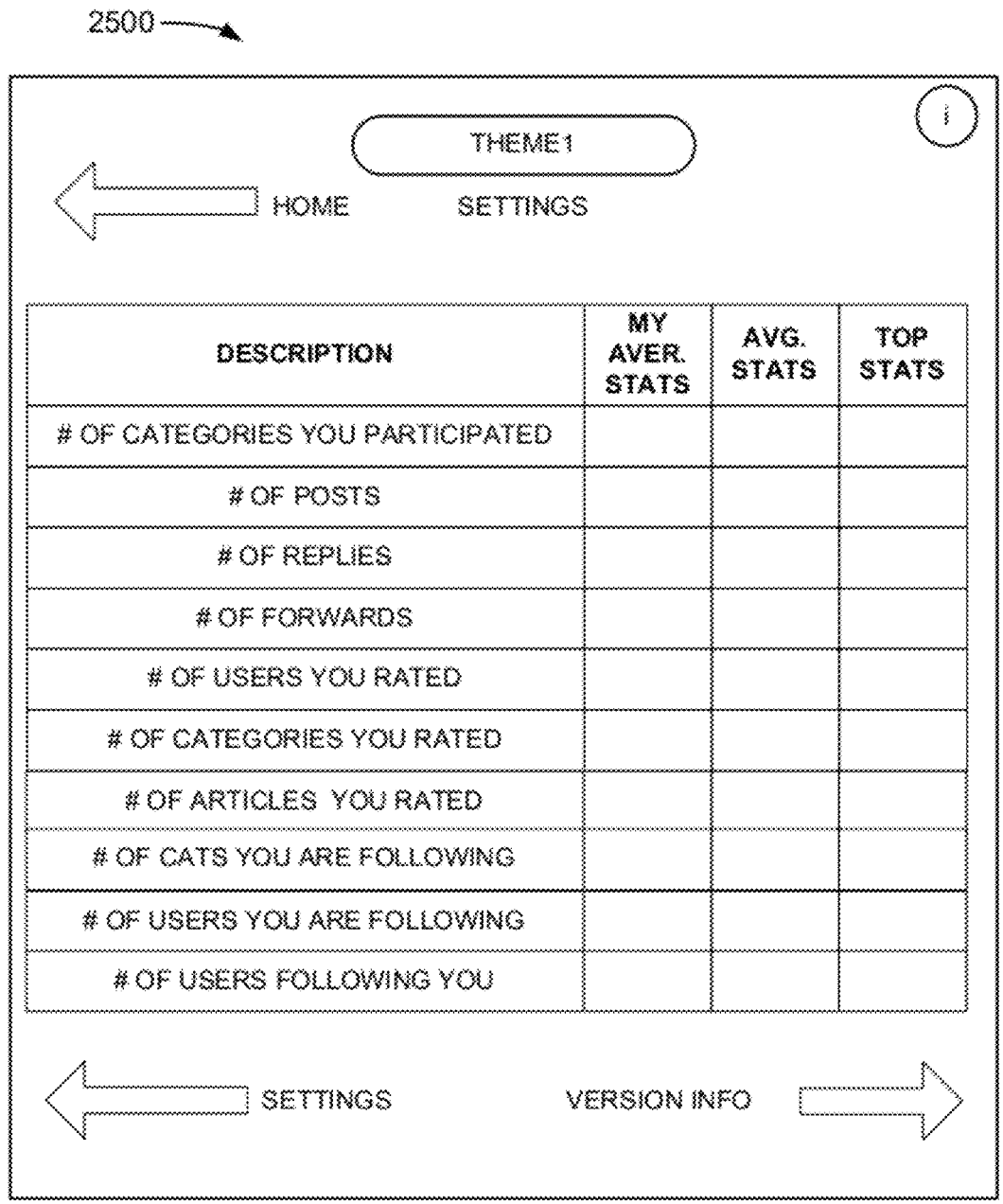

MY STATISTICS 1016: Statistics about the user and usage. See, e.g., FIGS. 24 and 25.

VERSION 1018: Information about the version of the software being used on a particular electronic hardware device.

Figure 26:
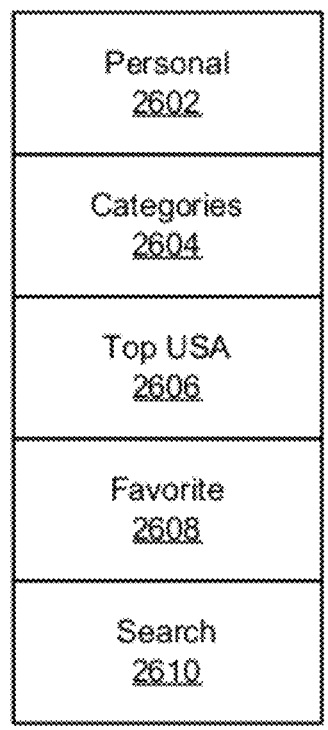
FIG. 26 depicts examples of high level user interface folders.

In the example of FIG. 8, the flowchart 800 continues to module 808 with creating a personal folder for the member. In a specific implementation, a personal folder is one of multiple top-level user interface folders. FIG. 26 depicts an example of multiple user interface folders, including a personal folder.

In the example of FIG. 8, the flowchart 800 continues to decision point 810 where it is determined whether an administrator will indicate that content sources are constructively trusted by the member. If it is determine that an administrator will not indicate that content sources are constructively trusted by the member (810-N), then the flowchart 800 continues to module 812 with maintaining in the personal folder trust folders for each trusted content source of the member. If, on the other hand, it is determined that an administrator will indicate that content sources are constructively trusted by the member (810-Y), then the flowchart 800 continues to module 814 with receiving constructively trusted content sources from the administrator and then to module 812 as was just described (where trusted content sources of the member include explicitly and constructively trusted content sources).

Figure 27A:
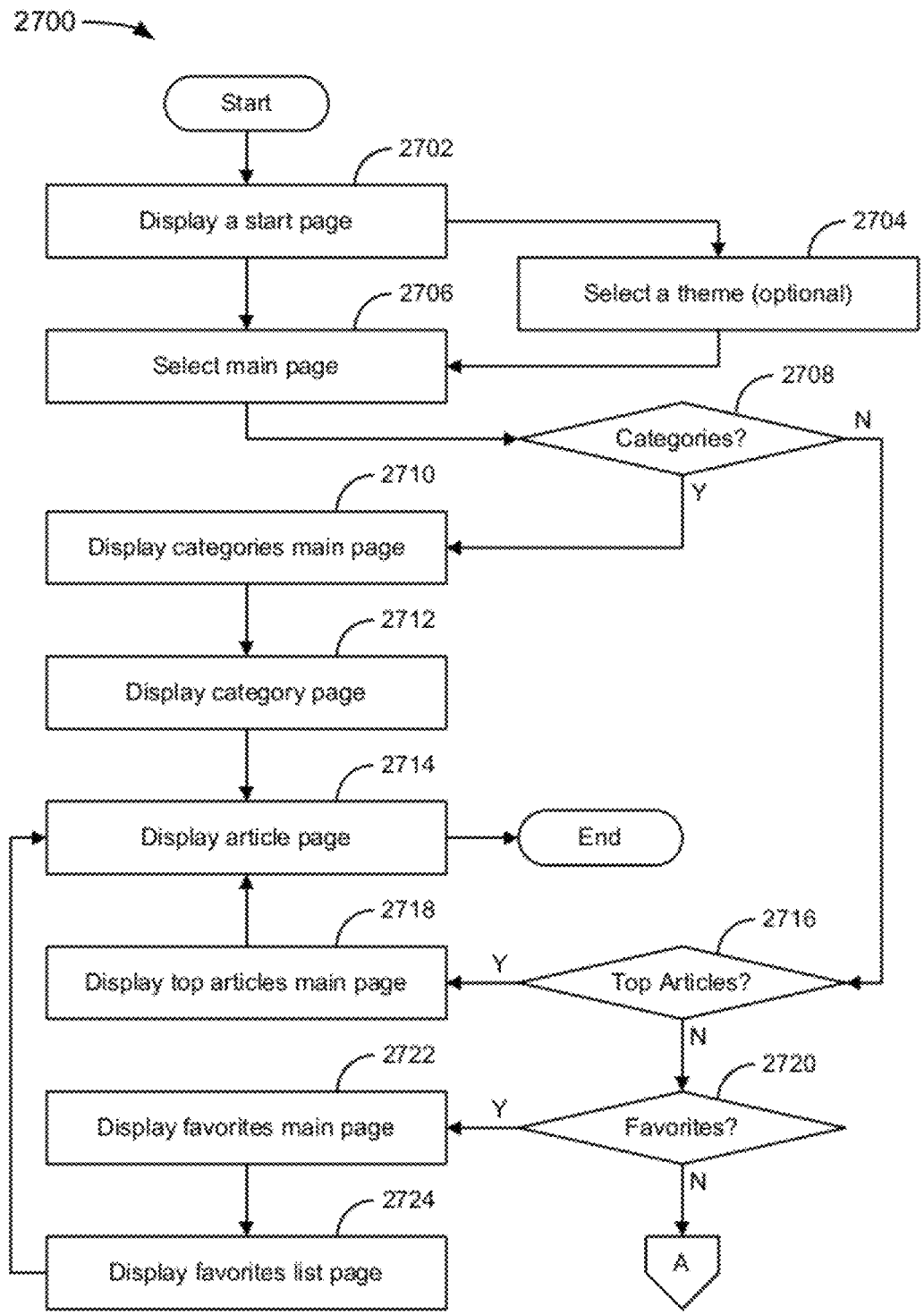
FIG. 27 depicts a flowchart of an example of a method for general navigation in a trusted social network structure.
Figure 27B:
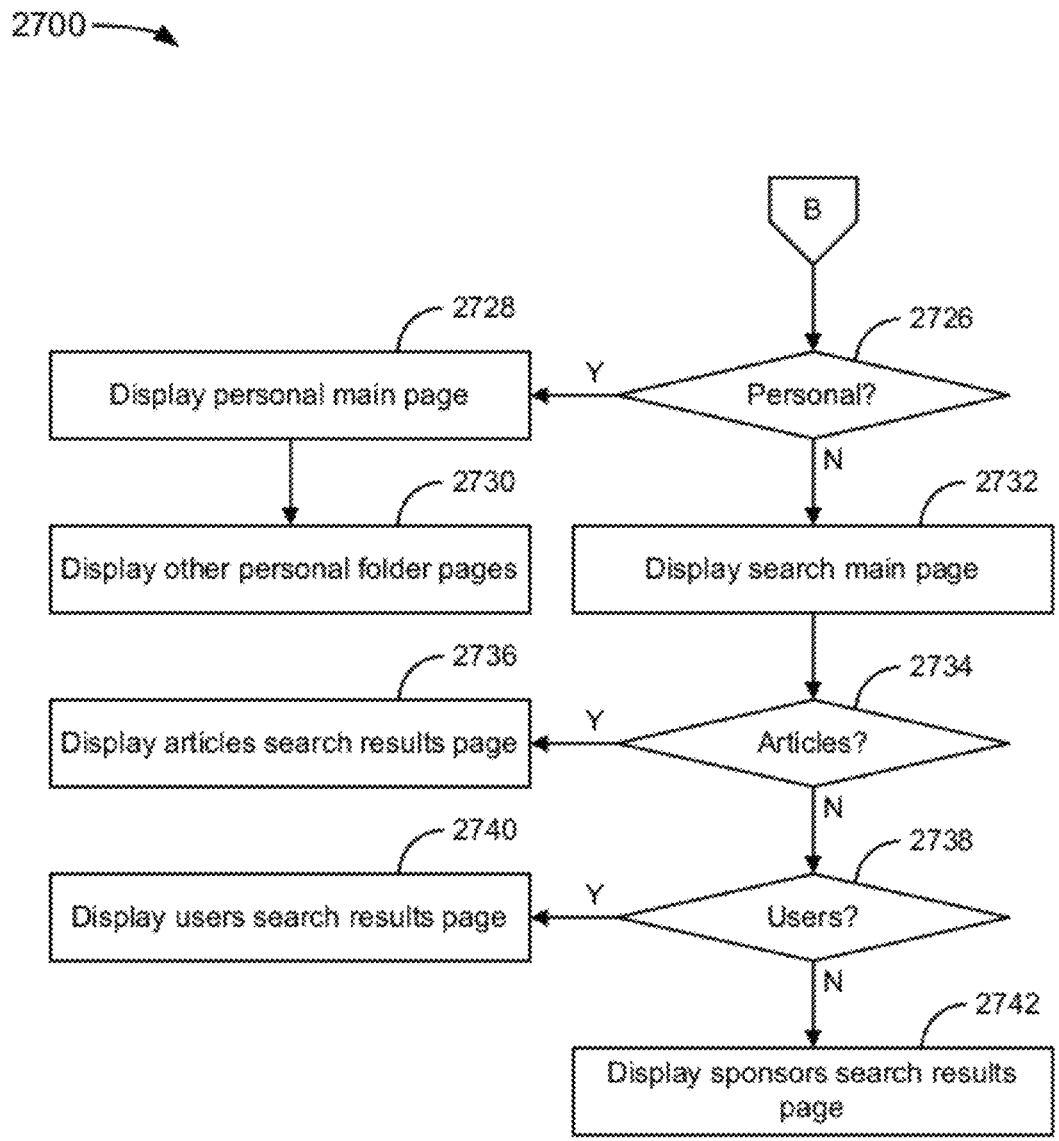
Figure 28:
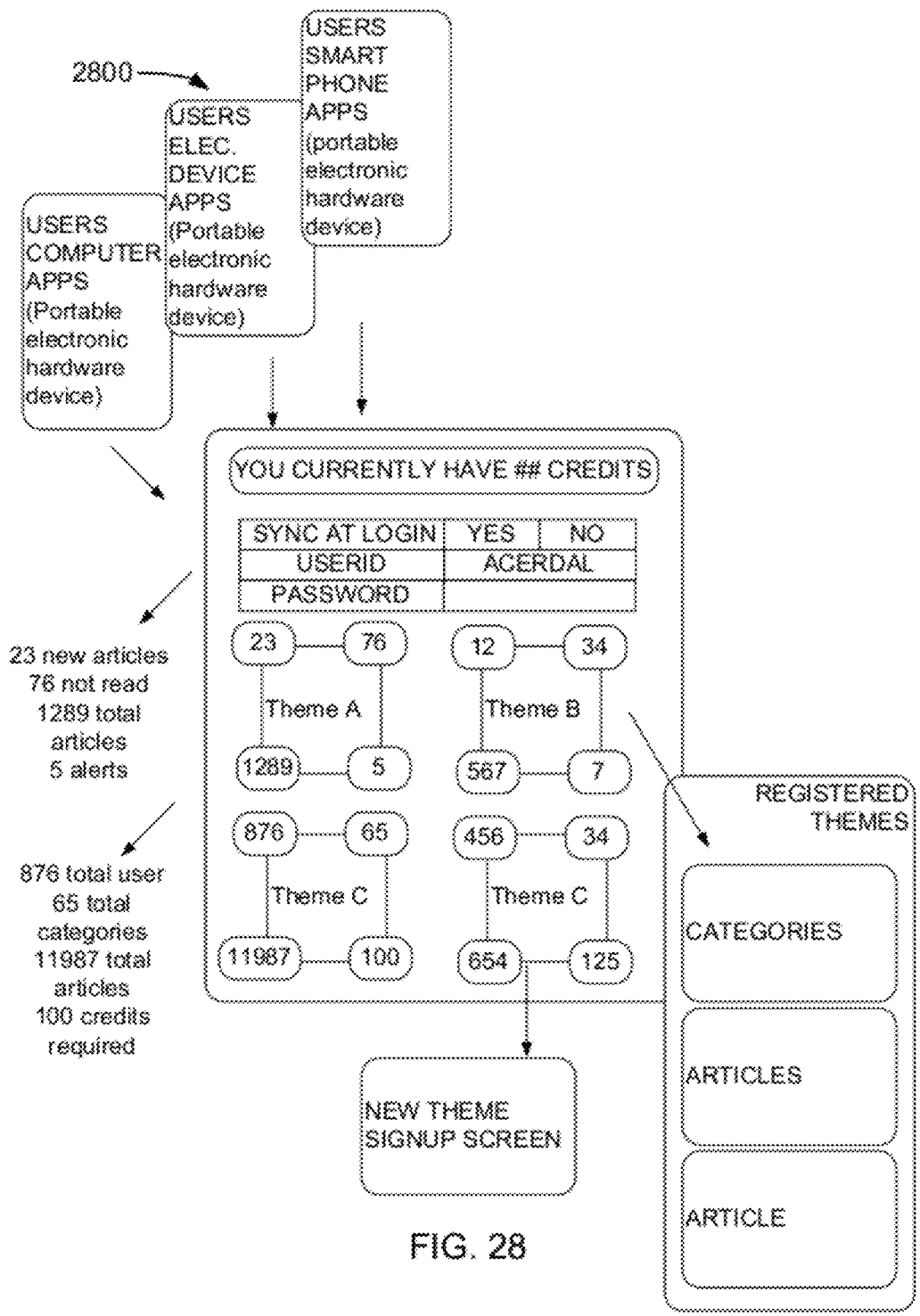
FIG. 28 depicts a conceptual diagram of a screen shot at a top level of a social network structure.

FIG. 27 depicts a flowchart 2700 of an example of a method for general navigation in a trusted social network structure. In the example of FIG. 27, the flowchart 2700 starts at module 2702 with displaying a start page. The top level screen can include, for example, userid and password fields (potentially with an indication of new articles, articles not read, total articles, and alerts for the member), though passwords may or may not be needed in some implementations. The user may also be given the option of selecting whether to sync at login. FIG. 28 depicts a conceptual diagram 2800 of a screen shot at a top level of a social network structure. In the example of FIG. 28, the examples of fields just mentioned are illustrated.

In the example of FIG. 27, the flowchart 2700 continues to optional module 2704 with selecting a theme. Since themes are optional, selecting a theme may not be an option. In the example of FIG. 28, two themes are "registered" (subscribed for) and two available themes are not registered. It may or may not be possible to select new themes in certain environments even where multiple themes are available (e.g., if a systems administrator assigns themes to members). In a system in which members have to pay for certain themes, members can use earned credits in lieu of cash payment.

In the example of FIG. 28, users can access a start page through portable or non-portable electronic hardware devices. Registered members, when they click on a Theme, are taken to the appropriate home page that displays, for example a Categories list, Articles list, and individual Articles. When a member clicks a Theme that they have not registered yet, the member will be taken to a new page for information about the Theme as well as registration information. In the example of FIG. 28, each Theme has numbers on the corners of a display window, which gives additional information about the specific Theme. The registered themes, for example display new articles, not read articles, total articles, and any alerts that user may have setup. For the Themes not yet subscribed, total user, total categories, total articles and the credits required for subscription to the Theme are displayed.

Referring once again to the example of FIG. 27, the flowchart 2700 continues to module 2706 with selecting a main page. The main pages described in this example are a categories main page, a top articles main page, a favorites main page, a personal main page and a search main page. In a specific implementation, the categories main screen can be a default home page, which assumes an initial "categories" determination at decision point 2708. Depending upon the implementation, the home page can be changed to some other page (not shown).

Figure 29:
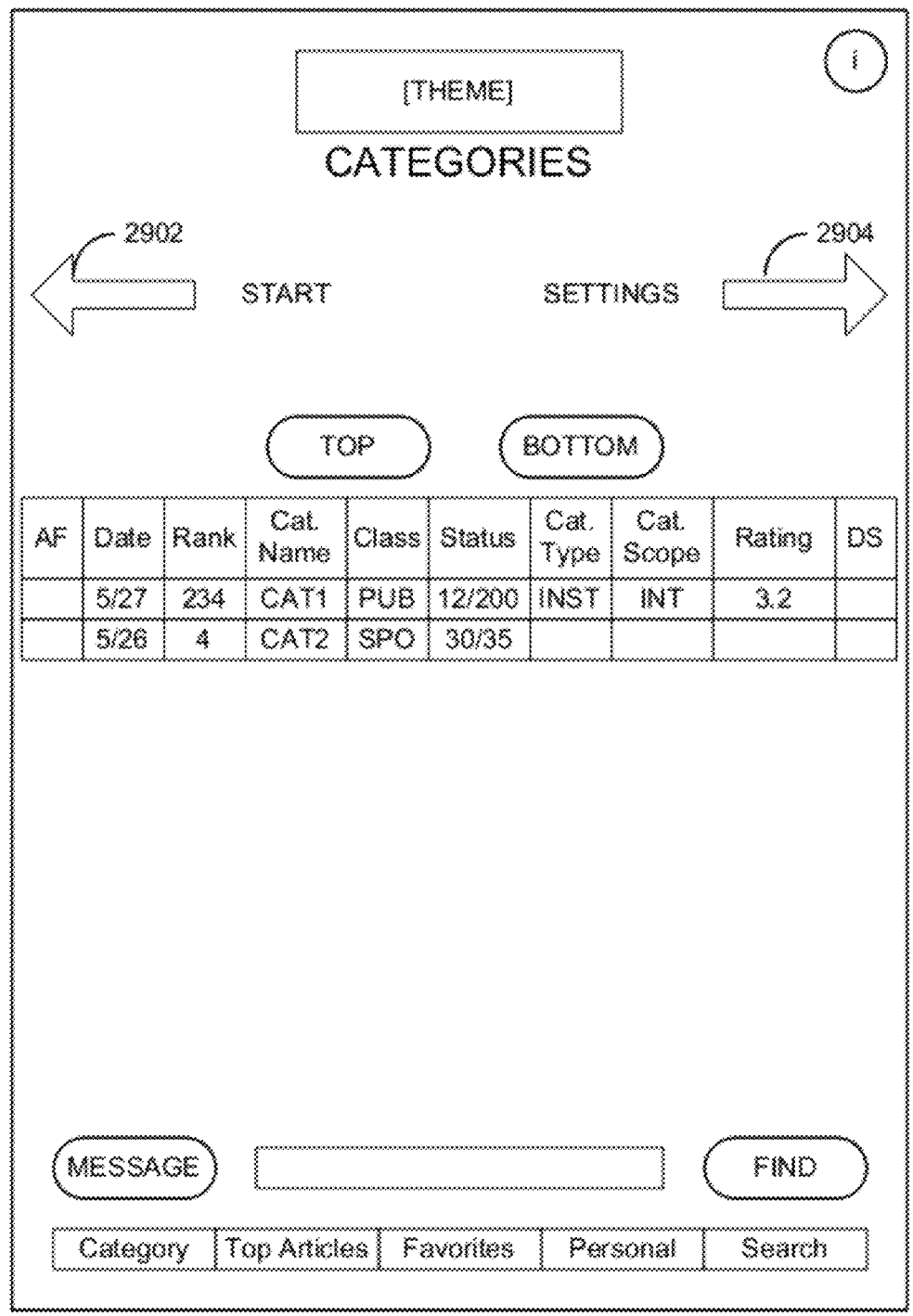
FIG. 29 depicts a conceptual diagram of a screen shot of an example of a categories main page.

In the example of FIG. 27, the flowchart 2700 continues to decision point 2708 where it is determined whether the categories main page has been selected. If it is determined that the categories main page has been selected (2708-Y), then the flowchart 2700 continues to module 2710 where the categories main page is displayed. FIG. 29 depicts a conceptual diagram 2900 of a screen shot of an example of a categories main page. In the example of FIG. 29, a user can navigate to a start screen (see, e.g., FIG. 28) using the START arrow 2902 or to a settings screen (see, e.g., FIG. 10) using the SETTINGS arrow 2904. As with other screen shots illustrated by way of example in this paper, the theme name is shown at the top of every screen as "[THEME]." The square brackets in this context are intended to represent a blank that would have the actual name in a screen shot, assuming the screen shot is similar in this respect to the illustrated one. In the example of FIG. 29, categories in the theme are listed, with a default sorting based on rank. In a specific implementation, ranking a category involves calculating based on the ranking of each article within the category. Rankings for articles can be calculated based on statistics from member activity, which can be monitored on, e.g., a continuous, periodic, arbitrary, or occasional basis. Data collected in association with members can include, e.g., the number of times an article was read, ranked, commented on, responded to, shared, etc. and/or other statistics can be used to calculate the rating for each article. In a specific implementation, each column of the screen shot 2900 is sortable, e.g., numerically, alphabetically, alphanumerically, etc. from high to low or low to high. In the example of FIG. 29, the Date column indicates the creation date for the category; Rank indicates the number one (highest) ranked category; Cat. Name is the category name; Class can include, in a specific implementation, an indication that the entry is non-personal (NP), which can mean the entry was created by an entity other than the member, public (PUB), which can mean the entry was created by a member and can be viewed by any other member, and sponsor (SPO), which can mean the category has a sponsor; Status can indicate the number of read articles by the member versus total number of articles in that category; Cat. Type can include types such as, e.g., Instructional, Informational, Review/Analysis, Profile, Inspirational, Research, Opinion, Resource List, Tips, Advice, Best of List, Humor, Tutorial, interview, Survey, etc. (INSTRU, INFORM, REVIEW, PROFIL, INSPIRA, RESEAR, OPINION, RESOULT, TIPS, ADVICE, BESTLT, HUMOR, TUTOR, INTERV, SURVEY); Cat. Scope is a category scope that can include International (INT), National (NAT), State (STA), City (CITY) or the like; Rating indicates how other users rated this particular Category, which can be a reflection of, e.g., only those elected to rate the category; Scope Name can be included in the case of a Cat. Scope of NAT, STA, or CITY, in which case Scope Name can include more specific information. There are also two buttons, AF on left and DS on right for each category: AF represents an option to Add to Favorite, which, when selected, adds the category to your Favorites folder (though the category is not necessarily moved to the Favorites folder, but rather the selection enables easy access to this category from the Favorites folder, and the category remains in the Categories Main Screen and the AF button is highlighted for easy identification); and DS represents the option to Don't Show, which puts the category to the bottom of the categories list and dehighlights the category name so that it cannot be selected (in a specific implementation, when sorted by category name, those categories marked as DS will always show at the bottom). A member can scroll up or down through the categories by touching an appropriate location on the screen or by using other applicable navigation controls. It may be desirable to include a quick access to the top of the list or to the bottom of the list by clicking on Top or Bottom, which are buttons located at the top of the screen.

Figure 30:
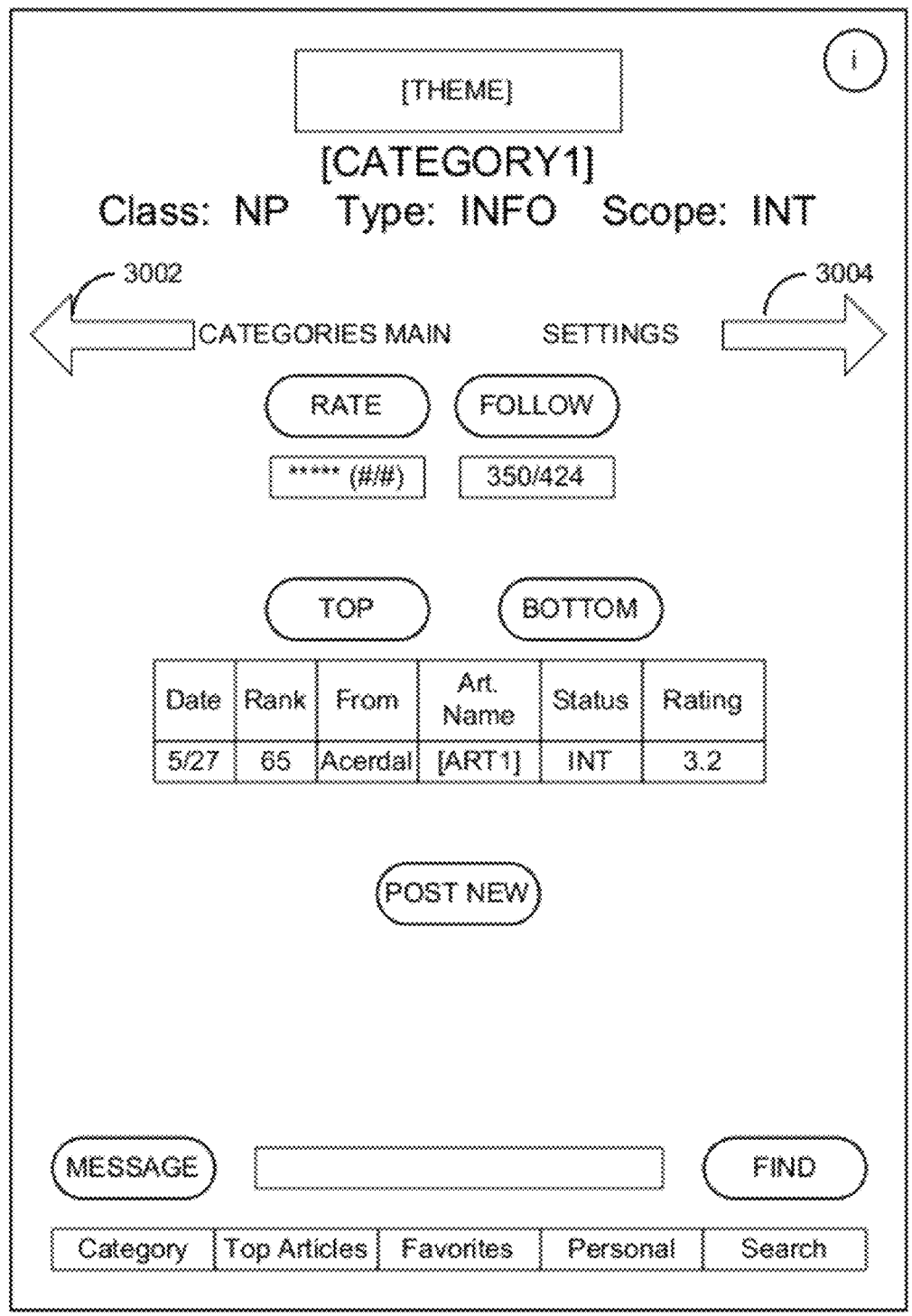
FIG. 30 depicts a conceptual diagram of a screen shot of an example of a category page.

Referring once again to the example of FIG. 27, the flowchart 2700 continues to module 2712 with displaying a category page. (For illustrative expedience, it is assumed that a member selects a category from the categories main page.) FIG. 30 depicts a conceptual diagram 3000 of a screen shot of an example of a category page. The structure of the category screen is similar to the main screen, where the main navigational buttons for CATEGORIES (C), TOP ARTICLES (T), FAVORITES (F), PERSONAL (P) and SEARCH (S) folders are found at the bottom of the screen. At the top of the screen you find Theme and Category names, as well as class, type, and scope of the [CATEGORY1]. Rating information about this category is displayed along with a button to rate it. The arrows at the top of the screen are used for navigating back to the Categories Main screen (see, e.g., FIG. 29) or to the SETTINGS screen (see, e.g., FIG. 10). You can rate [CATEGORY1] by clicking the RATE button. Below this button is the current rating for this category. You can set an alert to follow members of or a specific member of this category by clicking the FOLLOW button. Below this button are the statistics about how many members are following this category through setting alerts and the total number of members participating either by reading or by posting. The POST NEW button enables user to post an article to the Category. In a specific implementation, each column is sortable numerically, alphabetically, or alphanumerically, high to low or low to high. Here are brief description for each column: Date indicates the creation date for the Article; Rank indicates the rank of the article; From indicates who posted the article; Art. Name is the name or subject of the article; Status can indicate whether the article is New (N), Not Read (NR), Read (R), Favorite (F), Don't Show (DS), and the status of the article can change over time; Rating indicates how other users rated this particular article. (Rating can be a reflection of only those elected to rate the article.) User can scroll up or down through the list of articles by using an applicable navigation control. Also, there is a quick access to the top of the list or the bottom of the list by clicking the TOP or BOTTOM button.

Figure 31:
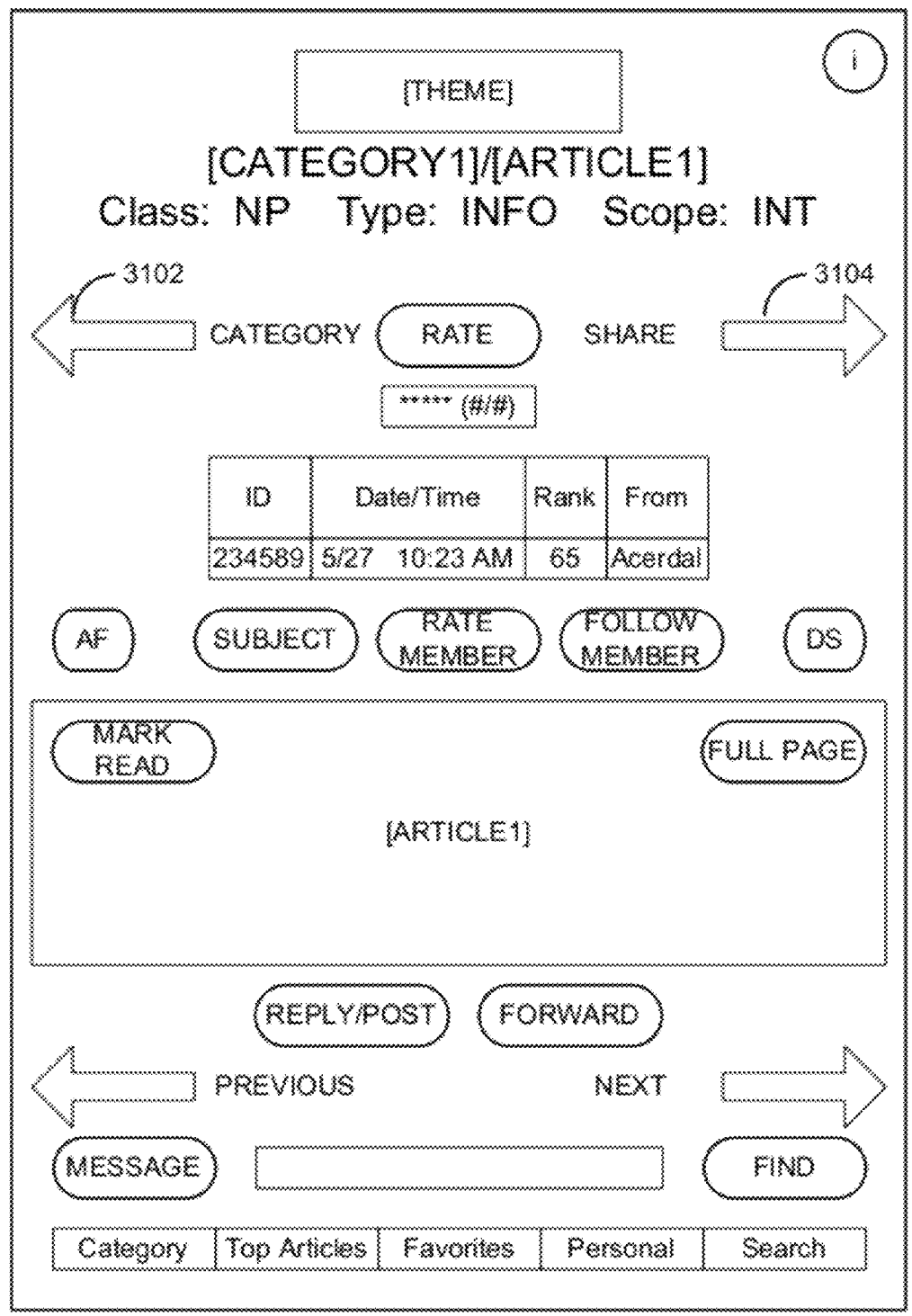
FIG. 31 depicts a conceptual diagram of a screen shot of an example of an article page.
Figure 32:
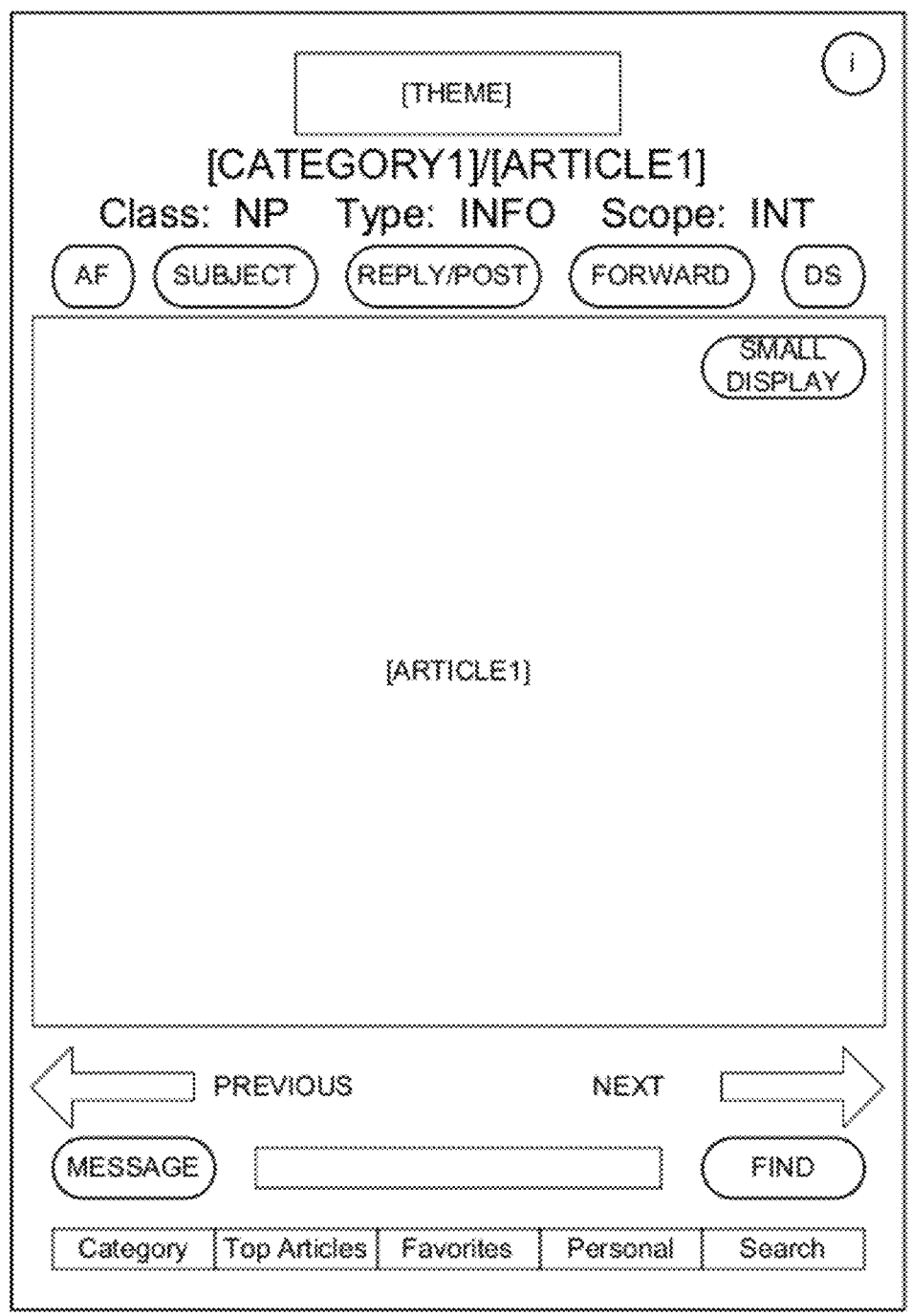
FIG. 32 depicts a conceptual diagram of a screen shot of an example of an article page in full page display mode.

Referring once again to the example of FIG. 27, the flowchart 2700 continues to module 2714 with displaying an article page. (For illustrative expedience, it is assumed that a member selects an article from the category page.) FIG. 31 depicts a conceptual diagram 3100 of a screen shot of an example of an article page. At top of the screen you find Theme, Category and Article names, as well as class, type, and scope. Rating information about this article as well as a button to rate it is provided at the top of the page. Rating may or may not be a reflection of only those elected to rate the article. The arrows at the top are for navigating back to the Category page (see, e.g., FIG. 30) or to a SHARE page. Using Share will allow you to send the article to another person using email, text message, share it with facebook or twitter, or the like. Here are brief description for each column: ID is a unique number for the article which can be used for searching or reporting purposes; Date/time indicates the creation date and time for the Article; Rank indicates the rank of the article relative to other articles; From identifies the user who posted the article. The SUBJECT button allows you to choose a subject (which can be preselected) for the article. The RATE MEMBER button allows you to rate the user who posted the article. The FOLLOW MEMBER button allows you to follow the user who posted the article (for all categories or a subset thereof). Below the Article, you will find a Next and Previous navigational arrow. The Next arrow will display the next article in the article list for the category, whereas the Previous arrow will display the previous article in the list for the category. The Add to Favorites (AF) button adds the article to favorites (the member may or may not select a category from a list or create a new custom category in a Favorites folder) and changes the status of the article to Favorite (F). The Don't Show (DS) button puts the article at the bottom of the articles list for the category. The REPLY/POST button will take you to the Reply/Post page. The FORWARD button will take you to the Forward page. The MARK READ button changes the status of the article to Read, and de-highlights the article in the list. In a specific implementation, the MARK READ button changes to a MARK UNREAD button when an article that is marked read is in the display pane, which when selected changes the status of the article to Not Read (NR) and highlights the article in the list. Basically clicking on the MARK READ or MARK UNREAD buttons switches back and forth between them. The FULL PAGE button enlarges the view of the article page. For example, one or more of the navigation arrows buttons and other data can be eliminated to make more room. The FULL PAGE button can be replaced with a SMALL DISPLAY button that switches back to a page that displays the article in a smaller pane. FIG. 32 depicts a conceptual diagram 3200 of a screen shot of an example of an article page in full page display mode.

Figure 33:
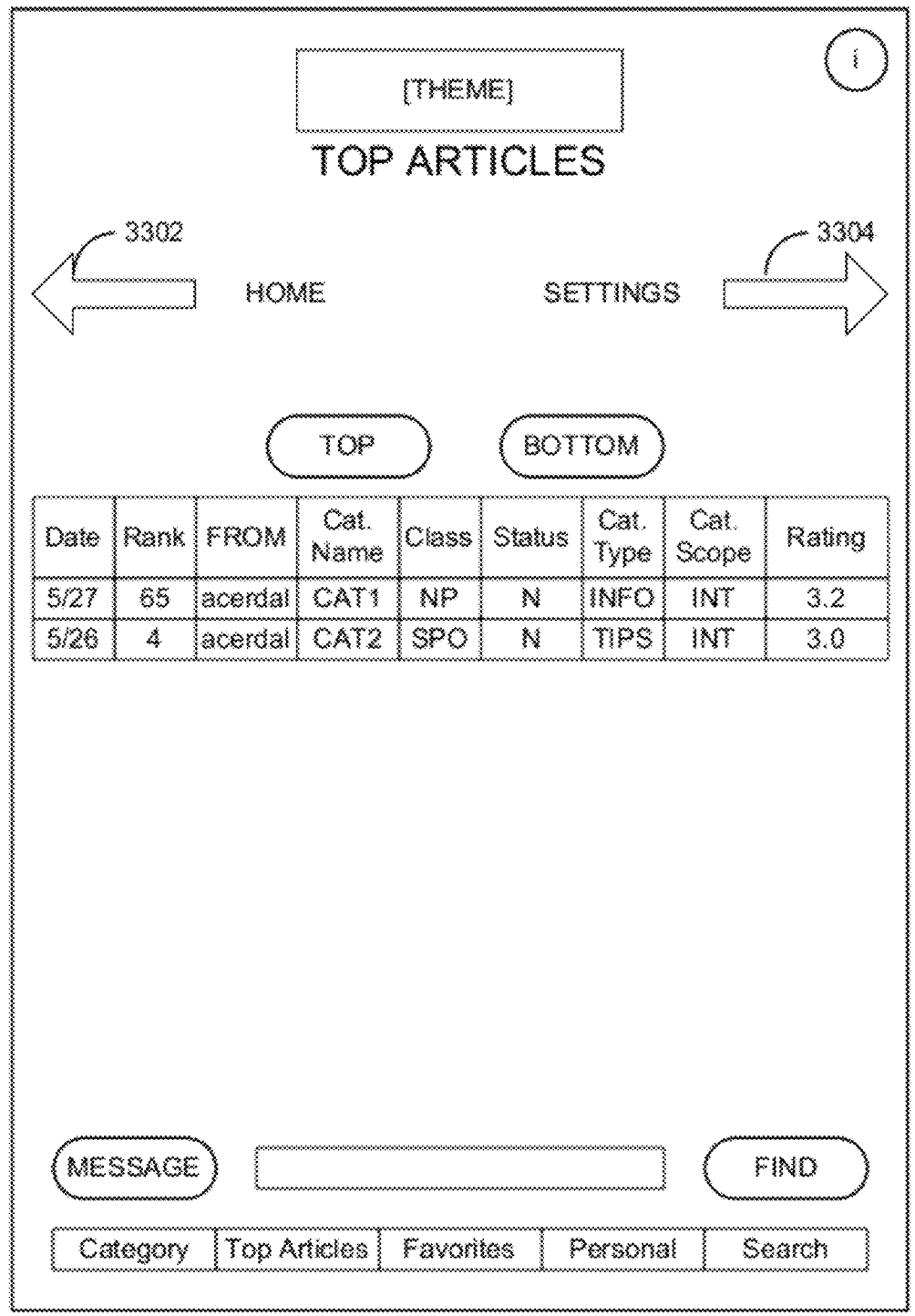
FIG. 33 depicts a conceptual diagram of a screen shot of an example of a top articles main page.

In the example of FIG. 27, with reference once again to decision point 2708, if it is determined that the categories main page has not been selected (2708-N), then the flowchart 2700 continues to decision point 2716 where it is determined whether the top articles main page has been selected. If it is determined that the top articles main page has been selected (2716-Y), then the flowchart 2700 continues to module 2718 where the top articles main page is displayed. FIG. 33 depicts a conceptual diagram 3300 of a screen shot of an example of a top articles main page. The structure of the Top Articles main screen is similar to the main screen of Categories, where the main navigational buttons for CATEGORIES (C), TOP ARTICLES (T), FAVORITES (F), PERSONAL (P) and SEARCH (S) folders are found at the bottom of the screen. At top of the screen you find Theme name. The arrows at the top are used for navigating back to the HOME page or to the SETTINGS page. Each column is sortable. Here are brief description for each column: DATE indicates the creation date for the Article; Rank indicates the rank of the article relative to other articles; From indicates the user who posted the content; Cat. Name is the category name to which the article belongs; Class can be, e.g., Non-Personal (NP), Public (PUB), or Sponsor (SPO); Status can indicate, e.g., New (N), Not Read (NR), Read (R), Favorite (F), or Don't Show (DS); Cat. Type can be, e.g., Instructional, Informational, Review/Analysis, Profile, Inspirational, Research, Opinion, Resource List, Tips, Advice, Best of List, Humor, Tutorial, interview, Survey, etc. (INSTRU, INFORM, REVIEW, PROFIL, INSPIRA, RESEAR, OPINION, RESOULT, TIPS, ADVICE, BESTLT, HUMOR, TUTOR, INTERV, SURVEY); Cat. Scope can be International (INT), National (NAT), State (STA), City (CITY) (in the case of NAT, STA, or CITY, more specific information can be entered); Rating indicates how other users rated this particular article. Member can scroll up or down the list of articles using applicable navigation controls and select the TOP button to go to the top of the list or the BOTTOM button to go to the bottom of the list.

Figure 34:
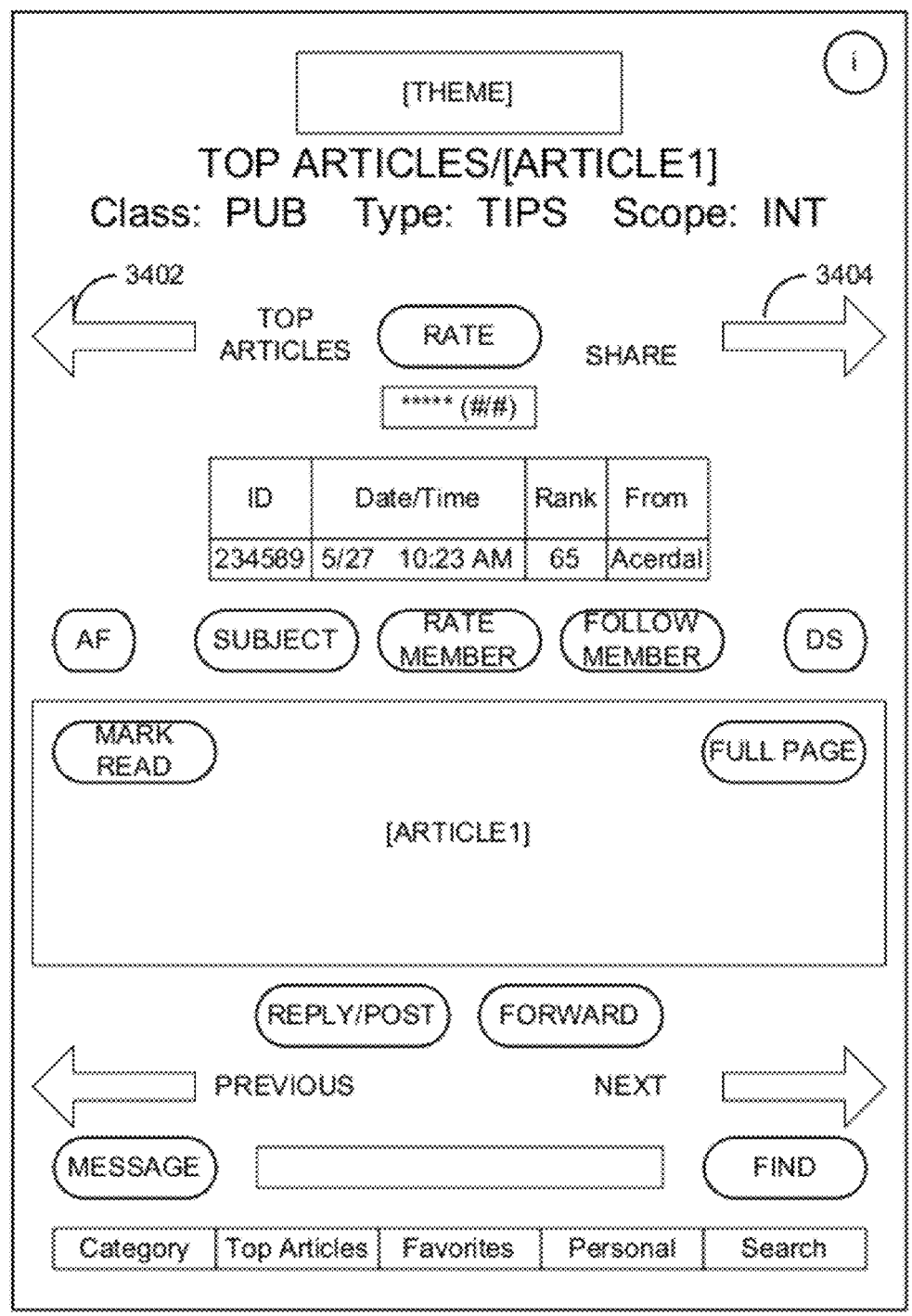
FIG. 34 depicts a conceptual diagram of a screen shot of an example of a top articles article page.

In the example of FIG. 27, the flowchart 2700 returns to module 2714 as described previously. Depending upon the implementation, the article page may vary somewhat. FIG. 34 depicts a conceptual diagram 3400 of a screen shot of an example of a top articles article page, which is quite similar to the categories article page described previously (see, e.g., FIG. 31).

Figure 35:
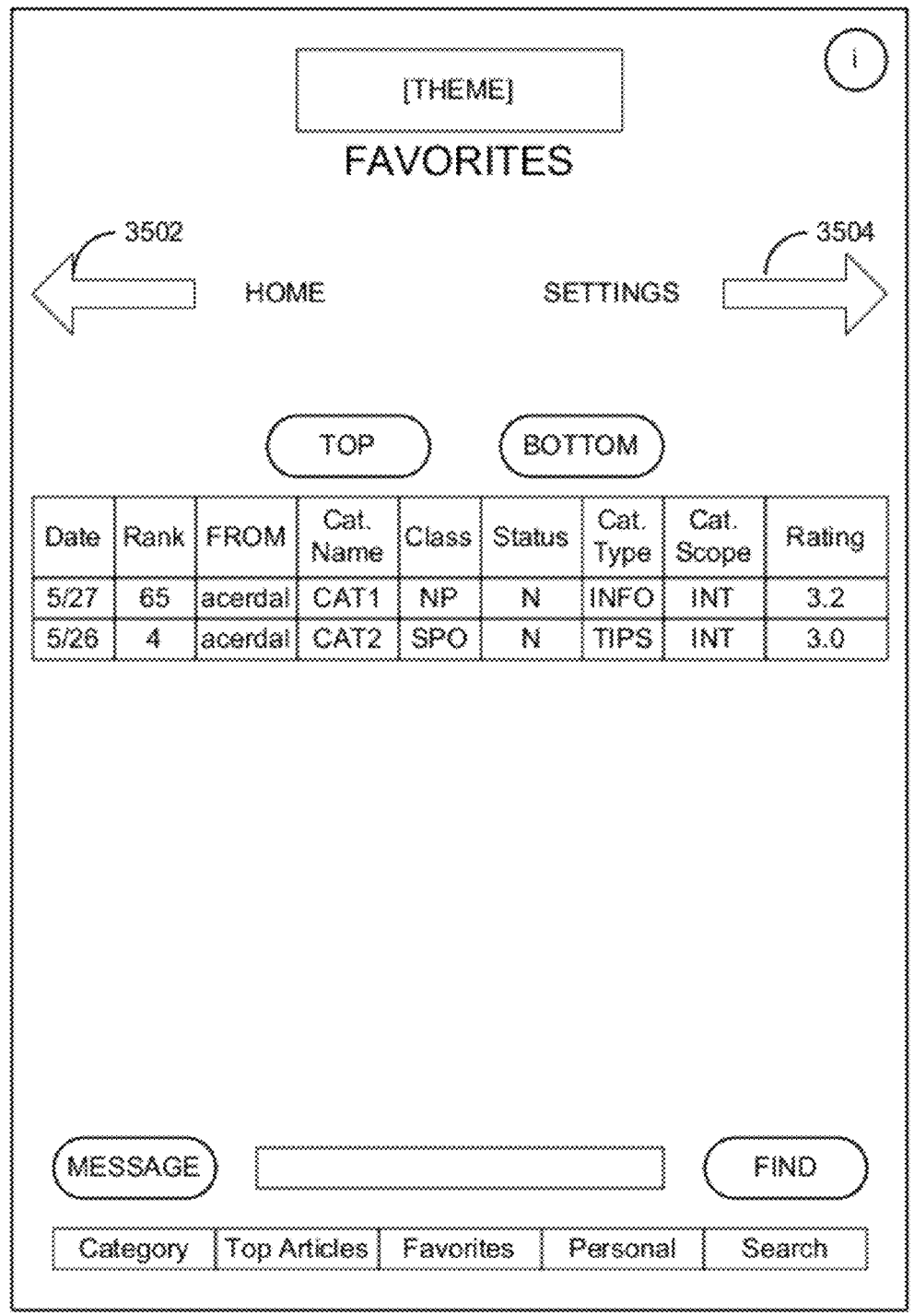
FIG. 35 depicts a conceptual diagram of a screen shot of an example of a favorites main page.

In the example of FIG. 27, with reference once again to decision point 2716, if it is determined that the top articles main page has not been selected (2716-N), then the flowchart 2700 continues to decision point 2720 where it is determined whether the favorites main page has been selected. If it is determined that the favorites main page has been selected (2720-Y), then the flowchart 2700 continues to module 2722 where the favorites main page is displayed. FIG. 35 depicts a conceptual diagram 3500 of a screen shot of an example of a favorites main page, which is quite similar to the categories main page described previously (see, e.g., FIG. 29).

Figure 36:
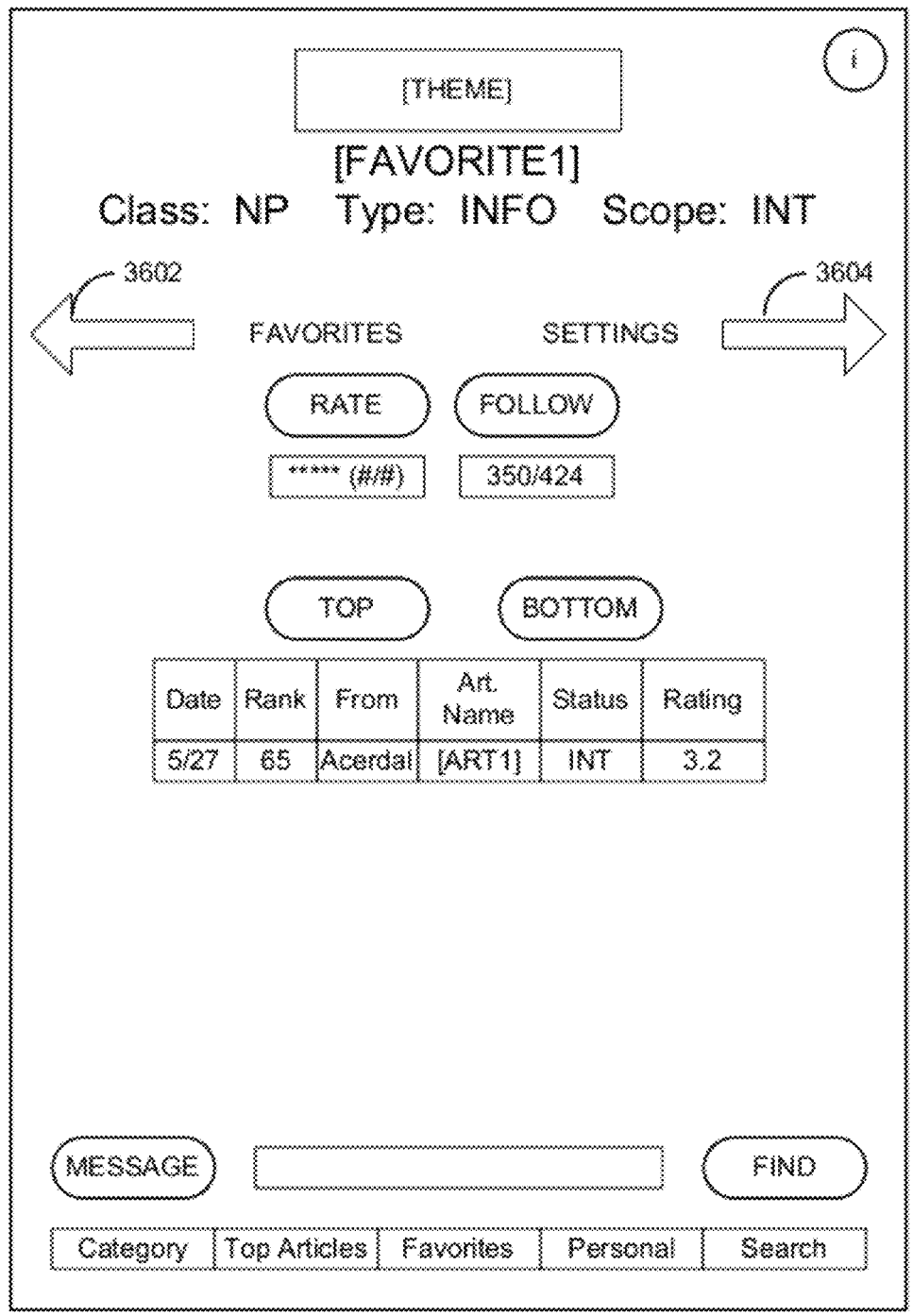
FIG. 36 depicts a conceptual diagram of a screen shot of an example of a favorites article list page.

In the example of FIG. 27, the flowchart 2700 continues to module 2724 with displaying a favorites article list page. FIG. 36 depicts a conceptual diagram 3600 of a screen shot of an example of a favorites article list page, which is quite similar to the category page described previously (see, e.g., FIG. 30).

Figure 37:
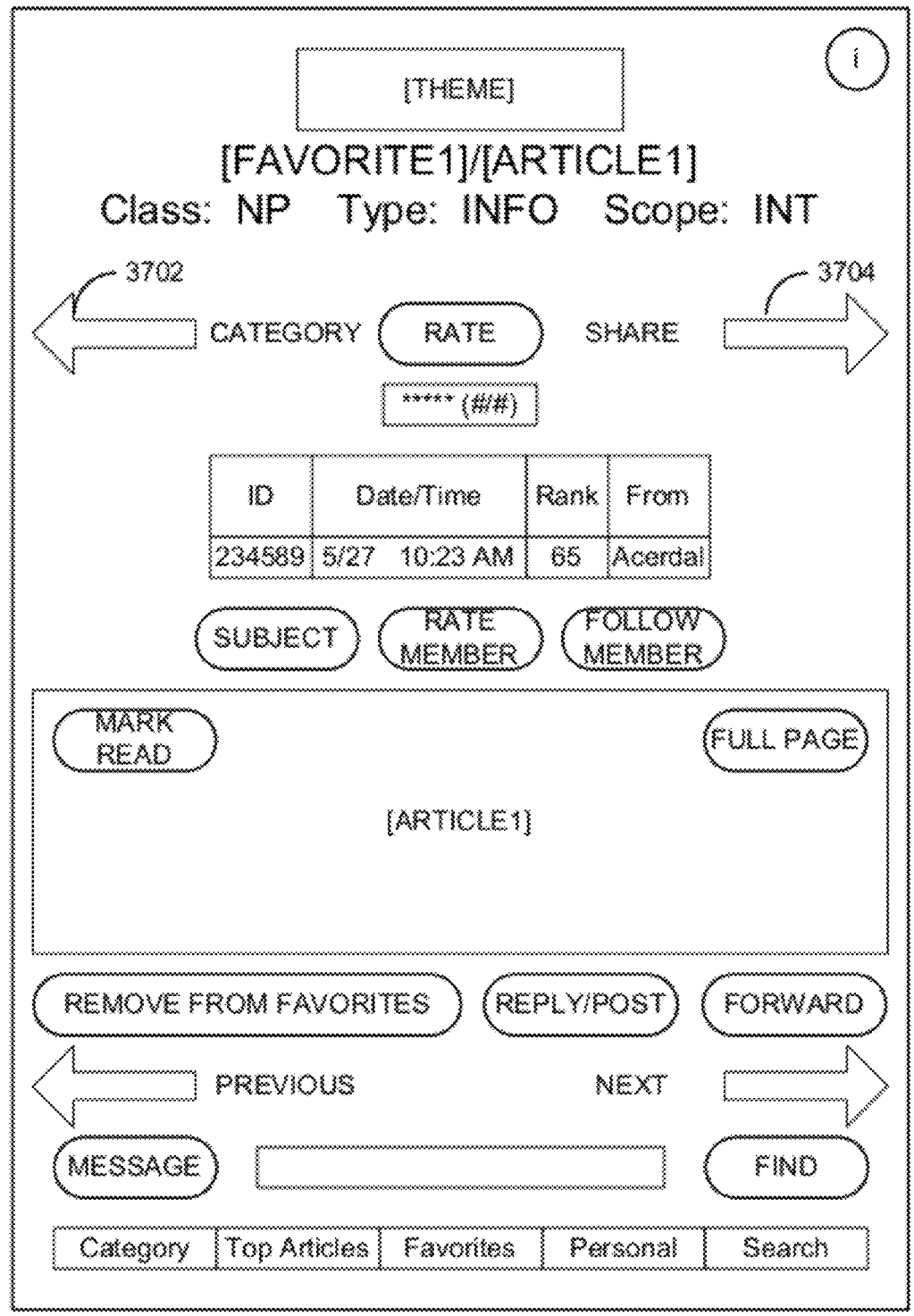
FIG. 37 depicts a conceptual diagram of a screen shot of an example of a favorite article page.

In the example of FIG. 27, the flowchart 2700 returns to module 2714 as described previously. Depending upon the implementation, the article page may vary somewhat. FIG. 37 depicts a conceptual diagram 3700 of a screen shot of an example of a favorite article page, which is quite similar to the categories article page described previously (see, e.g., FIG. 31).

In the example of FIG. 27, with reference once again to decision point 2720, if it is determined that the favorites main page has not been selected (2720-N), then the flowchart 2700 continues to decision point 2726 where it is determined whether the personal main page has been selected. If it is determined that the personal main page has been selected (2726-Y), then the flowchart 2700 continues to module 2728 where the personal main page is displayed. FIG. 38 depicts a conceptual diagram 3800 of a screen shot of an example of a personal main page.

The screen shown in the diagram 3800 is similar to the categories main screen. The diagram 3800 shows a theme name listed at the top. An arrow at the top allows a user to navigate to the HOME page while another arrow at the top allows the user to navigate to the SETTING page. The screen shown in the diagram 3800 lists the user's personal categories, such as PRI (corresponding to CATEGORY1), My Public (MPUB) (corresponding to CATEGORY2), and My Private (MPRI) (corresponding to CATEGORY3). The user's INBOX is automatically included in the user's PERSONAL folder. The INBOX comprises a special category that allows one user to send private messages to another user using his or her USERID. The private messages will show up in the INBOX. The screen shown in the diagram 3800 also lists other default boxes such as, an OUTBOX, a SENTBOX, a NOTEBOX, a CREDITBOX, an ALERTBOX, a POSTBOX, a RATEBOX, a SHAREBOX, a TEXTBOX, a TEMPBOX and a READBOX. The screen shown in the diagram 3800 uses a default sorting based on a column entitled "Rank." A category's rank is based on the ranking of each article within that category. Article ranks are based on statistics collected continuously from some, most, or all of the subscribers. Data collected from each subscriber includes the number of times an article was read, replied, shared, and other statistics to calculate the rating for each article. Default boxes created for the personal folder can include, for example:

INBOX: All private messages from other users stored in this folder.
OUTBOX: All private messages sent to other users stored in this folder.
SENTBOX: All private messages sent to other users are stored in this folder.
NOTEBOX: User can create and store notes for personal use in this folder.
CREDITBOX: All activities (like post, reply, etc.) related to receiving a credit is stored in this folder.
ALERTBOX: Copy of the settings for all alerts set by the user are stored in this folder.
POSTBOX: All postings, replies and forwards by the user are stored in this folder.
RATEBOX: All ratings done by the user are stored in this folder.
SHAREBOX: All sharing by the user are stored in this folder.
TEXTMBOX: All text messages sent by the user are stored in this folder.
TEMPBOX: Holds content created by the user for temporary purposes.
READBOX A user can store all URL links to articles from web in this folder, for example for future reading or reference. In addition, original articles as text may be copied from web and stored in this folder for future reading or reference.

The screen shown in the example of FIG. 38 allows columns to be numerically and/or alphabetically sortable, either in ascending or descending order. The following is a brief description for each column:

DATE: Indicates the creation date for the CATEGORY.
RANK: Rank 1 indicates the number one (highest) ranked category.
CAT NAME: Category name.
CLASS: There are three types of classes for PERSONAL folder. My Public (MPUB), meaning it has been created by you and that can be viewed by any other subscriber, My Private (MPRI), meaning it has been create by you and that can be viewed only by other users you have invited, and PRI, meaning it has been created by another user and can be viewed only by other users invited by the original author of the category. PRI also means you have been invited and you are participating in this category.
STATUS: In general, status indicates the number of read articles by the user versus total number of articles in that category. However, in special situations it may be INVITE, meaning you have been invited to this category, DISCON, meaning the category has been discontinued, or DISINV, meaning you have been disinvited to the category by the original author of the category.

CATEGORY TYPE: Instructional, Informational, Review/Analysis, Profile, Inspirational, Research, Opinion, Resource List, Tips, Advice, Best of List, Humor, Tutorial, interview, Survey, etc. (INSTRU, INFORM, REVIEW, PROFIL, INSPIRA, RESEAR, OPINION, RESOULT, TIPS, ADVICE, BESTLT, HUMOR, TUTOR, INTERV, SURVEY).

CATEGORY SCOPE: International (INT), National (NAT), State (STA), City (CITY). RATING: Indicates how other users rated this particular Category. Rating is a reflection of only those elected to rate the category.

The screen shown in the example of FIG. 38 also illustrates two buttons, namely, a check box (labeled "AF") on left and a box indicating "Don't Show" ("DS") on right for each category: The checkbox AF is used to select the category that a user is deleting.

In the screen shown in the example of FIG. 38, the button DS puts the category to the bottom of the categories list and de-highlights the category name so that it cannot be selected. When sorted by category name, the categories marked with the button DS will always show at the bottom. Also, the categories marked with the button DS will not update its content. If a user clicks on the button DS for a category that he or she has been invited, as signified with a STATUS of "INVITE," an automatic message goes back to the author of the category indicating that the author's invitation was rejected.

Other then the default boxes listed herein, the PERSONAL MAIN SCREEN lists the following categories: MPUB (public categories created by the user), MPRI (private categories created by the user) and PRI (private categories user has been invited and participating and those categories user just has been invited). When an entry having a CLASS of "PRI" has a STATUS of "INVITE," there is an indication that the user has been invited to this private category. Clicking on the category will open up information relating to the category. By clicking on the category, the user can open up category information. This is similar to the screen used in the ADD NEW CATEGORY form, where all the information has been already filled by the author of the category. If the user accepts the invitation, the user can click on the button labeled "ACCEPT/DONE." A user can also click on the button labeled, "CANCEL" or on the button labeled "DS" to put the category into Don't Show list.

In the screen shown in FIG. 38, the status can also be labeled "DISCON," which indicates a discontinued category. Such a category can indicate that the category was deleted by its author. The status can also be labeled, "DISINV," which means that the author disinvited the user.

In the screen shown in the example of FIG. 38, the button labeled, "ADD NEW CATEGORY" indicates that a new category will be added, with a public class "CLASS PUB" or a private class, "CLASS PRI." Clicking the ADD NEW CATEGORY button opens a form labeled, "ADD NEW CATEGORY" A user can then fills out the form to create the new category.

In the screen shown in the example of FIG. 38, the button labeled, "DELETE CATEGORY" indicates that a category is to be deleted. In the example of FIG. 38, a category can only be deleted by the author who created it. However, there can be exceptions when a category becomes discontinued or a user is disinvited from the category. In the case of either discontinuation or disinvitation, a user can also be allowed to delete the category, i.e., by selecting the category by clicking the box on left and clicking DELETE CATEGORY. A message box can confirm the user's action before deleting the category. There can be an option in the message box for completely deleting the category from memory or keeping a copy in the Personal folder with the status DISCON. DISINV and DISCON statuses can remain in a user personal folder for those categories until deleted. The user can click on the discontinued status button "DS" for that category or delete the category. When the category is deleted, system need not keep track of the category and need not synchronize the category. However, the system can inform others users of the category that the category was discontinued. This is done by changing the status of the category to DISCON on all users of the category.

In the screen shown in the example of FIG. 38, the button labeled, "MY CATS" displays a of categories MPRI and MPUB, that a user has created.

In the screen shown in the example of FIG. 38, the button labeled, "INVITED CATEGORIES" displays a list of categories other users privately created (and classified as "PRI") and invited the user to see.

In the screen shown in the example of FIG. 38, the button labeled "ALL CATS" displays all of a user's Personal categories, including the user's inbox ("INBOX") and the users' postings and replies ("MY POSTINGS/REPLIES"). When the user comes to the All Categories screen, all the categories are displayed. However, if user clicks on MY CATEGORIES or INVITED CATEGORIES buttons, the user interface can limit return back to the original Personal folder "Categories," using a variety of limitations, such as requiring the user to click on the button "ALL CATS."

In the screen shown in the example of FIG. 38, the button labeled "UPDATE MY INVITATIONS" allows an author to invite other users or disinvite other users. A check box on the left of the My Private indicator "MPRI" can be selected before clicking on the button labeled "UPDATE MY INVITATIONS." When a person is disinvited, the person's category status can change to DISINV. Once a user is disinvited, that user might be limited from seeing more messages (i.e., the system need not sync this category for this user anymore) and user might be limited form posting any more messages. Previous messages can remain in the memory until the disinvited user deletes the category. The author can be limited from disinviting only the users subscribed to the service. Other's invited by email need not be disinvited by the system until they become a registered user.

In the screen shown in the example of FIG. 38, the user can scroll up or down through this page by a user interface element, such as a screen touch. The screen shown in the example of FIG. 38 can also allow quick access to the top of the list or to the bottom of the list by clicking on TOP or BOTTOM at the top of the screen.

In the example of FIG. 27, the flowchart 2700 continues to the module 2730 where other personal folder pages are displayed. Examples of pages that can be displayed in association with a personal folder are illustrated in FIGS. 39-50.

Figure 39:
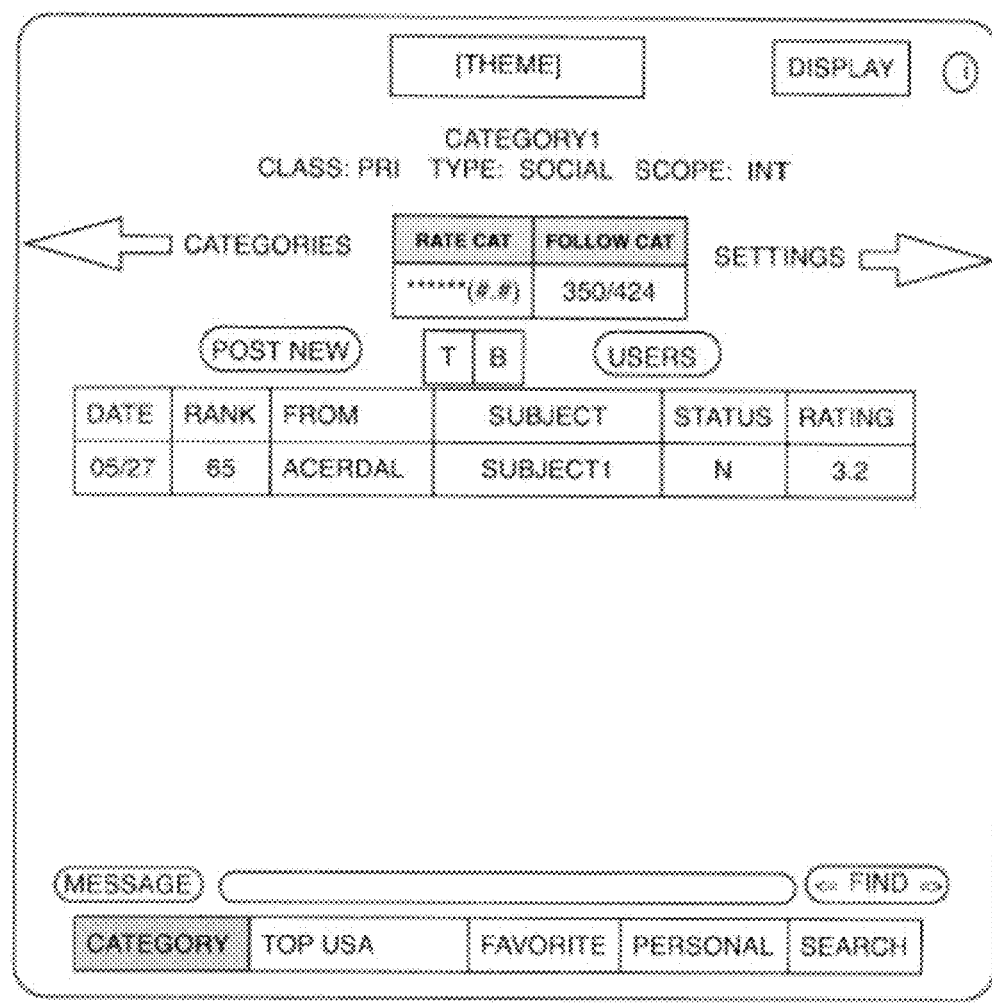
FIG. 39 depicts a conceptual diagram of a screenshot of an example of a private personal category list screen "PR.

FIG. 39 depicts a conceptual diagram 3900 of a screenshot of an example of a private personal category list screen "PRI." The private category list screen "PRI" is similar to other Category List Screens.

In the screen shown in the example of FIG. 39, there is a button labeled "USERS." The "USERS" button allows a user to find out the invited users for the enumerated Private Category. Like a main screen, the exemplary list screen of FIG. 39 has main navigational buttons for CATEGORIES (C), TOP USA (T), FAVORITES (F), PERSONAL (P) and SEARCH (S) folders (all shown at the bottom of the screen).

At the top of the screen shown in the example of FIG. 39, a user can find Theme and Category names. The screen can designate whether the category is non-personal ("NP"), indicating that the category was created by a company. The screen can also designate whether the category is a public category ("PUB"), indicating that a user created the category. The screen can contain rating information about the category and a rating button. The arrows at the top of the screen in FIG. 39 can be used used for navigating back to the Categories Main Screen or to the SETTING page.

In the screen shown in the example of FIG. 39, clicking the button "RATE CAT" can allow users to rate a Category. Below the "RATE CAT" button can be the current rating for this category.

In the screen shown in the example of FIG. 39, the button "FOLLOW CAT" allows users to set an alert to follow all the users or a specific user in the category. Below the "FOLLOW CAT" button can be the statistics a about how many users follow the category through setting alert and the total number of users participating either by reading or by posting.

In the screen shown in the example of FIG. 39, the "POST NEW" button can enable a user to post an article to the Category. Each column is sortable both ways numerically or alphabetically, ascending or descending. The following will aid one of skill in the art to further understand each column:
DATE: Can indicates the creation date for the Article.
RANK: Can indicate a ranking. E.g., "Rank 1" can indicate the number one (highest) ranked article in the set.
FROM: Can indicate the user who posted the message.
SUBJECT: Can indicate the article name or subject of the article.
STATUS: Can indicate any of the following things;
N—New—New article, meaning new since last access to the application. Those that were New before and not read yet will change its status to NR.
NR—Not Read—Article has Not been Read yet
R—Read—Article was Read
F—Favorite—Article marked as Favored
DS—Don't Show—Article marked as Don't Show. An article may be marked as DS (don't show) but still stays in the list. However, those with DS are put at the bottom of the list and they are made un-selectable until DS button is clicked again.
RATING: Can indicate how other users rated this particular article. Rating can be limited to reflect, e.g., only those elected to rate the article.

In the screen shown in the example of FIG. 39, a user can scrolls up or down through the this list screen using a user interface element such as by touching on a touch screen. Quick access to the top of the list or to the bottom of the list can occur with a click on the buttons labeled "T" or "B" at the top of the screen shown in the example of FIG. 39.

In the screen shown in the example of FIG. 39, each screen/page in each folder can also have a button/link to the "i" (information) pages. Click the "i" button can allow a user to access more specific information about the page he or she navigated to.

Figure 40:
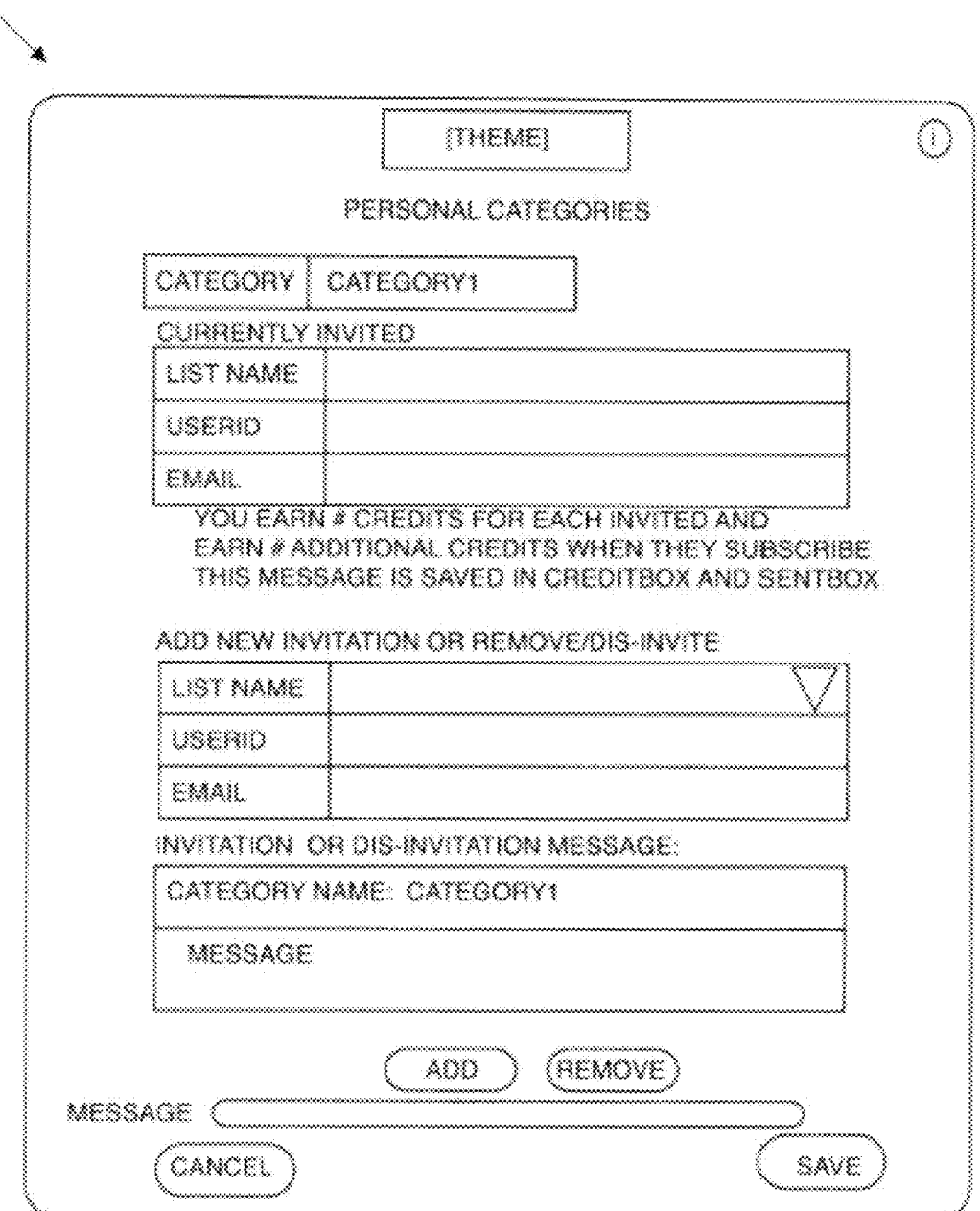
"
FIG. 40 depicts a conceptual diagram of a screenshot of an example of an "Update Invitations" screen that can be used to invite and uninvite users.

FIG. 40 depicts a conceptual diagram 4000 of a screenshot of an example of an "Update Invitations" screen that can be used to invite and uninvite users. The screen shown in the example of FIG. 40 displays a category name below the Theme. The screen in the example of FIG. 40 shows a "CURRENTLY INVITED" section including a LIST NAME a user has used, as well as a list of USERID and EMAIL addresses. In the ADD NEW INVITATION OR REMOVE/DIS-INVITE section, the user can add a new LIST NAME, USERID (separated by a delineator such as a comma), or new EMAIL for invitation.

In the screen shown in the example of FIG. 40, once the user has entered the new USERID/EMAIL and MESSAGE, the user can click on ADD to add the new people into the invited list and send a message to them. On the same screen, the user can REMOVE/DISINVITE users by typing their USERID. Once the message for the people who will be removed is typed, the user can click on the button "REMOVE" to remove and disinvite those users from the list and send a message to them. After completion of adding and/or removing, the user can click on the button "DONE" to close the screen. The invited users can have this category show up in their PERSONAL FOLDER with a status of "INVITE," and can get a personal message in their INBOX with the invitation message. Similarly those who were disinvited will can the category status changed to "DISINV," and they will get a message in their INBOX with the disinvite message from the author.

In the screen shown in the example of FIG. 40, those invited who do not have a subscriber status can receive an email message. When a person is disinvited, the category status will change to DISINV for that user. Once a user is disinvited, that user cannot see any more messages (i.e., the system need not sync this category for this user anymore) and user can be limited from posting any more messages. The previous messages can remain in the memory until the category is deleted by the user. The author can be limited to disinviting only the users subscribed to the service. Other users invited by email cannot be disinvited by the system. However, email disinvite message can still be delivered to the disinvited users.

FIG. 41 depicts a conceptual diagram 4100 of a screenshot of an example of a create new category screen shot. The button "ADD NEW CATEGORY" (shown in FIG. 38) can open up the screen ADD NEW CATEGORY, an example of which is shown in FIG. 41.

In the screen shown in the example of FIG. 41, a user can create a list using the LIST BUILDER which can be made up of USERIDs or EMAILS, separated by a delineator such as a comma. The user can then use the corresponding list along with additional USERID and eMails to invite people to the CATEGORY. The email can be limited to going to people who do not subscriber. The emailed people can get information about the category, as well as about the Application. The user can use the pulldown menu to select the LIST, or start typing and matching list of LISTs will be displayed for user to select.

In the screen shown in the example of FIG. 41, when a user selects a LIST, USERIDs or EMAILS can be displayed in the USERID LIST box on left. The user may alter this by deleting or adding USERIDs or EMAILS and click on SAVE. Cut & Paste in this box is allowed. The LIST name also can be deleted by clicking on DELETE button. The LIST created in this example is shared among all the other screens utilizing the LIST BUILDER. If the goal of the user is just to create or update a list, then user can create/delete and update lists using LIST NAME by clicking on ADD NEW CATEGORY button on PERSONAL screen. After create/delete and update of LIST NAME is complete, the user can close the screen by clicking CANCEL button. Similarly such closing can be accomplished using the SHARE, PRI MESSAGE and USER SETTINGS screens. If the goal is to continue with the creation of a new category, then user can be prompted to enter the following information;

CATEGORY NAME: (# Characters)
CATEGORY CLASS: Personal (PRI, MPRI), Public (PUB, MPUB), Sponsored (SPO) If a user is a general user, he or she can be able to select PRI or PUB. If the user is a Sponsor, he or she can be able to select SPO or PRI. Public means anyone can see and participate, whereas Private means only those who have been invited will be able to see and participate. A selection can be required to be made in order to continue with creation of a new category. If the Public option is selected, then there is no need to create a list for this category and user should continue with entering the category information. However, if the Private was selected, a list needs to be used to invite those people to the category.
CATEGORY TYPE: Instructional, Informational, Review/ Analysis, Profile, Inspirational, Research, Opinion, Resource List, Tips, Advice, Best of List, Humor, Tutorial, interview, Survey, etc. (INSTRU, INFORM, REVIEW, PROFIL, INSPIRA, RESEAR, OPINION, RESOULT, TIPS, ADVICE, BESTLT, HUMOR, TUTOR, INTERV, SURVEY)
CATEGORY SCOPE: International (INT), National (NAT), State (STA), City (CITY)
Additional information can include:
WHY IS THIS CATEGORY NEEDED?
HOW WILL USERS BENEFIT FROM THIS CATEGORY?
WHO WILL USE THIS CATEGORY?
ADDITIONAL COMMENTS In the screen shown in the example of FIG. 41, when a private category is created and a Private invitation is made, the category shows up in the personal folder of the invited users who are subscribers. The status of the category is set to INVITE, indicating that user has been invited to this category. Once the user clicks on the new category and clicks on ACCEPT/DONE button, the INVITE status is replaced with the common status info of "# of NR/# of Total" articles count in the category. A message goes back to the author/inviter that the user has accepted the invitation. If the invited user clicks on DS for that category, then an automatic message goes back to the author/inviter of the category that this USERID has rejected his invitation.

In the screen shown in the example of FIG. 41, when the ADD NEW CATEGORY form is filled, the information in the form is saved in memory and synced with system. System creates a new category, either Private or Public, with the message from the Author. System re-syncs the new category to author's electronic hardware device. If user is a SPONSOR (system can detect sponsors from their USERID), after DONE button is clicked in the 2nd page of ADD CATEGORY SCREEN (FIG. S6D), a new screen is displayed, ADD CATEGORY SCREEN SPONSOR (FIG. 43) to the user for filling out the specific credits that may be given to the users for their activities.

Figure 42:
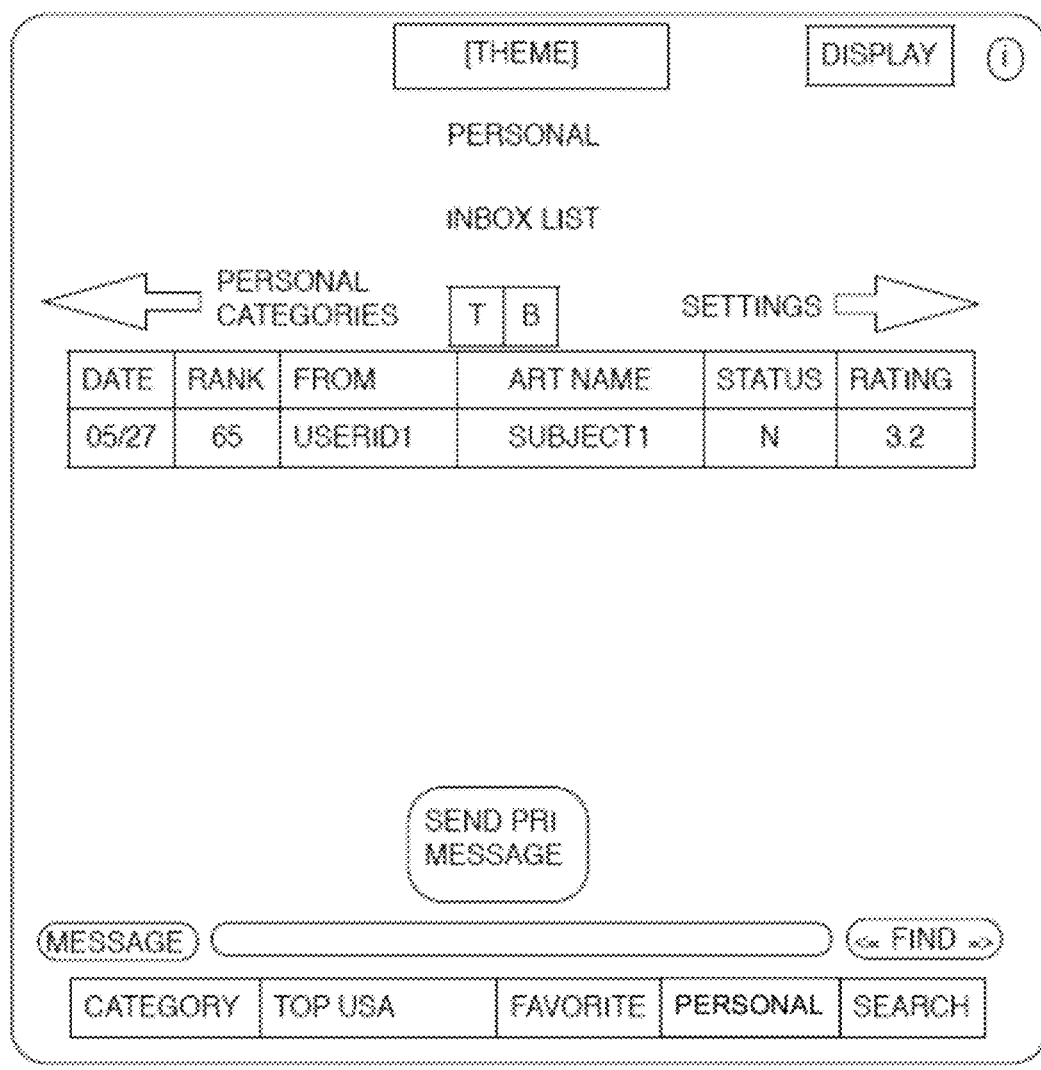
FIG. 42 depicts a conceptual diagram of a screenshot of an example of a personal inbox screen shot.

FIG. 42 depicts a conceptual diagram 4200 of a screenshot of an example of a personal inbox screen shot. The structure of the INBOX Articles list screen is similar to the list screen of Categories, where the main navigational buttons for CATEGORIES (C), TOP USA (T), FAVORITES (F), PERSONAL (P) and SEARCH (S) folders are found at the bottom of the screen. At top of the screen a user can find Theme name. The arrows at the top can be used for navigating back to the PERSONAL CATEGORIES page or to the SETTING page.

Each column is sortable both ways numerically or alphabetically, ascending or descending. Here are brief description for each column:
DATE: Indicates the creation date for the Article.
RANK: Rank 1 indicates the number one (highest) ranked article.
FROM: User who posted the message.
SUBJECT: Article name or Subject of the article.
STATUS: Article status indicates one of the followings;

N—New—New article, meaning new since last access to the application. Those that were New before and not read yet will change its status to NR.

NR—Not Read—Article has Not been Read yet

R—Read—Article was Read

F—Favorite—Article marked as Favored

DS—Don't Show—Article marked as Don't Show. An article may be marked as DS (don't show) but still stays in the list. However, those with DS are put at the bottom of the list and they are made un-selectable until DS button is clicked again.

RATING: Indicates how other users rated this particular article. Rating is a reflection of only those elected to rate the article.

Clicking the Subject will take you to the individual article screen

SEND PRI MESSAGE: User can send a private message to another user, which could be a subscriber or another person. For subscribers, USERID will be used and for others an email address will be used to send the message.

In the screen shown in the example of FIG. 42, the user can scroll up or down through the this list screen by touching on screen. Also, there can be a quick access to the top of the list or to the bottom of the list by clicking on T or B button at the top of the screen.

In the screen shown in the example of FIG. 42, each screen/page in each folder can also have a button/link to "i" (information) pages. Click the i button to access more specific information about the page you are at.

Figure 43:
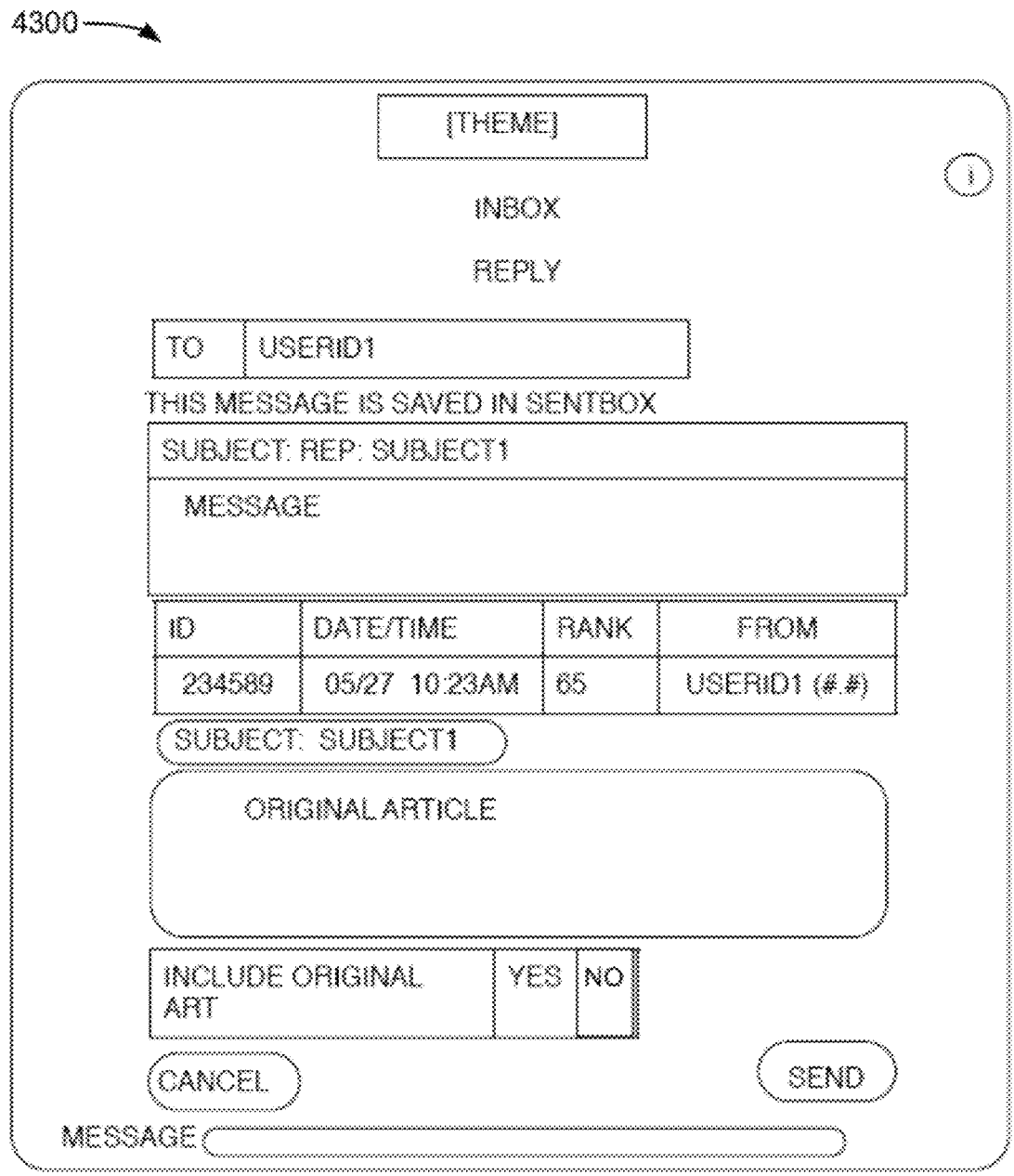
FIG. 43 depicts a conceptual diagram of a screenshot of an example of an inbox reply screen shot.

FIG. 43 depicts a conceptual diagram 4300 of a screenshot of an example of an inbox reply screen shot. Users can reply to the private messages that they receive in their INBOX. A user can have the option of including the original article as part of his or her reply message.

Figure 44:
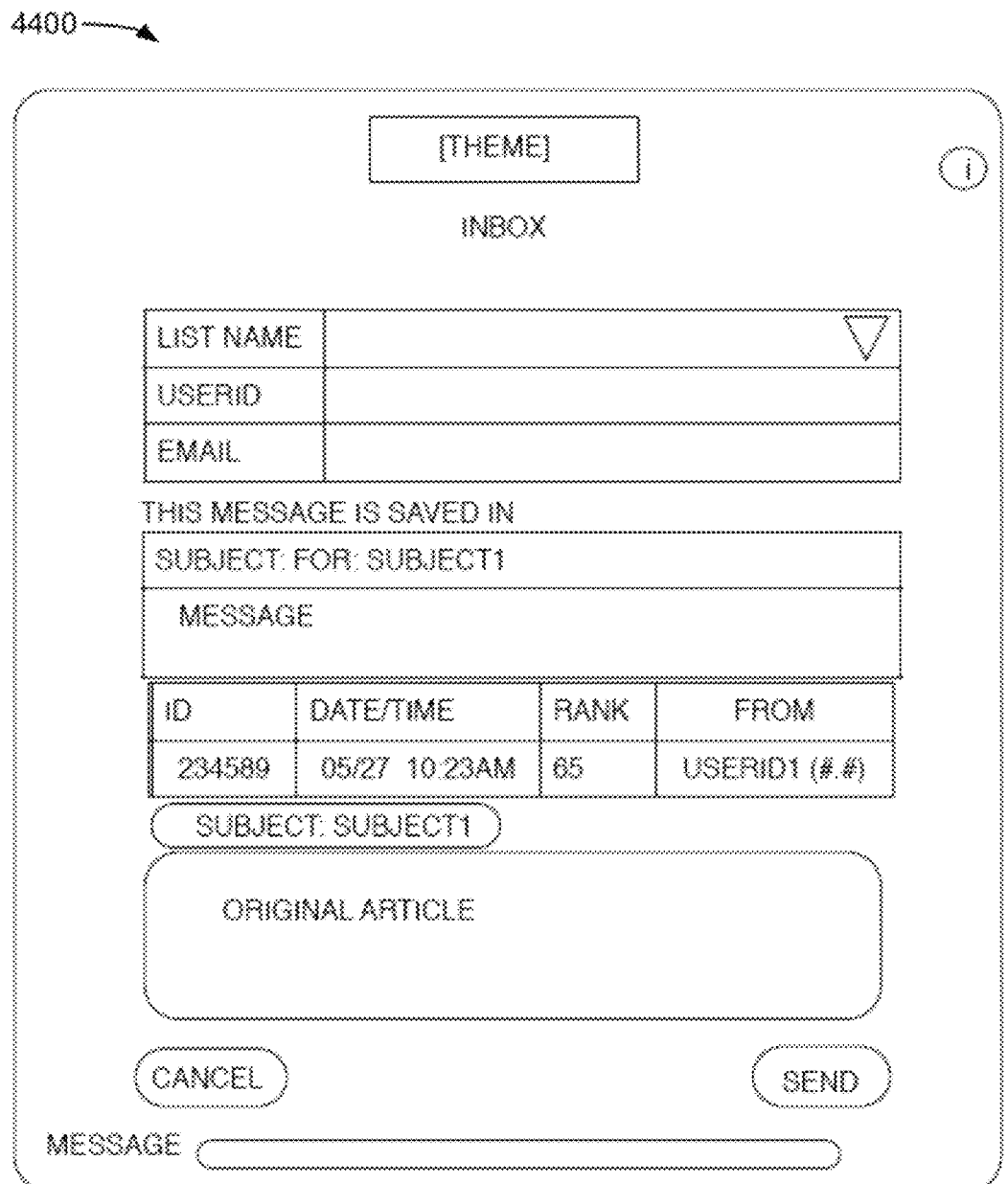
FIG. 44 depicts a conceptual diagram of a screenshot of an example of a inbox forward screen shot.

FIG. 44 depicts a conceptual diagram 4400 of a screenshot of an example of a inbox forward screen shot. Users can forward the private messages that they receive in their INBOX to others, who are registered users or to non-registered users through their email address.

Figure 45:
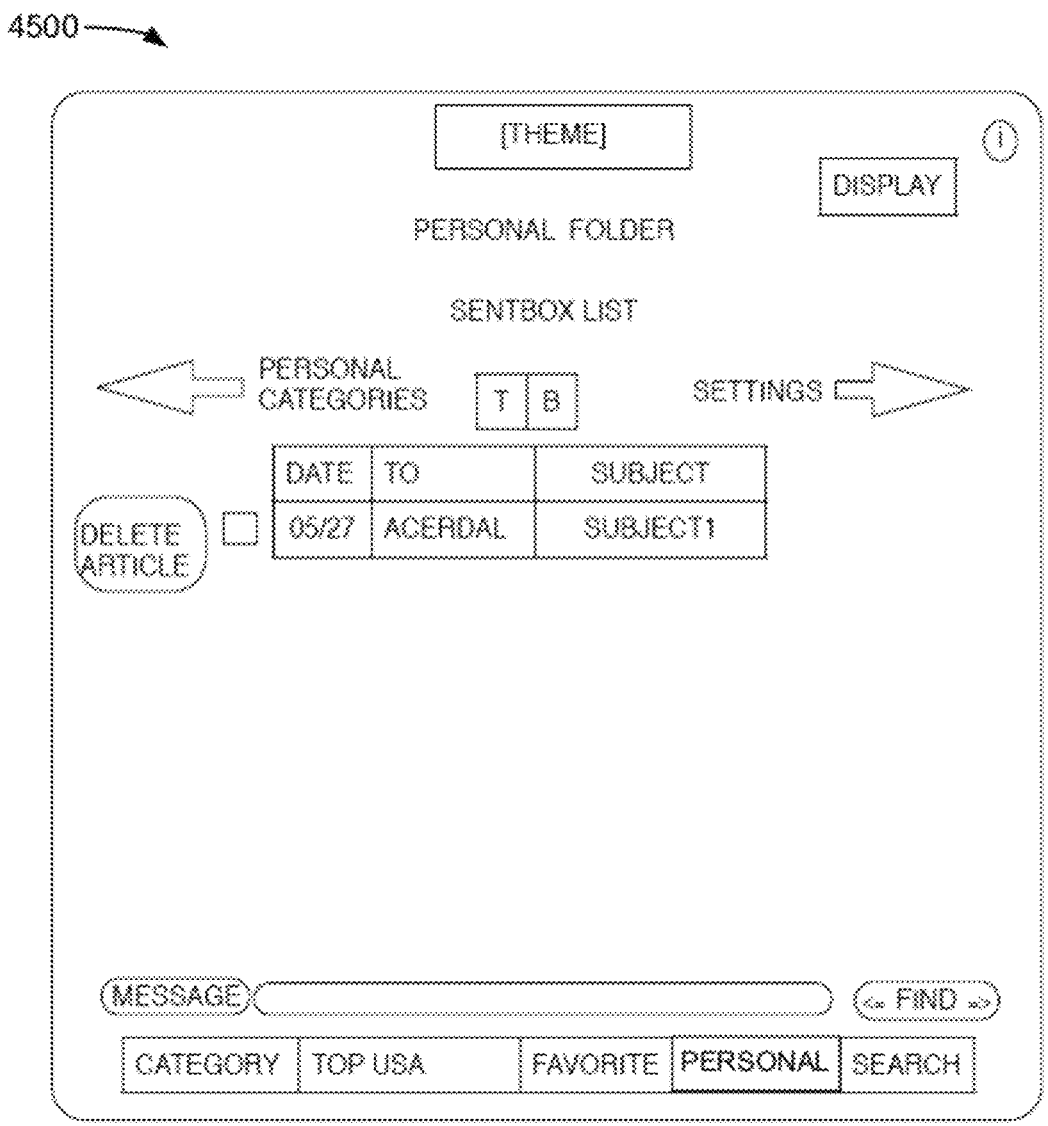
FIG. 45 depicts a conceptual diagram of a screenshot of an example of a personal folders sentbox list screen shot.

FIG. 45 depicts a conceptual diagram 4500 of a screenshot of an example of a personal folders sentbox list screen shot. List of private messages can be sent to other users.

Figure 46:
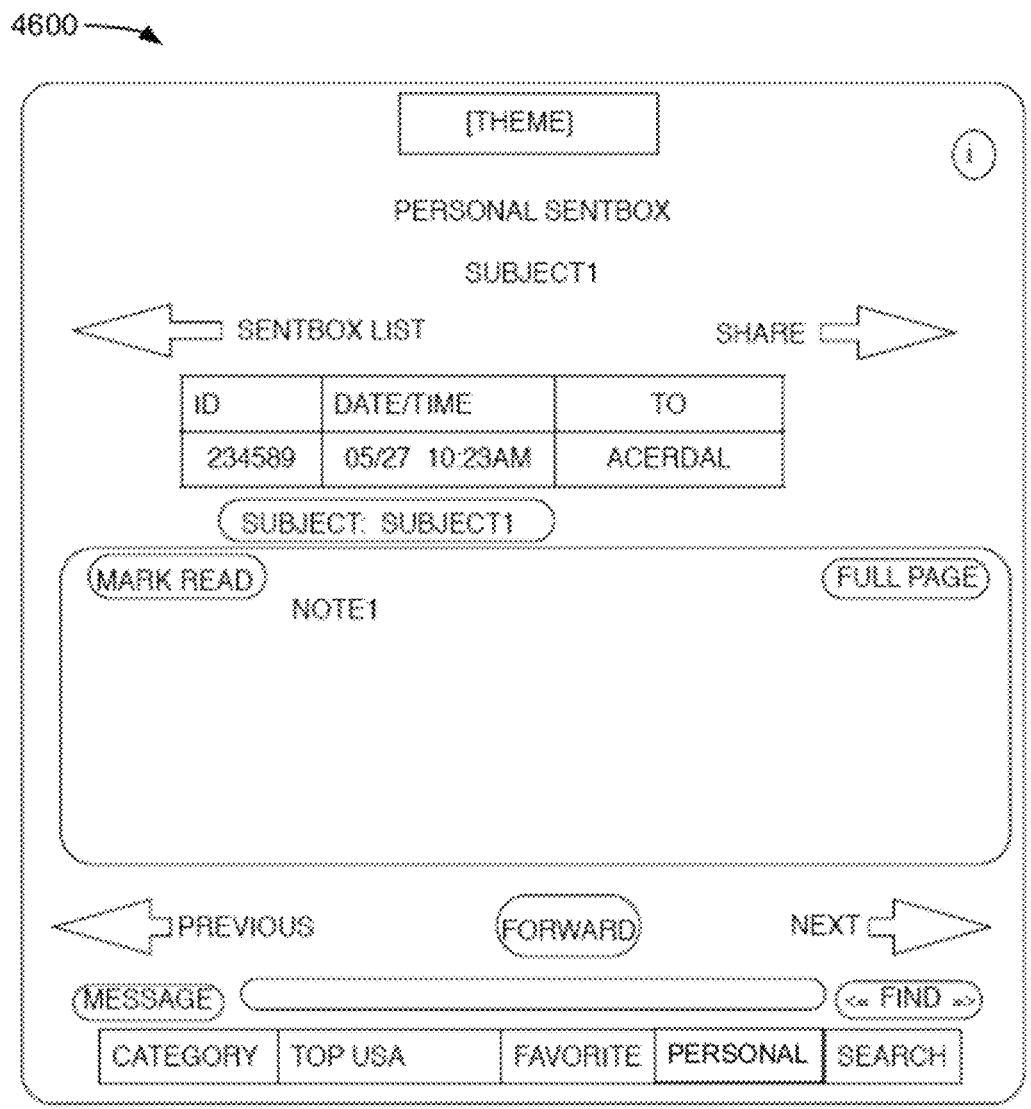
FIG. 46 depicts a conceptual diagram of a screenshot of an example of a personal sentbox subject screen shot.

FIG. 46 depicts a conceptual diagram 4600 of a screenshot of an example of a personal sentbox subject screen shot. Users can use this screen to view and forward the individual articles.

Figure 47:
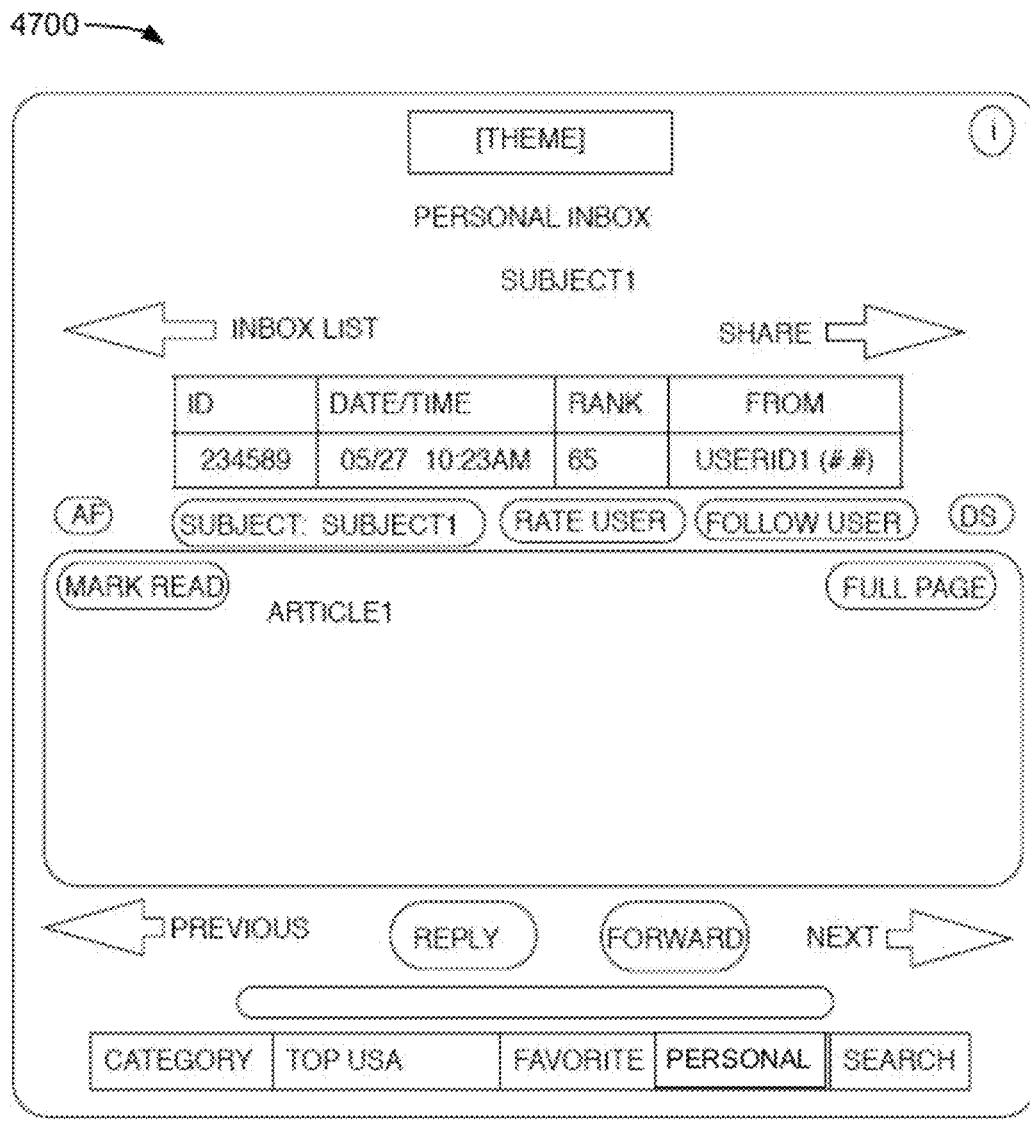
FIG. 47 depicts a conceptual diagram of a screenshot of an example of a personal inbox subject screen shot.

FIG. 47 depicts a conceptual diagram 4700 of a screenshot of an example of a personal inbox subject screen shot. This page can be similar to the Category Article Screen. At top of the screen you find Theme, Personal Category and Article names. It will also designate if the category is MPRI indicating private and created by you, MPUB indicating public and created by you, and PRI indicating public and was created by another user which you have been invited. The arrows at the top are for navigating back to the Personal Inbox List Screen or to the SHARE page. Using Share will allow you to send the article to another person using email, text message, share it with facebook or twitter.

Here are brief description for each column:

ID: This is a unique number for the article which can be used for searching or reporting purposes.

DATE/TIME: Indicates the creation date and time for the Article.

RANK: Rank 1 indicates the number one (highest) ranked article.

FROM: User who posted the message.

SUBJECT: Article name or Subject of the article.

RATE USER: You can rate the user who posted this article

FOLLOW USER: You can set alert to follow the user who posted this article for all categories that will be posted by this user or for a specific category.

Below the Article, you will find a Next and Previous navigational buttons. Next button will display the next article in the Personal Inbox List Screen, where as Previous button will display the previous article in the Personal Inbox List Screen.

The message screen will display messages regarding user actions. For example when article was added to the favorite or marked as DS, etc. The message screen is followed by the following buttons;

ADD TO FAVORITES (Article)—User is allowed to select a Category from a list or create a new custom category in the FAVORITE folder. Only the ARTICLE selected goes to the FAVORITE folder. Status of the article is changed to F.

DON'T SHOW—Will mark the article as DS and will put it at the bottom of the articles in the Category List. An article may be marked as DS (don't show) but still stays in the list. However, those articles are made un-selectable until DS button is clicked again.

REPLY/POST—Will take you to the Reply/Post page.

FORWARD—will take you to the Forward page.

MARK READ button changes the status of the article READ, and de-highlights the article in the list, and MARK READ turns into MARK UNREAD. Clicking the MARK UNREAD button, changes the status of the article to NOT READ (NR), highlights the article in the list, and MARK UNREAD turns into MARK READ button. Basically switching back and forth every time it is clicked.

FULL PAGE button enlarges the view of the article page. Navigation to Category List screen and SHARE screen, as well as the RATE ART buttons are eliminated to make room for larger article display area. Clicking the BACK TO FIT PAGE will take user to the original article display mode (See FIG. S3K).

In the screen shown in the example of FIG. 47, each screen/page in each folder also has a button/link to i (information) pages. Click the i button to access more specific information about the page you are at.

Figure 48:
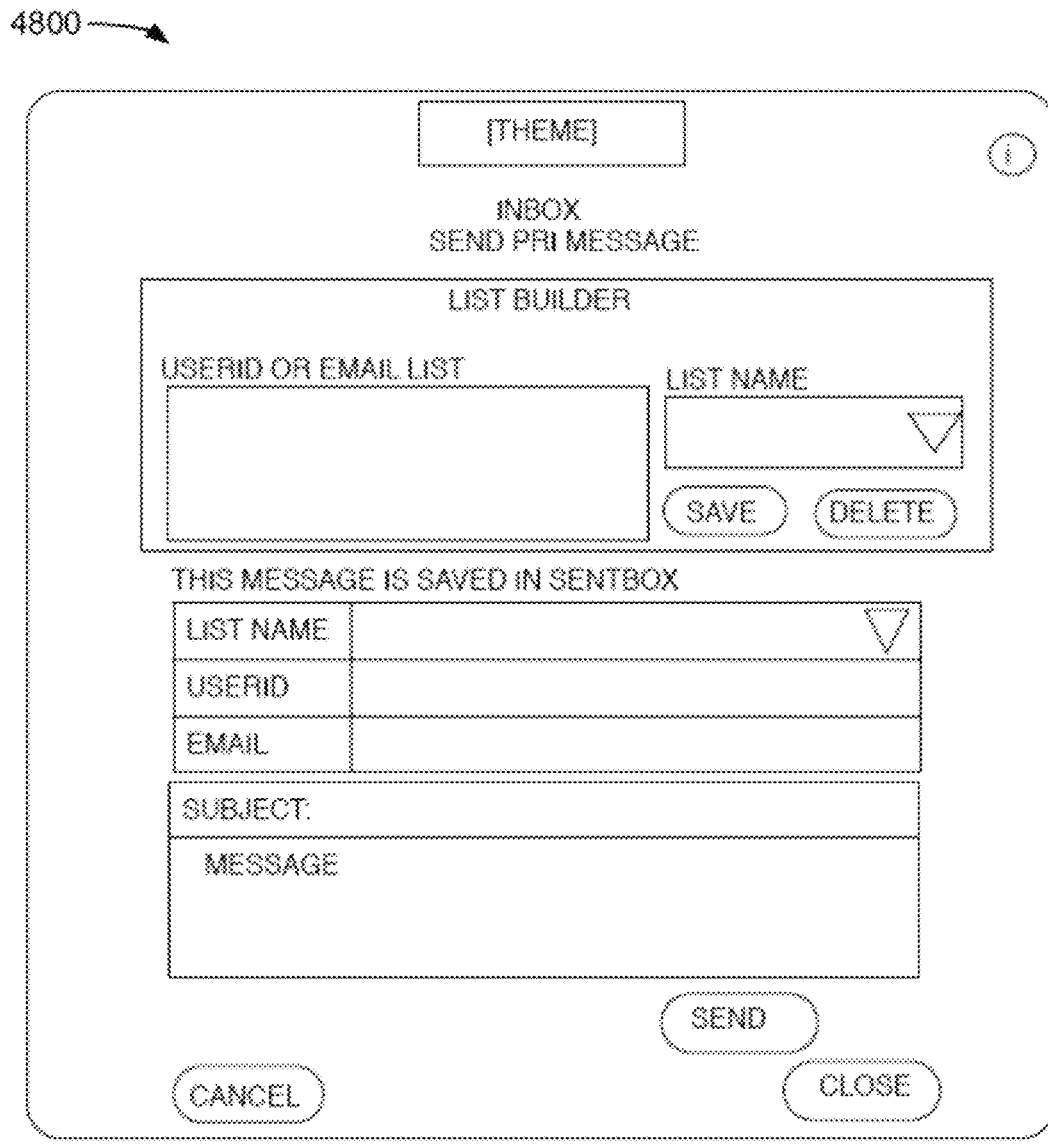
FIG. 48 depicts a conceptual diagram of a screenshot of an example of an inbox send PRI message screen shot.

FIG. 48 depicts a conceptual diagram 4800 of a screenshot of an example of an inbox send PRI message screen shot. The PRI message can be sent to another subscriber using their USERID, and/or using an email address. In LIST BUILDER user can create a LIST made up of USERIDs or EMAILS, separated by comma. This LIST then can be used along with additional USERID and eMails to send the Private message. Multiple USERID and EMails can be entered separated by comma. The email can go to people who are not yet subscribers. This emailed people get the private message, as well as information about the Application. User can use the pulldown menu to select the LIST, or start typing and matching list of LISTs will be displayed for user to select. When a LIST is selected, USERIDs or EMAILS show up in the USERID LIST box on left. User may alter this by deleting or adding USERIDs or EMAILS and click on SAVE. Cut & Paste in this box is allowed. LIST name also can be deleted by clicking on DELETE button. The LIST created here can be shared among all the other screens utilizing the LIST BUILDER LIST NAME: Select a LIST NAME using pull-down menu for sending the private message USERID: Enter USERIDs separated by comma EMAIL: Enter EMAIL addresses separated by comma PRI SENT BOX: Default is YES, meaning a copy of the PRI message will be kept in SENT BOX. If NO is selected, no copy will be kept. Enter subject and message, and click SEND. Each screen/page in each folder also has a button/link to i (information) pages. Click the i button to access more specific information about the page you are at.

Figure 49:
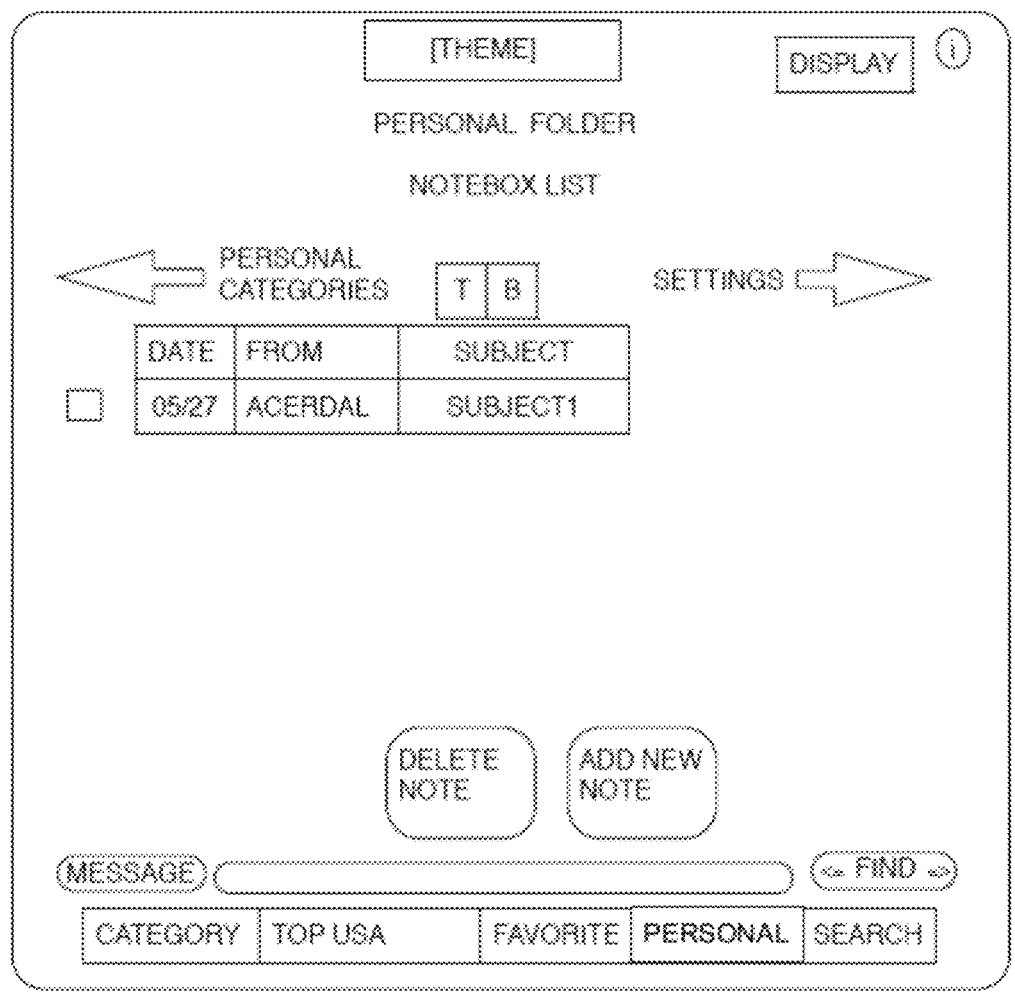
FIG. 49 depicts a conceptual diagram of a screenshot of an example of a personal folder notebox list screen shot.

FIG. 49 depicts a conceptual diagram 4900 of a screenshot of an example of a personal folder notebox list screen shot. The structure of the NOTEBOX Articles list screen is similar to the list screen of Categories, where the main navigational buttons for CATEGORIES (C), TOP ARTICLES (T), FAVORITES (F), PERSONAL (P) and SEARCH (S) folders are found at the bottom of the screen. At top of the screen you find Theme name. The arrows at the top are used for navigating back to the PERSONAL CATEGORIES page or to the SETTING page.

Each column is sortable both ways numerically or alphabetically, high to low or low to high. Here are brief description for each column:
DATE: Indicates the creation date for the Note.
FROM: User who created the Note. This information will be used if user decides to send this note as a private message to another user.
SUBJECT: Article name or Subject of the article. Clicking the Subject will take you to the individual note page
DELETE NOTE—Select a note by clicking on the Check Box on left side of the Note, and then click DELETE NOTE button to delete.
ADD NEW NOTE: Clicking this button will take user to the NOTEBOX Article Screen to enable user to enter text and save the new note.

In the screen shown in the example of FIG. 49, a user can scroll up or down through the list screen by a user interface element, such as touching on a touch screen. Also, there is a quick access to the top of the list or to the bottom of the list by clicking on T or button at the top of the screen.

Each screen/page in each folder also has a button/link to "i" (information) pages. Click the button to access more specific information about the page you are at.

Figure 50:
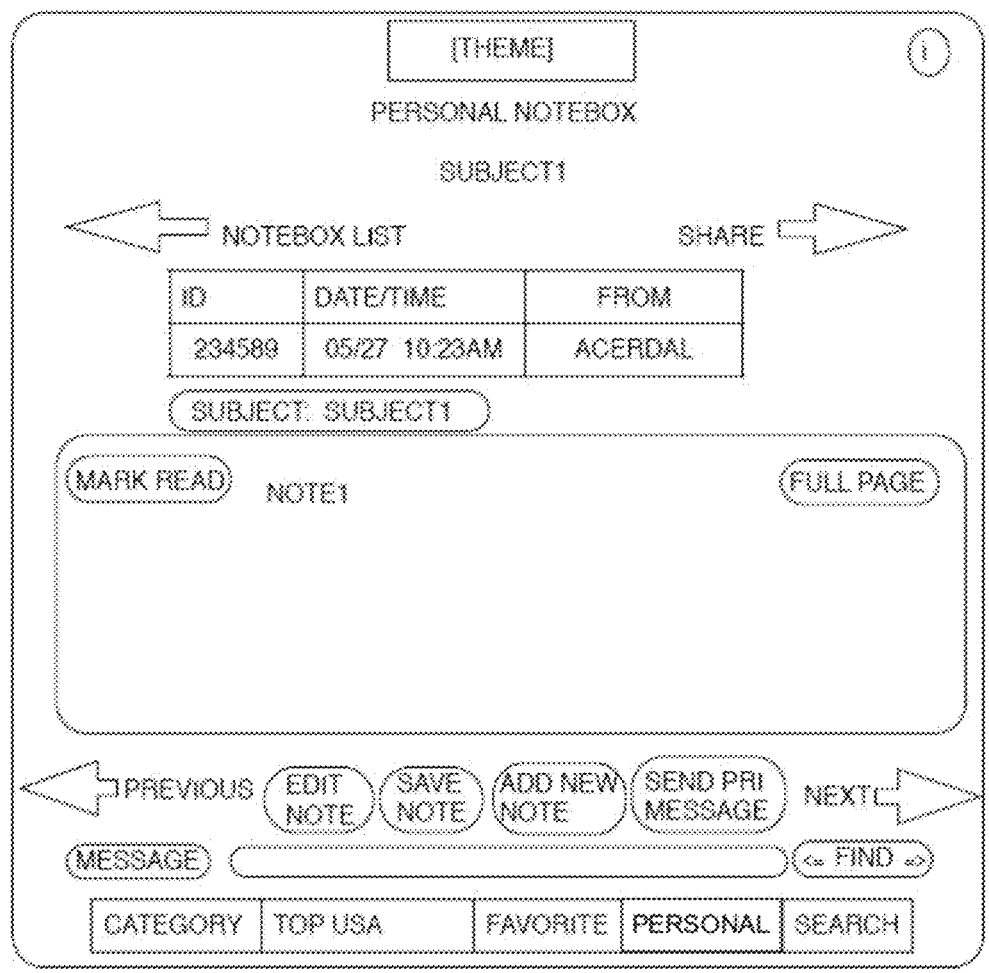
FIG. 50 depicts a conceptual diagram of a screenshot of an example of a personal notebox subject screen shot.

FIG. 50 depicts a conceptual diagram 5000 of a screenshot of an example of a personal notebox subject screen shot. This page is very similar to the Category Article Screen. At top of the screen you find Theme, Personal Category and Note/article names.

The arrows at the top are for navigating back to the Personal Inbox List Screen or to the SHARE page. Using Share will allow you to send the article to another person using email, text message, share it with social networks such as Facebook or Twitter.

Here are brief description for each column:
ID: This is a unique number for the note/article which can be used for searching or reporting purposes.
DATE/TIME: Indicates the creation date and time for the Note/Article.
FROM: User who created the note/article.
SUBJECT: Article name or Subject of the article.

In the screen shown in the example of FIG. 50, below the Article, a user can find Next and Previous navigational buttons. The next button will display the next note/article in the Notebox List Screen, where as Previous button will display the previous note/article in the Notebox List Screen.

In the screen shown in the example of FIG. 50, the Notebox where the text is entered will either be blank if user click on the ADD NEW NOTE button on the Notebox List Screen, or will have the text of the note if user clicked on the Subject of the not on the Notebox List Screen.

In the screen shown in the example of FIG. 50, the message screen will display messages regarding user actions. For example when article was added to the favorite or marked as DS, etc. The message screen can be followed by the following buttons;
EDIT NOTE—will take user to the edit mode so that note can be edited.
SAVE NOTE—will save the note.
ADD NEW NOTE: Clicking this button will create a blank Notebox and put user to the edit mode so that new text can be entered.
SEND PRI MESSAGE: User can send a private message to another user, which could be a subscriber or another person. For subscribers, USERID will be used and for others an email address will be used to send the message. The message in the Notebox will be copied over to the PRI Message box.
MARK READ button changes the status of the article READ, and de-highlights the article in the list, and MARK READ turns into MARK UNREAD. Clicking the MARK
UNREAD button, changes the status of the article to NOT READ (NR), highlights the article in the list, and MARK UNREAD turns into MARK READ button. Basically switching back and forth every time it is clicked.
FULL PAGE button enlarges the view of the article page. Navigation to Category List screen and SHARE screen, as well as the RATE ART buttons are eliminated to make room for larger article display area. Clicking the BACK TO FIT PAGE will take user to the original article display mode (See FIG. S3K).

Each screen/page in each folder also has a button/link to "i" (information) pages. Click the i button to access more specific information about the page you are at.

Returning to the example of FIG. 27, the flowchart 2700 continues to module 2732 where search main page is displayed. Because the example of FIG. 7 includes only 5 main page choices, Categories, Top Articles, Favorites, Personal, and Search, at this point the only remaining option is the search main page option. FIG. 51 depicts a conceptual diagram 5100 of a screenshot of an example of a search main page screen shot. User can save and reuse previous search settings. To save, type a search name and click the SAVE SEARCH button. To reuse, click the pulldown menu and select a saved search. User can search Categories, Articles, Users or Sponsors. Select one of the options CAT, ART, USER or SPON using the pull-down menu. Users can also perform search on the current page that they came from or search all content pages within the Theme. Category can be searched using a keyword. Category search results displayed using a screen similar to the Category Main Screen. Article search can be done using an article ID number or using a keyword. See FIG. S8B for articles search screen. User search can be accomplished using the USERID or a keyword. The results of user search is show in FIG. S8C. Furthermore, user can click on any of the matching USERID on page and look for more detail information about the user. See FIG. S8D user page screen. Similarly, user can search for a SPONSOR using their USERID or with a keyword. See FIG. S8E sponsor search page. ALL is a default selection for all the options—RATING, CLASS, STATUS, TYPE, SCOPE and RANKING. Note that CLASS, TYPE and SCOPE apply to Categories only, STATUS applies to Articles only. RANKING and RATING are used for all search, including Category, Article, User, and Sponsor. For TYPE option, user can select either ALL or one of the items provided in the pulldown list. For RANKING and RATING user also has only one option to select. For CLASS, STATUS, TYPE and SCOPE user can make multiple selections by clicking on them and highlighting them. Once the proper selections are made, user can enter one or more KEYWORDS to setup the search before clicking SEARCH button. If user is searching an article, entering the article ID is sufficient for searching without selecting any special options. Each screen/page in each folder also has a button/link to (information) pages. Click the i button to access more specific information about the page you are at.

Figure 52:
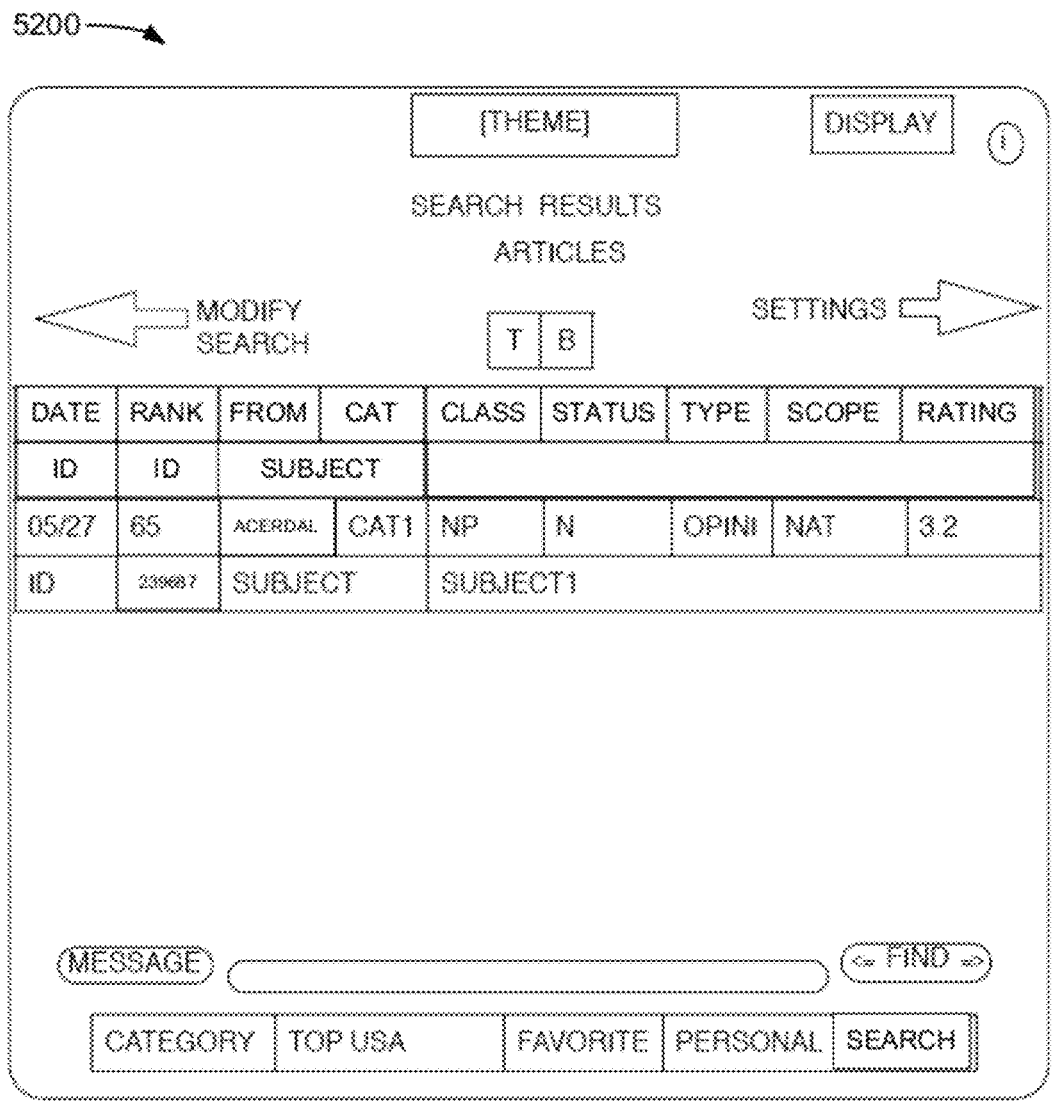
FIG. 52 depicts a conceptual diagram of a screenshot of an example of an articles search results page.

In the example of FIG. 27, the flowchart 2700 continues to decision point 2734 wherein it is determined whether a search is to be conducted for articles. If it is determined that a search is to be conducted for articles (2734-Y), then the flowchart 2700 continues to module 2736 where an articles search results page is displayed. FIG. 52 depicts a conceptual diagram 5200 of a screenshot of an example of an articles search results page.

DATE: Indicates the creation date for the Article.
RANK: Rank 1 indicates the number one (highest) ranked article.
FROM: User who posted the message.
CAT: Category name
CLASS: NP, PUB (or MPUB), PRI (or MPRI), SPO
STATUS: Article status indicates one of the followings;
N—New—New article, meaning new since last access to the application. Those that were New before and not read yet will change its status to NR.
NR—Not Read—Article has Not been Read yet
R—Read—Article was Read
F—Favorite—Article marked as Favored
DS—Don't Show—Article marked as Don't Show. An article may be marked as DS (don't show) but still stays in the list. However, those with DS are put at the bottom of the list and they are made not selectable until DS button is clicked again.
CATEGORY TYPE: Instructional, Informational, Review/Analysis, Profile, Inspirational, Research, Opinion, Resource List, Tips, Advice, Best of List, Humor, Tutorial, interview, Survey, etc. (INSTRU, INFORM, REVIEW, PROFIL, INSPIRA, RESEAR, OPINION, RESOULT, TIPS, ADVICE, BESTLT, HUMOR, TUTOR, INTERV, SURVEY)
CATEGORY SCOPE: International (INT), National (NAT), State (STA), City (CITY)
RATING: Indicates how other users rated this particular article. Rating is a reflection of only those elected to rate the article.
ID: This is a unique number for the article which can be used for searching or reporting purposes.
SUBJECT: Article name or Subject of the article.

User also can select either one line or two line display of the results for this screen. User can scroll up or down through the this list screen by touching on screen. Also, there is a quick access to the top of the list or to the bottom of the list by clicking on T or B button at the top of the screen.

Each screen/page in each folder also has a button/link to i (information) pages. Click the i button to access more specific information about the page you are at.

Figure 53:
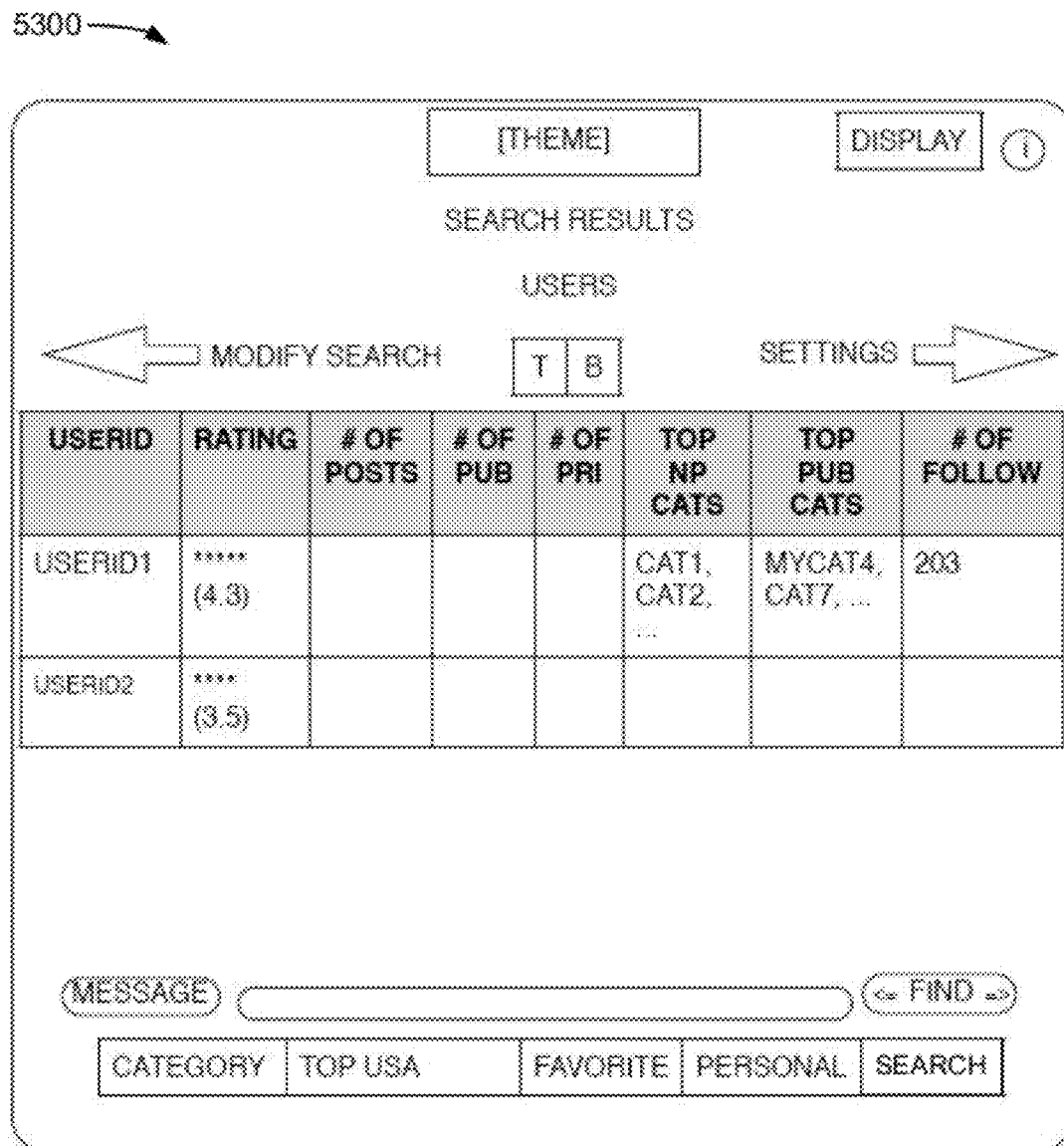
FIG. 53 depicts a conceptual diagram of a screenshot of an example of a users search results page.

In the example of FIG. 27, if it is determined that the search is not for articles (2734-N), then the flowchart 2700 continues to decision point 2738 where it is determined whether a search is to be conducted for users. If it is determined that a search is to be conducted for articles (2738-Y), then the flowchart 2700 continues to module 2740 where a users search results page is displayed. FIG. 53 depicts a conceptual diagram 5300 of a screenshot of an example of a users search results page.

USERID: User IDs
RATING: Indicates how other users rated this particular author. Rating is a reflection of only those elected to rate the author.
OF POSTS: Number of total postings made by the user to different categories.
OF PUB: Number of Public categories authored by the user.
OF PRI: Number of Private categories authored by the user.
TOP NP CATS: Top Non-Personal (created by company) categories followed by the user. Top means most actively participated by the user.
TOP PUB CATS: Top Public (created by users) categories followed by the user. Top means most actively participated by the user.
OF FOLLOWERS: Number of users following the author.

Figure 54:
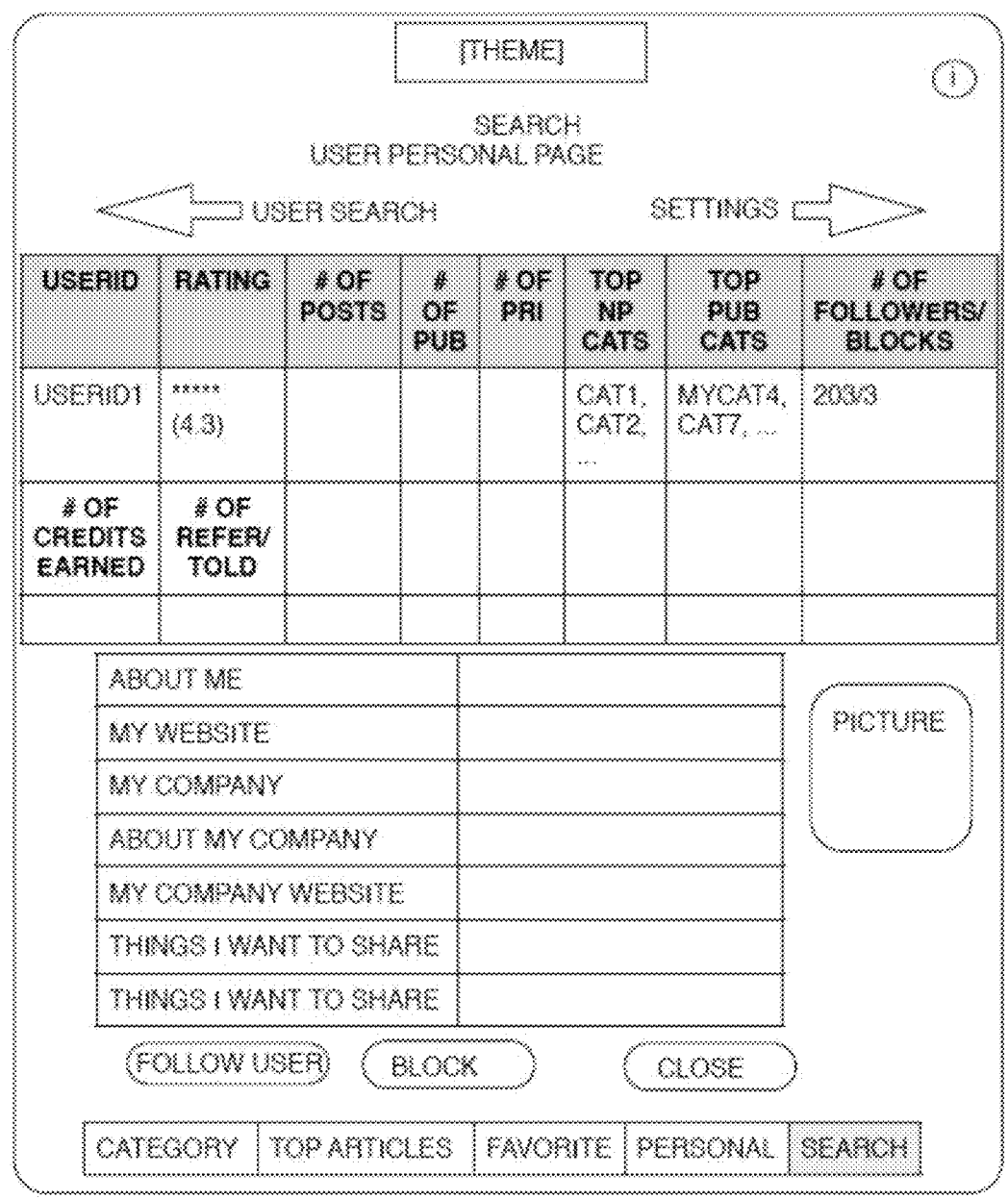
FIG. 54 depicts a conceptual diagram of a screenshot of an example of a user personal page.

When clicked on the USERID, the User Personal Page is displayed with more information about the user. FIG. 54 depicts a conceptual diagram 5400 of a screenshot of an example of a user personal page.

Figure 55:
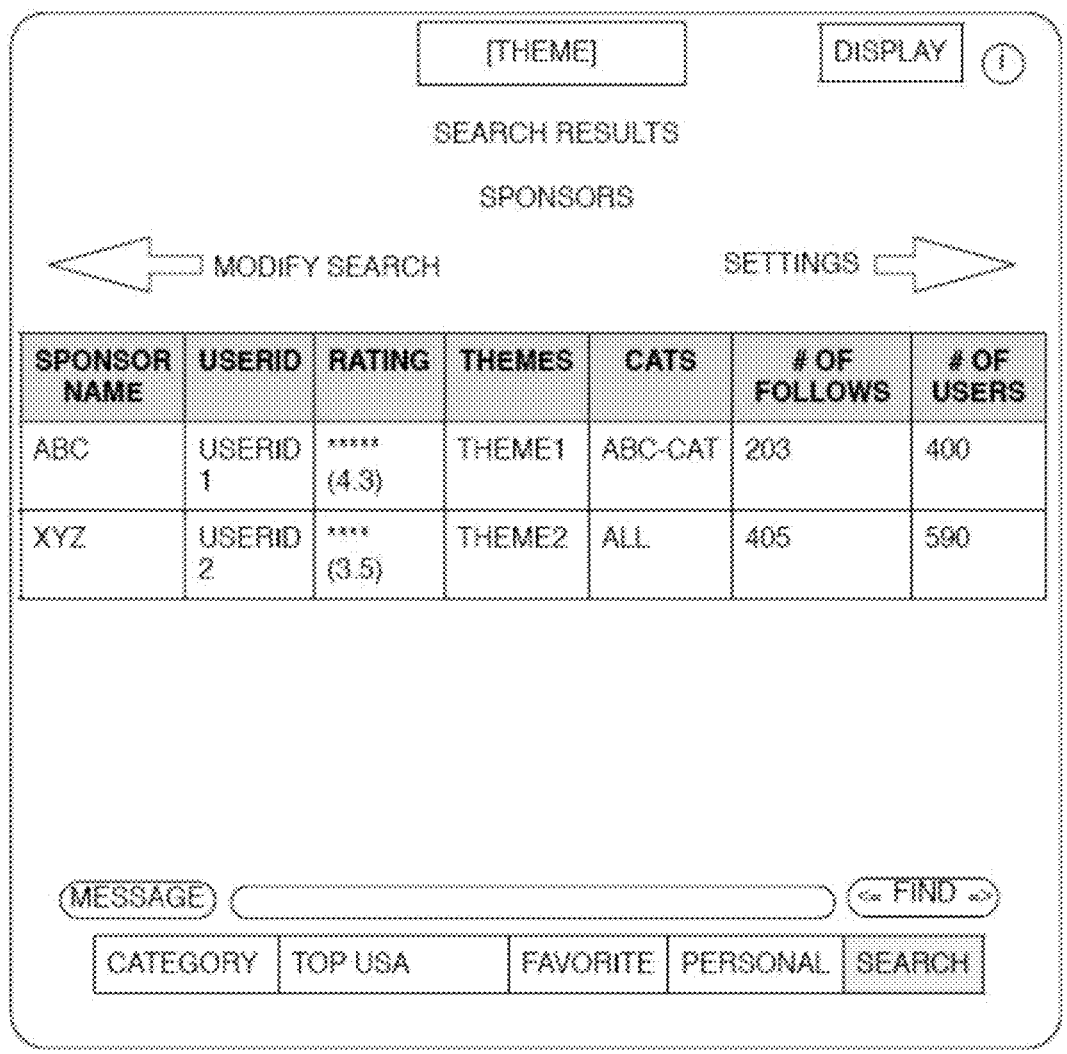
FIG. 55 depicts a conceptual diagram of a screenshot of an example of a sponsors search results page.

In the example of FIG. 27, if it is determined that the search is not for users (2738-N), then the flowchart 2700 continues to module 2742 where a sponsors search results page is displayed. In this example, only three examples of search categories are presented, articles, users, and sponsors. Because at this point it has been determined that the search is not for articles or users, it is assumed that the search is for sponsors. FIG. 55 depicts a conceptual diagram 5500 of a screenshot of an example of a sponsors search results page.

USERID: Any sponsor will be represented by one USERID.
RANKING: For a Theme, ranking indicates the average ranking of all the categories in that theme. For a Category, it represents the ranking for that category. These are basically reflection on the sponsor.
RATING: For a Theme, rating indicates the average rating of all the categories in that theme. For a Category, it represents the rating for that category. These are basically reflection on the sponsor.
THEMES: A sponsor can sponsor one or more Themes and all the categories within a Theme.
CATS: A sponsor can sponsor one or more Categories under a Public Theme.
OF FOLLOWS: Number of followers of a sponsored Theme with all the categories, or in a sponsored single Category in a Public Theme.
OF USERS: Number of users of a sponsored Theme with all the categories, or in a sponsored single Category in a Public Theme.
DS: As a default, all sponsors are included in the list. Meaning, if user accept advertisements, user may receive ads from any of the sponsors. If user do not want to receive any advertisements from a sponsor, user can click on DS for that sponsor.

User can click on SPONSOR NAME or USERID to access the User Page for more information about the sponsor and the user representing the sponsor. Also, user can click on THEME to get more information about the Theme as well.

Figure 56:
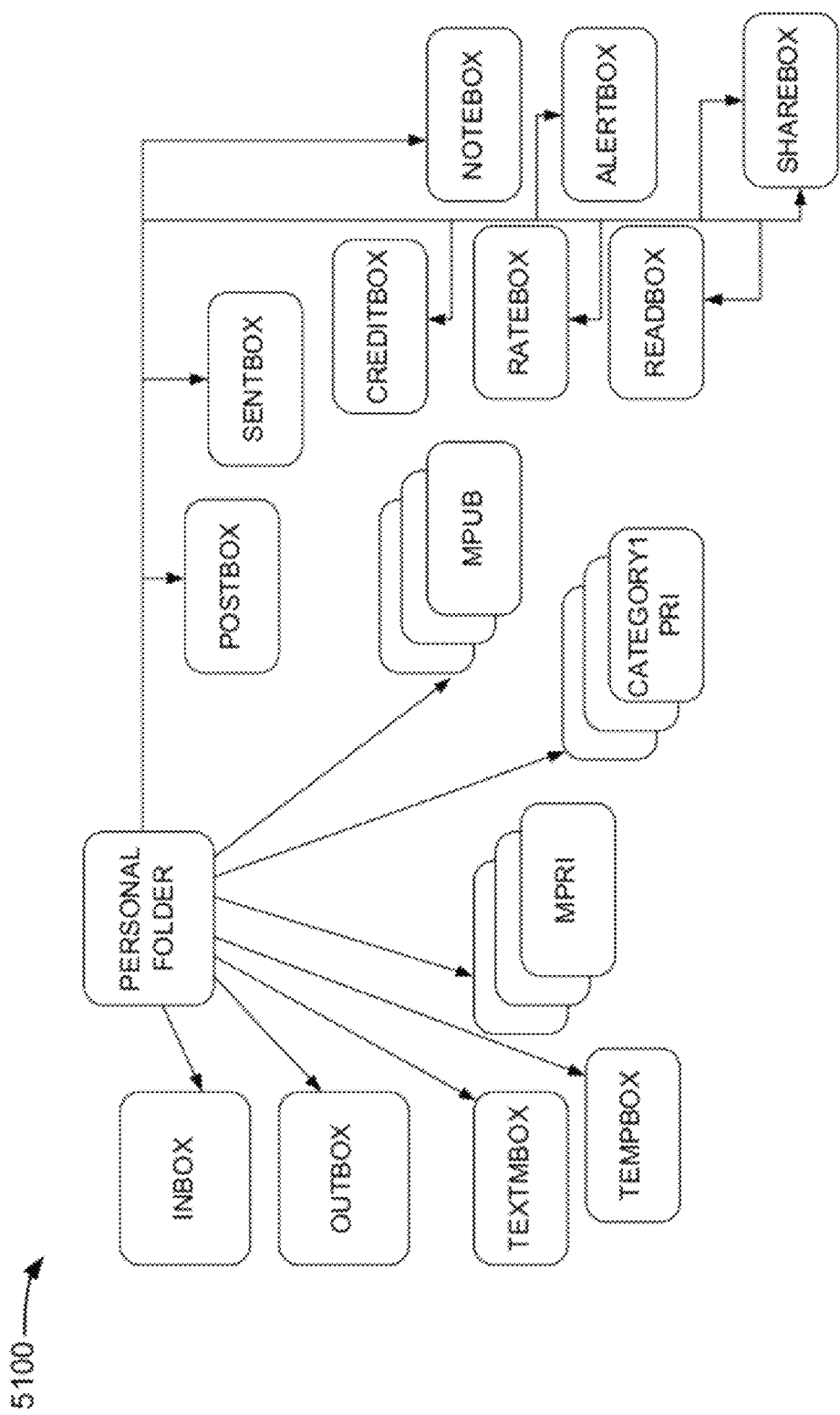
FIG. 56 depicts a conceptual diagram intended to illustrate some examples of personal folder contents, which can include trust folders.

The contents of a trust folder can be considered implementation- and/or configuration-specific. FIG. 56 depicts a conceptual diagram 5600 intended to illustrate some examples of personal folder contents, which can include trust folders. Private messages from other members are stored in INBOX. Private messages to other members are stored in OUTBOX.

Private messages sent to other members are stored in SENT-BOX. Notes are stored in NOTEBOX. Activities (like post, reply, etc.) related to receiving credit for social network activity are stored in CREDITBOX. Settings for alerts are stored in ALERTBOX. Postings, replies and forwards by the member are stored in POSTBOX. Ratings are stored in RATEBOX. Shared content is stored in SHAREBOX. Text messages are stored in TEXTMBOX. Temporary content is stored in TEMPBOX. READBOX can contain URL links to articles or text documents for future reading or reference. MPRI is a category of trust folder. MPUB is a category of trust folder that is open to the public. PRI is private categories to which the member has been invited.

Figure 57:
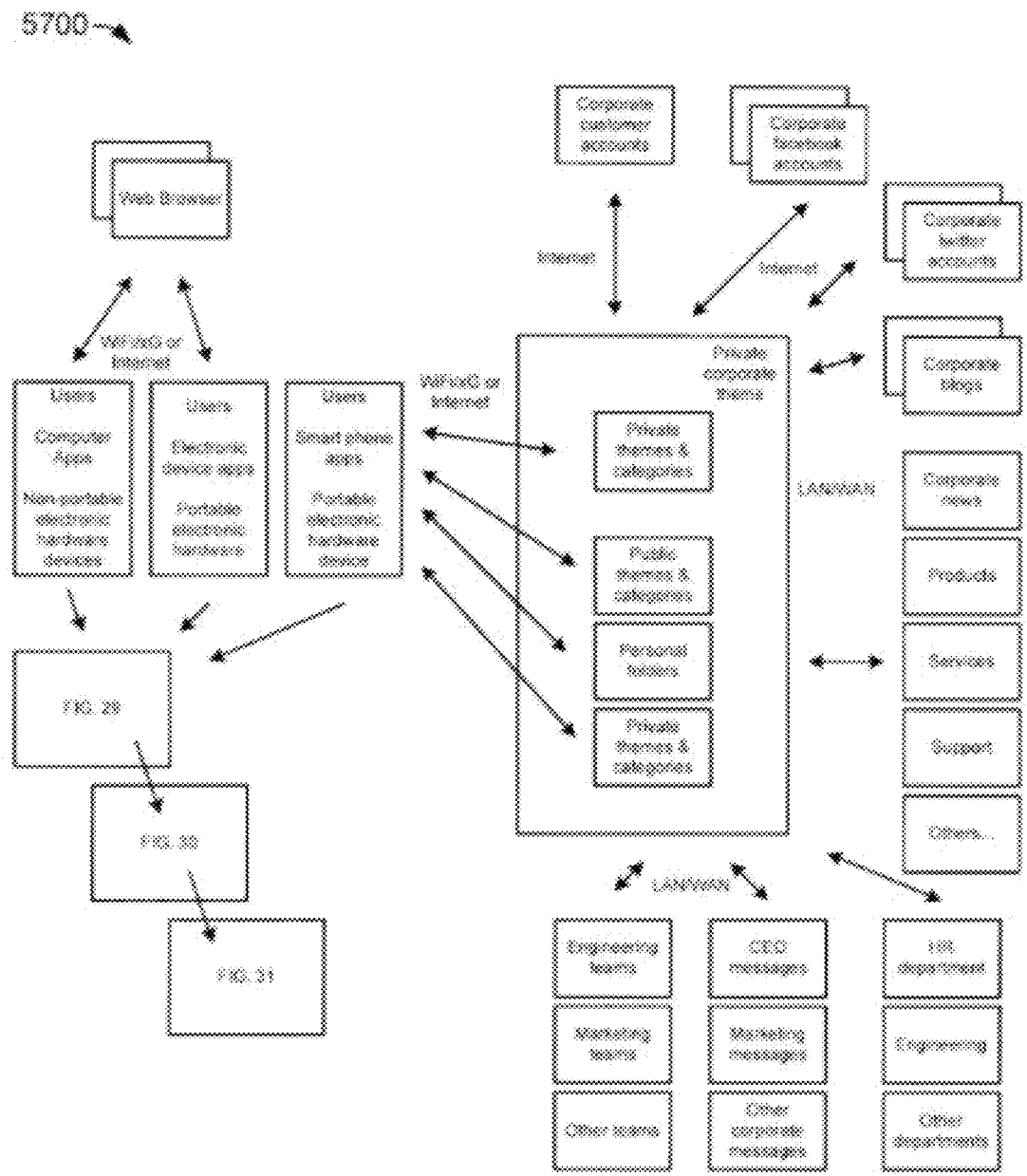
FIG. 57 shows a conceptual diagram intended to illustrate some examples of a system incorporating one or more trusted social networks.

FIG. 57 shows a conceptual diagram 5700 intended to illustrate some examples of a system incorporating one or more trusted social networks. A user can interface with the trusted social network system using a web browser. The web browser can, using a network connection such as WiFi, xG, or the Internet, connect the user to one or more devices.

In the example shown in FIG. 57, the devices can comprise a computer running apps, a electronic device running apps, or a smart phone running apps. Any of the computer, the electronic device, and the smart phone can link the user to a CATEGORIES page. The CATEGORIES page can, in turn link the user to a specific category, shown in FIG. 57 as exemplary CATEGORY1. The CATEGORY1 can link the user to a specific subject page, shown in FIG. 57 as exemplary CATEGORY1: SUBJECT 1.

In the example shown in FIG. 57, a network connection such as WiFi, xG, or the Internet, can connect the users to a Private corporate theme. The Private corporate theme is shown incorporating first "private themes & categories," "public themes & categories," "personal folders," and second "private themes and categories."

In the example shown in FIG. 57, a network connection (shown as the Internet) can connect the Private corporate theme to publicly accessible corporate accounts, such as "corporate customer accounts," and corporate social networks, such as "corporate Facebook accounts," and "corporate Twitter accounts."

In the example shown in FIG. 57, a network connection such as a LAN and/or WAN can connect the Private corporate theme to corporate sources that can be privately accessible. Exemplary corporate sources include: corporate blogs, corporate news, products, services, support, and other corporate sources.

In the example shown in FIG. 57, a network connection such as a LAN and/or WAN can connect the Private corporate theme to corporate departments that can be privately accessible. Exemplary corporate departments include: a human resources (HR) department, engineering, or other departments.

In the example shown in FIG. 57, a network connection such as a LAN and/or WAN can connect the Private corporate theme to corporate teams that can be privately accessible. Exemplary corporate teams include: engineering teams, marketing teams, and other teams.

In the example shown in FIG. 57, a network connection such as a LAN and/or WAN can connect the Private corporate theme to corporate messages that can be privately accessible. Exemplary corporate messages include: CEO messages, marketing messages, and other corporate messages.

Figure 58:
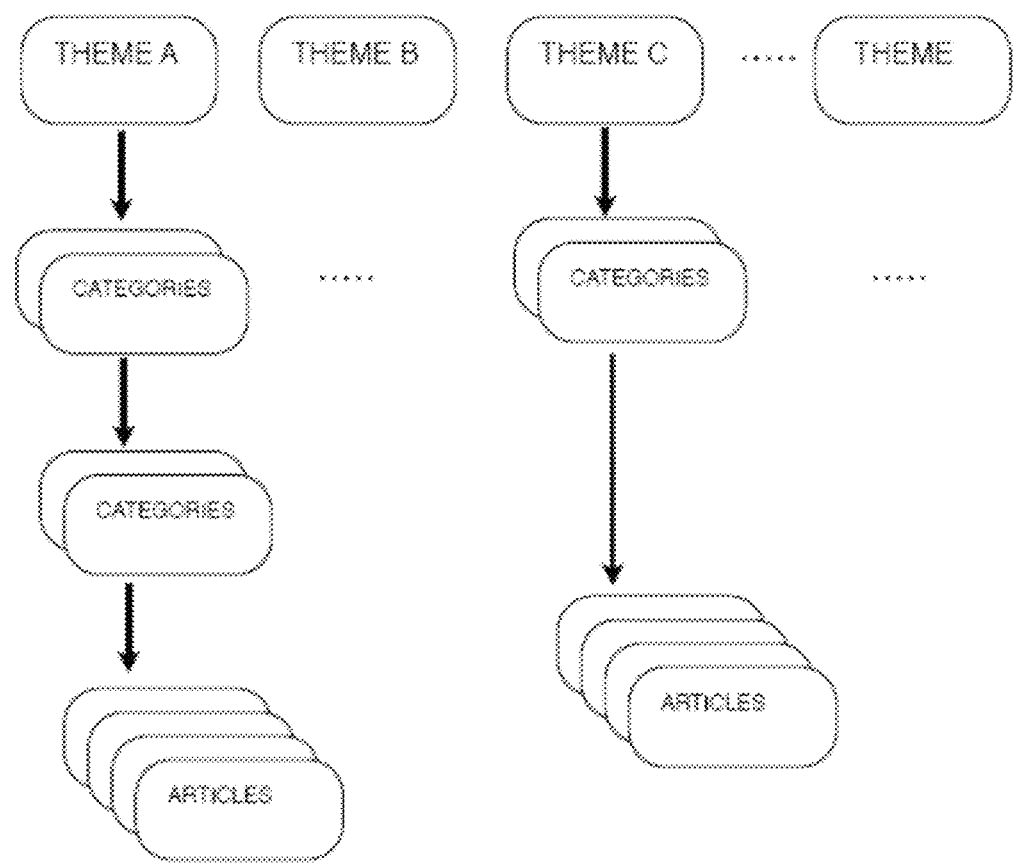
FIG. 58 shows a conceptual diagram of an example of a high level flow diagram of a trusted social network.

FIG. 58 shows a conceptual diagram 5800 of an example of a high level flow diagram of a trusted social network. In the example of FIG. 58, the diagram 5800 can include a first theme, THEME A, a second theme, THEME B, a third theme, THEME C, on to an "xth" theme, THEME X. One or more of the first theme, THEME A, the second theme, THEME B, the third theme, THEME C, and/or the "xth" theme. THEME X, can be connected to categories, which in turn can be connected to more categories and/or articles.

Figure 59:
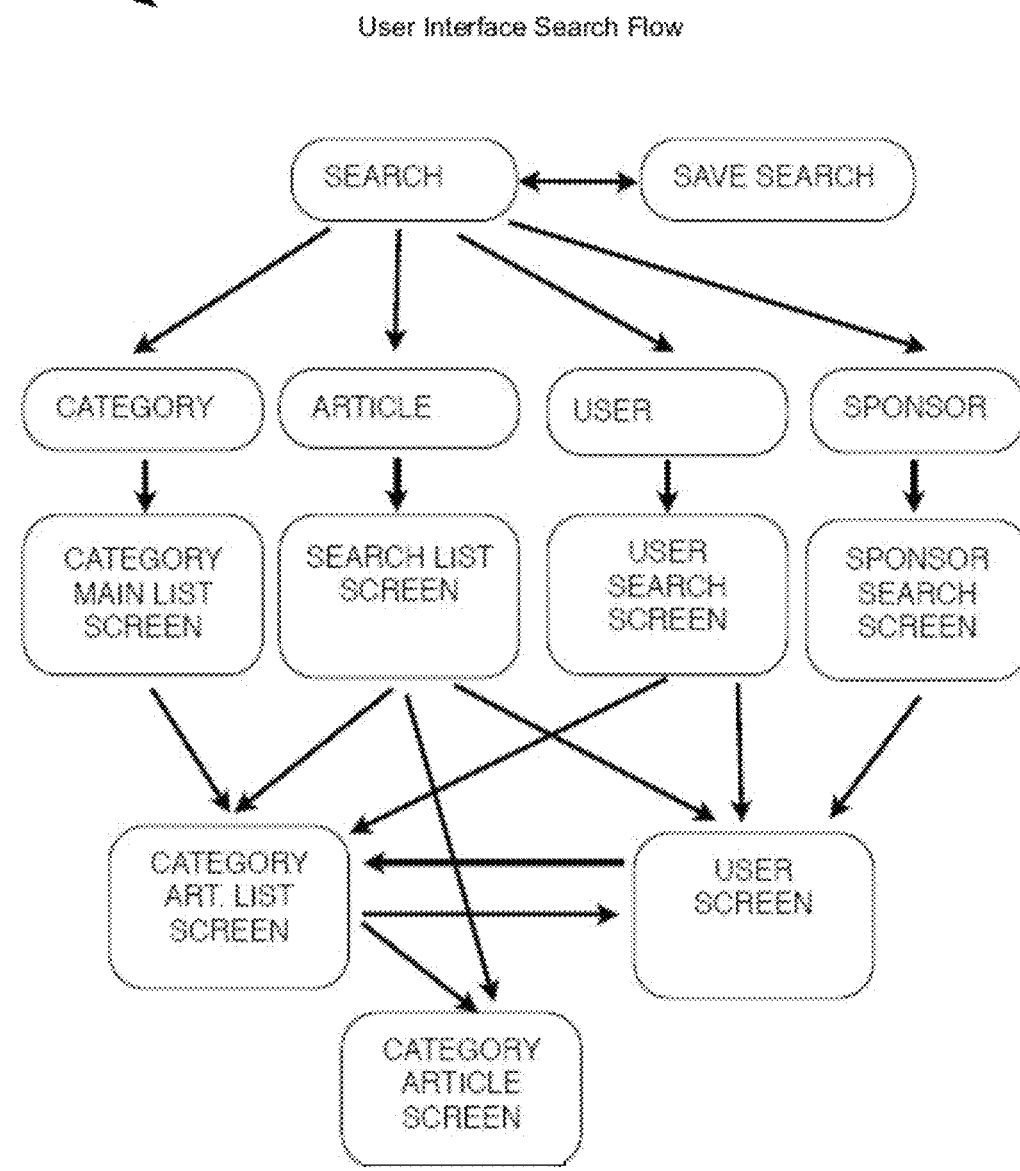
FIG. 59 shows a conceptual diagram of an example of a user interface search flow.

FIG. 59 shows a conceptual diagram 5900 of an example of a user interface search flow. In the example of FIG. 59, the diagram 5900 can include a search, a saved search, a category, an article, a user, a sponsor, a category main list screen, a search list screen, a user search screen, a sponsor search screen, a category article list screen, a user screen, and/or a category article screen. One or more of the elements in the diagram 5900 can be connected to one another.

Figure 60:
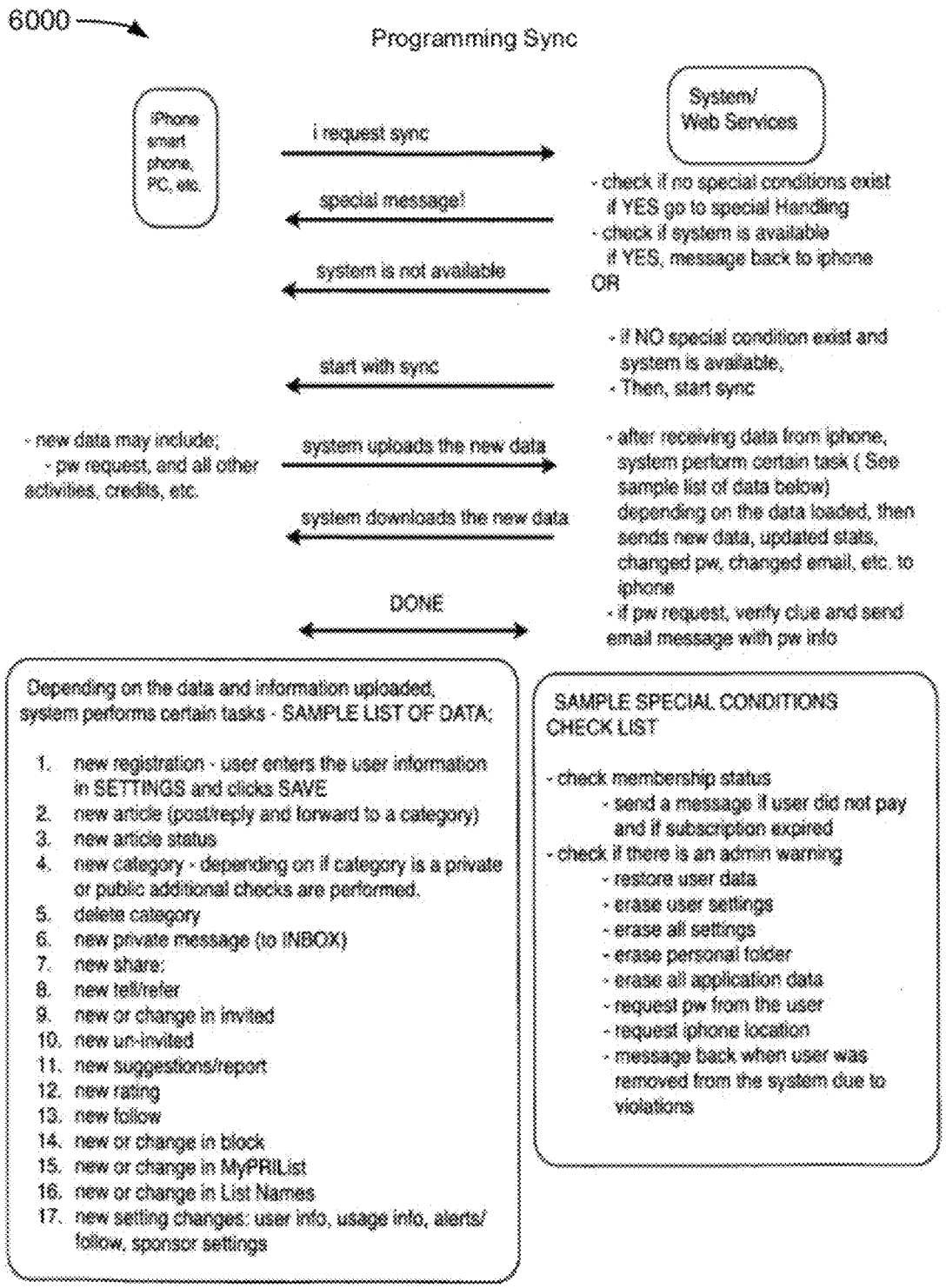
FIG. 60 shows a conceptual diagram of an example of a programming synchronization.

FIG. 60 shows a conceptual diagram 6000 of an example of programming synchronization. In the example of FIG. 60, the diagram 6000 can include a client, such as an iPhone, smart phone, a personal computer (PC), etc. The diagram 6000 can also include system/web services. In the example of FIG. 60, the client, can determine whether new data includes pw requests, and all other activities, credits etc. The client and the system/web services can exchange one or more of: i request sync, special message!, system is not available, start with sync, system uploads the new data, system downloads the new data, and/or whether the sync is DONE. New data to the client can include pw requests, and all other activities, credits, etc. Depending on the data and information uploaded, the system performs certain tasks. In the example of FIG. 60, the system/web services: checks if no special conditions—if YES, would go to special handling and sending a message back to the client; if NO, special conditions exist and the system is available, can start sync. After receiving data from the client, the system can perform certain tasks. If the pw request is received, the system can verify clues and send email messages with the pw information.

Figure 61:
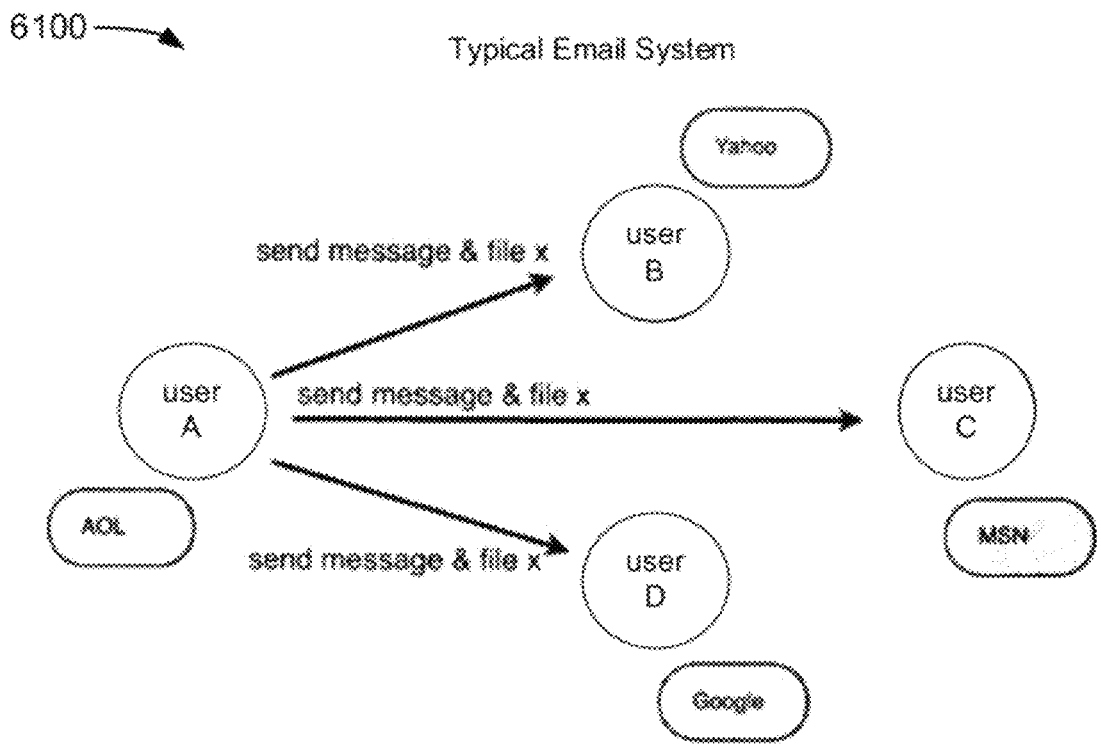
FIG. 61 shows a conceptual diagram of an example of a typical email system.

FIG. 61 shows a conceptual diagram 6100 of an example of a typical email system. In the example of FIG. 61, the diagram 6100 can include one or more of: AOL, User A, User B, User C, and User D. The diagram further shows one or more service providers, such as: America Online (AOL), Google, Yahoo, and/or the Microsoft Network (MSN). In the example of FIG. 61, the user A can send a message and/or a file (labeled "file x") to one or more of User B, User C, and/or User D. FIG. 100 shows the operation of the typical email system of FIG. 6100 in further detail.

Figure 62:
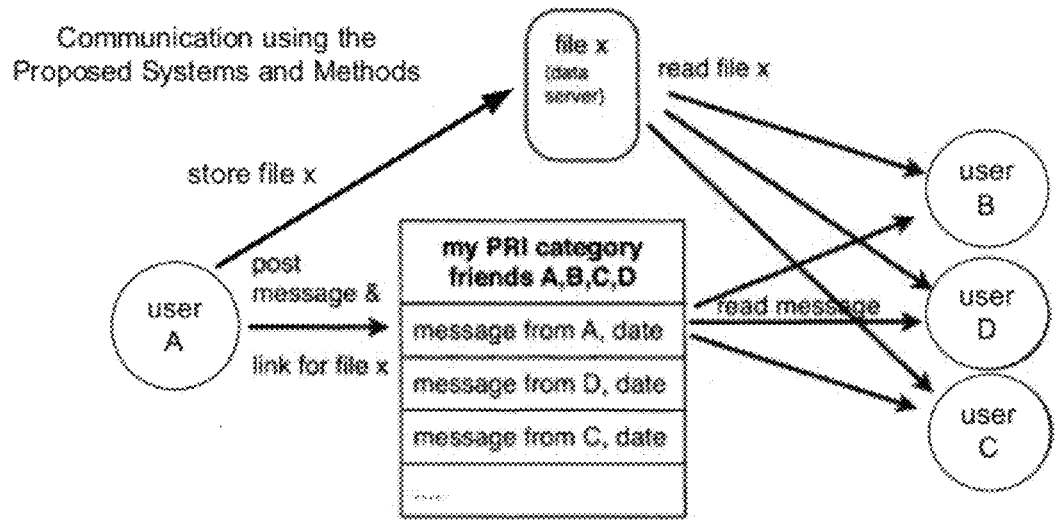
FIG. 62 shows a conceptual diagram of an example of communication using a trusted social network.

FIG. 62 shows a conceptual diagram 6200 of an example of communication using a trusted social network. In the example of FIG. 62, the diagram 6200 shows a user A, a private category (labeled "my PRI category"), a data server, and users B, C, and D. In the example of FIG. 62, the private category my PRI category can include one or more of: a message from User A, a message from User D, and/or a message from User C. In the example of FIG. 62, the User A can: store the file x in the data server, and/or post a message and/or a line for the file x in the private category, my PRI category. The data server can provide read access to the file x to the User B, the User C, and/or the User D. The private category, my PRI category, can also provide read access to the file x to the user B, the User C, and/or the user D. FIG. 101 shows the operation of the elements in the diagram 6200 in greater detail.

Figure 63:
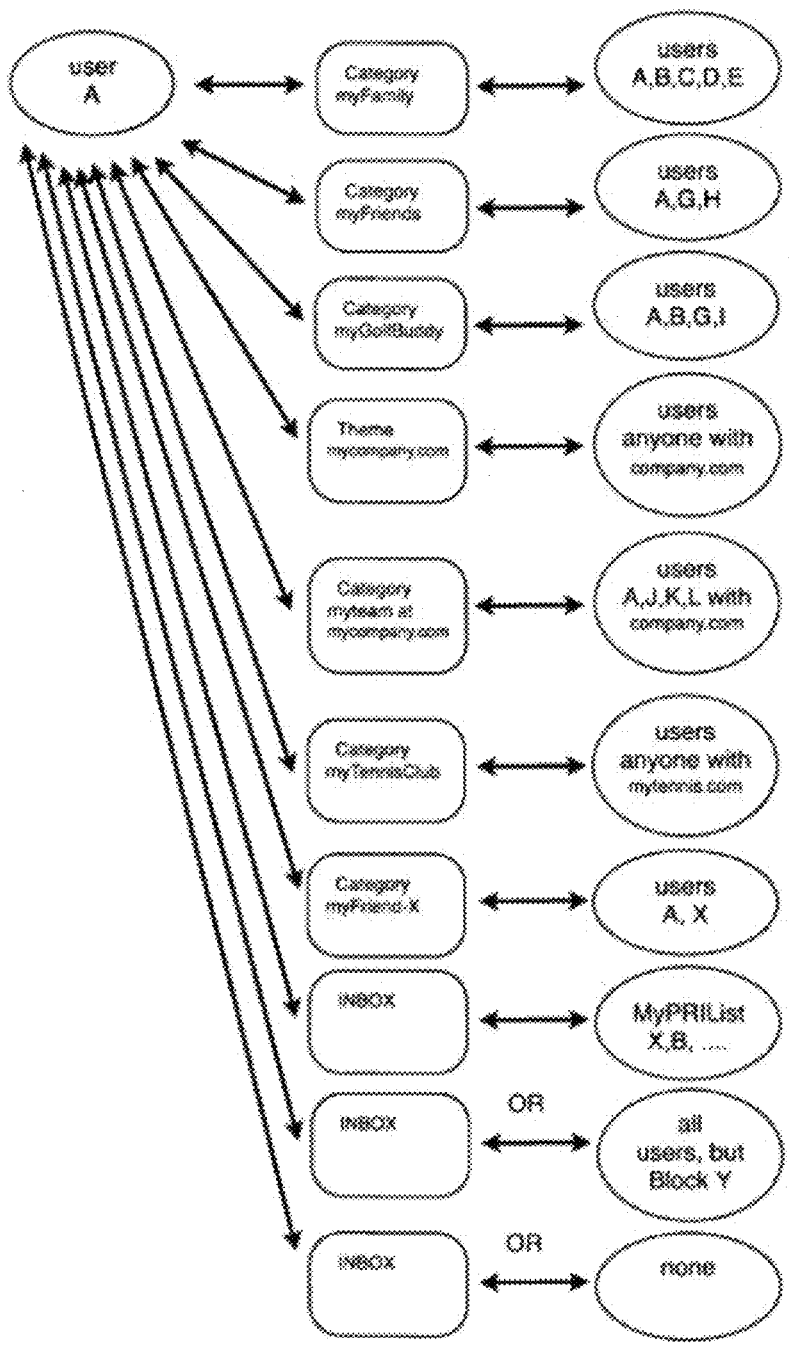
FIG. 63 shows a conceptual diagram of examples of some possible communication using a trusted social network.

FIG. 63 shows a conceptual diagram 6300 of examples of some possible communication using a trusted social network. In the example of FIG. 63, the diagram 6300 includes user A, Categories (shown as "myFamily," "myFriends," "myGolf-Buddy," "myteam at mycompany.com," "MyTennisClub," and "myFriend-x." The diagram 6300 also includes a theme, mycompany.com, and Inboxes (shown as three INBOXes).

The category myFamily connects the User A to users A, B, C, D, and E. The category myFriends connects the User A to users A, G, and H. The category myGolfBuddy connects the User A to users A, B, G, and I. The category myteam connects the User A to users A, J, K, and L at company.com. The category myTennisClub connects the User A to any of the users at mytennis.com. The category myFriend-X connects the User A to users A and X. The theme mycompany.com connects the User A to any of the users at company.com. The first INBOX connects the User A to users in the User A's private list, MyPRIList, User X, User B, and so on. The second INBOX connects the User A to all users but blocks User Y. The third INBOX connects the User A to no other users. FIG. 102 shows the operation of the elements in the diagram 6300 in greater detail.

Figure 64:
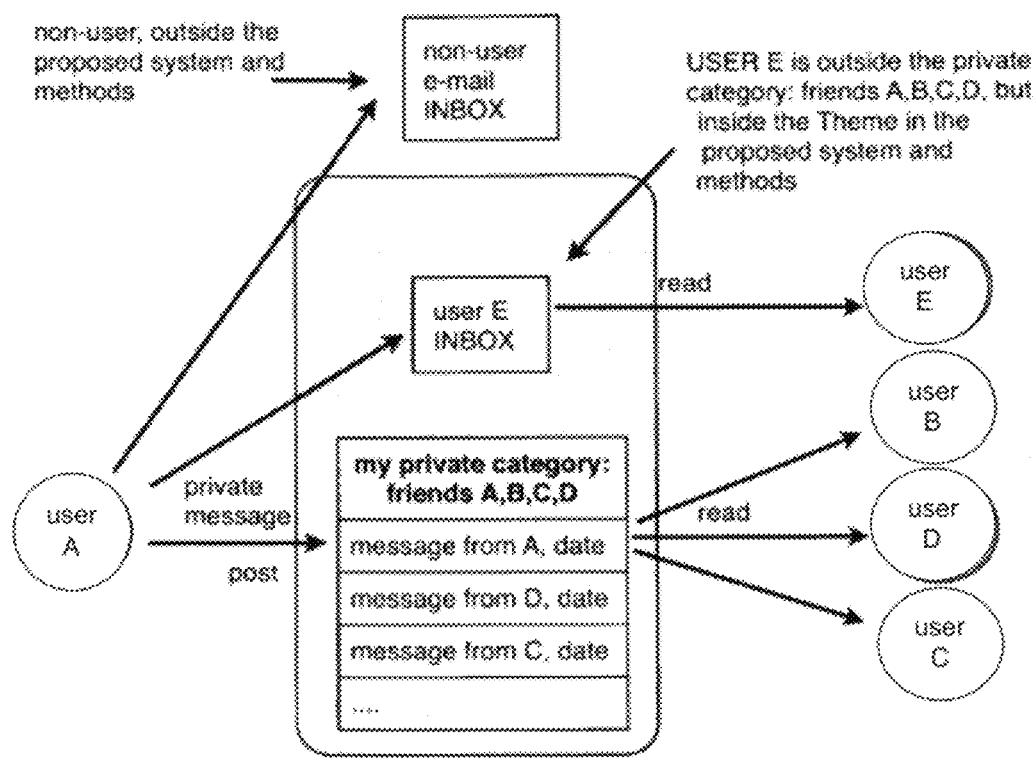
FIG. 64 shows a conceptual diagram of an example of posting/sending content using a trusted social network.

FIG. 64 shows a conceptual diagram 6400 of an example of posting/sending content using a trusted social network. In the example of FIG. 64, the diagram 6400 shows Users A-E, a non user inbox (labeled non-user e-mail INBOX), and a user inbox (including the label user E INBOX and a private category, labeled my private category: friends A, B, C, D). In the example of FIG. 64, the user A can send non-user messages to the non-user e-mail INBOX. The User A can also send a private message to the user E INBOX, and can send private, messages and/or posts to the my private category. The private messages and/or posts can go to the Users B-E. A non-user, outside the trusted social network can also access the non-user e-mail INBOX. FIG. 103 shows the operation of the elements in the diagram 6400 in greater detail.

Figure 65:
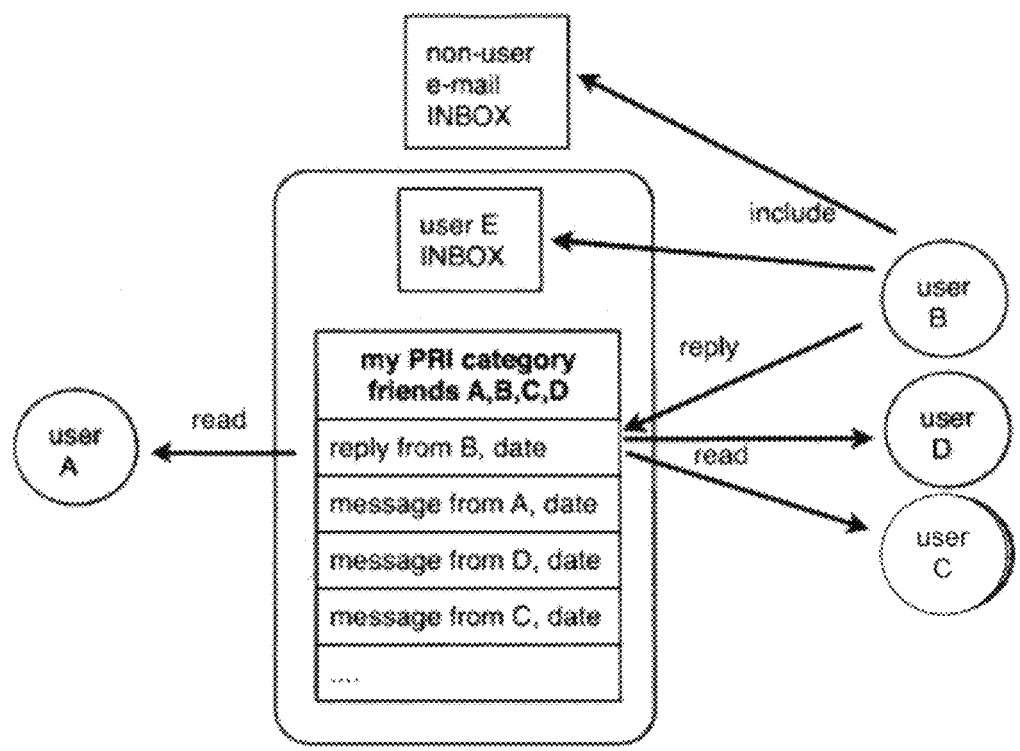
FIG. 65 shows a conceptual diagram of an example of using a trusted social network.

FIG. 65 shows a conceptual diagram 6500 of an example of using a trusted social network. In the example of FIG. 65, the diagram 6500 shows a user A, a user B, a user C, a user D, a non-user email INBOX, and a user inbox, (including the label user E INBOX and a private category, labeled my PRI category friends A, B, C, D. The private category my PRI category can include a reply from User B, a message from User A, a message from User D, and a message from User C. In the example of FIG. 64, the diagram 6500 shows the user B sending messages to the non-user e-mail INBOX and to the user E INBOX. The User B can also send a reply to the User A through the private categories, my PRI: category. The Users C and D can also read the User B's reply. FIG. 104 shows the operation of the elements the diagram 6500 in greater detail.

Figure 66:
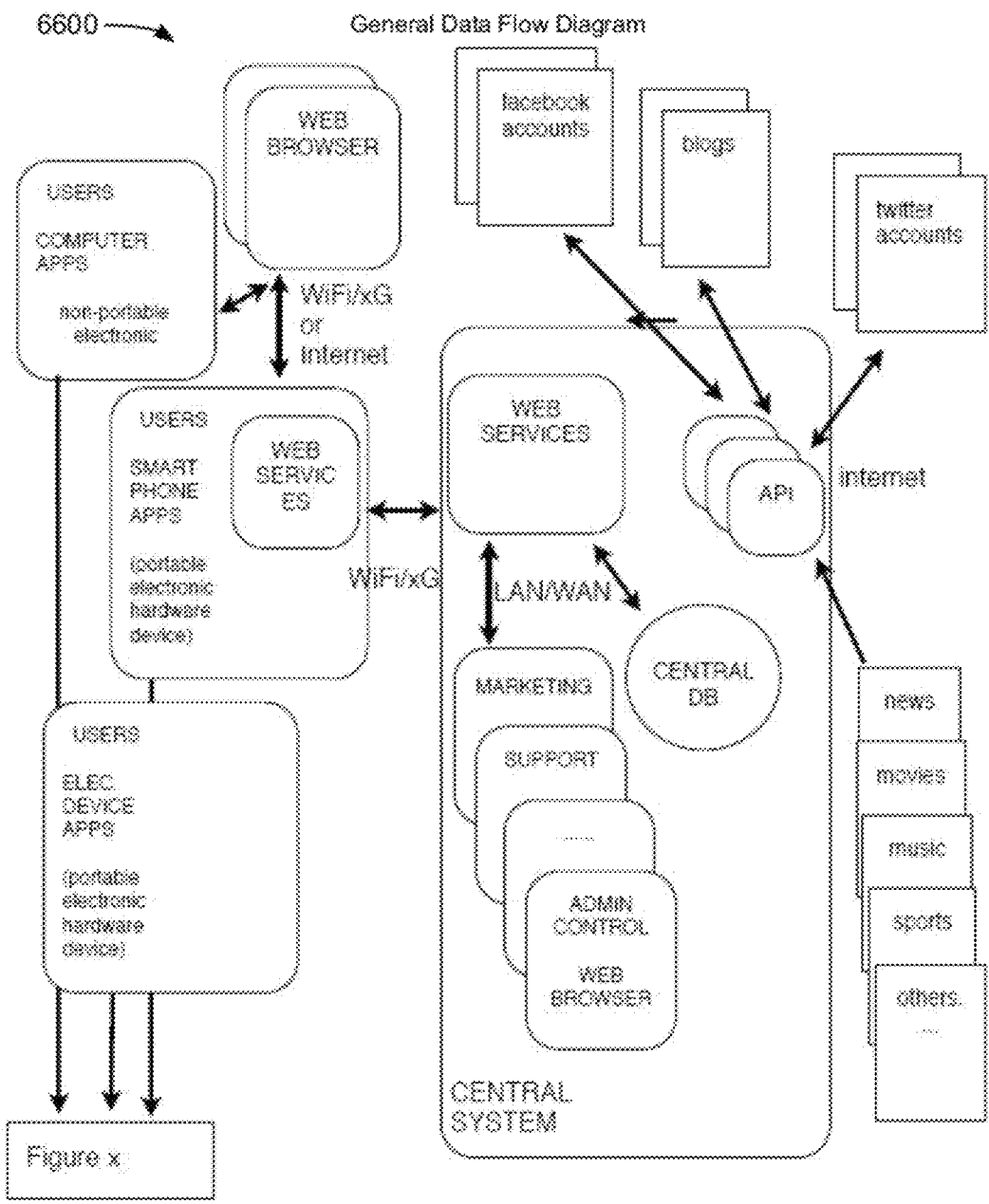
FIG. 66 shows an example of a general data flow diagram using a trusted social network.

FIG. 66 shows an example of a general data flow diagram 6600 using a trusted social network. In the example of FIG. 66, the general data flow diagram 6600 can include: a web browser, users with computer applications, users, a central system (having web services, APIs, central databases, and marketing, support, other things, and administrative control. The general data flow diagram 6600 can also include facebook accounts, blogs, twitter accounts, content, and the note.

Figure 67:
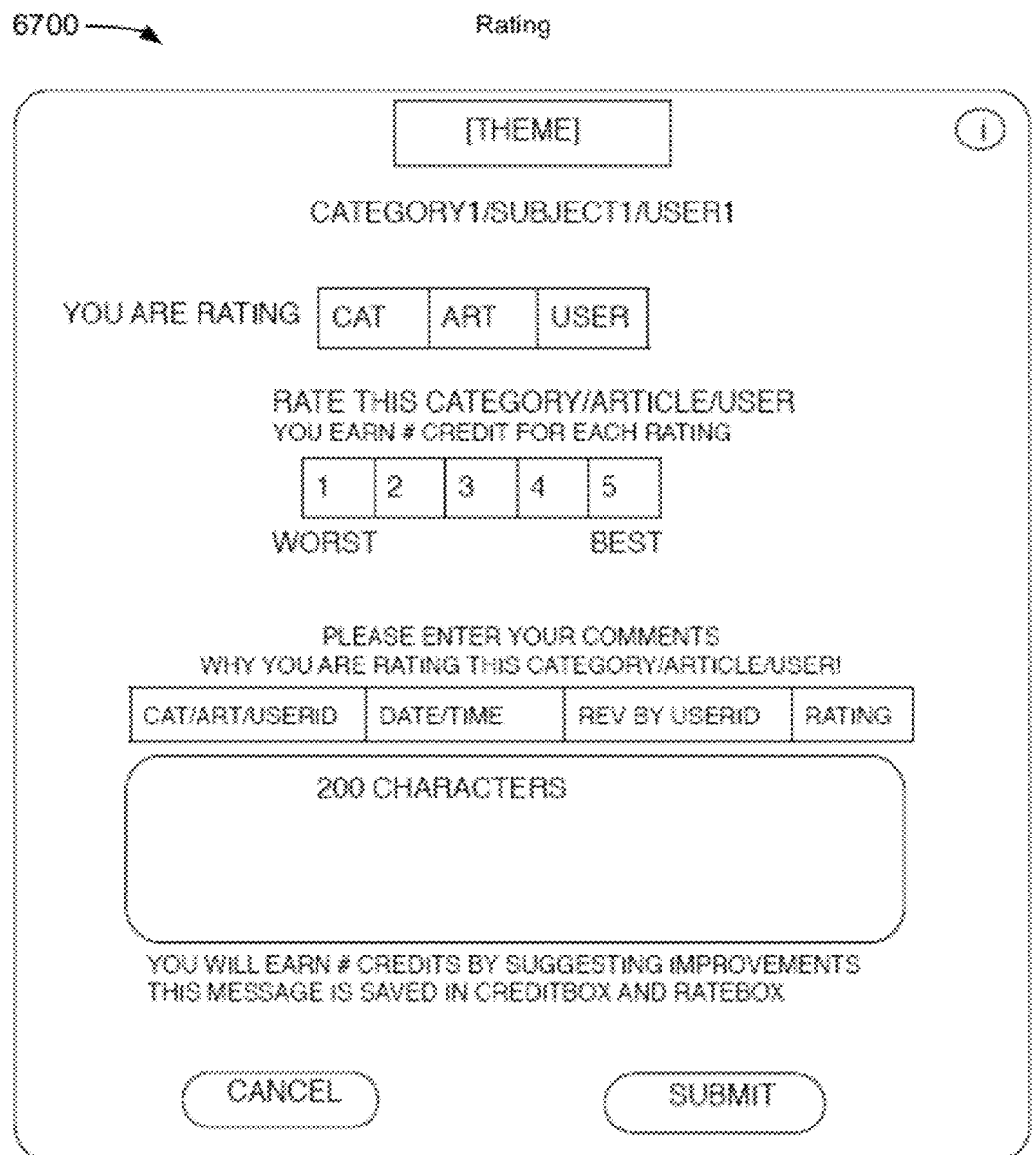
FIG. 67 shows an example of a rating screen using a trusted social network.

FIG. 67 shows an example of a rating screen 6700 of a trusted social network. In the example of FIG. 67, the rating screen 6700 can include a rated item (CAT, ART<USER); a rating amount (of 1-5), and comments.

Figure 68A:
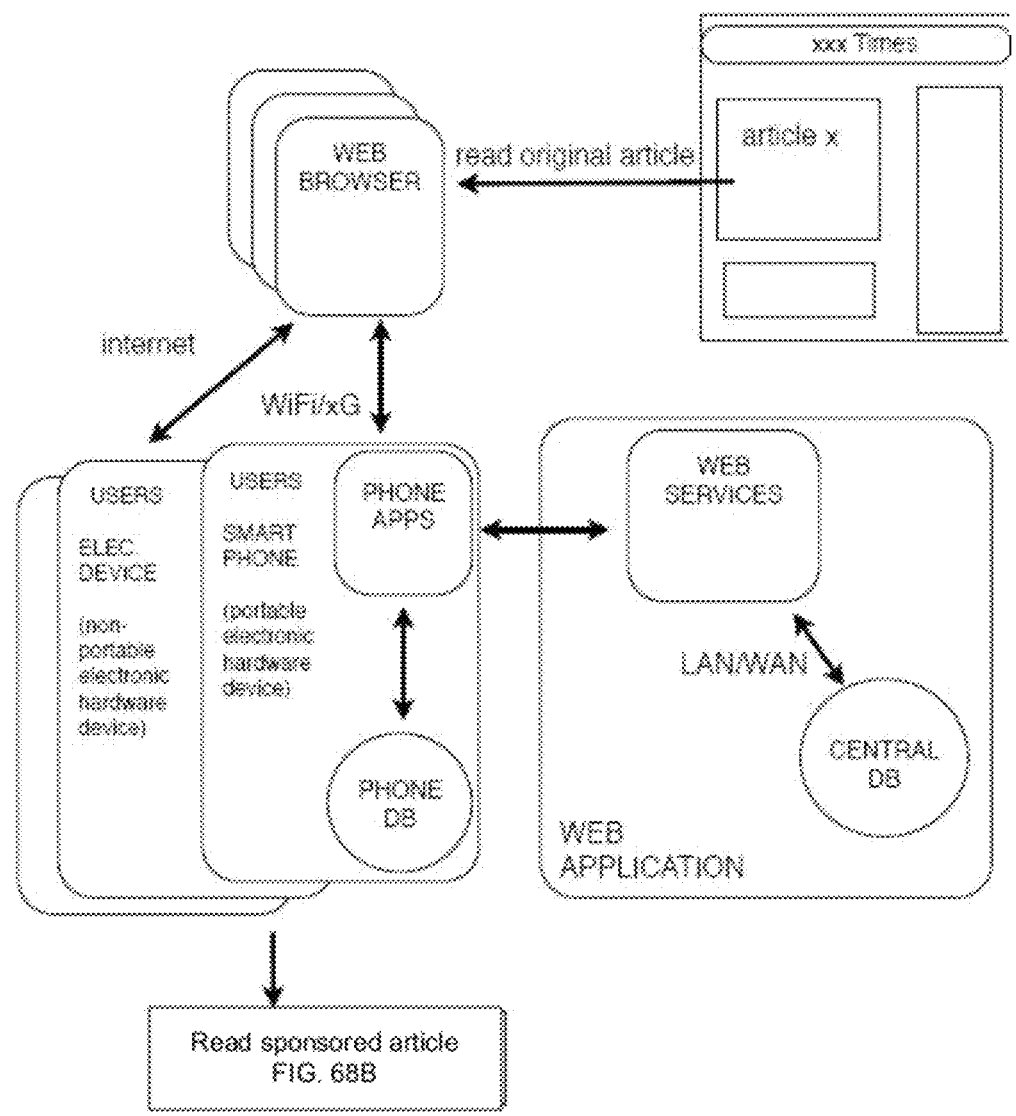
FIG. 68A shows an example of a conceptual diagram of a sponsor flow of a trusted social network.
Figure 68B:
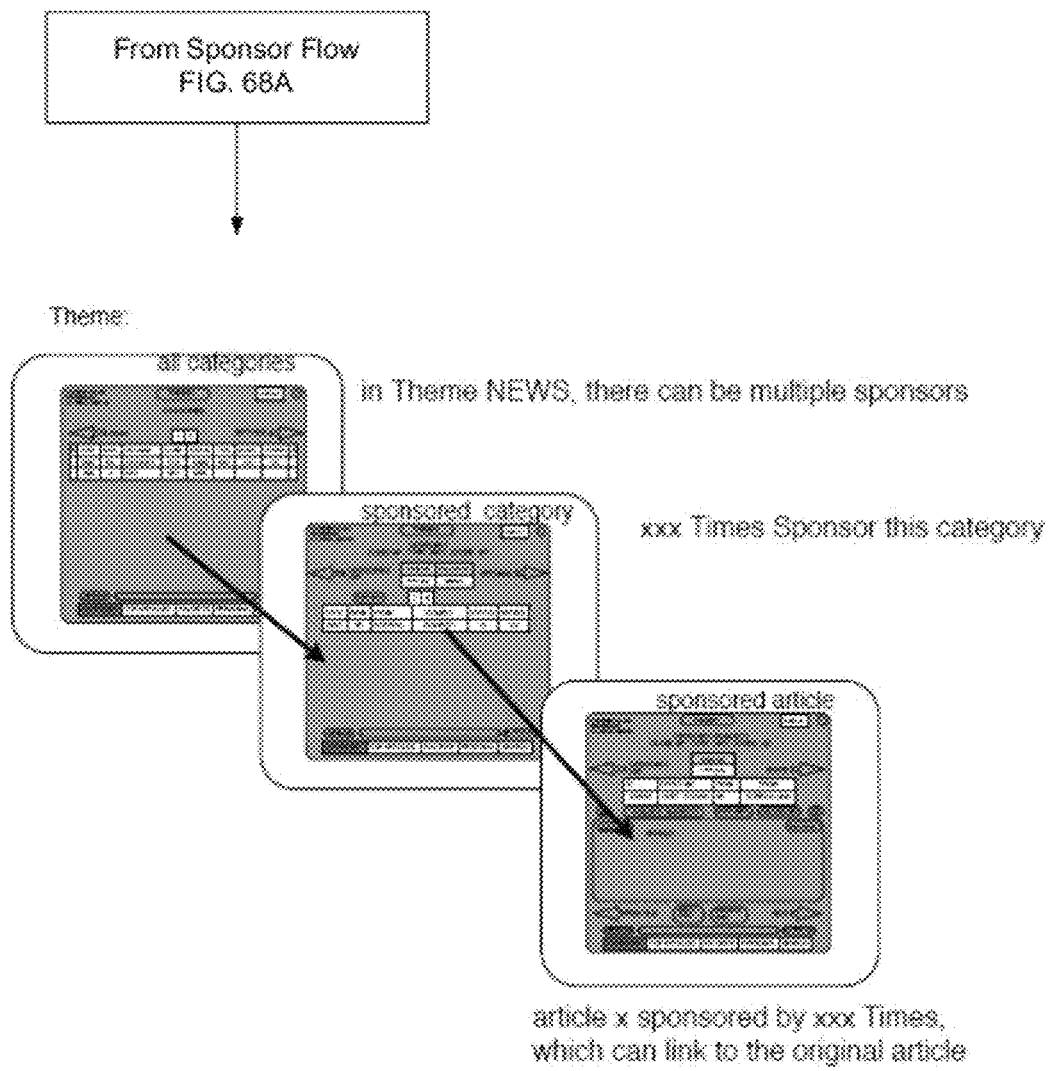
FIG. 68B shows an example of sponsored content.

FIG. 68A shows an example of a conceptual diagram of a sponsor flow 6800A of a trusted social network. In the example of FIG. 68A, the sponsor flow 6800A can include passing an article x to a web browser, which in turn is passed to users, who can read the article. The article in the sponsor flow 6800A is sponsored by xxx Times, as can be seen by FIG. 68B, which shows an example of sponsored content 6800B.

Figure 69A:
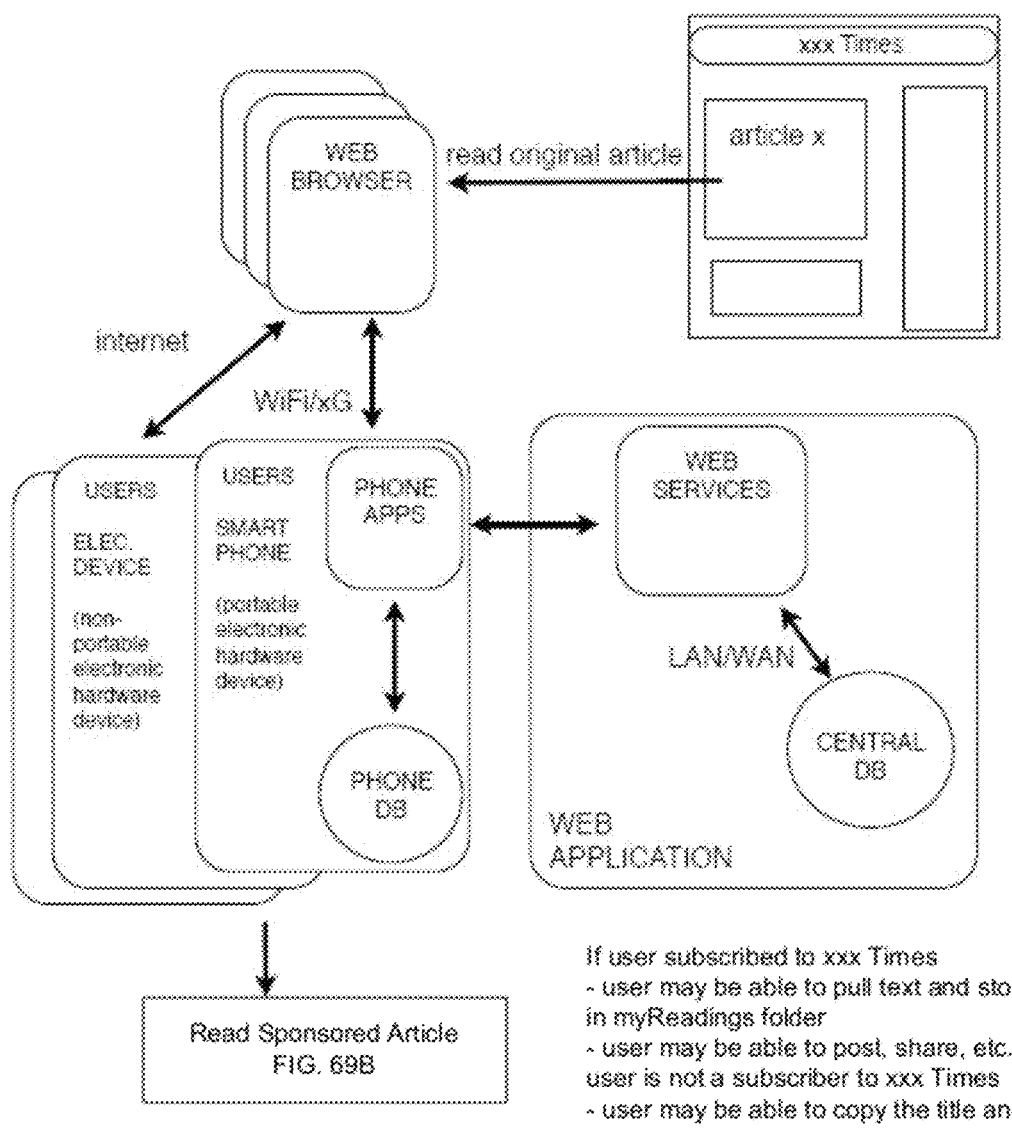
FIG. 69A shows an example of a conceptual diagram of a sponsor flow of a trusted social network.
Figure 69B:
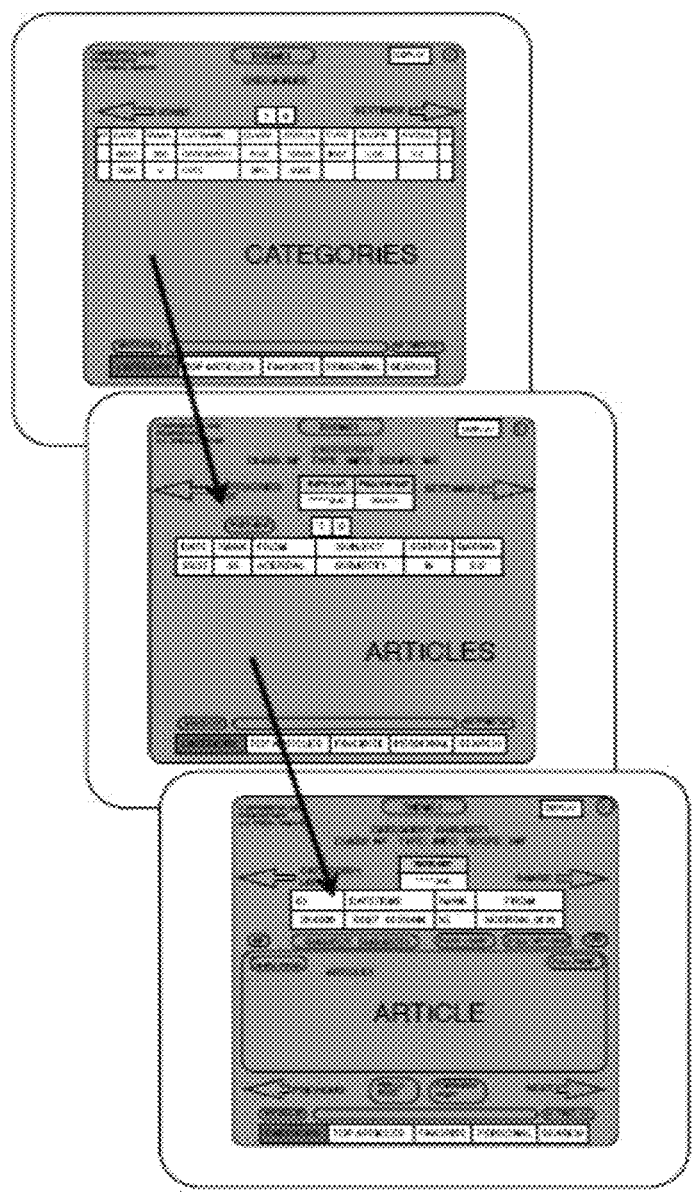
FIG. 69B shows an example of sponsored content.

FIG. 69A shows an example of a conceptual diagram of a sponsor flow 6900A of a trusted social network. In the example of FIG. 69A, the sponsor flow 6900A can include passing an article x to a web browser, which in turn is passed to users, who can read the article. The article in the sponsor flow 6900A is sponsored by xxx Times, as can be seen by FIG. 69B, which shows an example of sponsored content 6900B.

Figure 70:
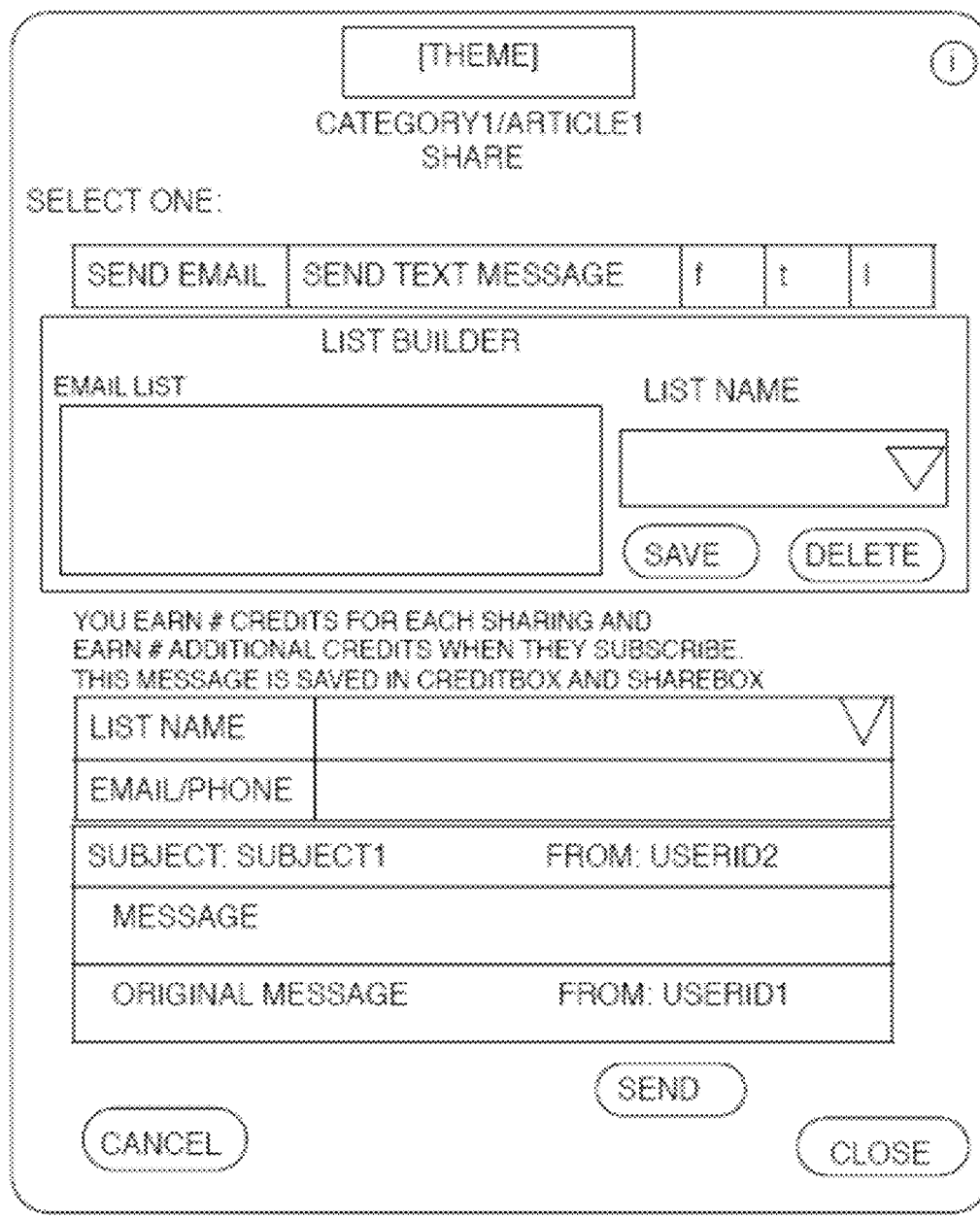
FIG. 70 shows an example of a sharing screen of a trusted social network.

FIG. 70 shows an example of a sharing screen 7000 of a trusted social network. In the example of FIG. 70, the sharing screen 7000 includes a destination (here an email or a text message), a list builder, and additional message parameters.

Figure 71:
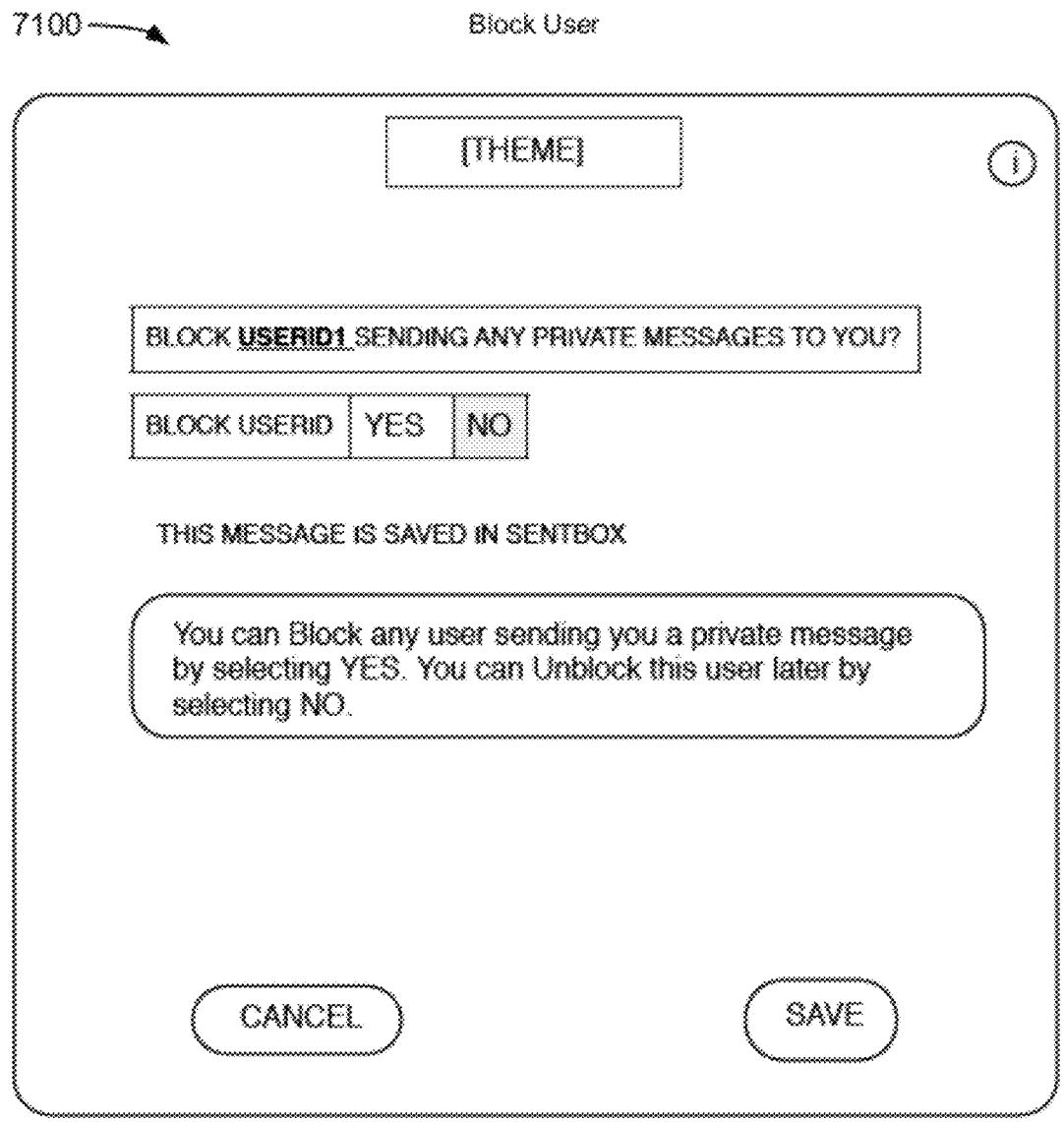
FIG. 71 shows an example of a block user screen of a trusted social network

FIG. 71 shows an example of a block user screen 7100 of a trusted social network. In the example of FIG. 71, the block user screen 7100 can include one or more ways to block any user sending a particular user a private message. As shown in the notice on the middle of the screen, the blocking can be undone.

Figure 72:
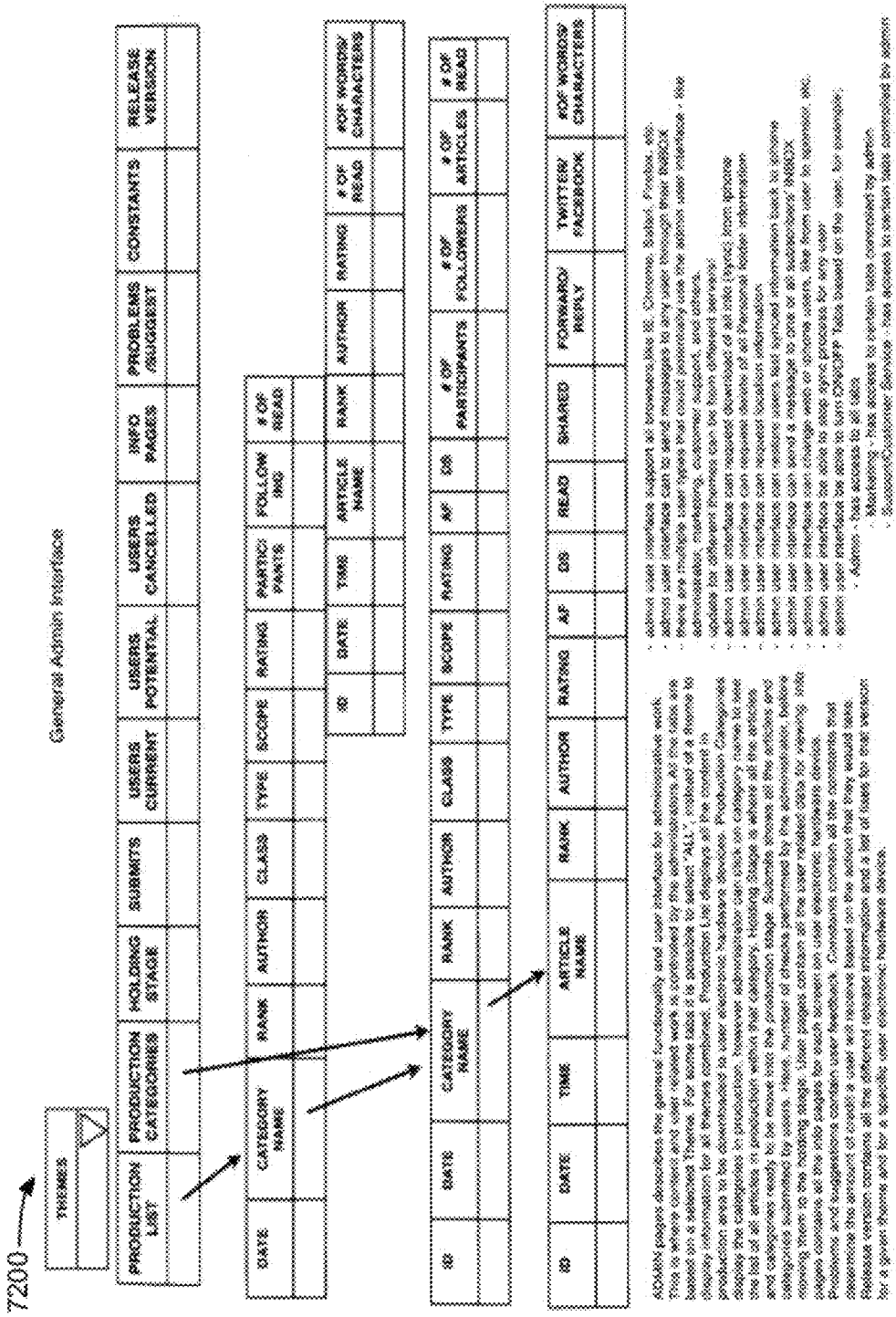
FIG. 72 shows an example of a general administrative interface of a trusted social network.
Figure 73:
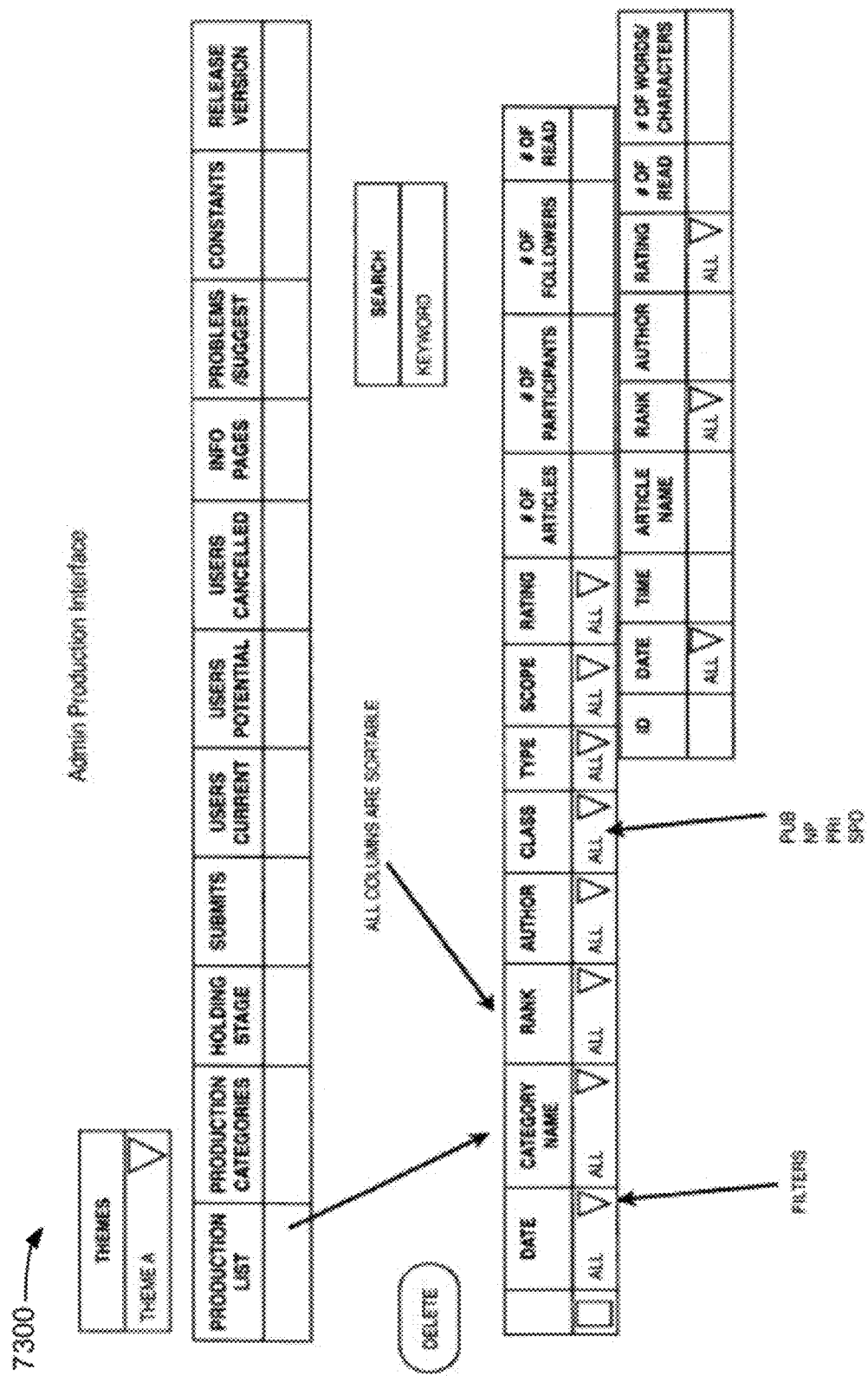
FIG. 73 shows an example of an administrative production interface of a trusted social network.
Figure 74:
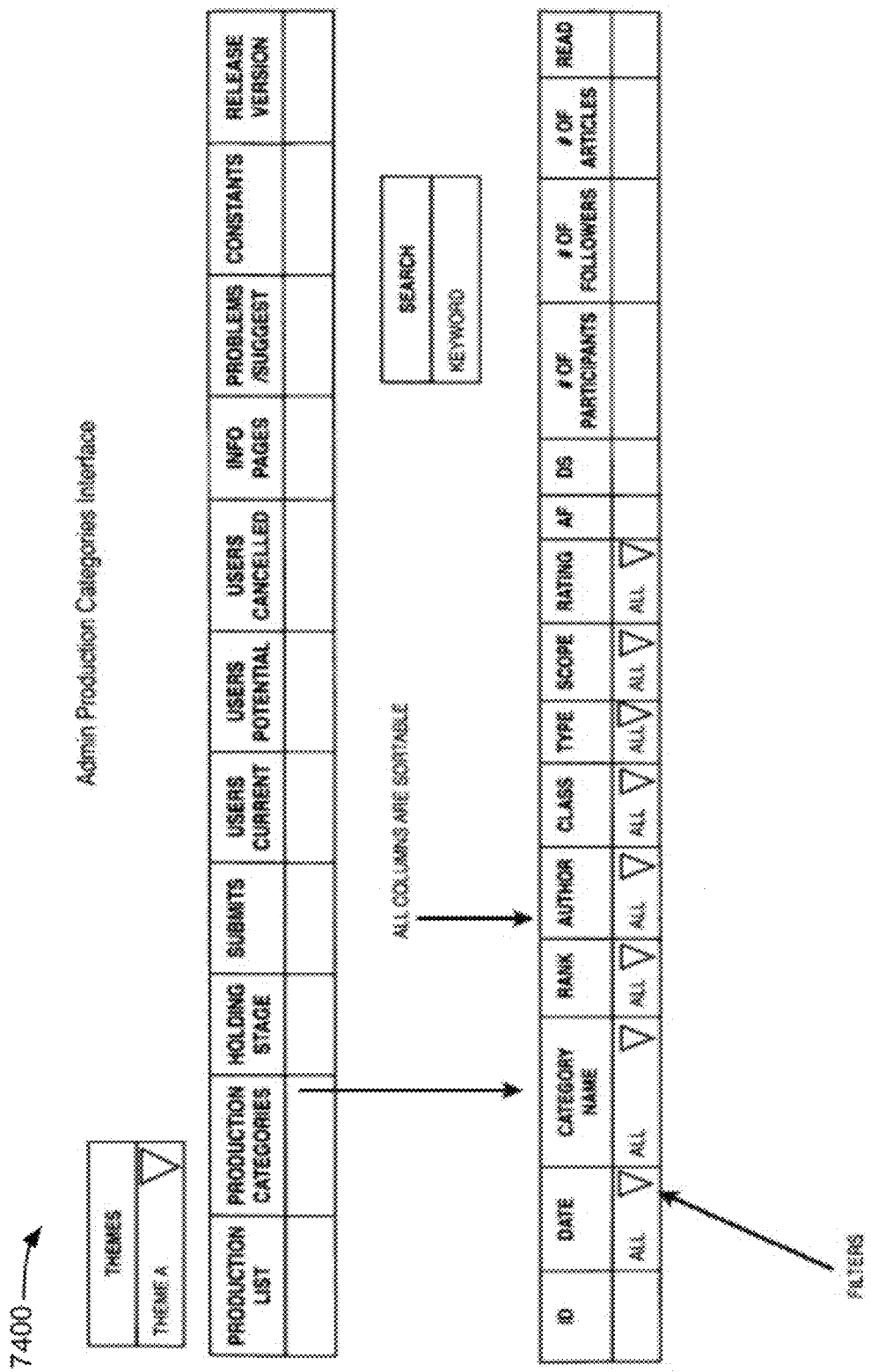
FIG. 74 shows an example of an administrative production categories interface of a trusted social network.
Figure 75:
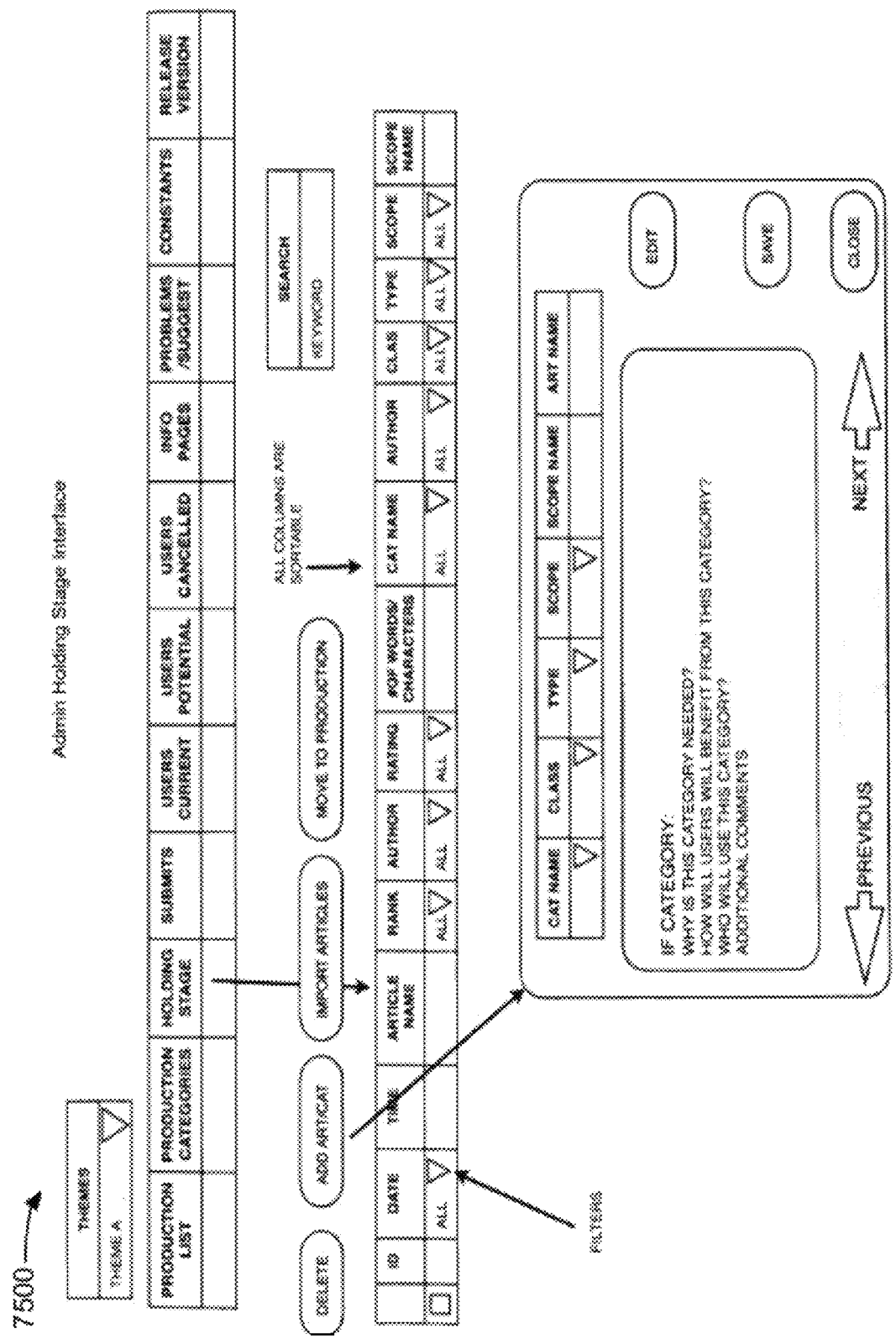
FIG. 75 shows an example of an administrative holding stage interface of a trusted social network.
Figure 76:
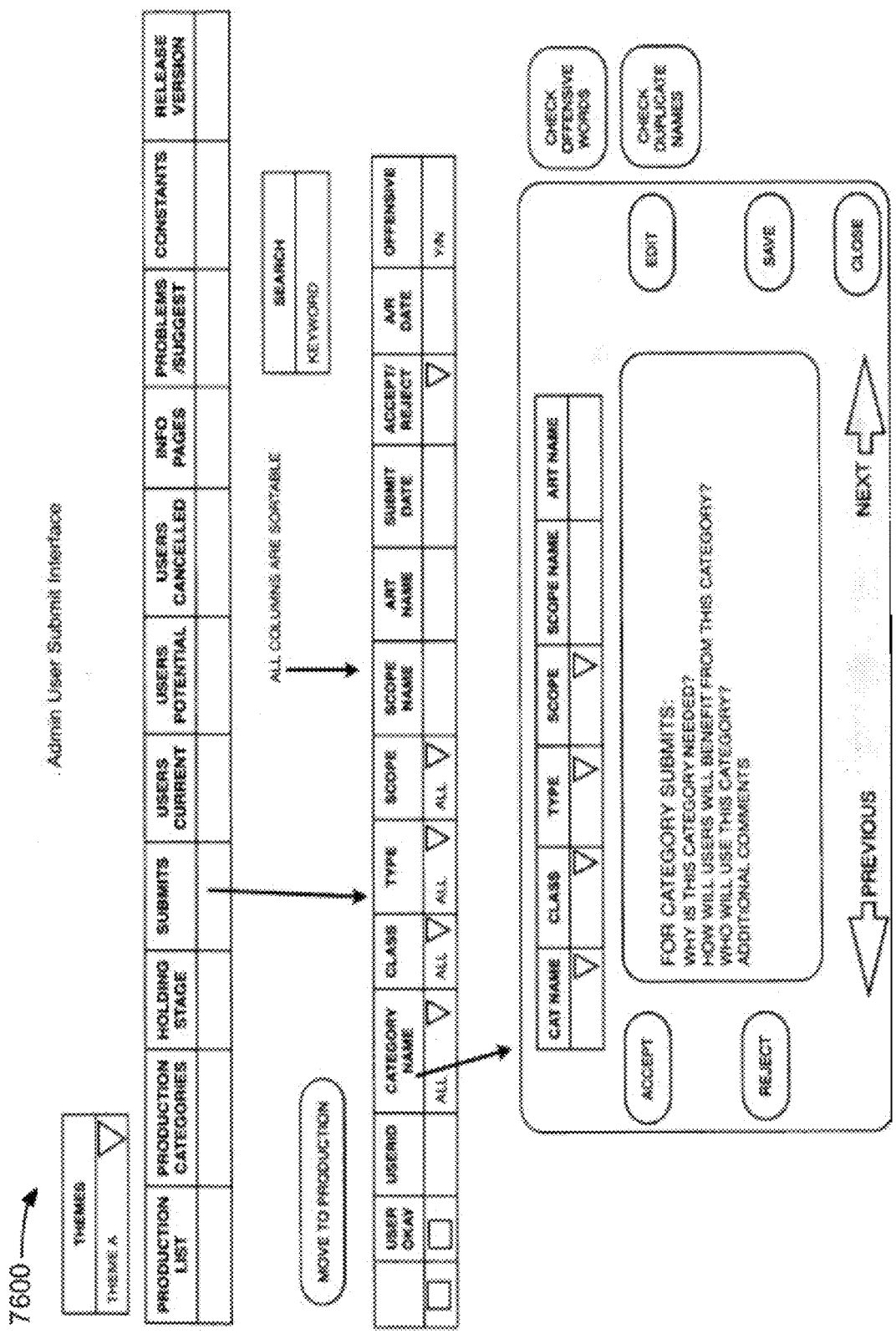
FIG. 76 shows an example of an administrative user submit interface of a trusted social network.
Figure 77:
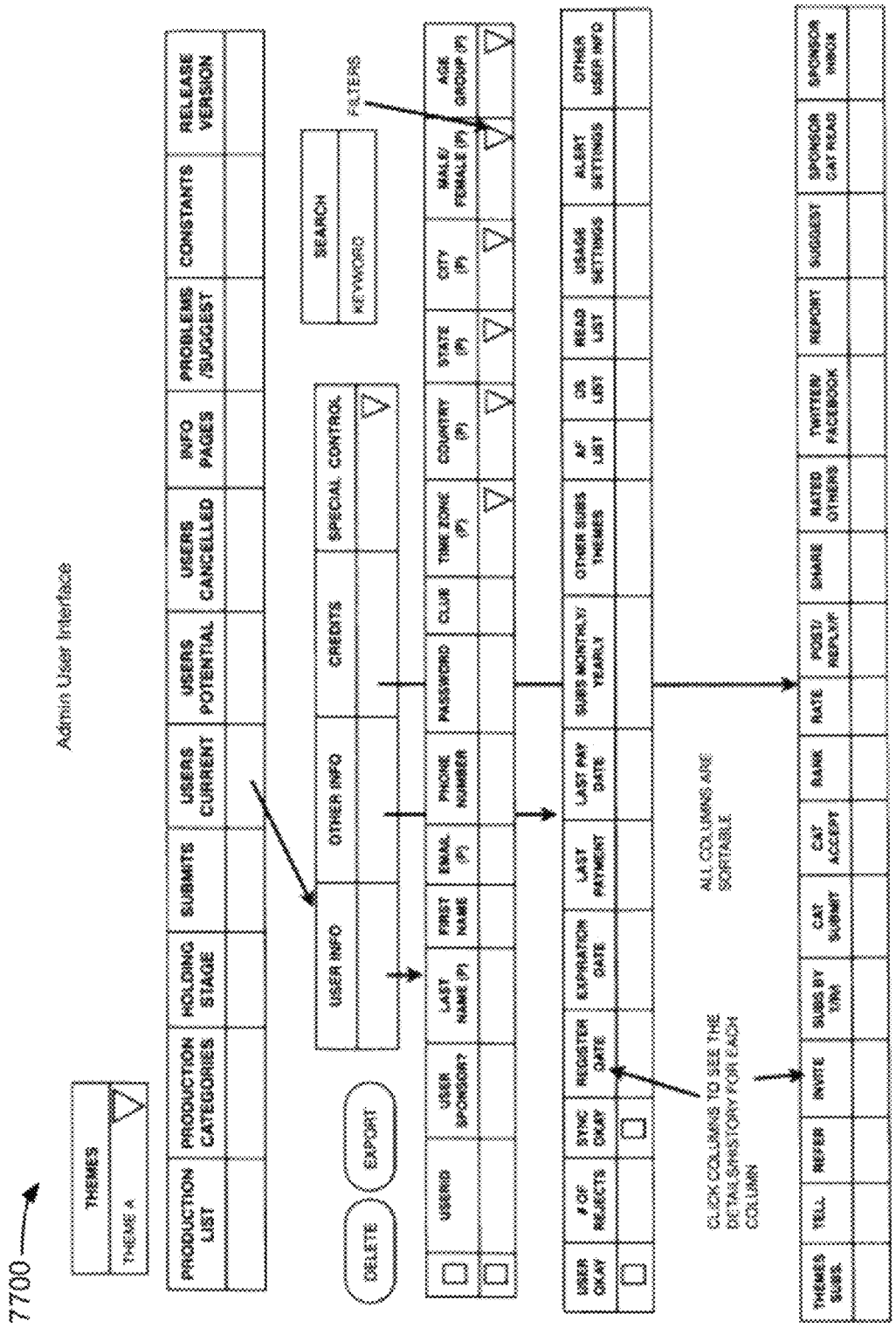
FIG. 77 shows an example of an administrative user interface of a trusted social network.
Figure 78:
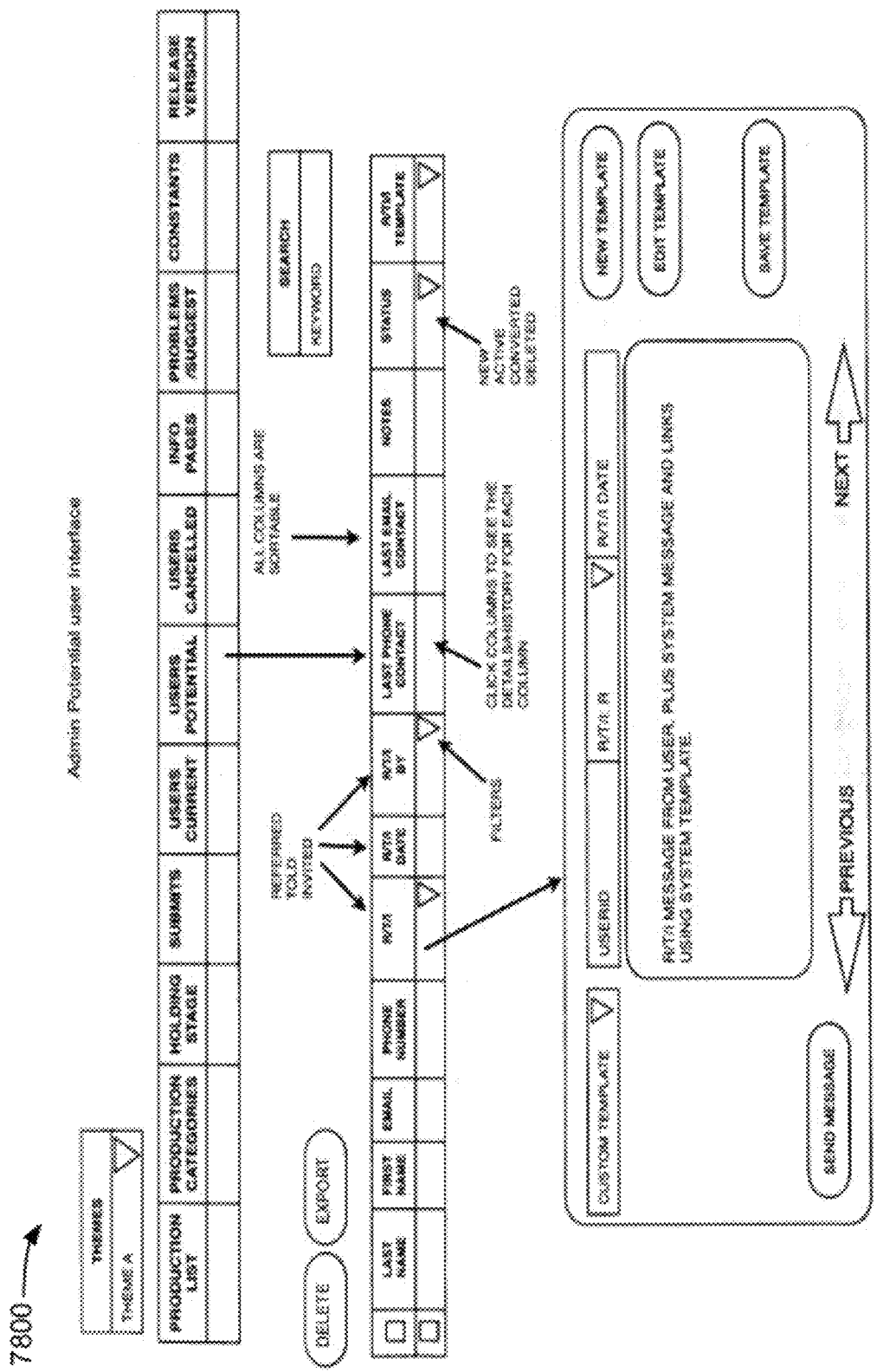
FIG. 78 shows an example of an administrative potential user interface of a trusted social network.
Figure 79:
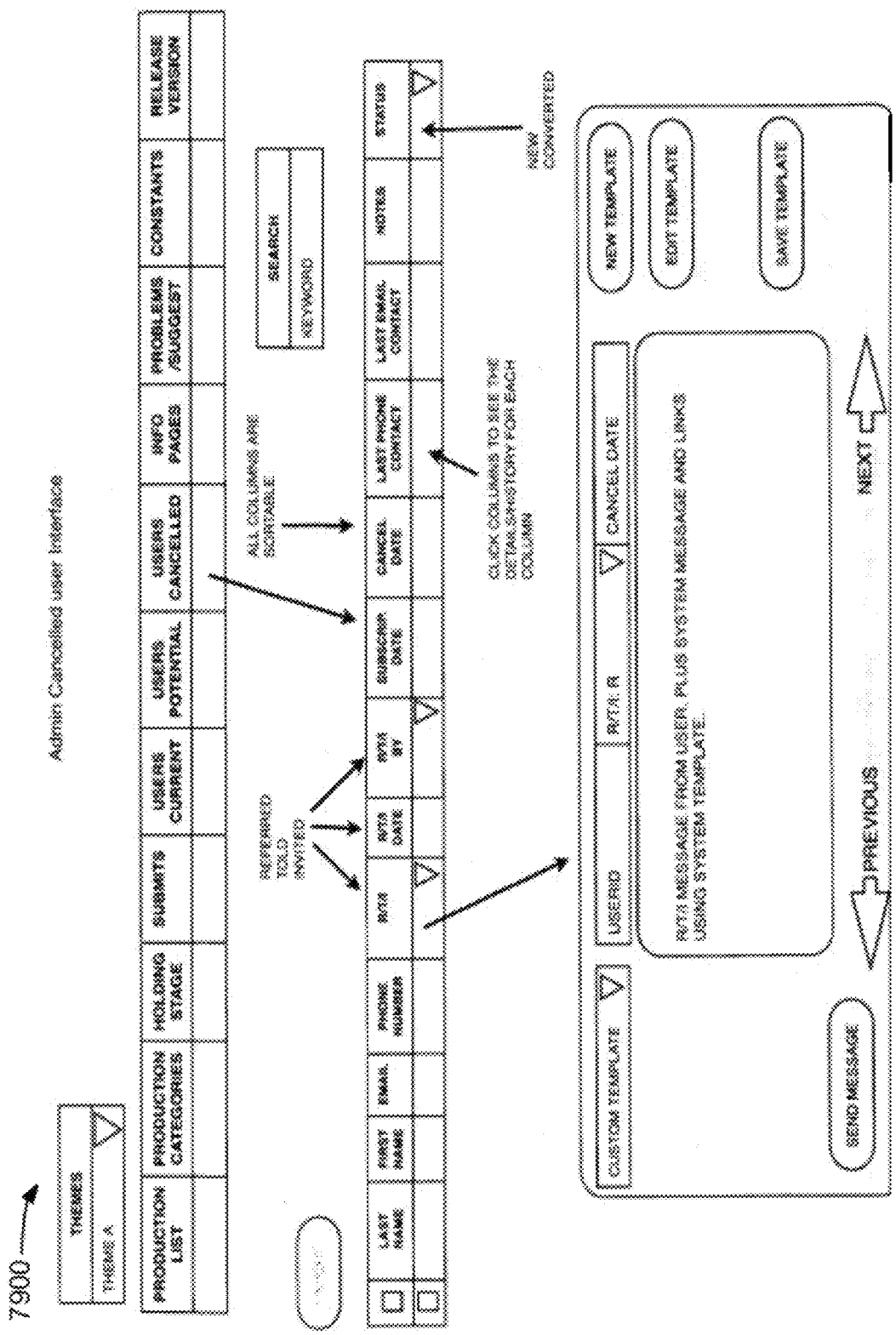
FIG. 79 shows an example of an administrative cancelled user interface of a trusted social network.
Figure 80:
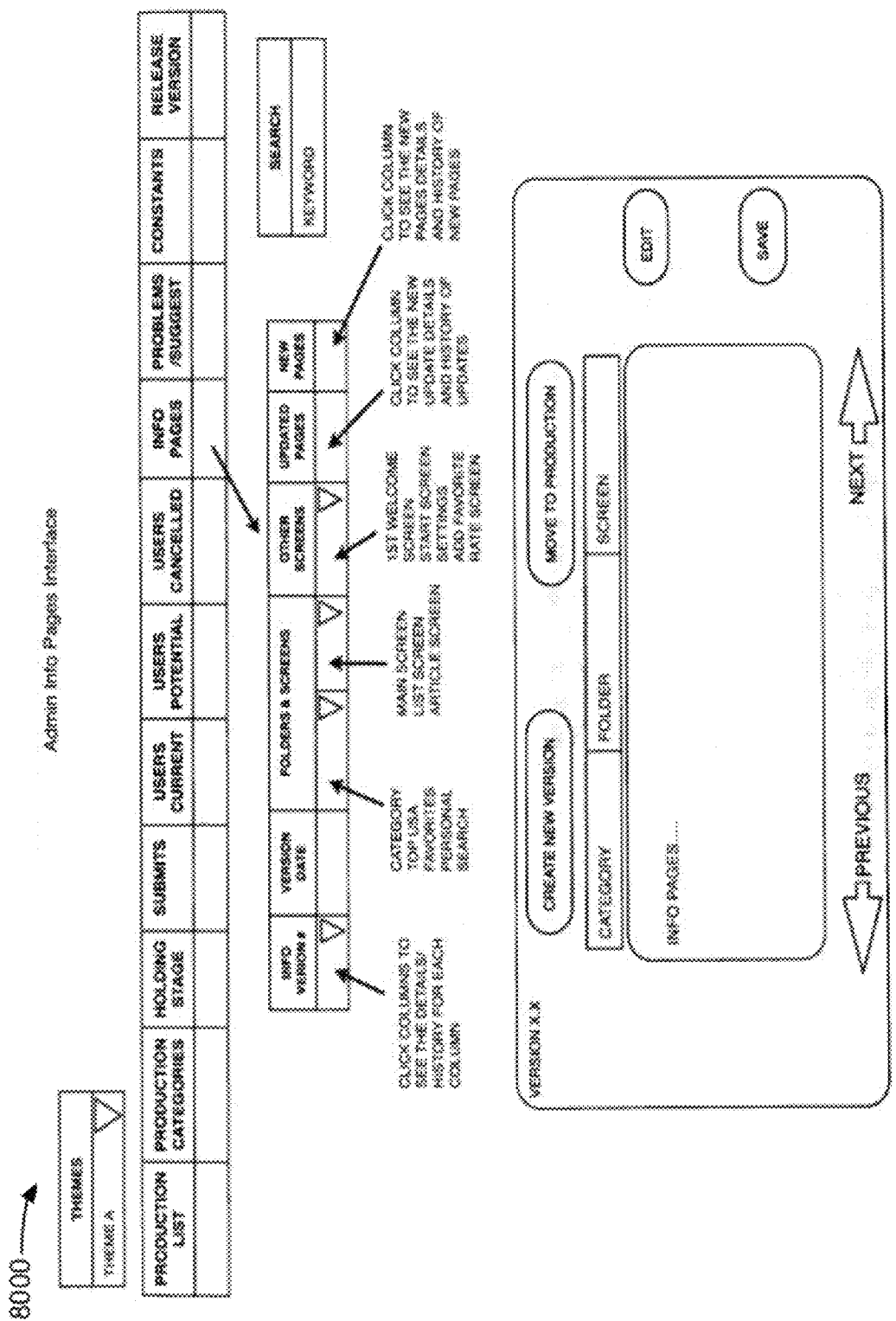
FIG. 80 shows an example of an administrative information pages interface of a trusted social network.
Figure 81:
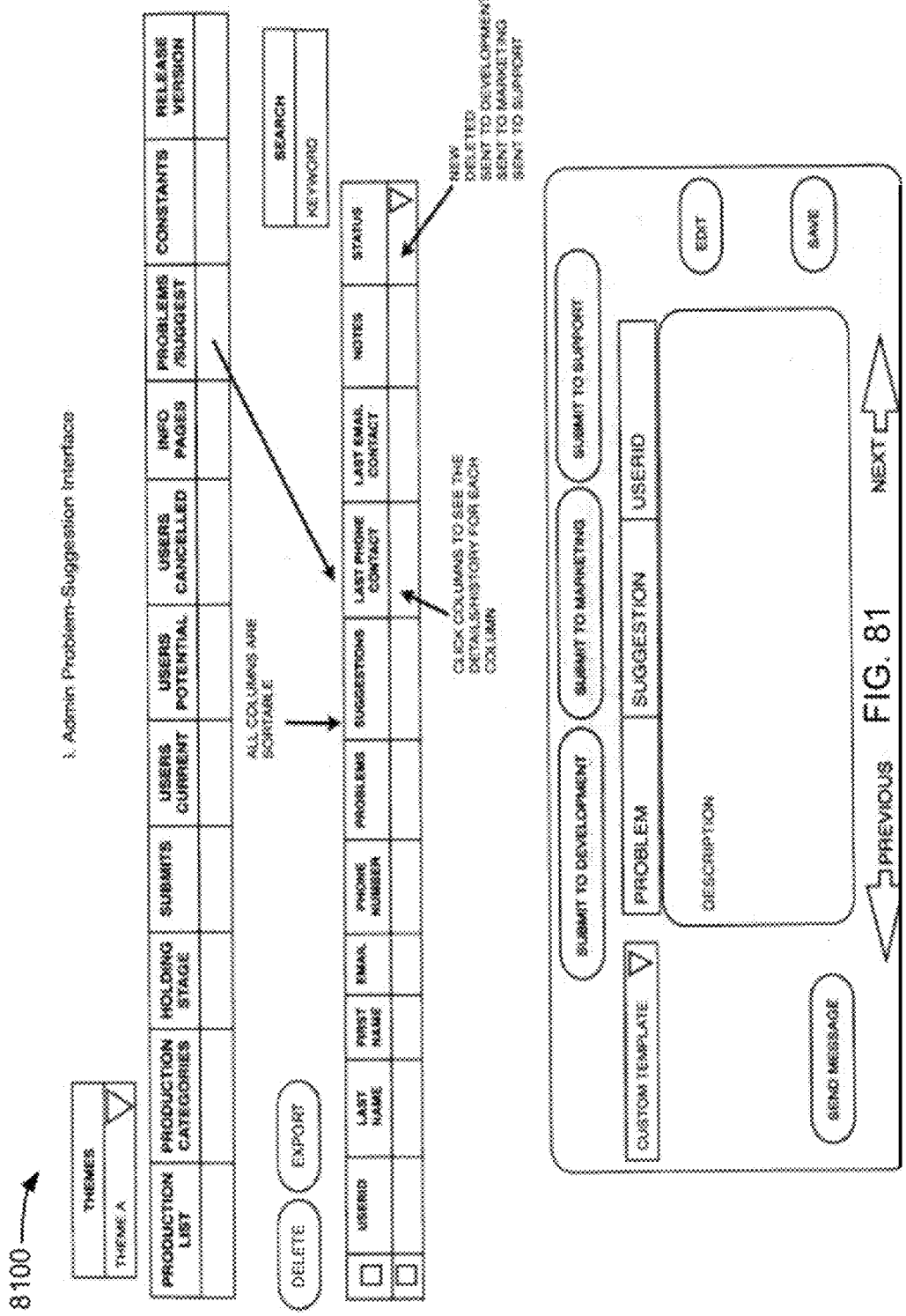
FIG. 81 shows an example of an administrative problem-suggestion interface of a trusted social network.
Figure 83:
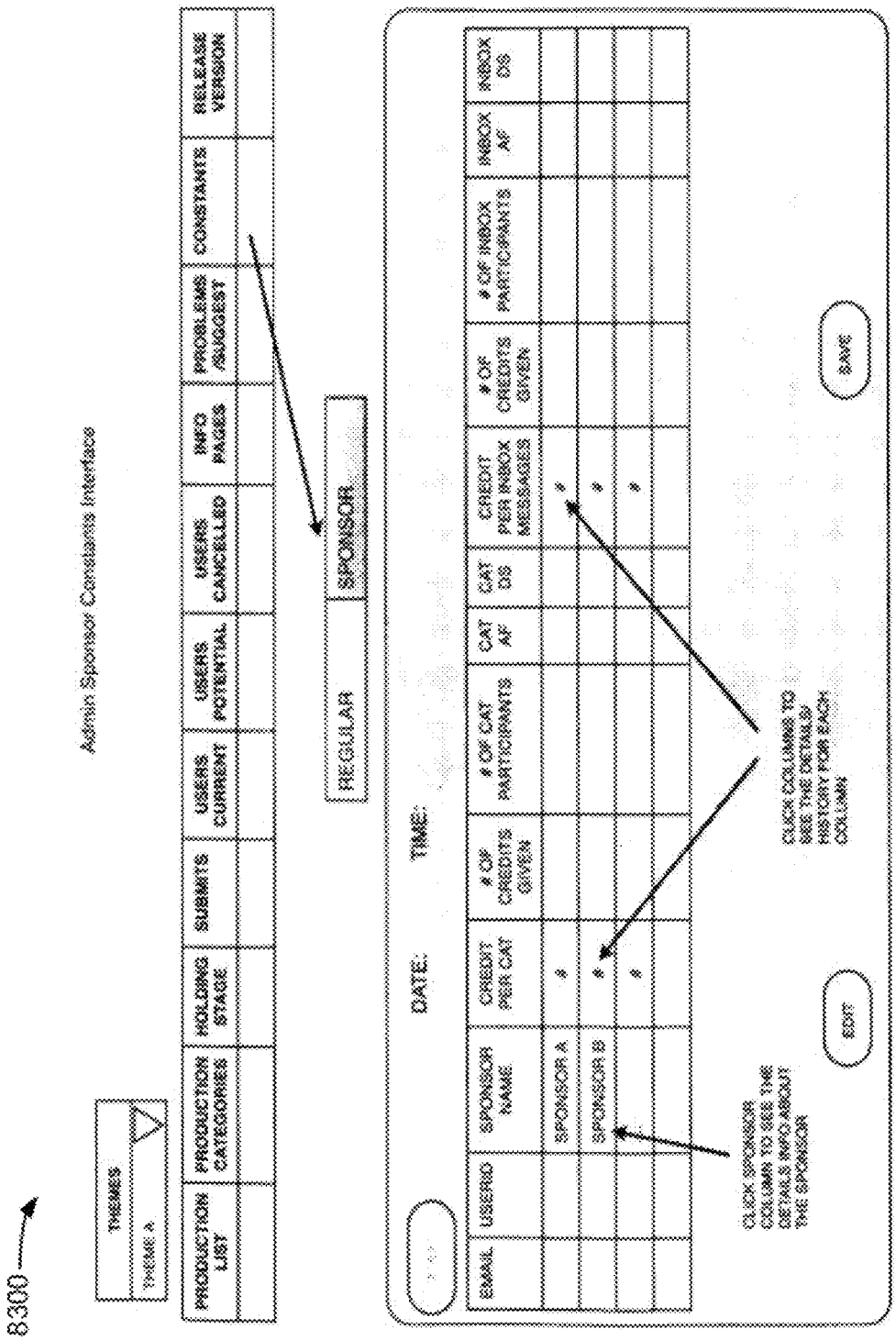
FIG. 83 shows an example of an administrative sponsor constants interface of a trusted social network.
Figure 84:
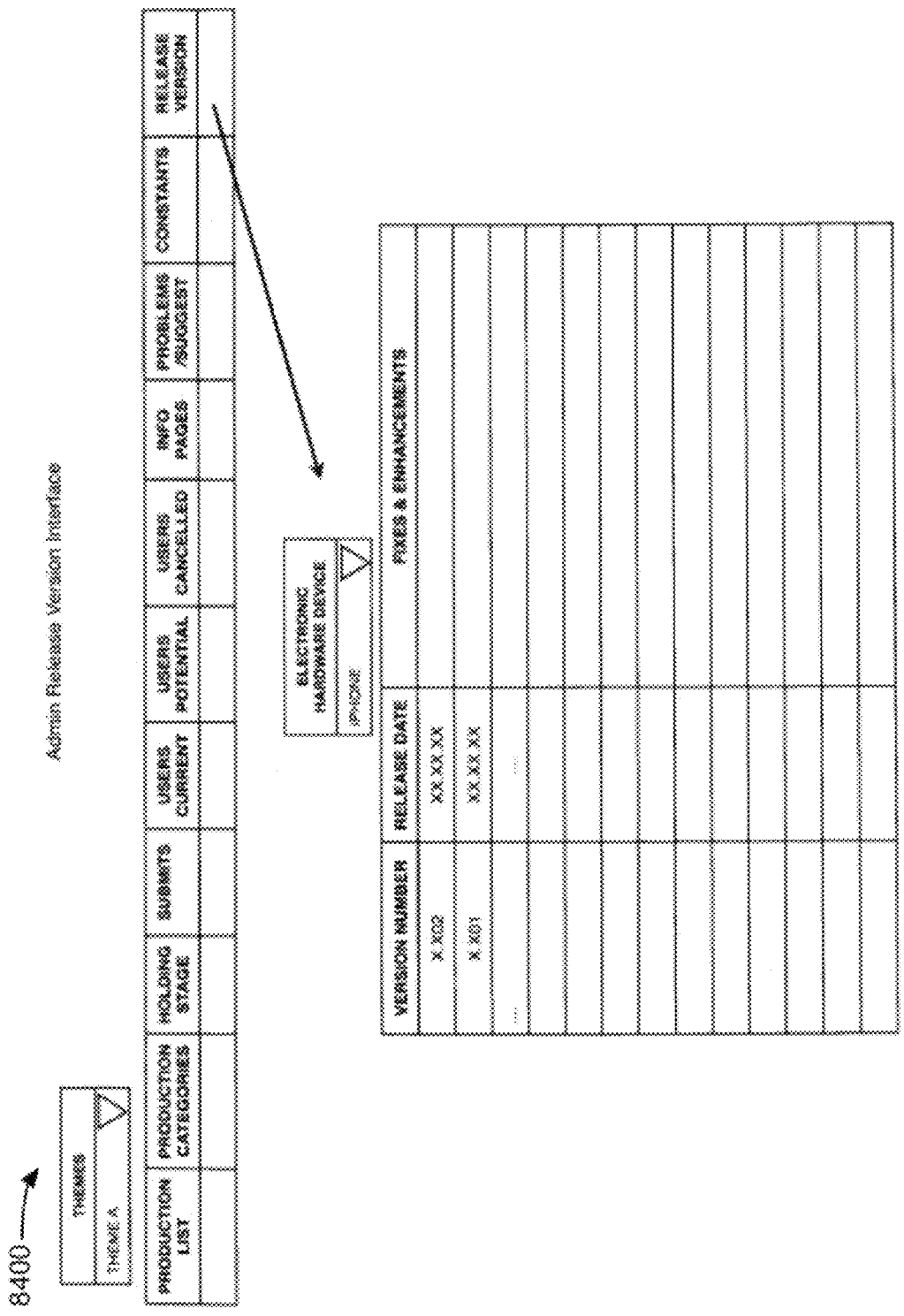
FIG. 84 shows an example of an administrative release version interface of artiste social network.

FIG. 72 shows an example of a general administrative interface 7200 of a trusted social network. FIG. 73 shows an example of an administrative production interface 7300 of a trusted social network. FIG. 74 shows an example of an administrative production categories interface 7400 of a trusted social network. FIG. 75 shows an example of an administrative holding stage interface 7500 of a trusted social network. FIG. 76 shows an example of an administrative user submit interface of a trusted social network. FIG. 77 shows an example of an administrative user interface 7700 of a trussed social network. FIG. 78 shows an example of an administrative potential user interface 7800 of a trusted social network. FIG. 79 shows an example of an administrative cancelled user interface 7900 of a trusted social network. FIG. 80 shows an example of an administrative information pages interface 8000 of a trusted social network. FIG. 81 shows an example of an administrative problem-suggestion interface 8100 of a trusted social network. FIG. 82 shows an example of an administrative constants interface 8200 of a trusted social network. FIG. 83 shows an example of an administrative sponsor constants interface 8300 of a trusted social network. FIG. 84 shows an example of an administrative release version interface 8400 of a trusted social network.

Figure 85:
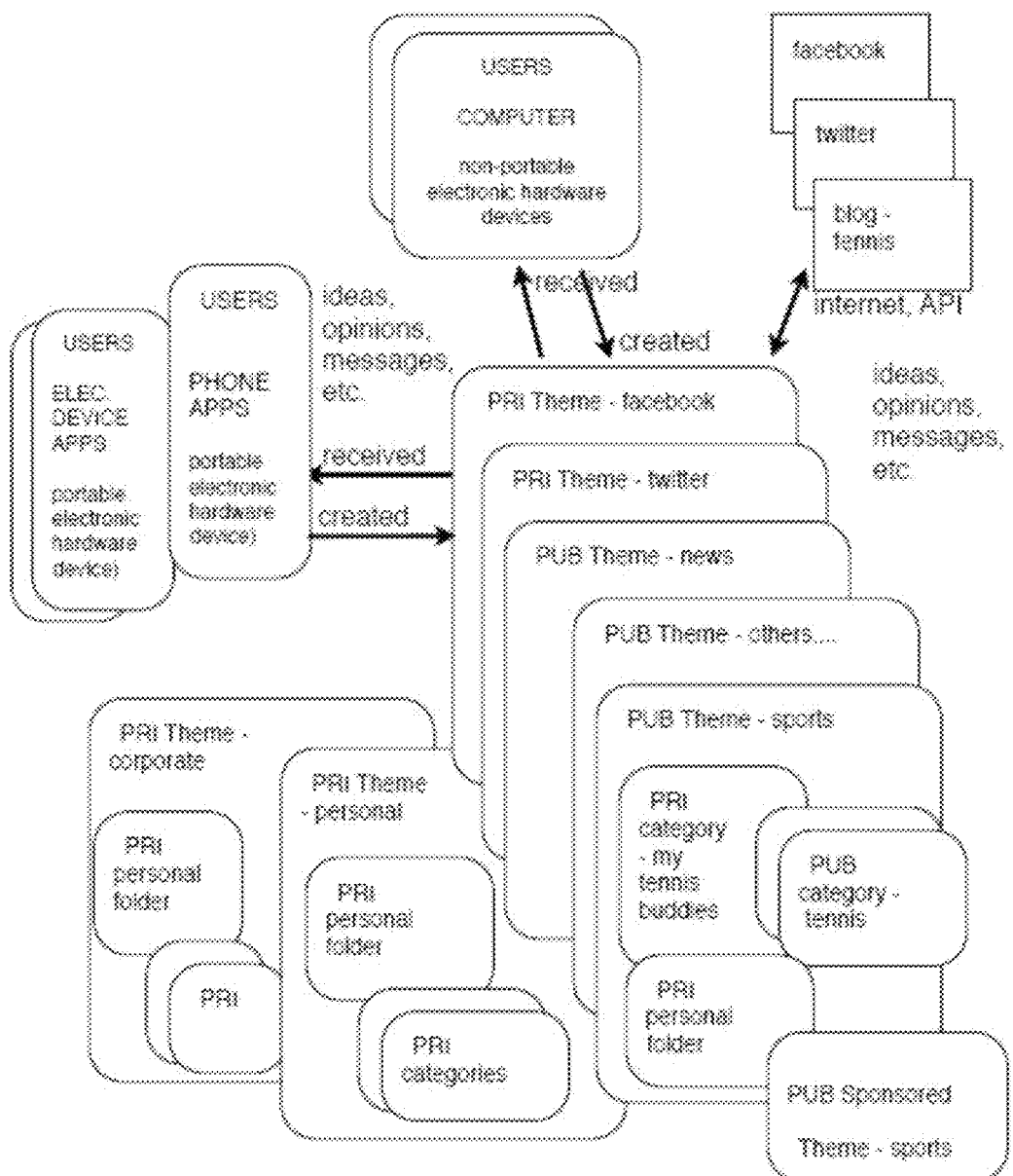
FIG. 85 shows an example of a data flow—PRI-PUB CATs & Themes flow of a trusted social network.

FIG. 85 shows an example of a data flow—PRI-PUB CATs & Themes flow 8500 of a trusted social network. In the example of FIG. 85, the data flow—PRI-PUB CATs & Themes flow 8500 can include users/computers, users/electronic device applications, users/phone applications, PRI themes, PUB themes, and connections to blogs and social networking sites (like Facebook and/or Twitter).

Figure 86A:
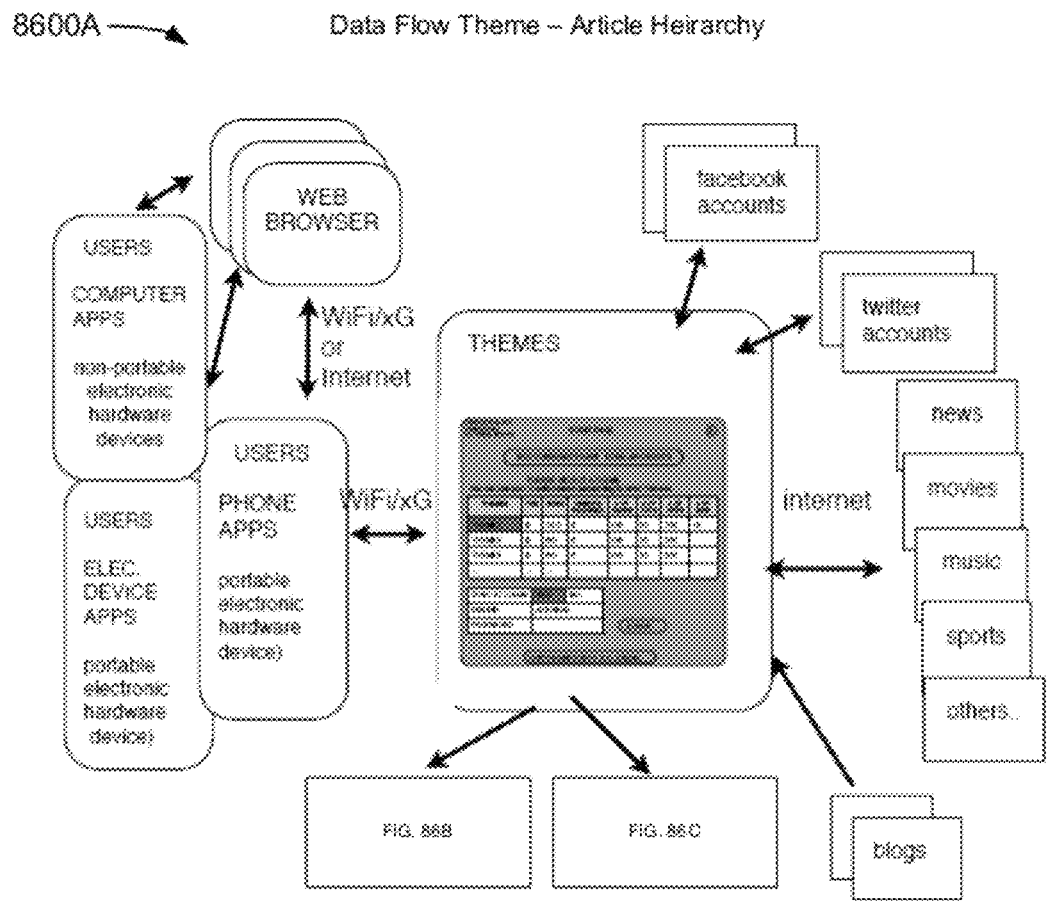
FIG. 86 shows an example of a data flow theme—article hierarchy flow of a trusted social network.
FIG. 86B shows an example of sponsored content.
FIG. 86C shows an example of sponsored content.
Figure 86B:
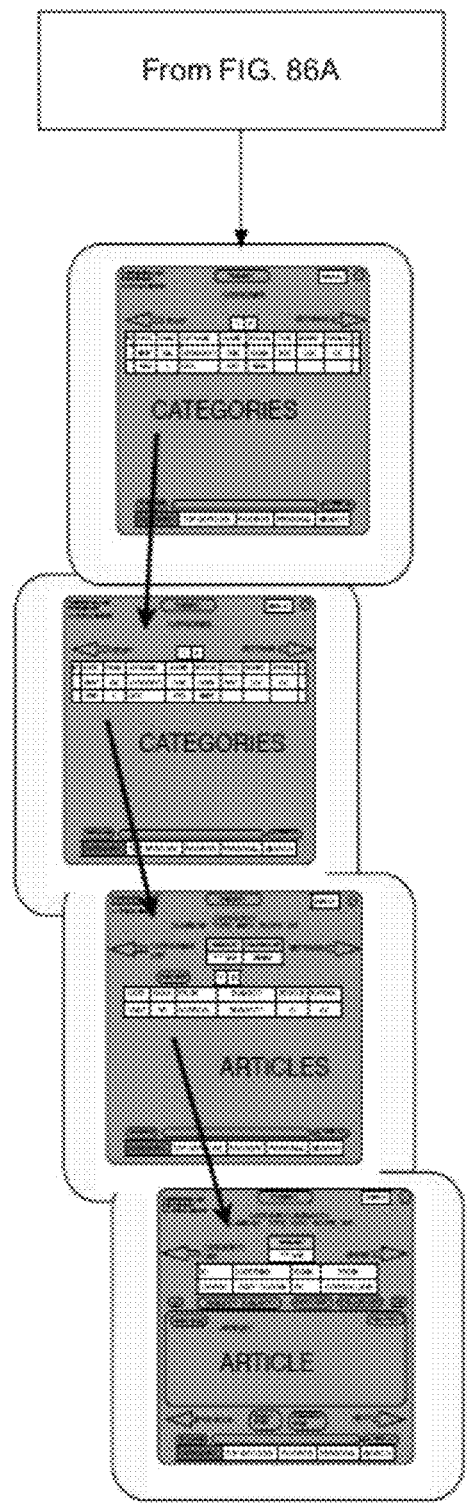
Figure 86C:
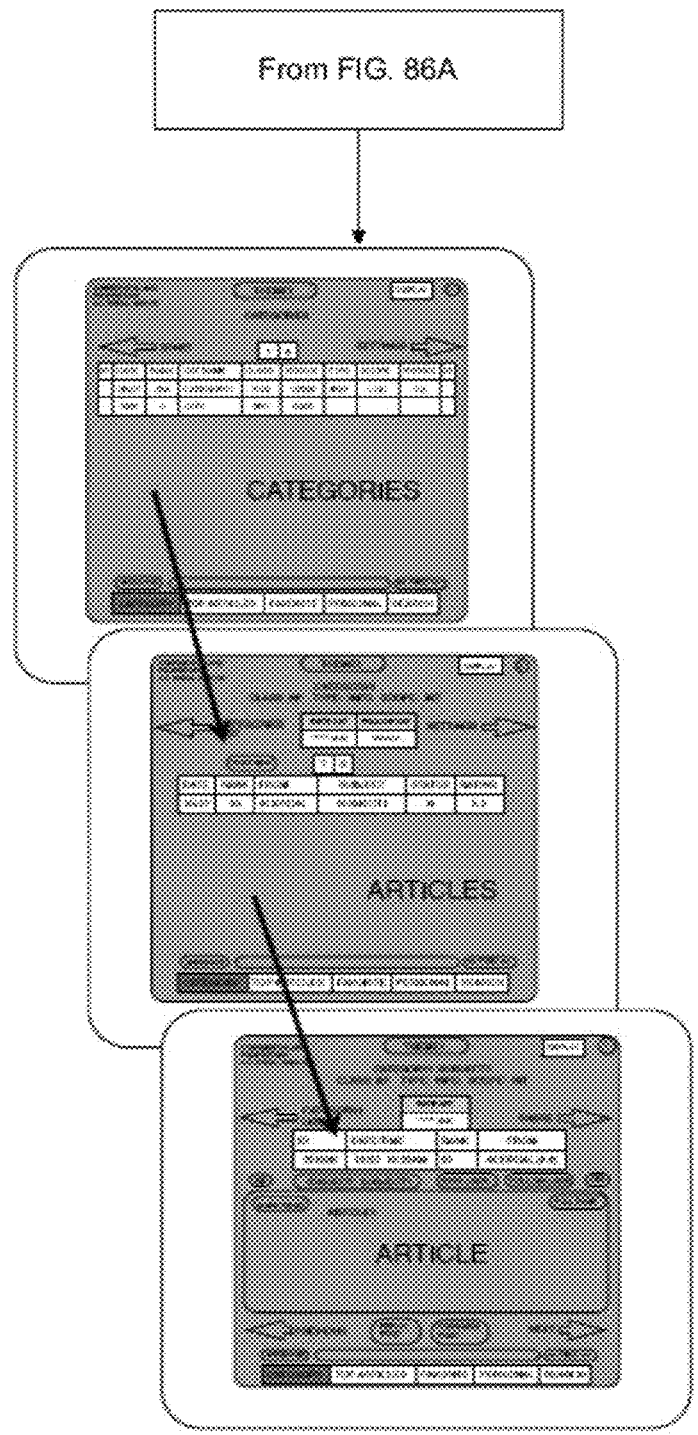

FIG. 86A shows an example of a data flow theme—article hierarchy low 8600A of a trusted social network. In the example of FIG. 86, the data flow theme—article hierarchy flow 8600A can include users/computers, users/electronic device applications, users/phone applications, PRI themes, PUB themes, and connections to blogs and social networking sites (like Facebook and/or Twitter). The data flow theme—article hierarchy flow 8600A can also include categories and articles. FIGS. 86B and 86C show examples of sponsored content.

FIG. 87 shows an example of a personal categories screen 8700 of a trusted social network. In the example of FIG. 87, the personal categories screen 8700 can include additional information for sponsors. Also shown are total distribution credits so far, and the amounts of credits to be distributed to each user.

Figure 88A:
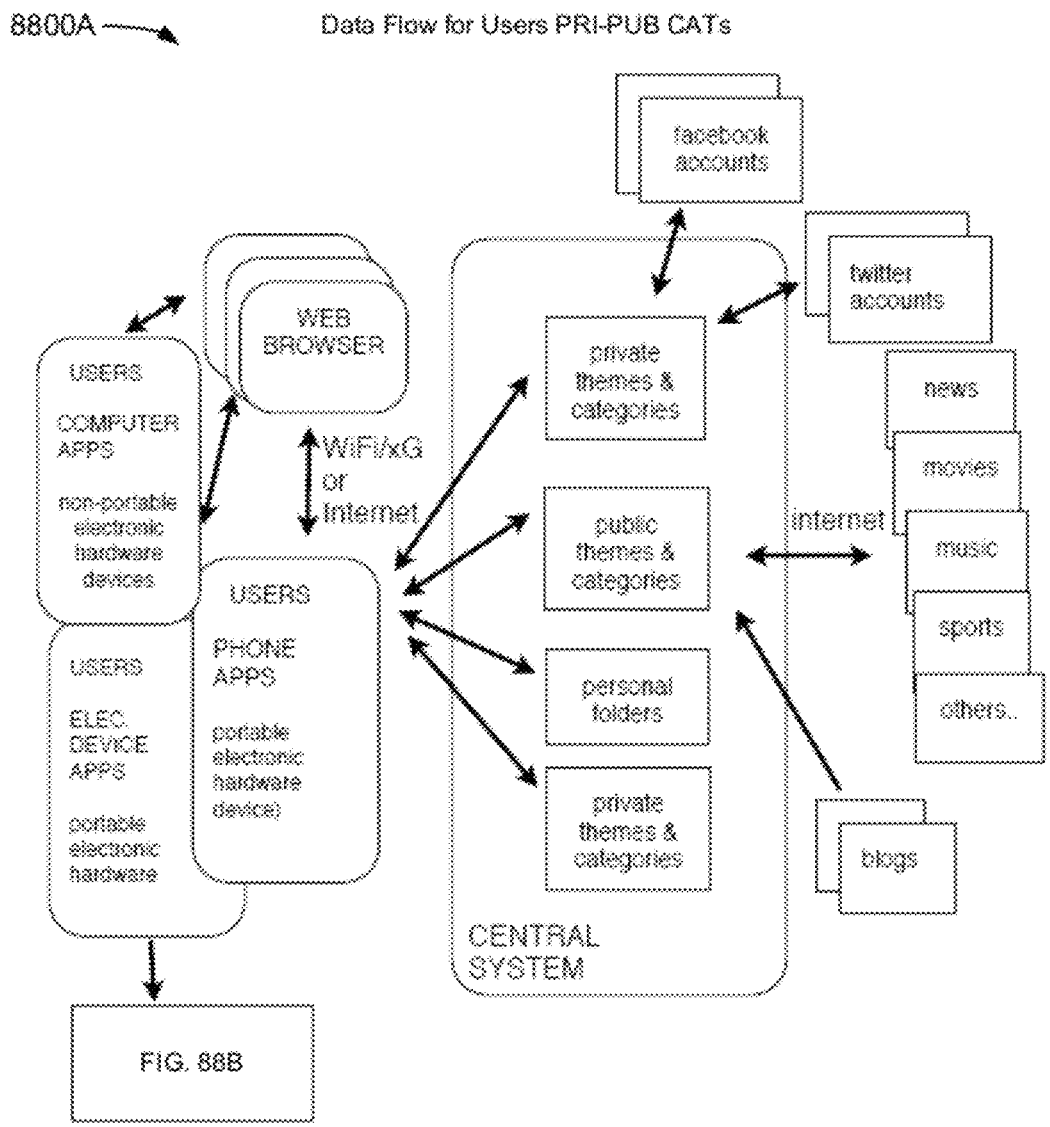
FIG. 88 shows an example of a data flow for users PRI-PUB CATs flow of a trusted social network.
Figure 88B:
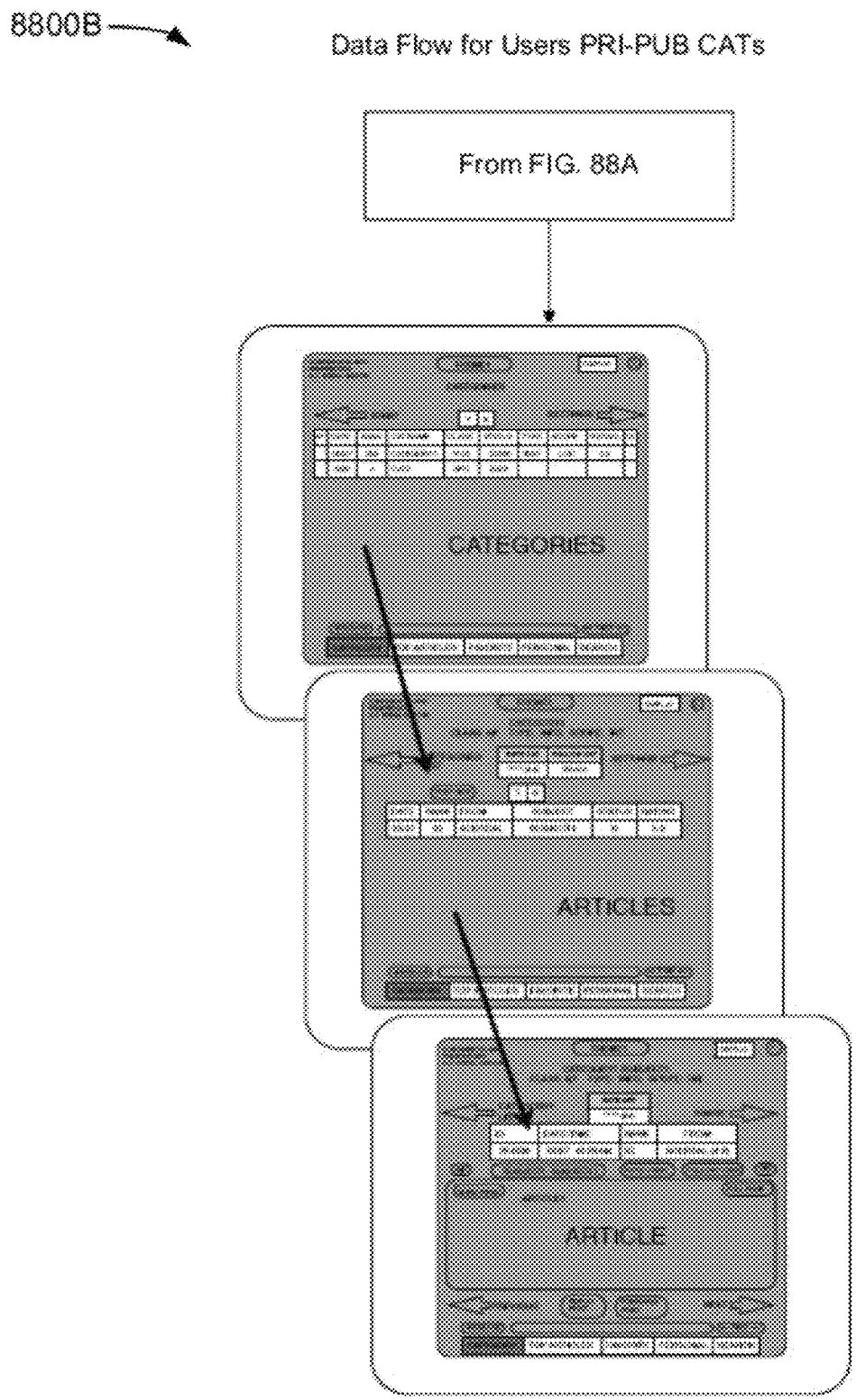

FIG. 88 shows an example of a data flow for users PRI-PUB CATs flow 8800 of a trusted social network. In the example of FIG. 88, the data flow for users PRI-PUB CATS flow 8800 can include users/computers, users/electronic device applications, users/phone applications, PRI themes, PUB themes, and connections to blogs and social networking, sites. (like Facebook and/or Twitter). The data flow for users PRI-PUB CATs flow 8800 can also include private themes and categories (here, a statement to a person's golf buddies, family, and poker team).

Figure 89:
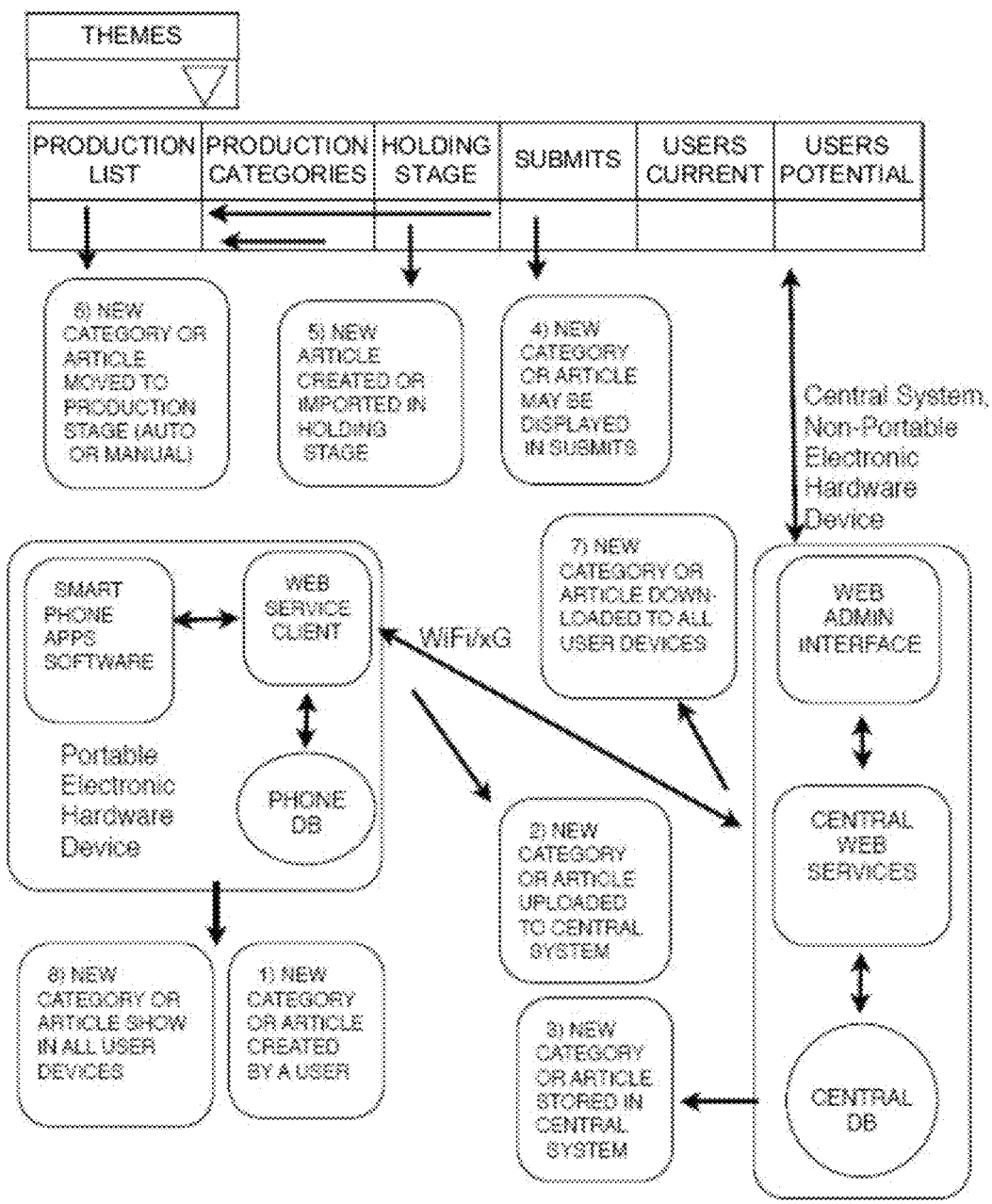
FIG. 89 shows an example of a user-system data flow-submit flow of a trusted social network.
Figure 90:
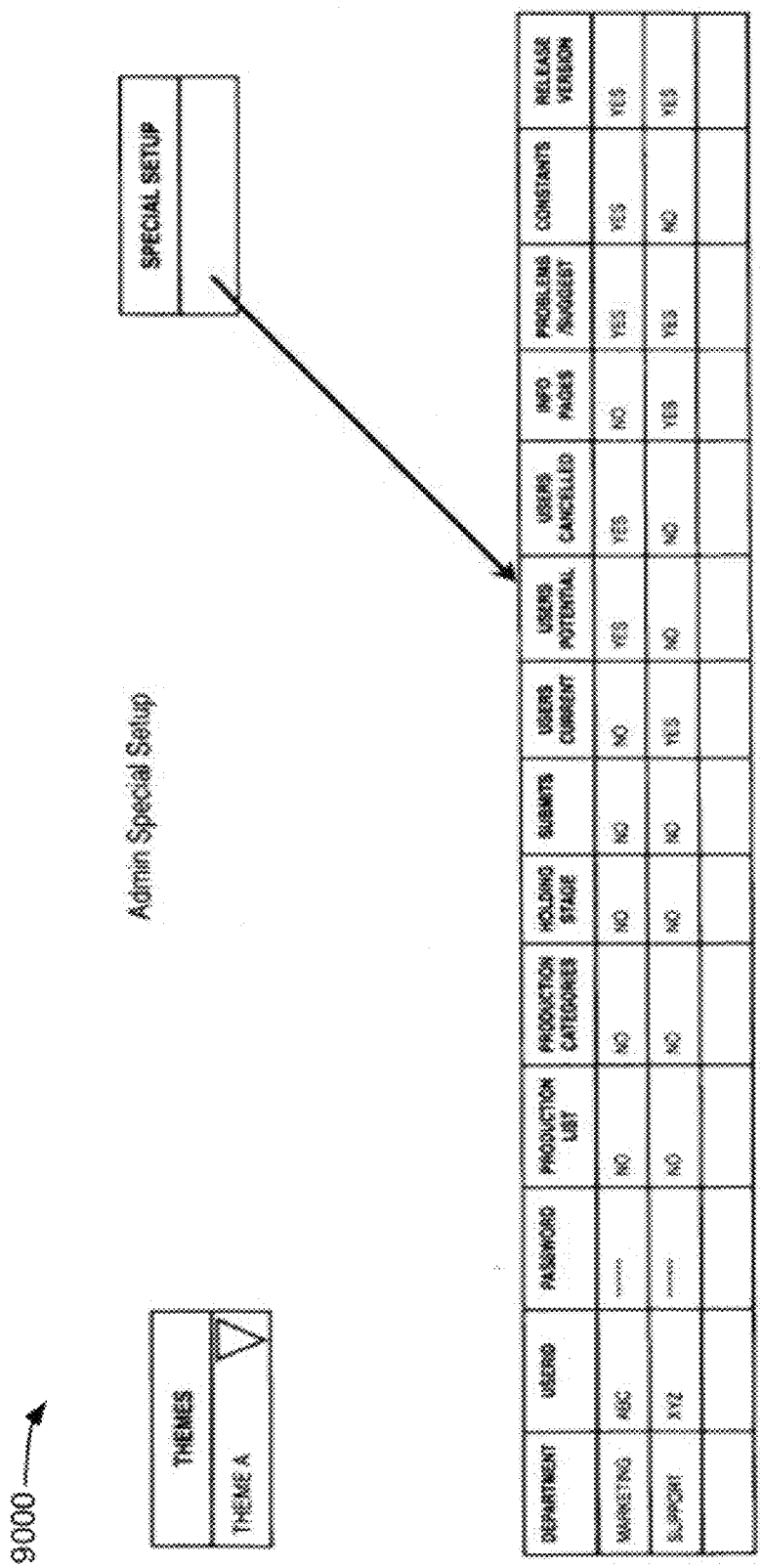
FIG. 90 shows an example of an administrative special setup flow of a trusted social network.

FIG. 89 shows an example of a user-system data flow-submit flow 8900 of a trusted social network. FIG. 90 shows an example of an administrative special setup flow 9000 of a trusted social network.

Figure 91:
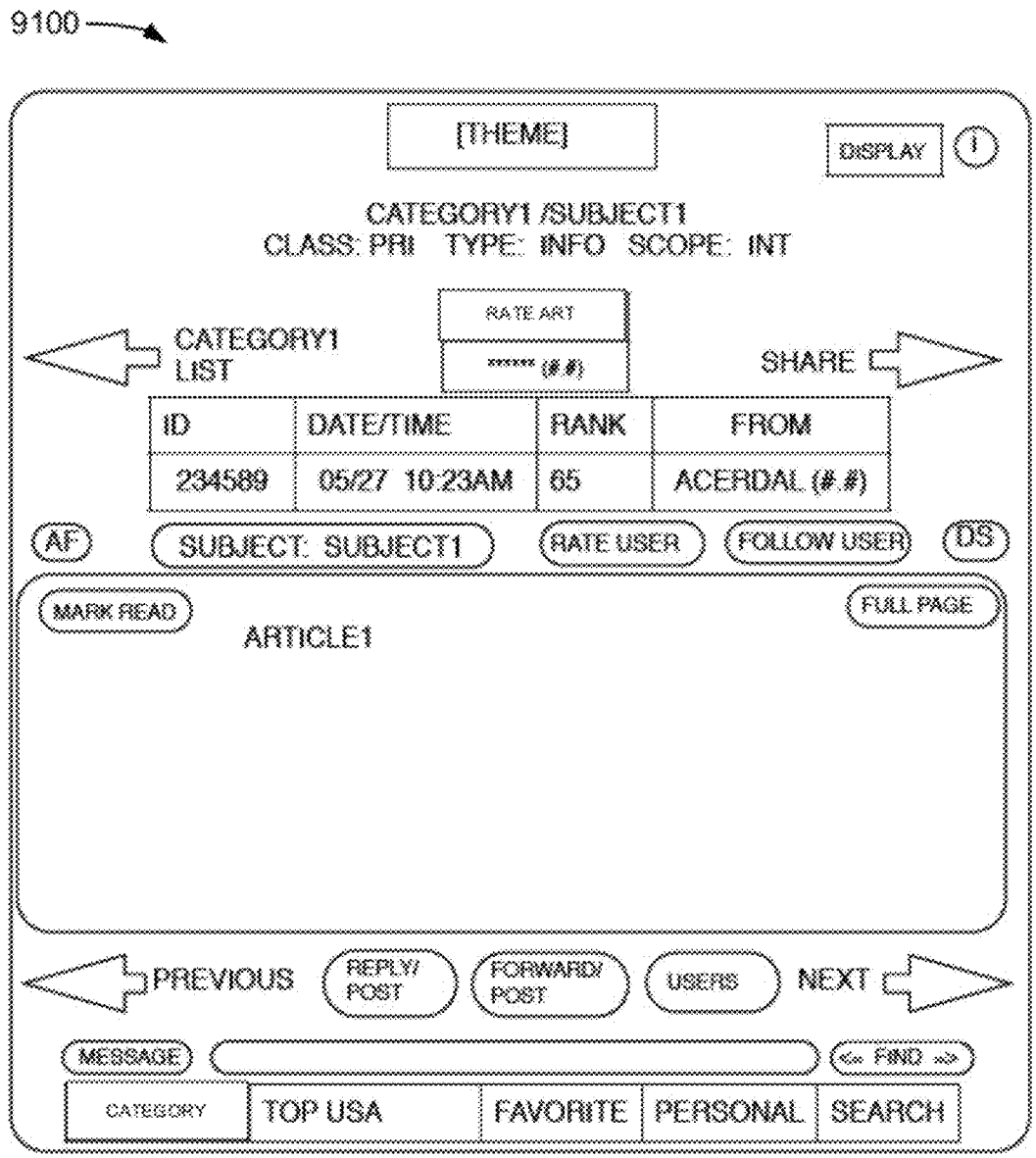
FIG. 91 shows an example of an article review screen of a trusted social network.

FIG. 91 shows an example of an article review screen 9100 of a trusted social network. In the example of FIG. 91, the article review screen 9100 can include a rating box, an article categorization box (including an ID, a date/time, a rank, and a from field), the actual article, being read, send mechanisms (here reply/post, forward/post, and users), and categories.

Figure 92:
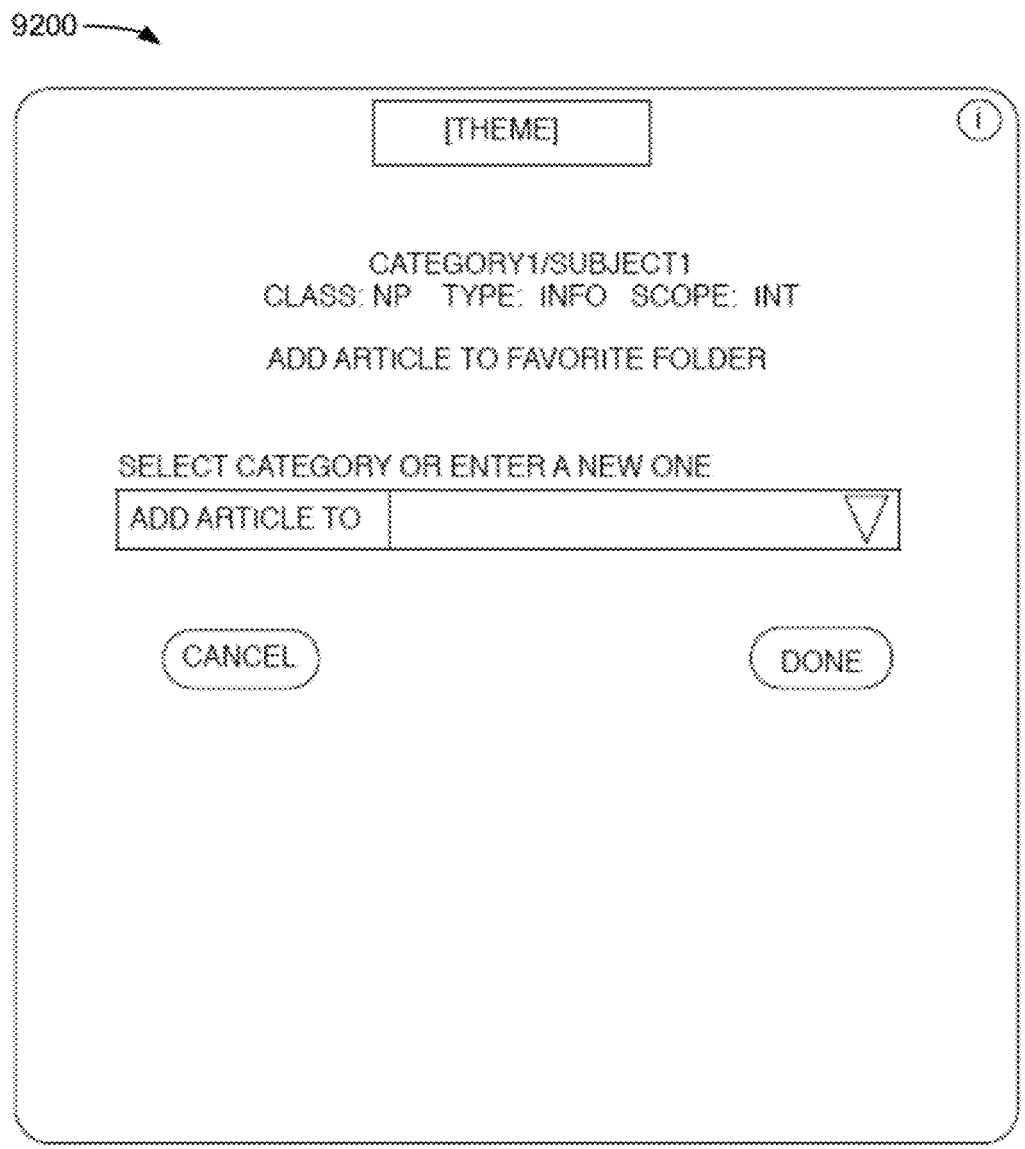
FIG. 92 shows an example of article save/categorization screen of a trusted social network.

FIG. 92 shows an example of article save/categorization screen 9200 of a trusted social network. In the example of FIG. 92, the article save/categorization screen 9200 lets a user save an article, and includes a mechanism for the article to be saved to one or more categories. If an existing category does not fit, the user can enter a new category.

Figure 93:
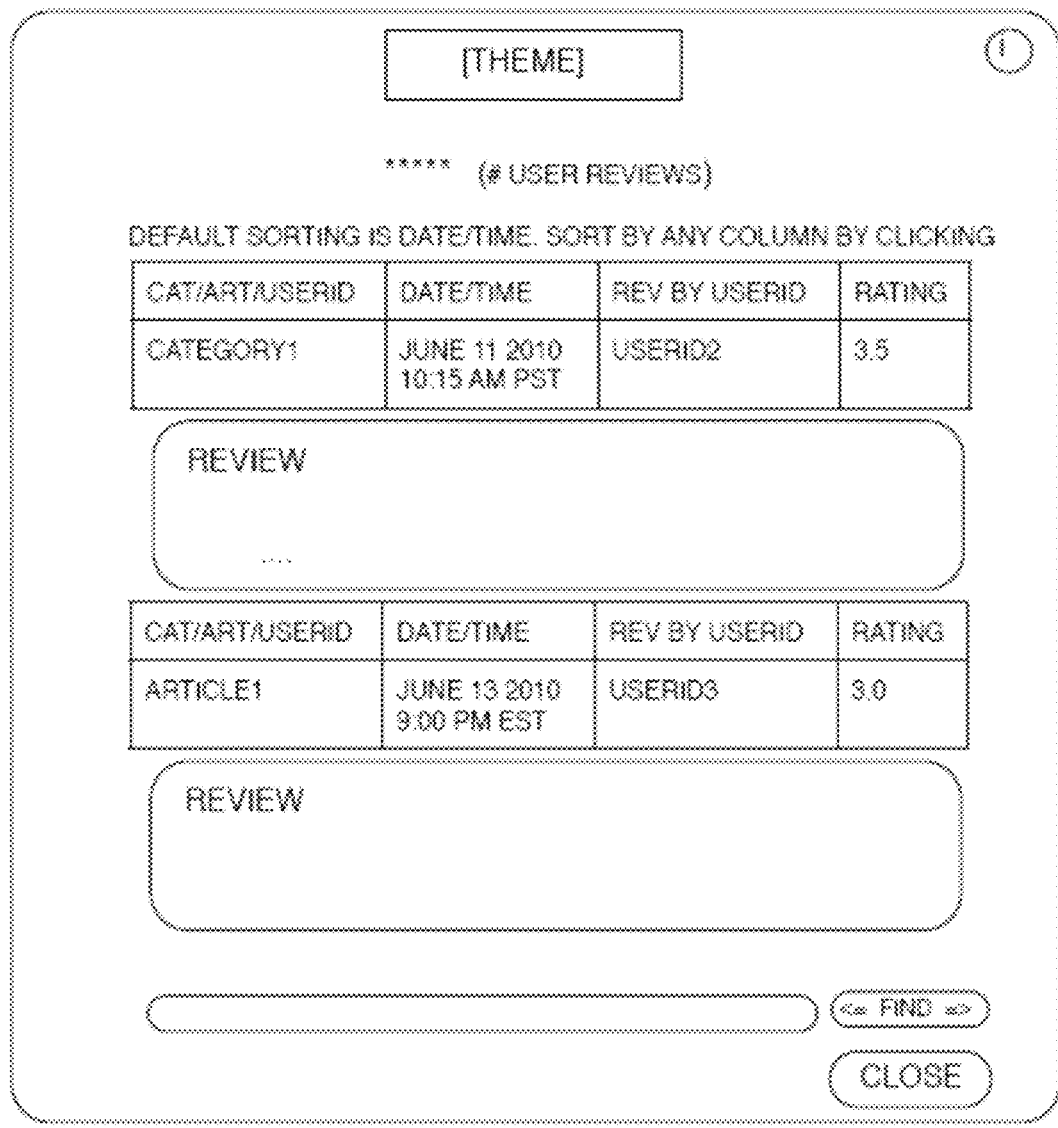
FIG. 93 shows an example of a content sorting screen of a trusted social network.

FIG. 93 shows an example of a content sorting screen 9300 of a trusted social network. In the example of FIG. 93, the content sorting screen 9300 can include default sorting, a place to submit a review, and other sorting mechanisms.

FIG. 94 shows an example of a content forwarding screen 9400 of a trusted social network. In the example of FIG. 94, the content forwarding screen 9400 can include an opportunity to reply/post, a sponsor message, a copy to field, and a message field.

Figure 95:
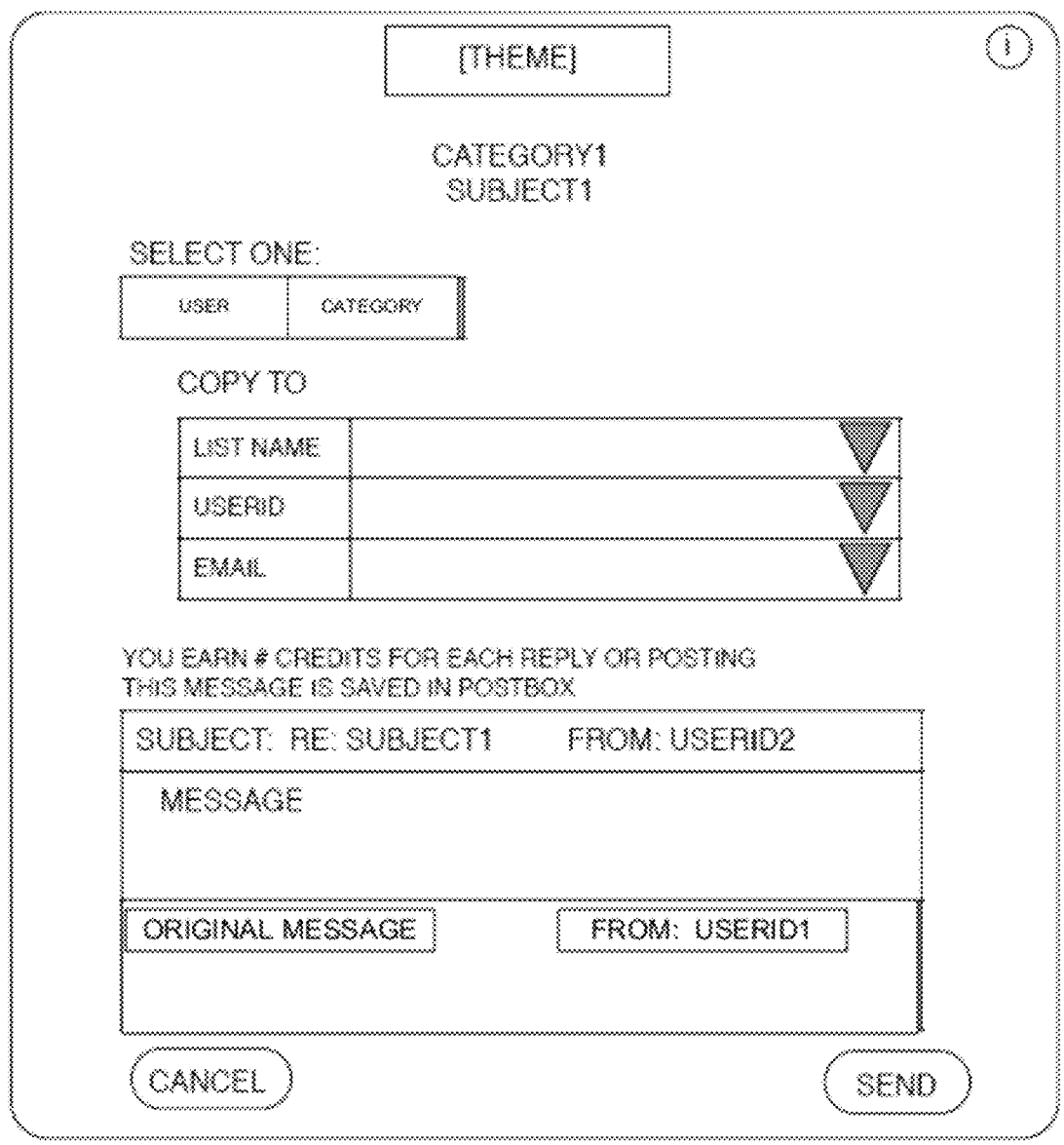
FIG. 95 shows an example of a content forwarding screen of a trusted social network.

FIG. 95 shows an example of a content forwarding screen 9500 of a trusted social network. In the example of FIG. 95, the content forwarding screen 9500 can include a person or category to forward to, a list name, list ID, and/or post to category, and a message field.

Figure 96:
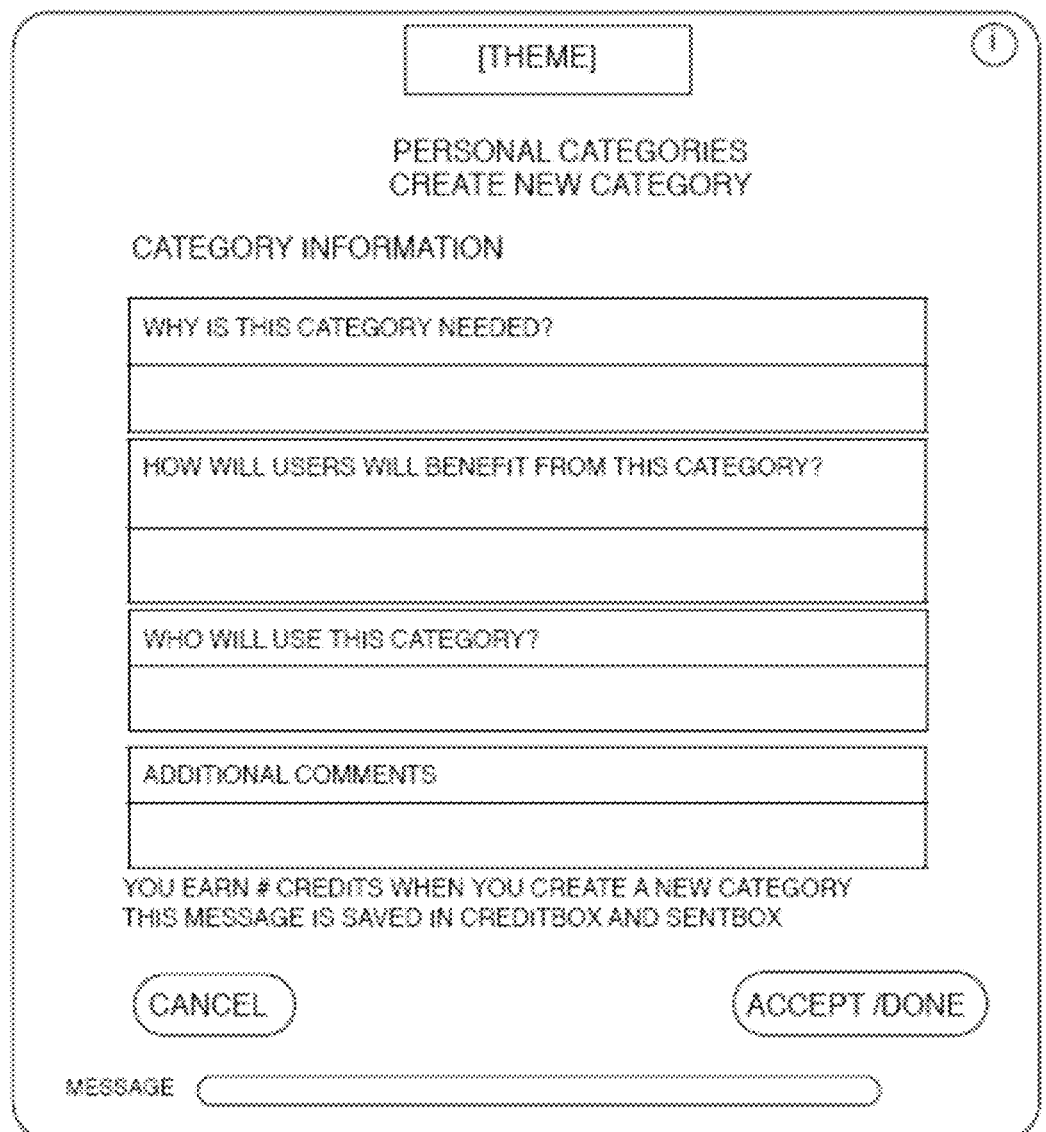
FIG. 96 shows an example of a category information screen of a trusted social network.

FIG. 96 shows an example of a category information, screen 9600 of a trusted social network. In the example of FIG. 96, the category information screen 9600 can include category information for a user to add a new category (such as a personal category).

Figure 97:
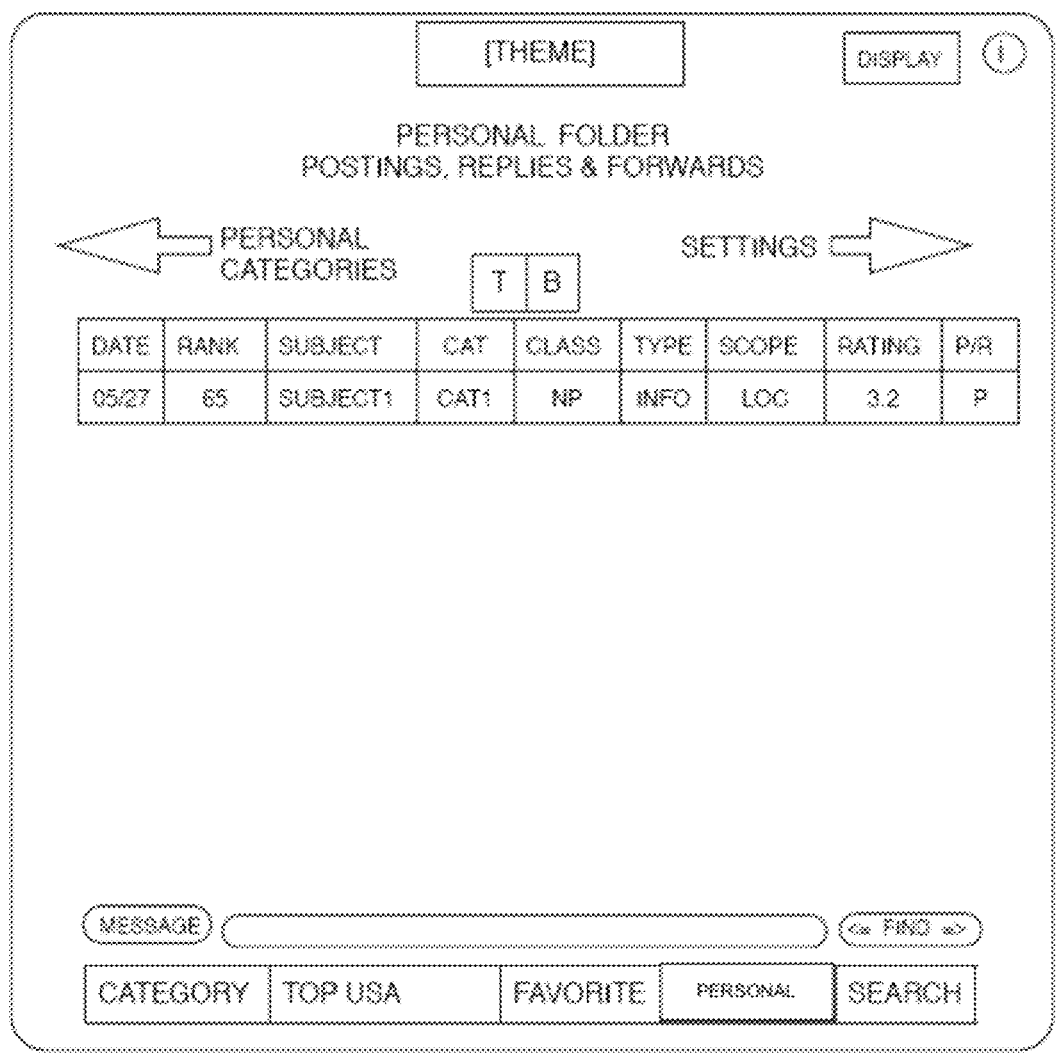
FIG. 97 shows an example of a personal folder, postings, replies, and forwards screen of a trusted social network.

FIG. 97 shows an example of a personal folder, postings, replies, and forwards screen 9700 of a trusted social network. In the example of FIG. 97, the personal folder, postings, replies, and forwards screen 9700 can include dates, ranks, subjects, categories, classes, types, scopes, ratings, and P/R of personal folder, postings, replies, and forwards.

Figure 98:
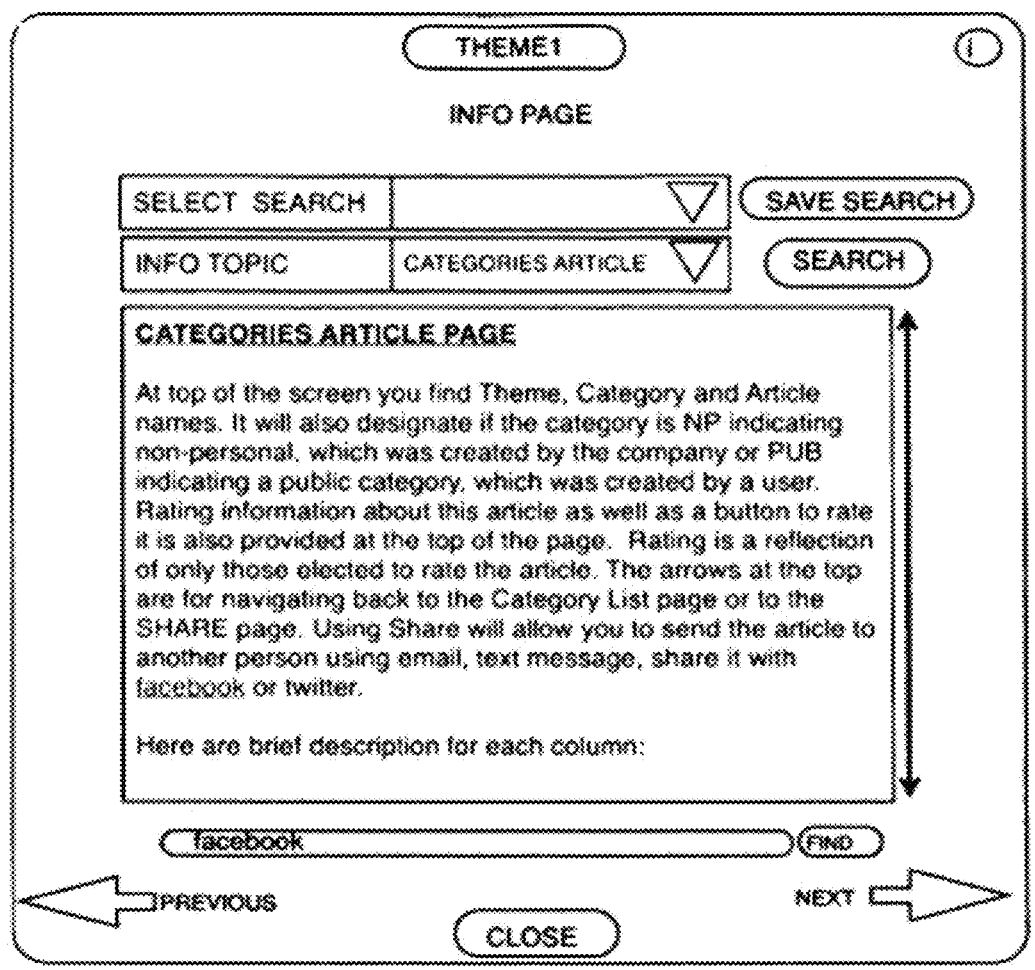
FIG. 98 shows an example of a categories articles page screen of a trusted social network.

FIG. 98 shows an example of a categories articles page screen 9800 of a trusted social network. In the example of FIG. 98, the categories articles page screen 9800 can include capability to select a search, capability to get information on a topic, a categories article page, and links to social networking sites (e.g., Facebook) and/or other sites.

Figure 99:
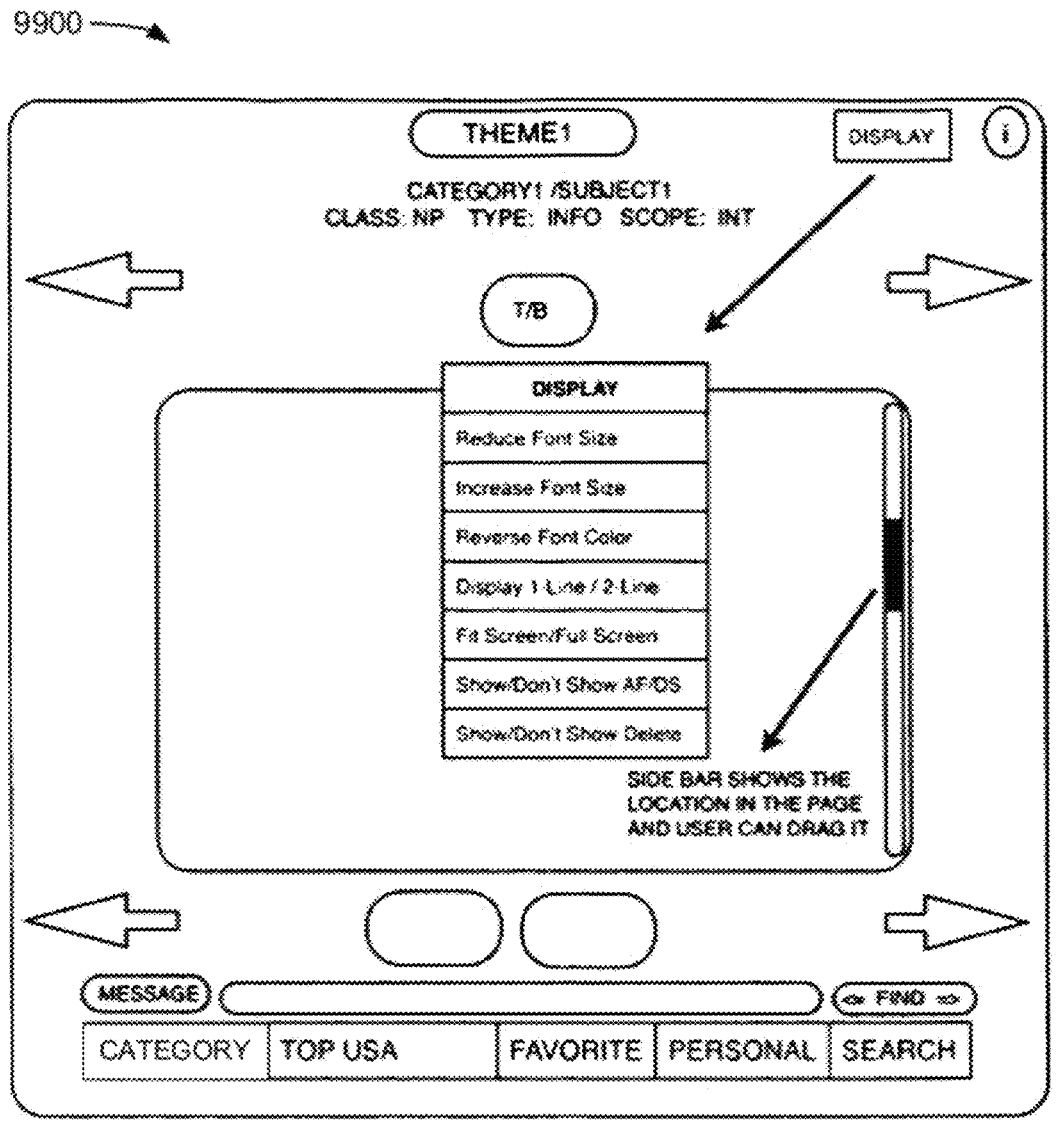
FIG. 99 shows an example of a display regulation screen of a trusted social network.

FIG. 99 shows an example of a display regulation screen 9900 of a trusted social network. In the example of FIG. 99, the display regulation screen 9900 can include display properties and ways to modify display properties.

FIG. 100 shows an example of a method 10000 for using an eMail system in accordance with a trusted social network. The method 10000 can involve one or more of the elements of the diagram 6100, shown in FIG. 61.

In the example of FIG. 100, the method 10000 can include step (1), sending an email message to multiple users and locations. For instance, the User A in FIG. 61 can send an email message to the Users B-D. In some embodiments, the step (1) can include the following substeps: (a) evaluating additional storage for different mail servers, (b) evaluating potential security issues, and/or (c) accounting for the fact that each user has to be copied with the individual emails.

In the example of FIG. 100, the method 10000 can include step (2) emailing an attached file to multiple users and locations. For instance, the User A in FIG. 61 can email an attached file. (here file x) to Users B-D. The step (2) can include substep (a), determining additional storage for different servers.

In the example of FIG. 100, the method 10000 can include step (3), accounting for the fact that the chances of an email being lost are high, which involves determining substep (a) noting that for whatever reason, people do not receive them (i.e., emails).

In the example of FIG. 100, the method 10000 can include step (4), considering that a recipient might get emails from anyone, which includes substep (a), that anyone can know a recipients' email address, and anyone with access to an email service can send the recipient an email. The method 10000 can also include step (5), considering that a recipient may not even know the people sending the emails, which can involve considering substep (a), the recipient may receive hundreds of junk/unwanted email. The method 10000 can also involve, step (6), considering that all emails come to the same inbox, which can involve considering substep (a), that even though emails can be put into folders, they typically must be first sorted, deleted, categorized, etc. by the user.

FIG. 101 shows an example of a method 10100 for communication using a trusted social network. The method 10100 can involve one or more of the elements of the diagram 6200, shown in FIG. 62.

In the example of FIG. 101, the method 10100 can include step (1) creating a private category of friends. For instance, the User A (in FIG. 62) can create the private category "my PRI category," comprising friends such as User B, User C, and/or User D. The User A can further define all authorized/approved users, e.g., Users B-D in FIG. 62.

In the example of FIG. 101, the method 10100 can include step (2), posting a message into one private category for those who are in the category. For example, the User A (in FIG. 62) can post a message and a link for the file x into the private category, "my PRI category."

In the example of FIG. 101, the method 10100 can include step (3), creating a file in one location using a data server, and posting a link to the category. For instance, the User A (in FIG. 62) can store the "file x" in the data server.

In the example of FIG. 101, the method 10100 can include step (4) noting that there is almost no chances of message being lost. The step (4) can involve consideration of the following benefits: (a) no more lost emails/messages, and (b) as the message is posted in the private category and all the users can see that there is a new message in that category, the system can setup alerts to be notified if there is a new message in that category.

In the example of FIG. 10.1, the method 10100 can include step (5) noting that the user will not be getting email/message from anyone outside the private category. The step (5) can involve consideration of the following, benefits: (a) others may know your userid, but only those authorized/approved can post a message to the private category, (b) user can also block any other user to send a message, or user can create a list of authorized/approved member list that can send messages. The method 10100 can include step (6) noting only those people authorized by the user can post or send a message. The step (6) can involve consideration of the following benefits: (a) there is no more junk mail, and/or (b) in a private category, only those authorized/approved can access and post messages.

In the example of FIG. 101, the method 10100 can include step (7), letting a user create multiple private categories for communication with other users. The step (7) can include the fact that each posting is done to its designated private category, which requires no separate sorting or organization of messages. For example, the User A (in FIG. 62) can create multiple private categories for communication with the Users B-D.

In the example of FIG. 101, the method 10100 can include step (8), all previously send messages are kept in private categories for future reference, which can include consideration of the following benefits: (a) no more loosing/deleting previous messages, (b) no more need to include past message, or to remember to do it, and/or (c) no need for additional storage for emails with previous messages. The system can keep all previously sent messages from the User A (see FIG. 62) in private categories for future user.

FIG. 102 shows an example of possible communication methods 10200 using a trusted social network. The method 10200 can involve one or more of the elements of the diagram 6300, shown in FIG. 63.

In the example of FIG. 102, the method 10200 can include step (1) User A creates a category MyFamily and invites users. For instance, the User A (in FIG. 63) can create the category myFamily an include users, such as Users B-E.

In the example of FIG. 102, the method 10200 can include step (2) User A creates a category myFriends and invites users. For instance, the User A (in FIG. 63) can create the category myFriends and invite users G, and H.

In the example of FIG. 102 the method 10200 can include step (3), User A creates a category Golf Buddy and invites users. For instance, the User A (see FIG. 63) can create the category myGolfBuddy and invite users B, G, and I.

In the example of FIG. 102, the method 10200 can include step (4), User A creates a category myFriend-x and invites users. For example, the User A (see FIG. 63) can create the category myFriend-x and can invite User X.

In the example of FIG. 102, the method 10200 can include step (5), creating a theme associated with a domain name. For instance, the User A (see FIG. 63) can create a theme, mycompany.com, and a category of users associated with mycompany.com onto which anyone with an email address ending with mycompany.com can participate.

In the example of FIG. 102, the method 10200 can include step (6), User A creates' a category myTeam and invites users. For example, the User A (see FIG. 63) can create the category myTeam and invite users J, K and L, to be a part of the mycompany.com theme.

In the example of FIG. 102, the method 10200 can include step (7), User A creates a category myTennisClub, a public Category. For instance, the User A (see FIG. 63) can create the category myTennisClub as a public Category where anyone who is also part of the mytennis.com group can participate.

In the example of FIG. 102, the method 10200 can include step (8), User A creates a category myFriend-x and invites users. For example, the User A (see FIG. 63) can create the category myFriend-x and can invite User X.

In the example of FIG. 102, the method 10200 can include step (9), User A sets up his personal folder such that he receive messages to his or her INBOX only from those listed in MyPRIList file. For instance, the User A can set up his personal folder such that he receive messages to his or her INBOX only from those listed in MyPRIList file, like UserX, User B, and others.

The method 10200 can include step (10), User A sets up his personal folder such that he receive messages to their INBOX, from anyone registered to the theme, except blocked users. For example, the User A (see FIG. 63) can set up his personal folder such that he receives messages to his INBOX, from anyone registered to the theme, except the blocked user Y.

The method 10200 can include step (11), User A sets up his personal folder such that he does not receive messages from anyone to their INBOX. For example, the User A, (see FIG. 63) can set up his personal folder such that he does not receive messages to his INBOX from anyone.

FIG. 103 shows an example of a method 10300 for posting/sending content using a trusted social network. The method 10300 can involve one or more of the elements of the diagram 6400, shown in FIG. 64.

In the example of FIG. 103, the method 10300 can include step (1), User A executes multiple communications all at once. For instance, the User A (see FIG. 64) can send a message to the non-user e-mail INBOX, can send a private message to the user E INBOX, and can send a private message/and or a post to the private category, my private category. In some embodiments, the step (1) can involve the following substeps: (a) post a message to a private category "friends" in a Theme with members A, B, C, and D, and where all members of the category can read and reply; (b) include the message to another registered user E in the theme. Because user E is not authorized for category "friends", the message will go to the INBOX of user E, as long as user A is allowed to send message to user E (set by user E), and (c) include the message to another person who is not a registered member of the Theme, and the message goes the email address of the person.

FIG. 104 shows an example of a method 10400 for replying/sending content using a trusted social network. The method 10400 can involve one or more of the elements of the diagram 6500, shown in FIG. 65. In the example of FIG. 104, the method 10400 can include: User-B replies to the post by A. Similar to user A action in FIG. 103, user B also includes the message to user E as well as non-user outside the Theme. Again, other users can read the posting, by B as well as any other previous posting in this private category "friends."

Figure 105:
FIG. 105 shows an example of an interface.

FIG. 105 shows an example of an interface 10500.

The detailed description discloses examples and techniques, but it will be appreciated by those skilled in the relevant art that modifications, permutations, and equivalents thereof are within the scope of the teachings. It is therefore intended that the following appended claims include all such modifications, permutations, and equivalents. While certain aspects of the invention are presented below in certain claim forms, the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the invention.

APPENDIX

General Navigation

For a given Theme, data organized and accessed, for example, through five main Folders:

C—CATEGORY—List of categories in the theme
T—TOP USA—List of top ranked users (U), sponsors (S) and articles (A)

F—FAVORITES—List of categories and articles designated a favorite

P—PERSONAL—List of public and private categories created by you and your inbox

S—SEARCH—For searching categories, articles or users

At the bottom of each screen you will have an option to select any one of them, (C,T,F,P,S), and the selected one will be kept highlighted.

In addition, for each main Folder, there may be three screens for viewing data;

M—MAIN SCREEN—List of categories in the theme. This is the default screen for all folders, except Top Articles folder. Clicking on any of the categories listed on this main screen takes you to the list screen.

L—LIST SCREEN—List of articles in a category. This is the default screen for Top Articles folder. Clicking on any of the articles listed on this list screen takes you to the article screen.

A—ARTICLE SCREEN—Article view where you can share, reply, post, etc.

User can scrolls up or down through the Main, List and Article Screens through either by using a scroll bar or by touching on screen (in supported electronic hardware devices). Also, there is a quick access to the top of the list or to the bottom of the list by clicking on T or B at the top of the screen.

Each screen in each folder also has a button/link to i (information) screens. Click the i button to access more specific information about the screen you are at.

Electronic hardware device can be portable or non-portable. In this document, some examples are given using a portable electronic device, for example, iPhone.

Display Description

1. Each screen may be different. However there are commonalities between the screens with specific navigation and display capabilities. See a Sample Screen in FIG. S11.

2. Each screen/page in each folder also has a link to i (information) pages.

3. When new Theme is subscribed, allow settings for that new Theme as well

4. When new Theme is subscribed, give credit to the user for that subscription

5. STATUS: NEW, NOT-READ, READ, FAVORITE, DONT-SHOW; N and NR should be highlighted until they are R.

6. CLASS: NOT-PERSONAL/NP, PRIVATE/PRI, or PUBLIC/PUB. NP is created by the system, whereas PRI and PUB created by the users. Any user can access to NP or PUB. However, only invited users have access to PRI.

7. All columns on all screens/pages are sortable.

8. An article is put into a FAVORITE folder, it is basically marked as F

9. An article may be marked as DS (don't show) but still stays in the list. However, those with DS are put at the bottom of the list and they are made un-selectable until DS button is clicked again.

10. After going to SHARE or ADD TO FAVORITE screens, and after clicking DONE button on these pages, user should be able to go back to where they clicked those buttons.

11. in all screens, HOME means the Main Folder page as setup in the SETTINGS 12. the START PAGE is the one that gives user to select different Themes. START PAGE can be access from the MAIN PAGE of C, T, F, P 13. The theme name is always displayed at the top and it is a clickable button to access to the start page that displays subscribed and other themes that can be subscribed.

14. Category name is displayed below the theme, and article name is displayed next to category name, always in that order.

15. on Main screen the theme is displayed and below that is the name of the navigational box selected. If categories box was selected, then "category" be displayed below. If favorites box selected, then "favorites" should be below the theme name.

16. on List screen, display theme name, and below display the specific selected category name. Below should be the class, type, and scope of the category. Article screens starts similar to list screens. However, there are some exceptions on personal folder when displaying for example inbox.

17. At the bottom, for most screens the main navigation box should be displayed for selecting five different folders; Category, Top USA (Users/SponsorsArticles), Favorites, Personal, and Search. Clicking any of these buttons highlights that folder and take user to the Main screen, except for Top Articles, where user should be taken to the List screen.

18. For Main and List screens, there are two navigational arrows at the top, one on right and one on left. The arrow on left typically takes user back to the previous page. For example, from Article, user goes back to the List screen, and from List screen back to the Main screen. The arrow on right is takes user from Main and List screens to the Settings screen. On Article screen, it takes user to the Share screen.

19. For Article screen, there are two navigational arrows at the bottom, Next and Previous, which takes users to next and previous Articles. In addition many screens have a message box where appropriate messages are displayed. Message box is also shared as a text entry for Find operations to search keywords in current page.

20. All data display pages have scrolling capability. However, all buttons/arrows/links at the top and bottom should always be accessible to the user. For all scrollable pages there should be buttons at the top labeled T (top) and B (bottom) to access to the top or bottom of the scrollable page quickly.

21. Each screen has a button on top right, i (information) to access more information about that screen. Closing this information screen brings user back to the screen that user clicked on the button i. In info page user can also perform search based on key words.

22. On all List screens where articles in a category are listed, there should be button to rate the category and to see the ratings by other users. On this List screen, user should also be able set an alert to follow the category.

23. On all Article screens, there should be a button to rate the article and to see the rating of the article by other users. On this article screen, user should also be able to rate a user and set an alert to follow a user.

24. All Main and List page columns should be sortable, two ways, newest to oldest and high to low are default. Clicking on column sorts it the opposite way.

25. Following columns are clickable on all pages; USERID or FROM, CATEGORY name, SUBJECT name.

26. AF button stands for add to favorite and DS stands for don't show, valid for Categories or Articles. Adding to favorite means we mark the original article as F, not making a copy of the original article. Don't show for Categories means the category is marked as DS, and it should still show on the category list but should be de-highlighted such that user cannot click on it. To click on a category that was marked DA, user first has to click on DS to turn DS off. When a category is in DS status, it should not be synced with the system and it should retain it's content before user selected the DS status.

When an article is marked as DS, the article name should be de-highlighted and cannot be selected until user clicks on DS again.

27. Display on portable electronic hardware devices should support both portrait/vertical and landscape/horizontal display modes 28. user should be able REDUCE/INCREASE FONT size works one size at a time 29. user should be able to REVERSE FONT COLOR—goes from white background—black font to black background—white font 30. Text and buttons should be implemented such that they can support Font size and color changes.

31. on portable electronic hardware devices, MAIN/LIST PAGES: FULL SCREEN—if currently in Portrait mode, it changes into Landscape and adjust the font size if necessary, and if in Landscape mode, it stays in that mode but adjust font size. In both cases displays all columns.

32. on portable electronic hardware devices, MAIN/LIST PAGES: FIT SCREEN—if currently in Portrait mode and if the columns do not fit into the screen using the current font size, TYPE and SCOPE columns are eliminated in display to make the fit and if necessary font size is adjusted, if currently in Landscape mode, all columns are displayed and font size is adjusted automatically if needed to fit into the screen. No column elimination is done.

33. on ARTICLE PAGE: FULL PAGE—enlarges the article page to full screen 34. on ARTICLE PAGE: FIT PAGE—brings the article page to original size 35. all screens, there should be a way to go back to the screen where the user came from (back button, close button, etc.)

36. user should be able to access Pulldown menu to select different display options. For example, user should be able to change font sizes using pulldown and change font and background color using pulldown 37. title section at the top for Theme/Category/Article names (fixed/non-scrollable)

38. New (N) CAT/ART and NR CAT/ART are always highlighted, until they become F, DS, or R (Read)

39. CATEGORY/LIST PAGE: Data presentation using columns in the middle that is scrollable 40. CATEGORY/LIST PAGE: If the data does not fit into screen, it can expand to the right so that it can be scrollable to the right, or display changes to landscape/horizontal to show all columns. User should also have an option to display limited data such that the data displayed fits into the regular screen without scrolling. This can be accomplished by SHOW ALL, FIT SCREEN buttons/pulldown menu.

41. ARTICLE PAGE: Data presentation using a regular text page in the middle that is scrollable 42. titles on each column should be highlighted (fixed/non-scrollable)

43. the main navigation on the screen is through arrows at the top and folder buttons at the bottom (fixed/non-scrollable)

44. navigation is also achieved through
   1. clickable special buttons like RATE CAT, FOLLOW CAT, RATE ART, etc. (fixed/non-scrollable)
   2. check boxes like AF, DS, or AF/DS buttons, etc. scrollable
   3. clickable links such as Theme name, Category name, Subject name, user name in data columns 45. for ARTICLE PAGE: navigation is achieved through NEXT and PREVIOUS article buttons 46. default buttons/selections should always be highlighted in different color/shade 47. User can enter and search keywords on a page using a Find function, (<=, =>)

48. user can Scroll on a text page using a scroll bar on a side

49. Message box on a screen displays messages to user (this box is shared between message box and Find function)

50. after each sort of columns by the user, system remembers the last one and display data using that sort until it is changed by the users 51. similarly, system remembers the last selection through the Display pulldown menu until it is changed by the user 52. PERSONAL MAIN SCREEN
   1. All PRI categories (PRI/MPRI) are displayed in PERSONAL FOLDER
   2. MPUB categories displayed in both PERSONAL FOLDER and CATEGORY FOLDER
   3. No PUB category is displayed in PERSONAL FOLDER
   4. No PRI category is displayed in CATEGORY FOLDER
   5. Clicking on a category opens up a screen similar to the CATEGORY LIST screen
   6. Then, clicking an article opens up a screen similar to the CATEGORY ARTICLE.
   7. Clicking on a personal message in INBOX opens up a screen same as the CATEGORY ARTICLE.

Electronic hardware device can be portable or non-portable. In this document, some examples are given using a portable electronic device, for example, iPhone.

How CAT/ART Goes from N to R Status
   1. if CAT with a Status N Opened by iphone User>## sec (some constant time)
      1. Then, Change CAT Status from N to R
   2. if ART with a Status N Opened by iphone User>## sec (based on an equation using the number of words in the article)
      1. Then, Change ART Status from N to R How Timer is Used to Track Usage
   1. Every time a THEME is Opened, start THEME timer
      1. Every time a THEME is Exited, stop the THEME timer, and record
   2. Every time a CAT is Opened, start CAT timer
      1. Every time a CAT is Exited, stop the CAT timer, and record
   3. Every time a ART is Opened, start ART timer
      1. Every time a ART is Exited, stop the ART timer, and record
   4. Every time user clicks on CATEGORIES folder, start CATEGORIES timer, and sop any other folder timer and record
   5. Every time user clicks on TOP USA folder, start TOP USA timer, and sop any other folder timer and record
   6. Every time user clicks on FAVORITES folder, start FAVORITES timer, and sop any other folder timer and record
   7. Every time user clicks on PERSONAL folder, start PERSONAL timer, and sop any other folder timer and record
   8. Every time user clicks on SEARCH folder, start SEARCH timer, and sop any other folder timer and record How Users are Selected which Sponsor Message to Receive
   1. sponsors can send private message once a day per CATEGORY that they are sponsoring. Each category can have maximum of 1 sponsor.
      1. to those user who agree to receive private messages from sponsors, or
      2. to those users who have not blocked the sponsor sending a message by selecting DS for that particular sponsor, or
      3. to those users who have selected sponsor as AF (favorite)
      4. then use the following rule (top categories calculated daily);

1. if user agreed to receive 3 private sponsor messages
   1. and if the sponsor category is one of the top 3 categories that the user is participating
2. if user agreed to receive 5 private sponsor messages
   1. and if the sponsor category is one of the top 5 categories that the user is participating
3. if user agreed to receive 10 private sponsor messages
   1. and if the sponsor category is one of the top 10 categories that the user is participating
2. if user is a SPONSOR, then user is enabled to select a user list named SPONSORLIST_CATID on PRI MESSAGE screen (FIG. S7C), which contains list of user who have agreed to receive private message from sponsors, and users who did not block the sponsor by selecting DS for that particular sponsor. The SPONSORLIST_CATID is valid for the particular Category that the sponsor is sponsoring. Once the private message using SPONSORLIST is used by the sponsor in a given calendar day, the selection is disabled until next calendar day.
3. sponsor also has the option of posting one sponsor message in their category, but no limit on messages as a user. Sponsors will have an option to indicated if the message that they are posting is their sponsor message or a message as a general user (see FIG. S3H2). Once sponsor use their sponsor message, then the sponsor message selection is disabled until the next calendar day.

Summary of an Example Implementation of the Command "ADD NEW CATEGORY"

1. user fills out the form
2. iphone request upload to admin during sync
3. if public, an ID is issued to the NEW category and included within Theme during sync back to iphone
4. if private, it is added to the Personal folder during sync back to iphone
5. all invited are sent a message to their personal folder INBOX by the system (for subscribers)
6. all invited sent an email message by the system (for non-subscribers)

Add Category Detail Steps:

1. user clicks on category name field
   1. user enters category name, as name is entered, which is empty as default (user can copy/cut/paste in this text box)
   2. iphone program checks for category name rules for validity (for example all capitalized first letters, limited characters like - and /, and numbers) and provides immediate feedback guiding the user for appropriate characters
   3. if number of characters in the category name is more than accepted, provides an immediate feedback
   4. if user selects another field other than selecting PRIVATE or PUBLIC buttons, a warning is given to the user one must be selected before proceeding.
2. user MUST click on PUBLIC or PRIVATE button, where only one of them is selectable and highlights the selected one (initially neither buttons are highlighted, but selectable)
   1. if user changes the selected one, for example from PRIVATE (highlighted) to PUBLIC (unhighlighted) to PUBLIC (highlighted), then program automatically unhighlight the PRIVATE button.
   2. program stays in this routine until a selection is made
      1. if user tries to click on any other field on screen, a message is displayed to user to request them to make a selection first before proceeding.
   3. when user selects another field (indicating user is done with entering category name and made the PUBLIC/PRIVATE selection), iphone program checks for category name duplication, if exist provides an immediate feedback
      1. if PUBLIC was selected, iphone program calls a routine to connect to the web system and check system database for the category name duplication.
         1. if category name is duplicate, provide a list of alternative category names that may be close to the one entered so that user can select from.
      2. if PRIVATE was selected, iphone program checks the iphone database so that there is no duplication of category name
      3. if category name is okay, a check mark is shown next to the name, if not an immediate feedback given showing the duplicate name
      4. if category name is not okay, a warning is given to the user and the cursor goes to the category name field, and process repeat from step 1.1 above.
3. user may create a new list
   1. user clicks on "create or update userid . . . " space, which is empty as a default (in this box, as in all text boxes, user has the ability to copy/cut/paste, etc.)
      1. program turns "delete" button off/un-selectable and "save" button on/selectable
   2. user enters userids separated by comma
   3. iphone program checks for userid name rules for validity (for example all capital letters, limited characters like - and /, and numbers, and number of min/max characters in a userid), checks for comma separating userids and provides feedback immediately
   4. iphone program checks for valid email (like @ sign, .com/.net, etc.) and provides feedback immediately
   2. user enters a new list name
      1. user enters a list name, which is empty as a default
      2. iphone program checks for valid list name (like number of characters, duplicate names, etc.) and provides immediate feedback
      3. user clicks on save and iphone program calls a routine to connect to the web system and check system database for the userid name exist and correct.
         1. if any userid is not correct, provide a list of userids that may be close to the one entered so that user can select from.
      4. if user clicks on any other button, iphone program warns user to save their list, but provide an option to save or cancel the creation of list.
4. user may update or delete a list
   1. user clicks on pulldown menu to select a name from the list, which is empty as a default
   2. when a list name is selected, all the userids and emails saved in this list are displayed on the "create or update userid . . . " box
   3. user may click on "delete" button, in that case a message is displayed to confirm that list will be deleted. Once it is confirmed, list is deleted and an empty list box is displayed. Here user may go to step 3 or 4 above.
   4. user may update the list by clicking on the "create or update userid . . . " box.
      1. user may delete userid or email from the list
      2. user may add a userid or email (procedure is same as step 3 above.
      3. if user clicks on any other button, iphone program warns user to save their list, but provide an option to save or cancel the updating the list.
5. user selects a list using pulldown, or enter one or more userid or email, separated with comma.
   1. as userid and email is entered, iphone program checks if they are valid as described before 6. Category name is shown in the invitation message (a check mark next to the name indicates it has been validated)
7. user enters message to the message box
8. user clicks "done" button,
   1. all data is verified and saved in iphone database, we create a queues (for email and userids) in iphone to send the message to all invited people
   2. if category name and userids have been verified and correct,
      1. email que information is passed to the web system immediately through sync, and through web system, message goes to their email address, (we use special templates with additional information and link about the application to these users for them to subscribe to the application)
      2. userid queue information is passed to the web system immediately through sync, and through web system message goes to iphone application inbox of users (we use special template for this purpose, where user will have the option to accept or decline the invitation)
      3. screen is closed
9. user can click the "cancel" button any time to cancel the creation of the new category. User is displayed a message asking to confirm that they would like to cancel. If they click "okay", the category is cancelled.

Sync Summary

As the portable or non-portable electronic hardware device is used, all activities related to communication and management of content is captured and stored in local database. Then this content is loaded into the main system database. As content, activities, statistics, etc. are collected and aggregated, it is then distributed back to the user's electronic hardware device. This process of uploading data from user electronic hardware device to the system database and back downloading to the user electronic hardware device is described here is synchronization (sync).

Electronic hardware device can be portable or non-portable. In this document, sync process summary is given using a portable electronic device, for example, iPhone. See also FIG. 4 for an example sync process using iPhone.

sync can be initiated when the APPS (application software) is opened, periodically by iphone, and/or manually initiated by the iphone user
    iphone to web; (manually by user or auto)
    sync starts auto when the application software is opened
    sync starts auto periodically based on timer set in SETTINGS
    sync starts manually, for example based on user clicking SYNC DATA NOW button
    sync starts automatically after there is a specific user action, like;
    post/reply/forward CAT/ART, send PRI message, share, tell, refer, suggest, report
    web to iphone; (by Admin/system)
    I want data
    I have data
    I want to stop sync
    I want to erase data
    I want to restore data
    I want to check Local Time
    I want to check location
    I want to change email
    I want to change password, etc.
    after transfer of data in both ways, there are other tasks run, or initiated by the sync, before exiting in, for example;
    in iphone: initiate change in status of CAT/ART N to NR
    in system/Web: send/perform tasks like post, reply, share, email, etc.
    in system/Web: update statistics like Credits for user before transferring to iphone General Sync Rules Check if APPS is Open,
if YES, Do NOT Sync during APPS is Open
Unless, Manually Requested by the iphone USER
Unless, Manually Requested by the Admin (for example, in cases where iphone is stolen and Admin is checking the location, or erasing data)
if NO,
First, Sync iphone to Web, AND Update Stats
Next, Sync Web to iphone
keep track of last sync date/time, and keep track of date/time when Application was last used. Then,
when a new time based automatic sync starts, and if Apps was not opened since the last sync, then no upload from iphone to web is needed, and download new category and articles and statistics from web to iphone.
sync web to iphone;
Download new Category if system Category ID #>iPhone Category ID # in a Theme
Download new Article if the system Article ID #>iPhone Article ID # in a Category
sync automatically when there is a specific user action, like;
post, reply, forward, share, tell, refer, suggest, report, send PRI message
After Apps Downloaded First Time. During the Sync
Check user Agreed to USER TERMS
Check user filled out email, userid, first and last names
Check user email and userid are unique
Check if user selected Sponsor and verify with the system
Check user's email address and compare it with the emails list of current user recommend/to Id/invited/etc.
if YES, give credit to current user
Some Logic for the Sync
if APPS Last Close D,T (Date.Time)>Last Sync D,T
(meaning APPS was opened by the user after the last sync with the iphone)
Then, perform Sync both ways (iphone to Web, and Web to iphone)
if APPS Last Close D,T<Last Sync D,T
(meaning APPS was not opened by the user after the last sync with iphone)
Then perform Sync Web to iphone only.
When Exiting APPS, mark APPS Last Close D,T
When Current Sync Completes all of its tasks, Update Last Sync D,T before Exiting
How CAT/ART Goes from N Status to NR Status
if APPS Last Close D,T (Date.Time)>Last Sync D,T
if CAT/ART Status is N, AND
if Current Sync D (Date)> OR=Last Sync D+1 (meaning it has been a calendar day after the last sync, for example like 12:01 AM, right after midnight and the date has increased by at least one, for example from 03, Tuesday to 04, Wednesday. NOTE: for this function to work properly, we need to use the Local Time, and that means before we do any sync operation, we need to find out the Local Time. I think this can be done by finding the location of the user.)
Then, CAT/ART Status changes From N to NR (however, CAT/ART still stays highlighted)

Download Cat and Art from Web to iphone
For a Theme,
if Biggest Web CAT ID #>Biggest iphone CAT ID #,
Then, Load CAT to iphone AND Mark it NEW
For a CAT,
if Biggest Web ART ID #>Biggest iphone ART ID #,
Then, Load ART to iphone AND Mark it NEW
CAT ID # starts from 1 and increases by 1 every time a new CAT is added to a Theme
ART ID# starts from 1 and increases by 1 every time a new ART is added to a Category
Some Checks Will be Done
if MANUAL SYNC is ON in iphone, AND
IF Last Sync D>CD-# (# could be any constant like 7, CD is Current Date),
Then send a Warning email to User/Admin/Customer Support (perhaps the user forgot to turn on the sync or forgot to manual sync!)
if Last APPS Close D>CD-7
Then send a Warning email to User/Admin/Customer Support (perhaps user needs help to get going!)
Some Comments on Implementation of Sync
sync structure may be implemented using queues;
data stored in queue in iphone for each data to be stored in web
sync program passes/extracts data from queue as FIFO
as all data extracted, queue is cleared
If user opens the application, during a auto sync (display a message that a sync is in progress), and
complete ALL the sync functions (iphone to web and web to iphone)
in some cases, it is possible to just complete iphone to web and stop.
Things that Sync Will Need to Transfer from iphone to Web System:
 1) Any Change in SETTINGS
  1) USER SETTINGS
  2) USAGE SETTINGS
  3) SPONSOR SETTINGS
  once approved user cannot change USERID, EMAIL, FIRST, LAST NAME.
 2) Any new Content or Stat
  1) READ (ART or CAT)
  2) FAVORITE (ART OR CAT)
  3) DS (ART or CAT)
  4) FOLLOW (USER or CAT)
  5) BLOCK USER
  6) POST, REPLY, or FORWARD (CAT)
  7) SEND PRI MESSAGE (PERSONAL)
  8) REPLY or FORWARD (PERSONAL)
  9) RATE (CATEGORY, ARTICLE, or USER)
  10) SHARE (EMAIL, TEXT MESSAGE, t, f, OR l)
  11) TELL, REFER, SUGGEST, REPORT
  12) READ SPONSOR MESSAGE (CAT)
  13) READ SPONSOR MESSAGE (INBOX)
 3) Any new
  1) CAT (PUB OR PRI)
  2) INVITE
 4) Any new Theme SETTINGS
 5) Any new Status changes (CAT or ART)
Things that Sync Will Need to Transfer from Web System to iphone:
 1) New CAT OR ART
 2) CREDITS
 3) Stats (Numbers, RATING, or RANKING) (THEME, CAT, ARTICLE, or USER)
 4) New or Updated INFO PAGES
 5) Program Update
 6) PERSONAL Folder Info
 7) Special ADMIN Commands
  1) Erase (DATA and INFO)
  2) Update USER EMAIL or PASSWORD
  3) Get Location INFO
Admin general—FIGS. 27-39 and FIG. 53.

FIG. 27 shows the conceptual hierarchy of the data for categories and articles and type of data/information being stored for each category and article. Top diagram is the main menu that may be available to admin for interface. Below that are the category and article representations.

ADMIN screens (FIG. 28 through FIG. 39) describes the general functionality and user interface for administrative work. This is where content and user related work is controlled by the administrators. All the tabs are based on a selected Theme. For most tabs it is possible to select "ALL" in THEMES pulldown menu, instead of a Specific Theme to display information for all themes combined. For many of the columns, the filtering capability enables admin to display ALL or only the selected set of information. In addition filters, keyword search capability can be used to locate any information.

PRODUCTION LIST screen (FIG. 28) displays all the articles in production area ready to be downloaded to user electronic hardware devices during their next sync. PRODUCTION CATEGORIES screen (FIG. 29) display the categories in production, however administrator can select a category name to see the list of all articles in production within that category. Basically, in Production Categories, admin is looking at the same information as in the Production List, except it is presented differently.

HOLDING STAGE screen (FIG. 30) is where all the articles and categories that were either created by the admin or imported in get ready to be move into the production stage. Admin can add categories or articles by clicking on ADD ART/CAT button. When it is added by the admin, category will have a class NP (none personal), and both article and category will have their rate and rank set to null, author will designate Admin, and date/time will reflect the date/time that the article or category was added by the admin. Admin also can import articles to the holding stage by clicking the IMPORT ARTICLES button, which opens up a dialog box with browsing capability to locate the file to be imported. A common format, like comma delimited text file can be used for the importing of articles. Creation date and time are also expected to be imported along with the content. When an article or category created by a user, they will also have null rating and ranking information. However, the creation date and time will reflect the actual date time that they were created by the user in their electronic hardware device. When MOVE TO PRODUCTION button is clicked, all the articles selected will be moved into production. When moving to production stage, all categories and articles will be assigned an ID automatically by the system based on their creation date and time. IDs will be generated in increments of one from the last category or article that was already in production. Once the articles and categories are moved to production stage, they are removed from the holding stage. Note that when an article or category is deleted, they go into "deleted" status, but are not removed from the list. However, those deleted cannot be moved into the production stage. Admin can also edit any category or article information by clicking on the ARTICLE NAME or CATEGORY NAME.

SUBMIT STAGE screen (FIG. 31) shows all the articles and categories submitted by users that requires admin attention. Here, number of checks performed by the administrator, before moving them to the holding stage.

Typically, an article submitted by the user will be copied from the user electronic hardware device to the system database. Then, after processing by the system, the article may be included in the Submit Stage or in the Production Stage (See FIG. 52). Here is control logic behind processing the articles;

1. NEW ARTICLE: if user is "okay" box is checked, article has no offensive words, article is moved into the PRODUCTION STAGE automatically with no changes.

2. NEW ARTICLE: if user is "okay" box is checked, but articles has 1 or 2 minor offensive words, offensive words are modified or deleted automatically by the system using an OFFENSIVE WORD library, and article is moved into the PRODUCTION STAGE, a warning message goes to user inbox for the use of offensive words. If user had three articles with offensive words, the user is "okay" box is automatically unchecked by the system. Accept/Reject column indicates if the articles was accepted or rejected. Otherwise this column shows a question mark, indicating it requires admin attention.

3. NEW ARTICLE: if user is "okay" box is checked, but article has more than 2 offensive words or any non-minor offensive words, article is moved into the SUBMIT STAGE. Admin may replace offensive words using the OFFENSIVE WORD library and move article to PRODUCTION STAGE, or reject the article and send a message to the user inbox with a warning. If user had three articles with offensive words, the user is "okay" box is automatically unchecked by the system. Accept/Reject column indicates if the articles was accepted or rejected. Otherwise this column shows a question mark, indicating it requires admin attention.

4. NEW ARTICLE: if user is "okay" box is not checked, article is moved into the SUBMIT STAGE. After review, if exist, admin may replace offensive words using the OFFENSIVE WORD library and move article to PRODUCTION STAGE, or reject the article and send a message to the user inbox with a warning. Accept/Reject column indicates if the articles was accepted or rejected. Otherwise this column shows a question mark, indicating it requires admin attention.

Then, in Submit Stage, admin can select the Accepted articles and move them to production by clicking on the MOVE TO PRODUCTION button. Articles that moved into production stage are removed from the SUBMIT STAGE. Note that moving article to production stage involves creation of unique ID automatically by the system based on the creation date and time. Rejected articles or articles that have question mark in their Accept/Reject column cannot be moved to production until they become accepted.

For handling categories, following control logic is applied:

1. NEW CATEGORY: if the new category is a private one (PRI), category is moved into the PRODUCTION STAGE automatically with no changes.

2. NEW CATEGORY: if the new category is a sponsored one (SPO) or a public one (PUB), category is moved into the SUBMIT STAGE with a question mark in Accept/Reject column requiring admin attention. Admin checks the proposed category name by clicking on using CHECK OFFENSIVE WORD button which uses an OFFENSIVE WORD library, and checks for category name duplication by clicking on the CHECK DUPLICATE NAMES button. In case of offensive word or duplication of names, admin may reject the proposed category. System also provides a dialog box with a list of categories that has a name that is close to the propose category name, as well as those that has similar category type and scope. If admin determines that there is already a category that is similar to the proposed category, admin may reject the proposed category. A message is sent to the user indicating that the proposed category has been rejected with the reason.

If the proposed category is accepted, a message is sent to the user indicating the acceptance of the proposed category. The accepted category is then moved into the production stage by clicking on the MOVE TO PRODUCTION button.

CURRENT USERS Screen (FIG. 32) contains all the user related data for viewing. When needed, admin can make changes in the user data. This is the screen where Admin can check or uncheck the user okay and sync okay boxes, user okay box is used in article submission process, and sync okay box is used when there are registration or subscription issues with the user.

Within the Current Users screen, the pulldown menu, SPECIAL CONTROL, enables admin to execute special commands that can be executed during sync.

Special Control capabilities includes:
admin can to send messages to any user through their INBOX
admin can request download of all user information from iphone
admin can request delete of all user information and Personal folder information
admin can request location information
admin can restore users last synced information back to iphone
admin can change web or iphone users, like from user to sponsor, etc POTENTIAL USERS Screen (FIG. 33) contains list of emails and names submitted by the current users. Whenever a current user submits first time a referral for a user, or told about us to another user, or invite another user, message is collected from the electronic hardware device by the web services during sync and processed automatically and sent to those potential users. The original message includes comments by the user as well as messages and links from the system. The email format is a predetermined template. For follow ups with the potential users, admin may send additional messages using this Potential User screen.

When the R/T/I (Referred/Told/Invited) column is clicked, the content of the message sent is displayed. To edit the R/T/I templates, user selects the R or T or I from the R/T/I TEMPLATE (default none or blank) column and clicks on EDIT TEMPLATE to view and edit the content. Admin can also create a new custom template, name it and send a message to the potential user using the saved custom template.

After the first automatic system message to the potential user, STATUS shows NEW. After another message is sent to the potential user by the admin, status is changed to ACTIVE. When a user is registered, system checks their name and email against the potential users list. If there is a match, the original user that submitted the potential user contact information gets a credit, and the potential user's status is changed to CONVERTED. In some conditions, admin may delete the potential user contact information. The contact information actually stays in the list, but the status is changed to DELETED.

CANCELLED USER screen (FIG. 34) display a list of users who have cancelled their registration. This screen is similar to the screen for POTENTIAL USERS screen with capabilities to send messages to the cancelled users.

INFO PAGES screen (FIG. 35) contains all the info pages for each screen on user electronic hardware device. Info pages are synced with electronic hardware device every time there is a change in any info pages. This is controlled by the info page version.

All info pages are in reality a single page. However, links are provided from every screen to the info page sections such that when a user clicks on info button on any screen of the electronic hardware device, appropriate section of the info page is displayed on screen. User can scroll up an down to read that section or any other section in the info pages. Admin can navigate to specific screens of the info pages using the navigation provided in this INFO PAGES screen.

When a new screen is created by the programmers, a corresponding info page appears here on the INFO PAGES tab of ADMIN interface under the NEW PAGES AND OTHER SCREENS columns. Or when a program update was made to any given screen which requires a updated documentation, it shows up under UPDATED PAGES column. In both cases a flag is set by a program on these columns, which requires info page to be updated or written.

PROBLEMS AND SUGGESTIONS screen (FIG. 36) contains user feedback. Admin interface is similar to the POTENTIAL USERS screen, where admin can follow user suggestions and problems and communicate with the users.

REGULAR CONSTANTS screen (FIG. 37) contains all the constants that determine the amount of credit a user will receive based on the action that they would take. Admin can make changes to these constants.

SPONSOR CONSTANTS screen (FIG. 38) contains information about the sponsors as well as the additional constants that are used specifically for that sponsor, and some general information about the category and usage. Columns are editable and admin can enter new sponsors as needed and save the information. As the sponsor registers to the system through their electronic hardware device, their registration will be checked against the information on the SPONSOR CONSTANT screen to allow certain capabilities that only sponsors can have.

RELEASE VERSION screen (FIG. 39) contains all the different release information and a list of fixes for that version for a given theme and for a specific user electronic hardware device.

SPECIAL SETUP SCREEN (FIG. 53) enables admin to setup access capabilities to different users for different screens of the admin user interface. Any user with access to any admin capabilities will require a userid and a password to access.

Electronic hardware device can be portable or non-portable. In this document, some examples are given using a portable electronic device, for example, iPhone.

Start Page
1.—if a new Theme is subscribed, ask user if;
1.—Personal folder should be shared or create a new one specific to this Theme
2.—MyPRIList should be shared
3.—Blocked user list should be shared
4.—Follow Userid should be shared
5.—user settings should be shared
6.—usage settings should be shared
Sort Columns
2.—sort alphabetically, numerically, or date, two ways
3.—sort dates from newest to oldest (default) or oldest to newest
4.—sort numbers from high to low (default), or low to high
5.—sort alphabetically from A to Z (default) or Z to A
6.—after sort, categories or articles with DS are always at the bottom
7.—case insensitive
Add Favorite Screen
8.—either type in a new category name or select from a list using the pull down menu
9.—or, instead of pull down, as new category names entered, it show below for selection on a scrollable page
Rate Screen
10.—it is used either for CATEGORY, ARTICLE, or USERID
11.—depending on the button clicked like RATE CAT, RATE ART, RATE USER, all the data and labels are displayed accordingly
12.—rating buttons all unhighlighted at the beginning and when clicked it is highlighted. only one can be selectable
13.—userid doing the review is entered automatically
14.—user selects rating, enters comments, selects if user wants to have this info be sent as a message to his/her RATE-BOX
Share Screen
15.—share screen is used for sharing this message with people outside the system
16.—user can share in five different ways; EMAIL, TEXT MESSAGE, FACEBOOK, TWITTER, & LINKEIN
17.—depending on the selection, a new screen will be presented which may require userid and password to login
18.—LIST BUILDER is a capability for user to build lists that contain EMAIL addresses, and save/delete and use them later
19.—user can instead enter one or more EMAIL addresses without entering them into the list builder
20.—for text messaging, one or multiple phone numbers can be entered
21.—user can enter the message in a scrollable page above the original message
22.—the original message is also in a separate scrollable page
23.—when user clicks SEND, the new and original messages are sent and screen stays so that user can share it using other methods as well
24.—all messages include standard template, providing information about the application and the theme
25.—when user clicks CLOSE, screen is closed and user is taken back to the page that they clicked the SHARE button
Reply-Post Screen
26.—user selects either REPLY or POST
27.—when REPLY is selected, SUBJECT starts with REP: and cannot be changed.
28.—when POST is selected, user can enter a SUBJECT name
29.—user then enters the message in a scrollable page
30.—the original message is displayed on this screen as a reference only, which is also in a separate scrollable page, but is not posted to the category
Forward Screen
31.—user selects either USER or CATEGORY to forward the message
32.—when USER is selected, LIST NAME can be selected for list of USERIDs or enter one or more USERIDs
33.—when CATEGORY is selected, a category name is entered or selected from a category list
34.—when USER is selected and user clicks SEND, the new and original messages are sent to the INBOX of USERID or list of USERIDs, and screen stays so that user can forward it to other users or category as well
35.—when CATEGORY is selected and user clicks SEND, the new and original messages are posted to the CATEGORY and screen stays so that user can forward it to other users or category as well Update Invitation Screen 36.—currently invited USERID, List, and EMAILS are shown 37.—using the ADD button, user can add additional USERID, List and EMAILS, or 38.—using the REMOVE button, user can remove one or more USERID, List, and EMAILS 39.—after clicking ADD or REMOVE buttons, screen stays so that user can add or remove additional people 40.—message box shows messages after each action, like additional people added or removed Add Category Screen 41.—user must select either PRIVATE or PUBLIC 42.—LIST BUILDER is a capability for user to build lists that contain USERID or EMAIL addresses, and save/delete and use them later 43.—user can instead enter one or more USERID or EMAIL addresses without entering them into the list builder 44.—user selects the CATEGORY CLASS, TYPE and SCOPE from the pulldown menu Inbox Article Screen 45.—REPLY—sends a message back to the USERID that sent the original message, user has option to include the original message 46.—FORWARD—sends a message to another USERID Search Screen 47.—if SEARCH was clicked from MAIN page, then SEARCH CAT is automatically displayed in pulldown menu in SEARCH screen. But user can change it through pulldown menu.

48.—if SEARCH was clicked from ARTICLE page, then SEARCH ART is automatically displayed. But user can change it through pulldown menu.

49.—user can save any search setup by typing a new search name, and re-use it by selecting it using the pulldown menu.

50.—user must select either CAT for Category, ART for Article, or USER for User search 51.—user can search either the current page where the SEARCH button was clicked, or all the pages in the database.

52.—user can select either CATEGORY TYPE "ALL" or only one of the Types from the pulldown menu.

53. After searching for CATEGORY, result page is similar as the CATEGORY MAIN page clicking on category in this page opens up a CATEGORY LIST PAGE, and clicking on an article opens up a screen same as the CATEGORY ARTICLE.

54. After searching for ARTICLE, result page is the SEARCH LIST SCREEN. Clicking on the article (SUBJECT) opens up a screen same as the CATEGORY ARTICLE. Clicking on the CATEGORY opens up the category screen using the CATEGORY MAIN page.

55. After searching for USER, clicking on the USERID opens up the PRI MESSAGE screen with the SEND PRI MESSAGE option highlighted.

Find/Message:

56.—This box is used for two purposes. Find is used to search keywords on the current page. As user types, keywords are displayed immediately. The forward and backward arrows are used to highlight the next or previous found keyword. In addition, this box may be used to display messages when there is a user action. Here are some examples of Find searches;

1. in MAIN PAGE: Category Name, highlights matching category names 2. in LIST PAGE: Subject Name, User Name, highlights matching subject or user names 3. in ARTICLE PAGE: any keyword in an article content is highlighted 4. in INFO PAGE: any keyword in info pages content is highlighted User Navigational Flow (on Portable or Non-Portable Electronic Hardware Device)

1. user registers and downloads the application 2. 1st screen is displayed (FIG. S1)

3. user is directed to USER RULES AND GUIDELINES page (FIG. S9L) in SETTINGS (FIG. 46)

1. user must review and accept USER RULES AND GUIDELINES (Figure S9L)

1. if user does not read and accept the rules and guidelines, user cannot go further and use the application is disabled.

2. once user accepts the USER RULES AND GUIDELINES, user is directed to TUTORIAL or SETTINGS main screen 3. on SETTINGS screen user can select either USER TUTORIALS or USER SETTINGS. All other links are disabled until user fills out the required information in USER SETTINGS screen 2. user may navigate to USER TUTORIALS to learn about the application 1. user is directed to USER SETTINGS or SETTINGS main screen 3. user must set up USER SETTINGS (FIG. 48)

1. if user does not fill out the required information on this screen, user cannot to to HOME screen (HOME screen is disabled until the required USER SETTINGS information is filled out)

2. once user fills out the required information and click on button SAVE, electronic hardware device initiates a communication (sync) with the main system and provides the user information for approval. System verifies unique USERID and EMAIL and registers the user. If USERID or EMAIL is not unique, user is displayed a message to change them until approved by the system.

3. once the system approves the unique USERID and EMAIL, all links in SETTINGS screens are enabled, and user can navigate within SETTINGS screens freely and also navigate to the HOME screen.

4. user is highly recommended to set up USAGE SETTINGS (FIG. 49)

Figure 23:
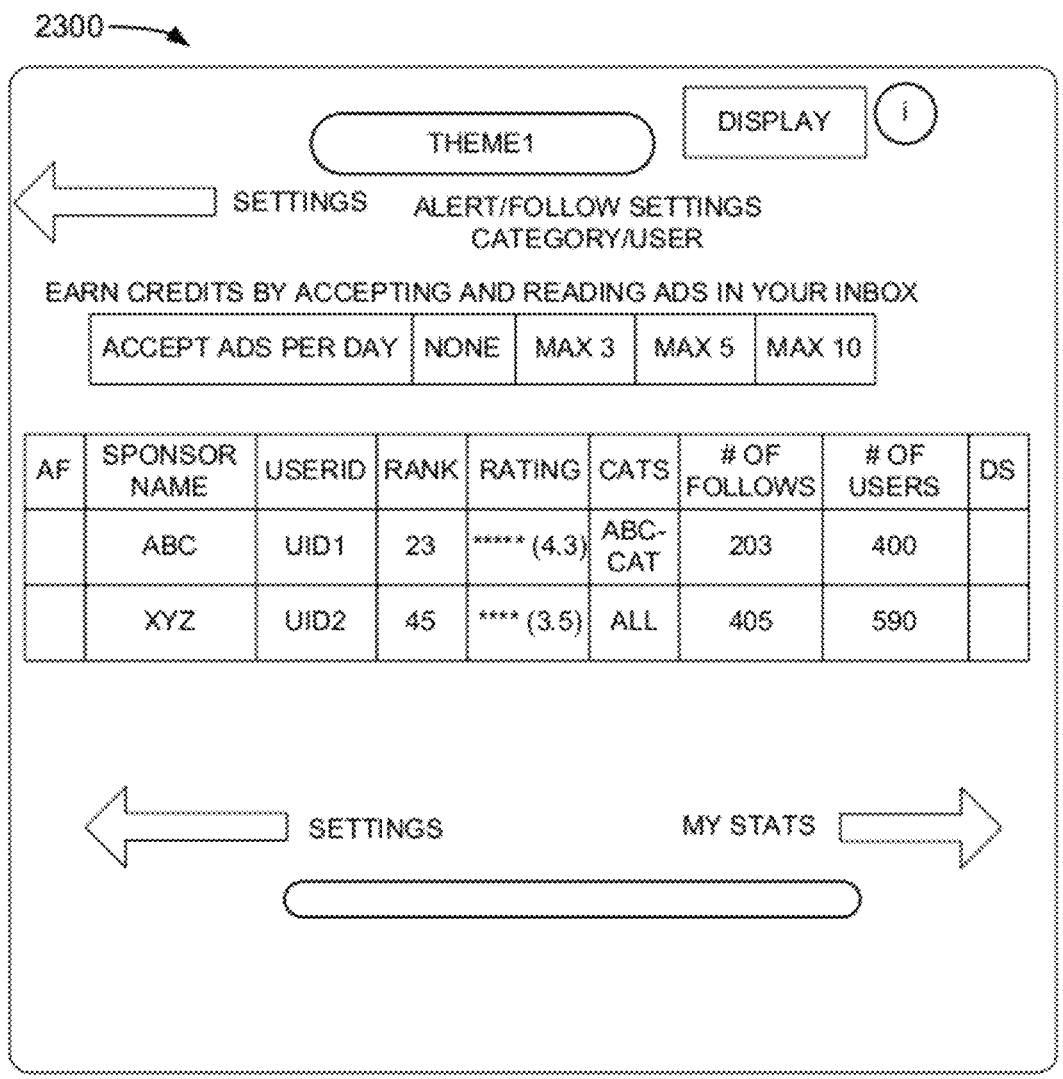

5. user may review and set ALERTS (FIG. 23)

Figure 16:
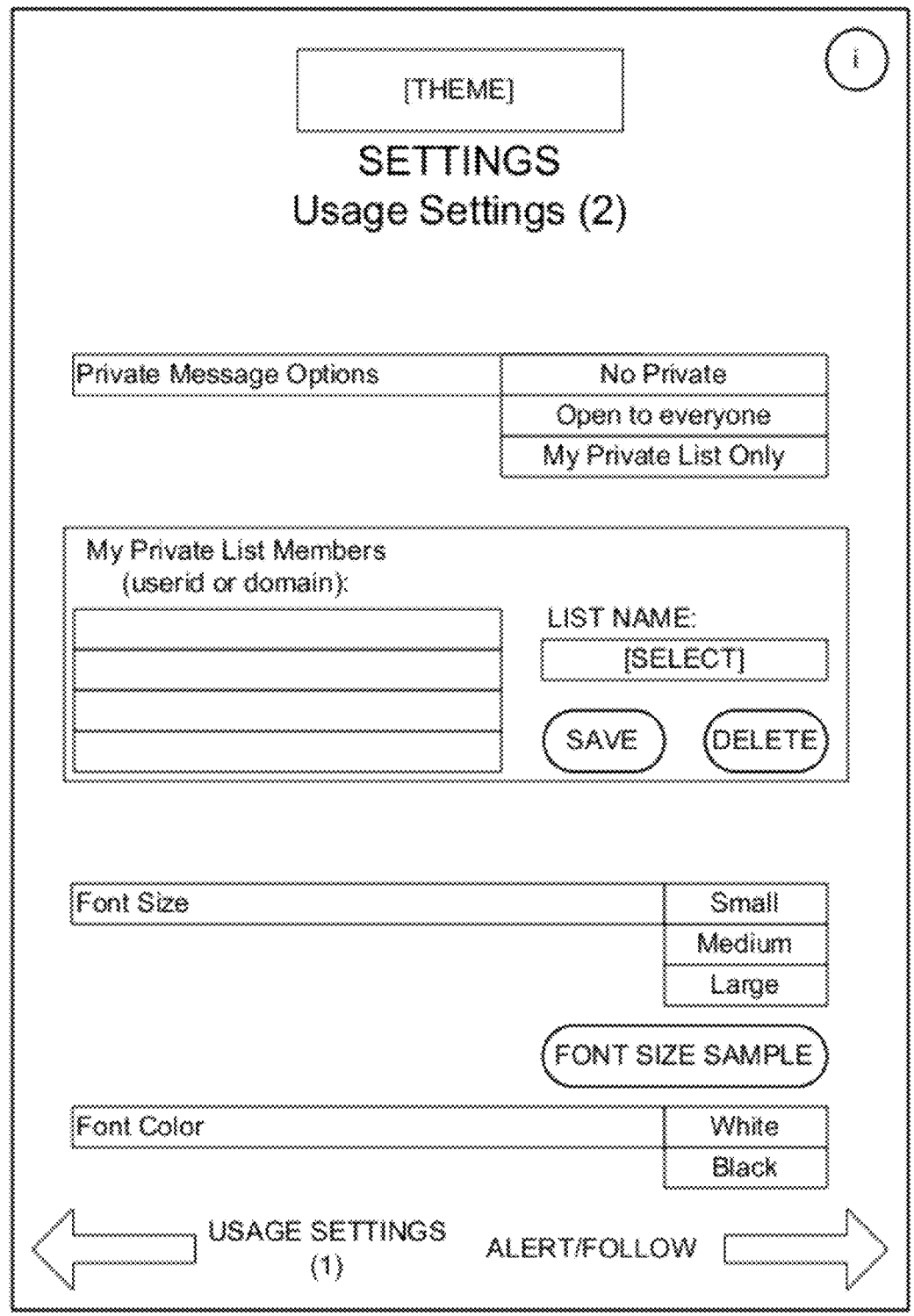

6. user may review status of CREDITS and how can earn more credits (FIG. 16)

7. user may review SPONSOR SETTINGS and make change (FIG. 44)

8. user may review STATISTICS (FIG. 50)

Figure 22:
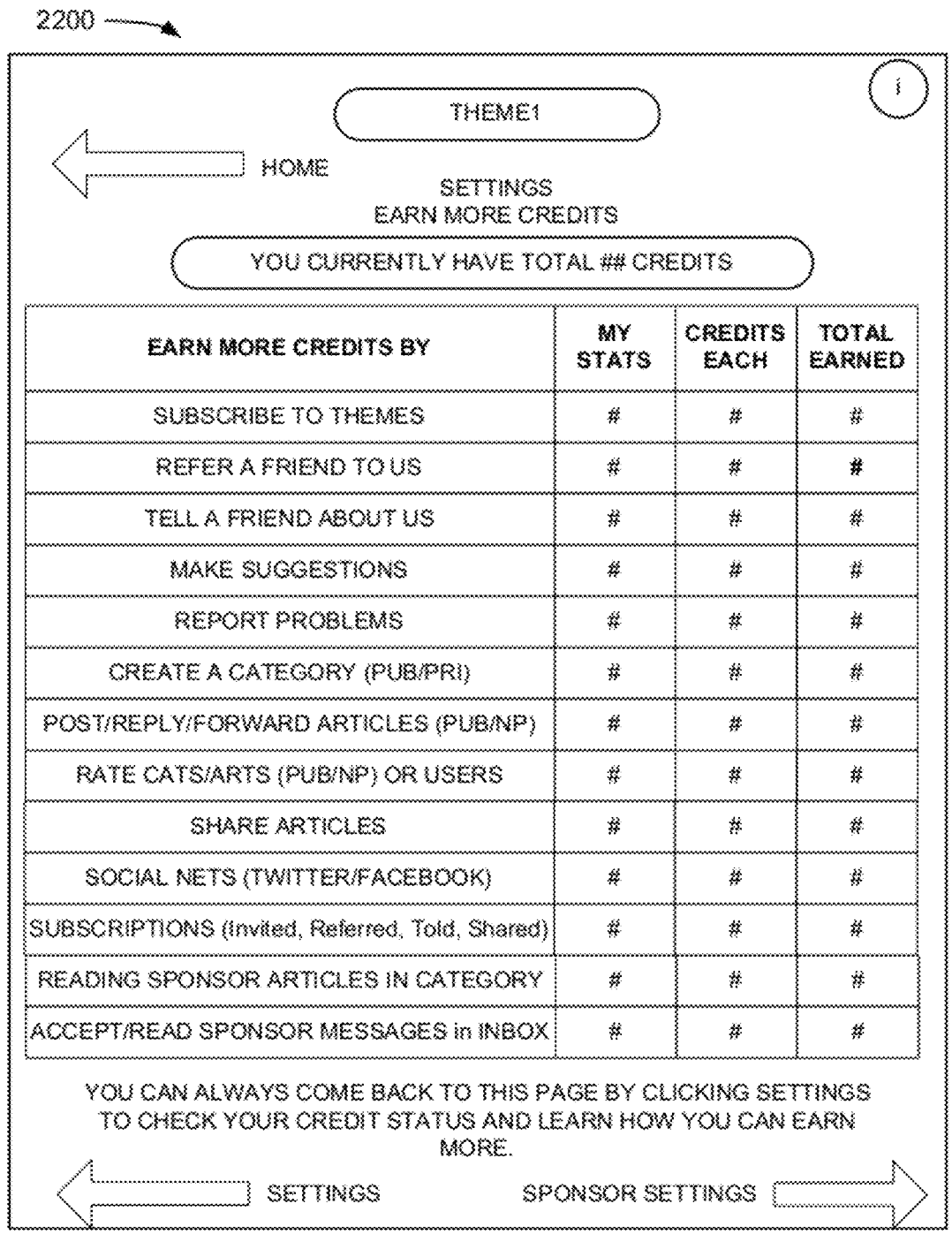

9. user may review VERSION information 10. through the main SETTINGS screen (FIG. 46), user can navigate within SETTINGS environment until they feel ready to move to the main application screen by clicking on the HOME link 11. default HOME screen is CATEGORY (FIG. 22). User can change the default screen in USAGE SETTINGS screen to TOP USA (FIG. S4B), FAVORITES (FIG. S5A), PERSONAL (FIG. 42) or SEARCH (FIG. 45) screens (also referred as C, T, F, P, S and Folders).

12. on all HOME screens (C, T, F, P, S), user has the option to go back to the SETTINGS screens.

4. CATEGORY Main, system default HOME, screen (FIG. 22)

1. user can navigate to START screen (FIG. 21) by clicking on START arrow link or by clicking on THEME name on top of the screen.

1. On the START screen user can navigate to any of the other Themes that user has already registered by clicking on the Theme icon, or user can click on any of the other Theme icons that user has not registered yet, and user is directed to the new Theme Signup screen. On the new Theme Signup screen, user is given information about the Theme, which user can continue with registration, or clicks cancel to go back to the START screen.

2. user may navigate to main SETTINGS screen by clicking on SETTINGS link top right of screen 3. user may navigate to INFORMATION pages (i) by clicking on (i) link at top right of screen 4. user may navigate between following links (Folders) at the bottom of the screen by clicking them
  1. CATEGORY screen (FIG. 22)
  2. TOP USA screen (FIG. S4B)
  3. FAVORITE screen (FIG. S5A)
  4. PERSONAL screen (FIG. 42)
  5. SEARCH screen (FIG. 45)

5. user may navigate to specific Category by clicking on the CATEGORY (CAT) NAME 6. user may navigate within the CATEGORY Main page by using buttons like TOP/BOTTOM (T/B) and using the FIND button at the bottom of the screen. User can also sort columns by clicking to the headers section of the column.

7. user may change the display characteristics of the screen by selecting an option from the DISPLAY pulldown menu.

8. user may navigate within the Category Main page by scrolling up and down by using a scrolling bar or by using a hand motion in electronic hardware devices that supports that capability.

Figure 14:

5. CATEGORY Lists screen (FIG. 14)

1. user can navigate to START screen (FIG. 21) by clicking on THEME name on top of the screen.

2. user may navigate to main SETTINGS screen by clicking on SETTINGS arrow link on top right of the screen.

3. user may navigate to INFORMATION pages (i) by clicking on (i) link at top right of screen 4. user may navigate between following links (Folders) at the bottom of the screen by clicking them
  1. CATEGORY screen (FIG. 22)
  2. TOP USA screen (FIG. S4B)
  3. FAVORITE screen (FIG. S5A)
  4. PERSONAL screen (FIG. 42)
  5. SEARCH screen (FIG. 45)

Figure 19:
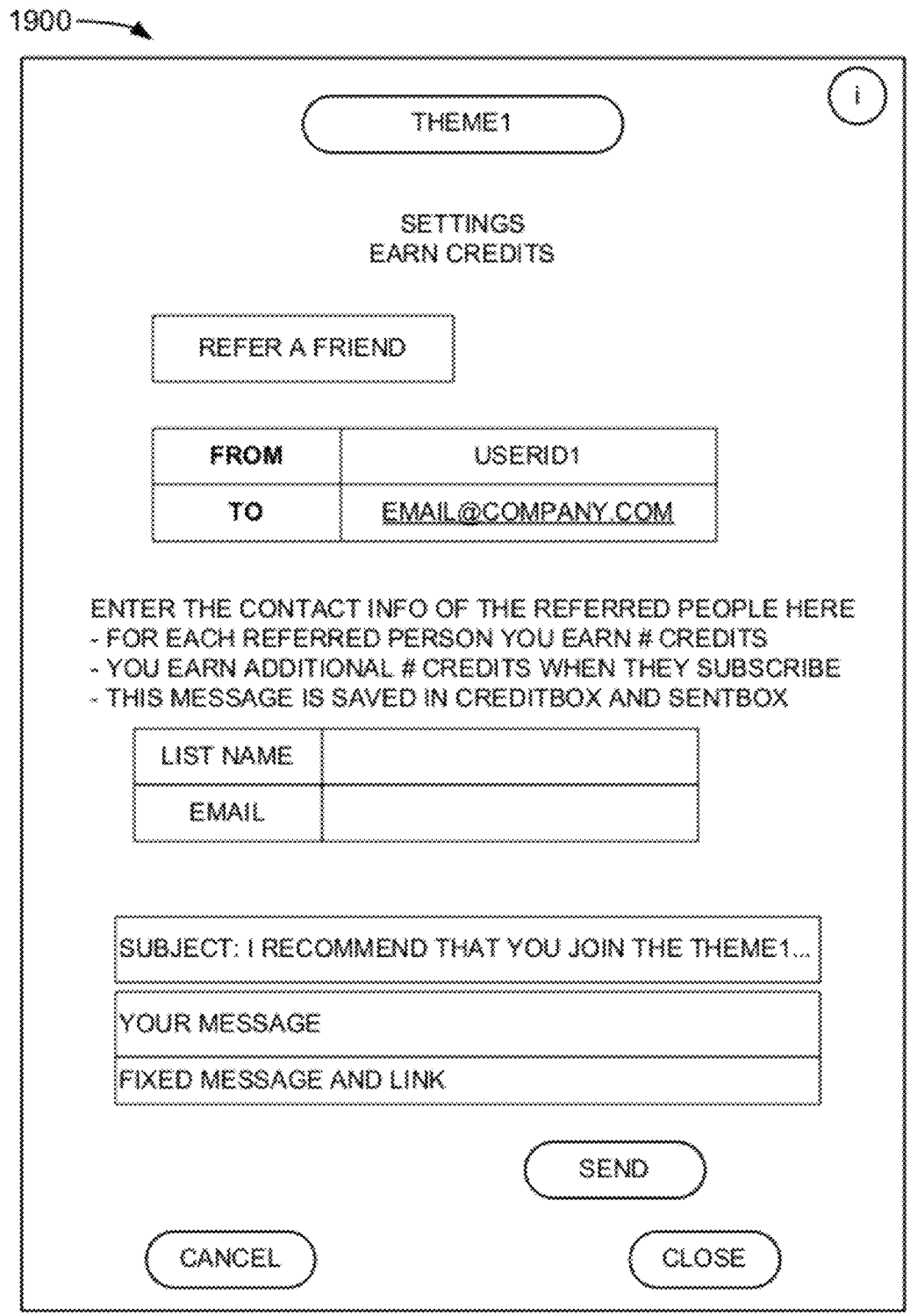
Figure 20:
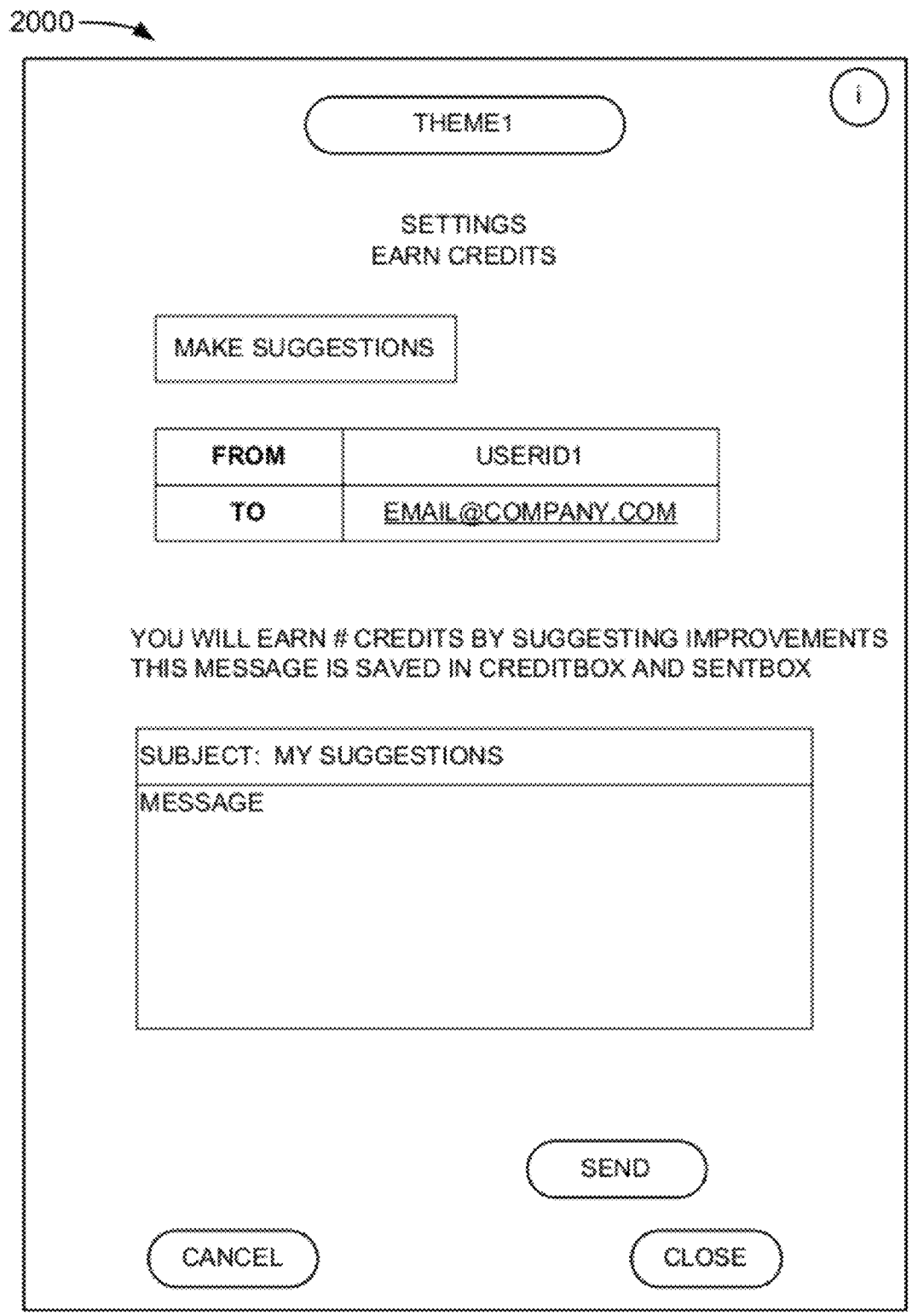
Figure 21:
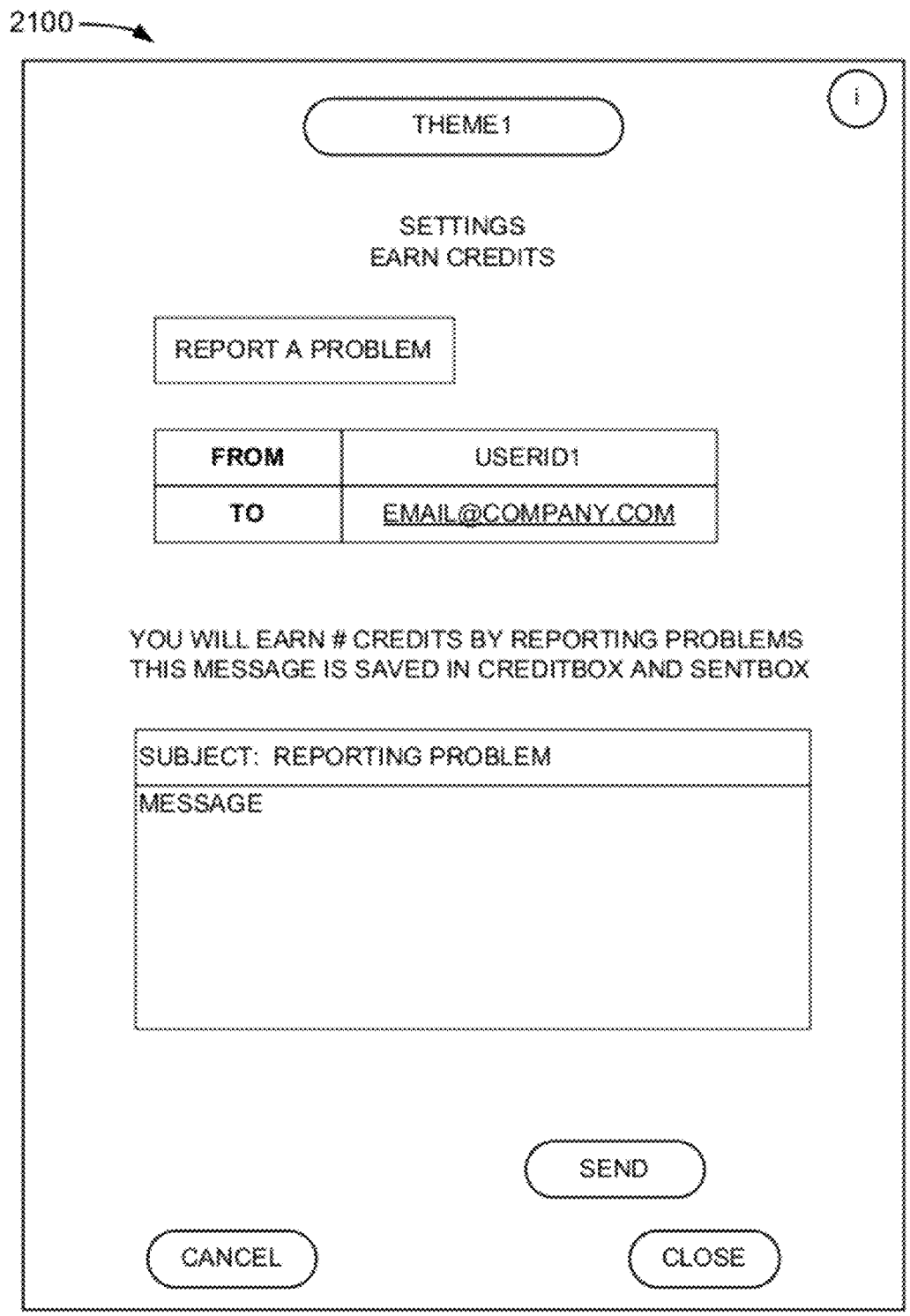

5. user may navigate to specific Article by clicking on the ARTICLE (ART) NAME (FIG. 19)

6. user may navigate within the CATEGORY List page by using buttons like TOP/BOTTOM (T/B) and using the FIND button at the bottom of the screen. User can also sort columns by clicking to the headers section of the column.

7. user may navigate to USER PAGE (FIG. S8D) by clicking on the USERID, under the FROM column. Closing the USER PAGE will navigate user back to the page that they clicked on the USERID.

8. user may post a new article. Clicking on the POST NEW button will navigate user to the REPLY/POST screen (FIG. S3H). On REPLY/POST screen, clicking the SEND/CANCEL buttons will navigate user back to the page that they clicked on the POST NEW button.

9. user may change the display characteristics of the screen by selecting an option from the DISPLAY pulldown menu.

Figure 15:
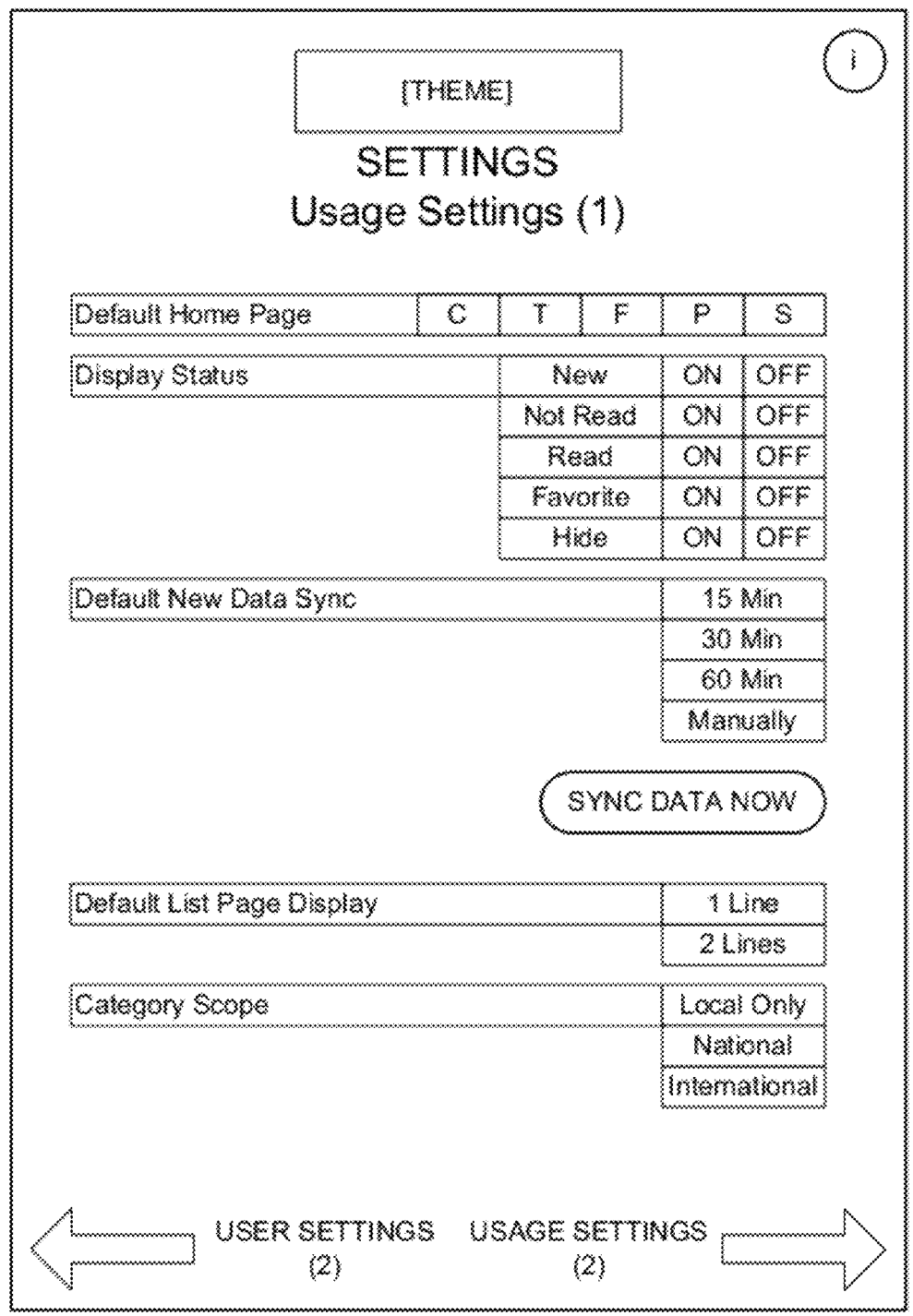

10. user may Rate the Category by clicking on the RATE CAT button and the user will be taken to the RATE Screen (FIG. 15). On RATE screen, clicking the SUBMIT/CANCEL buttons will navigate user back to the page that they clicked on the RATE CAT button.

11. user may Follow the Category by clicking on the FOLLOW CAT button and the user will be taken to the ALERT/FOLLOW SETTINGS Screen (FIG. 23). On ALERT/FOLLOW SETTINGS Screen, clicking the CLOSE/CANCEL buttons will navigate user back to the page that they clicked on the FOLLOW CAT button.

12. user may navigate within the Category List page by scrolling up and down by using a scrolling bar or by using a hand motion in electronic hardware devices that supports that capability.

6. CATEGORY Article Screen (FIG. 19)

1. user can navigate to START screen (FIG. 21) by clicking on THEME name on top of the screen.

2. user may navigate to SHARE screen (FIG. 20) by clicking on SHARE arrow link on top right of the screen. On SHARE screen, clicking the CLOSE/CANCEL buttons will navigate user back to the page that they clicked on the SHARE button.

3. user may navigate to INFORMATION pages (i) by clicking on (i) link at top right of screen 4. user may navigate between following links (Folders) at the bottom of the screen by clicking them
  1. CATEGORY screen (FIG. 22)
  2. TOP USA screen (FIG. S4B)
  3. FAVORITE screen (FIG. S5A)
  4. PERSONAL screen (FIG. 42)
  5. SEARCH screen (FIG. 45)

5. user may navigate back to CATEGORY List screen (FIG. 14) by clicking CATEGORY LIST arrow link on top left.

6. user may navigate to USER PAGE (FIG. S8D) by clicking on the USERID, under the FROM column. Closing the USER PAGE will navigate user back to the page that they clicked on the USERID.

7. user may reply to or post a new article. Clicking on the REPLY/POST button will navigate user to the REPLY/POST screen (FIG. S3H). On REPLY/POST screen, clicking the SEND/CANCEL buttons will navigate user back to the page that they clicked on the REPLY/POST button.

1. if user is a sponsor, user also has the option of posting one sponsor message in their category, but no limit on messages as a user. Sponsors will have an option to indicated if the message that they are posting is their sponsor message or a message as a general user (see FIG. S3H2). Once sponsor use their sponsor message, then the sponsor message selection is disabled until the next calendar day.

8. user may forward article to other users or post it to another category. Clicking on the FORWARD/POST button will navigate user to the FORWARD screen (FIG. S31). On FORWARD/POST screen, clicking the SEND/CANCEL buttons will navigate user back to the page that they clicked on the FORWARD/POST button.

9. user may change the display characteristics of the screen by selecting an option from the DISPLAY pulldown menu.

10. user may Rate the Article by clicking on the RATE ART button and the user will be taken to the RATE Screen (FIG. 15). On RATE screen, clicking the SUBMIT/CANCEL buttons will navigate user back to the page that they clicked on the RATE CAT button.

11. user may Rate the User by clicking on the RATE USER button and the user will be taken to the RATE Screen (FIG. 15). On RATE screen, clicking the SUBMIT/CANCEL buttons will navigate user back to the page that they clicked on the RATE USER button.

12. user may Follow the User by clicking on the FOLLOW USER button and the user will be taken to the ALERT/FOLLOW SETTINGS Screen (FIG. 23). On ALERT/FOLLOW SETTINGS Screen, clicking the CLOSE/CANCEL buttons will navigate user back to the page that they clicked on the FOLLOW USER button.

13. user may navigate within the Category Article page by scrolling up and down by using a scrolling bar or by using a hand motion in electronic hardware devices that supports that capability.

14. user may navigate to other articles by using the NEXT and PREVIOUS link arrows, still using the CATEGORY Article Screen.

15. user may navigate to the FULL PAGE (FIG. S3K) view of the article by clicking on the FULL PAGE button, which enlarges the view of the article page. Navigation to Category List screen and SHARE screen, as well as the RATE ART buttons are eliminated to make room for larger article display area. Clicking the BACK TO FIT PAGE will take user to the original article display mode.

16. after reviewing the article user may go back to the CATEGORY List screen, CATEGORY Main screen, or go to other Folders like TOP USA, FAVORITE, PERSONAL or SEARCH.

7. TOP USA List Screen (FIG. S4B) use the similar navigation as the CATEGORY List screen.

8. TOP USA Article Screen (FIG. S4C) use the similar navigation as the CATEGORY Article screen 9. FAVORITE Main Screen (FIG. S5A) use the similar navigation as the CATEGORY Main screen 10. FAVORITE List Screen (FIG. S5B) use the similar navigation as the CATEGORY List screen 11. FAVORITE Article Screen (FIG. S4C) use the similar navigation as the CATEGORY Article screen 12. PERSONAL Main Screen (FIG. 42)

1. user can navigate to START screen (FIG. 21) by clicking on THEME name on top of the screen.

2. user may navigate to main SETTINGS screen by clicking on SETTINGS link top right of screen 3. user may navigate to INFORMATION pages (i) by clicking on (i) link at top right of screen 4. user may navigate between following links (Folders) at the bottom of the screen by clicking them 1. CATEGORY screen (FIG. 22)
    2. TOP USA screen (FIG. S4B)
    3. FAVORITE screen (FIG. S5A)
    4. PERSONAL screen (FIG. 42)
    5. SEARCH screen (FIG. 45)

5. user may navigate to specific Category like INBOX, OUTBOX, SENTBOX, etc. by clicking on the CATEGORY (CAT) NAME 6. user may navigate within the CATEGORY Main page by using buttons like TOP/BOTTOM (T/B) and using the FIND button at the bottom of the screen. User can also sort columns by clicking to the headers section of the column.

7. user may change the display characteristics of the screen by selecting an option from the DISPLAY pulldown menu.

8. user may navigate within the Category Main page by scrolling up and down by using a scrolling bar or by using a hand motion in electronic hardware devices that supports that capability.

Figure 13:
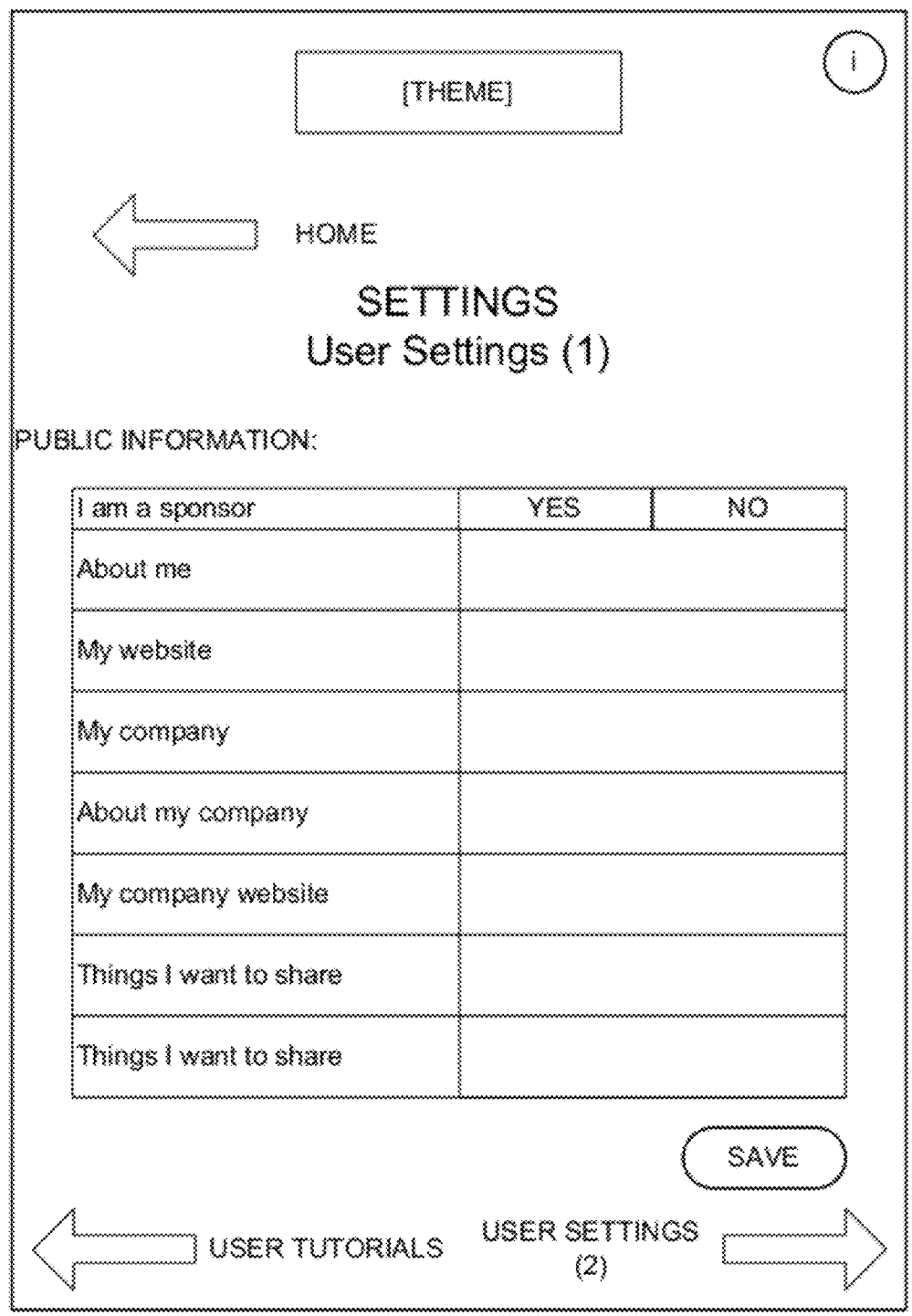

9. user may add a new CATEGORY by clicking on the ADD NEW CATEGORY button at the bottom, which will navigate user to the ADD CATEGORY Screen (FIG. 13). On ADD CATEGORY screen, clicking the DONE/CANCEL buttons will navigate user back to the page that they clicked on the ADD NEW CATEGORY button.

1. if user is SPONSOR, user will be navigated to the ADD CATEGORY SCREEN SPONSORS (FIG. 43), when user clicks on DONE button on ADD NEW CATEGORY screen.

2. on ADD CATEGORY SCREEN SPONSORS, clicking on DONE/CANCEL buttons will navigate user back to the page that they clicked on the ADD NEW CATEGORY button.

10. user may delete a category that he created by clicking on the DELETE CATEGORY button at bottom. Navigation will stay on the same screen.

11. user may change the display of categories by clicking on the buttons MY CATS, INVITED CATS or ALL CATS. Only those categories that correspond to the button clicked are displayed. Navigation will stay on the same screen.

Figure 12:
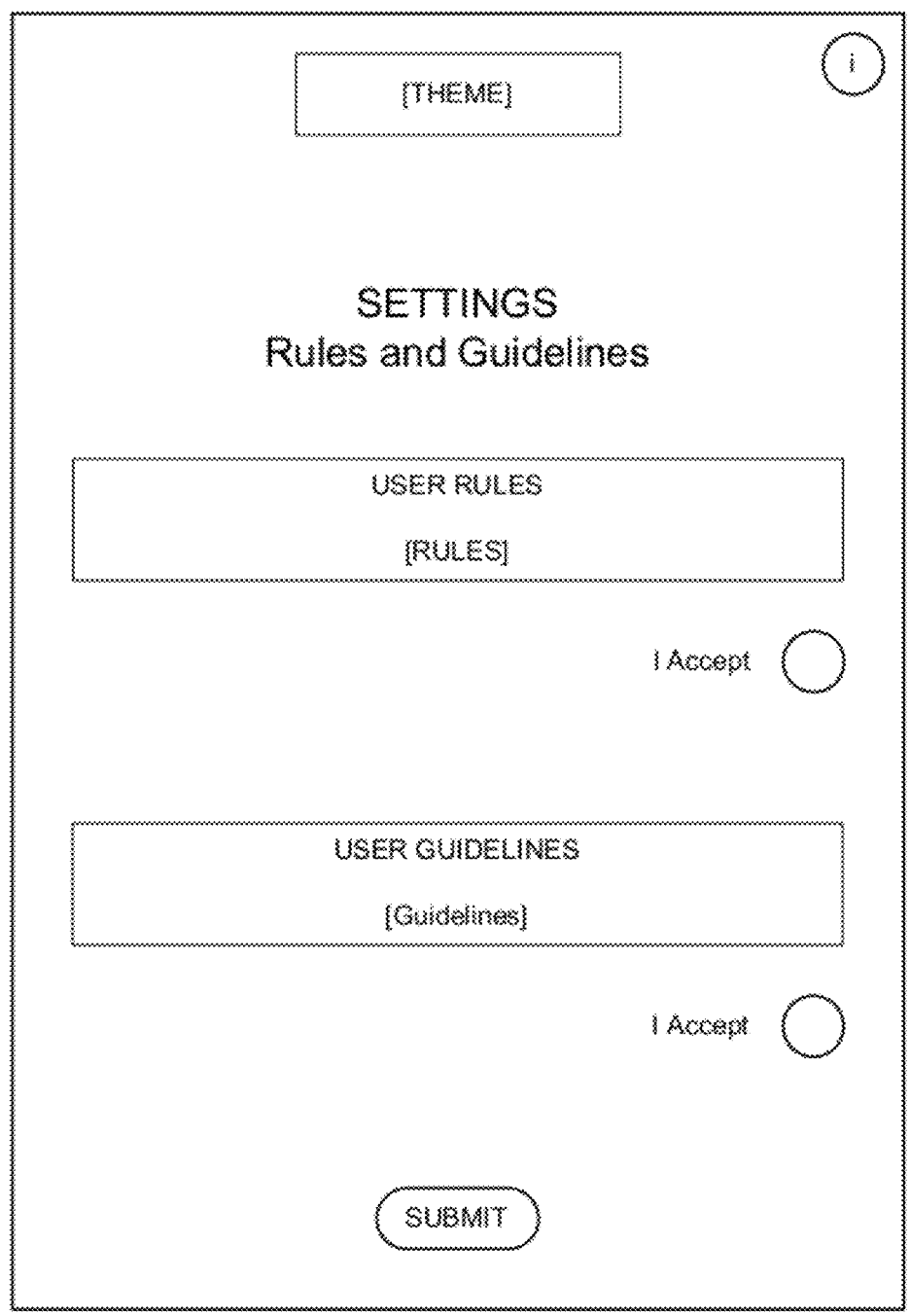

12. user may update the invited list of people on his private categories, like adding more or deleting others from the list. Clicking on the UPDATE MY INVITATIONS will navigate user to the UPDATE INVITATIONS screen (FIG. 12). On UPDATE INVITATIONS screen, clicking the SAVE/CANCEL buttons will navigate user back to the page that they clicked on the UPDATE MY INVITATIONS button.

1. PERSONAL INBOX List Screen (FIG. S7A): user may navigate to INBOX category by clicking on the INBOX under the CAT NAME column. On INBOX screen, user can navigate back to the PERSONAL Main screen by either clicking on the PERSONAL CATEGORIES link arrow on top left or by clicking on the PERSONAL Folder button at the bottom.

1. SEND PRI MESSAGE screen (FIG. S7C). On PERSONAL INBOX screen, user may send a private message to other user by clicking on the SEND PRI MESSAGE button. On SEND PRI MESSAGE screen, clicking the CLOSE/CANCEL buttons will navigate user back to the page that they clicked on the SEND PRI MESSAGE button.

1. if user is a SPONSOR, then user is enabled to select a user list named SPONSORLIST_CATID (which contains list of user who have agreed to receive private message from sponsors, and users who did not block the sponsor by selecting DS for that particular sponsor). Once the private message using SPONSORLIST_CATID is used by the sponsor, the selection is disabled until next calendar day.

2. User may navigate to a specific article in INBOX List screen by clicking on the ARTICLE (ART) NAME. On INBOX Article screen, clicking on the INBOX LIST link arrow on top left will navigate user back to the INBOX List screen.

2. PERSONAL INBOX Article Screen (FIG. S7B): use the similar navigation as the CATEGORY Article screen, except there is no rating of article for private INBOX Articles. On INBOX Article screen, clicking on the INBOX LIST link arrow on top left ill navigate user back to the INBOX List screen.

3. PERSONAL INBOX REPLY Screen (FIG. S7G): user may reply to private messages in their INBOX. On PERSONAL INBOX REPLY screen, clicking the SEND/CANCEL buttons will navigate user back to the PERSONAL INBOX Article screen.

4. PERSONAL INBOX FORWARD Screen (FIG. S7H): user may forward a private message in their INBOX to others. On PERSONAL INBOX FORWARD screen, clicking the SEND/CANCEL buttons will navigate user back to the PERSONAL INBOX Article screen.

5. PERSONAL NOTEBOX List Screen (FIG. S7E): use the similar navigation as the CATEGORY List screen, except there is no rate/follow of category for private NOTEBOX. On NOTEBOX List screen, clicking on the PERSONAL CATEGORIES link arrow on top left ill navigate user back to the INBOX List screen.

6. PERSONAL NOTEBOX Article Screen (FIG. S7F): use the similar navigation as the CATEGORY Article screen, except there is no rating of articles for private NOTEBOX. On NOTEBOX Article screen, clicking on the NOTEBOX LIST link arrow on top left ill navigate user back to the NOTEBOX List screen.

7. PERSONAL SENTBOX List Screen (FIG. S7I): use the similar navigation as the CATEGORY List screen, except there is no rate/follow of category for private SENTBOX. On SENTBOX List screen, clicking on the PERSONAL CATEGORIES link arrow on top left ill navigate user back to the INBOX List screen.

8. PERSONAL SENTBOX Article Screen (FIG. S7J): use the similar navigation as the CATEGORY Article screen, except there is no rating of articles for private SENTBOX. On SENTBOX Article screen, clicking on the SENTBOX LIST link arrow on top left ill navigate user back to the SENTBOX List screen.

13. SEARCH Main Screen (FIG. 45)
  1. user can navigate to START screen (FIG. 21) by clicking on START arrow link or by clicking on THEME name on top of the screen.
  2. user may navigate to main SETTINGS screen by clicking on SETTINGS link top right of screen
  3. user may navigate to INFORMATION pages (i) by clicking on (i) link at top right of screen
  4. user may navigate to HOME page (default) by clicking on HOME link arrow at top left of screen
  5. user may navigate between following links (Folders) at the bottom of the screen by clicking them
    1. CATEGORY screen (FIG. 22)
    2. TOP USA screen (FIG. S4B)
    3. FAVORITE screen (FIG. S5A)
    4. PERSONAL screen (FIG. 42)
    5. SEARCH screen (FIG. 45)
  6. Clicking on the CANCEL button on SEARCH Main screen will navigate user back to the page that they clicked on the SEARCH folder.
  7. user may perform a search on Categories, Articles, Users and Sponsors;
    1. CATEGORY SEARCH RESULTS: use the same screen and navigation as the CATEGORY Main screen (FIG. 22)
    2. ARTICLE SEARCH RESULTS (FIG. S8B): use the similar navigation as the CATEGORY List screen, except there is no rate/follow of category. On ARTICLES SEARCH RESULTS screen, clicking on the MODIFY SEARCH link arrow on top left ill navigate user back to the SEARCH Main screen.
    3. USER SEARCH RESULTS (FIG. S8C): use the similar navigation as the CATEGORY List screen, except there is no rate/follow of category. On USER SEARCH RESULTS screen, clicking on the MODIFY SEARCH link arrow on top left ill navigate user back to the SEARCH Main screen.
    4. SPONSOR SEARCH RESULTS (FIG. S8E): use the similar navigation as the CATEGORY List screen, except there is no rate/follow of category. On SPONSOR SEARCH RESULTS screen, clicking on the MODIFY SEARCH link arrow on top left ill navigate user back to the SEARCH Main screen.

14. SETTINGS
  1. after the first time forced navigation to the SETTINGS screens, user has the full flexibility to navigate throughout the SETTINGS screens to change the setup.
  2. user may navigate to USER RULES AND GUIDELINES screen, however user's acceptance of the rules and guidelines cannot be changed anymore.
  3. user may navigate to USER SETTINGS screen, however user's USERID, EMAIL, and FIRST and LAST NAME cannot be changed anymore.

TABLE 1

Sample list of Information to be tracked.

INFORMATION THAT WILL BE TRACKED IN ANY ELECTRONIC HARDWARE DEVICE (LIKE IPHONE) INCLUDE:

1. Track all statistics for each Article
  1. Article ID number
  2. Theme and Category that article belong to
  3. which userid posted the article (author)
  4. Date and time of posting
  5. article status: N, NR, R, F, DS
  6. number of times an article was read
  7. number of times an article was read by a unique userid
  8. number of times an article was shared through email, messaging, f, t, or l
  9. number of users have this article in Favorite folder
  10. number of users have this article in DS status
  11. number of users have replied to or forwarded this articles
  12. number of times posted to facebook
  13. number of times posted to twitter
  14. rank of the article
  15. rating of the article and user comments
  16. length of the article in terms of number of characters and number of words
2. Track all statistics for each User
  1. number of Theme subscription, and their names
  2. number of times articles posted or replied and to which category
  3. number of times articles shared through email, messaging, f, t, or l
  4. number of times articles forwarded to a user or another category
  5. Top five PUB categories participated by the user
  6. Top five NP categories participated by the user
  7. number of referrals and the referral's contact info
  8. number of times told friends and the friends contact info
  9. number of users subscribed who were referred or told by the user and their userid
  10. number of facebook postings
  11. number of twitter postings
  12. number of suggestions
  13. number of problem reporting
  14. rating of user and user comments
  15. track all postings, replies, and forwards and be able to store at SENTBOX
  16. top five categories participated NP or PUB TABLE 1-continued Sample list of Information to be tracked.

17. number of followers
18. number of blocks on this user
19. number of invitations received
20. total use time for application sofware, folders like Categories, Top USA, Favorites, Personal and Search, and use of individual categories (continuos for 365 days, from start of the apps to close)
21. Total time use of C T F P S folders
22. Total time use of a Category for NP PUB PRI
 3. Track all Credits for each user
  1. credit earned by subscribing to each Theme
  2. credit earned for each Referral
  3. credit earned for each Telling
  4. credit earned for each Invited (non-subscriber)
  5. credit earned for each Sharing
  6. credit earned for each Subscribed User that you have Referred, Told, Invited or Shared
  7. credit earned for each Rating
  8. credit earned for each Suggestions
  9. credit earned for each problem Reporting
  10. credit earned for each creation of a Category PUB or PRI
  11. credit earned for each Postings/Replies/Forwards for PUB/NP (Non-Private) Categories
  12. credit earned for each Person invited to PRI Category
  13. credit earned for reading sponsored Ad in a Category
  14. credit earned for accepting to receive Ads in INBOX from sponsors
 4. Track all statistics for each category (in general, any statistics for articles in a given category can be combined to get a total statistical number for a category)
  1. number of categories created, PRI and PUB, their name
  2. Author of the category and date/time it was created
  3. number of posted articles
  4. number of read articles
  5. number of replies and forwards for each article
  6. number of unique users participating
  7. number of average daily postings/replies
  8. number of users have this category in their Favorites
  9. number of users following this category
  10. number of DS
  11. Category Rating and user comments
  12. Category Ranking—based on the sum of the ranking of each article in that category
  13. Number of PUB (including MPUB), NP, PRI (including MPRI)
  14. number of each Category TYPE
  15. number of each Category SCOPE
INFORMATION THAT WILL BE UPLOADED FROM ANY ELECTRONIC HARDWARE DEVICE (LIKE IPHONE) TO MAIN DATABASE INCLUDE:

5. Related to each Article
  1. New Articles posted/replied—ID numbers (ID also includes Theme and Category numbers)
   1. userid posted the article (author)
   2. Date and time of posting
   3. length of the new article in terms of number of characters and number of words
  2. number of times an article was read in any category (do not count articles read if user is the author)
  3. number of times an article was shared through email, messaging, f, t, or l
  4. articles in Favorite folder
  5. articles in DS status
  6. articles forwarded
  7. articles rated and user comments
 6. Related to each User
  1. new Theme subscription, and their names, date, etc
  2. articles posted or replied and to which category, date, etc.
  3. articles shared through email, messaging, f, t, or l, dates, etc.
  4. articles replied or forwarded to a user or another category, dates, etc.
  5. categories participated by reading, posting, replying, or forwarding
  1. for each category, we track four items; articles read, posted, replied, forwarded by each user
  6. Top five PUB categories participated by the user
  7. Top five NP categories participated by the user
  8. referrals—referrals contact info, dates, etc.
  9. told friends—friends contact info, dates, etc.
  10. sharing through emails, facebook, twitter, etc., article name, dates, etc.
  11. suggestions—content, dates, etc.
  12. problem reporting—content, dates,.etc.
  13. rating of other user/article/category, comments, date, etc.
  14. categories and users followed names, dates, etc.
  15. blocks requested—userid, dates, etc.
  16. invitations sent—userid, dates, etc.
  17. total use time for apps date, time (continuos for 365 days, from start of the apps to close)
  18. Total time use of folders C T F P S date, time
  19. Total time use of a Categories ID, date, time, etc.
  20. saved SEARCH setups
  21. saved LIST NAMEs
  22. saved FAVORITE names TABLE 1-continued Sample list of Information to be tracked.

23. saved SETTINGS folder
  7. Related to each category (category, rating, PUB/PRI, TYPE, SCOPE, userid, date/time, etc.)
  1. new category created
  2. Favorites categories
  3. Following categories
  4. DS categories
  5. Categories rated and user comments
  8. Related to Credits
  1. credit earned for each Referral
  2. credit earned for each Telling
  3. credit earned for each Invited (non-subscriber)
  4. credit earned for each Sharing
  5. credit earned for each Subscribed User that you have Referred, Told, Invited or Shared
  6. credit earned for each Rating
  7. credit earned for each Suggestions
  8. credit earned for each problem Reporting
  9. credit earned for each creation of a Category PUB or PRI
  10. credit earned for each Postings/Replies/Forwards for PUB/NP (Non-Private) Categories
  11. credit earned for each Person invited to PRI Category
  12. credit earned for reading sponsored Ad in a Category
  13. credit earned for accepting to receive Ads in INBOX from sponsors
INFORMATION THAT WILL BE DOWNLOADED TO ANY ELECTRONIC
HARDWARE DEVICE (LIKE IPHONE) FROM MAIN DATABASE INCLUDE:

9. for each Article (theme, category, userid, date/time, etc.)
  1. new articles—userid posted the article (author), Date and time of posting
  2. ranking of the article
  3. rating of the article and user comments
  4. length of the article in terms of number of characters and number of words
  10. for each User
  1. new categories created, PRI and PUB
  2. new articles posted, replied, forwarded
  3. rating of users and user comments
  4. ranking of users
  5. number of followers
  6. blocked messages
  7. invitations received
  8. personal messages
  9. total use time for apps, folders, and categories (continuos for 365 days, from start of the apps to close)
  10. Total time use of C T F P S, folders
  11. Total time use of a Category for NP PUB PRI
  11. credits
  1. credit earned by subscribing to each Theme
  2. credit earned for each Referral
  3. credit earned for each Telling
  4. credit earned for each Invited (non-subscriber)
  5. credit earned for each Sharing
  6. credit earned for each Subscribed User that you have Referred, Told, Invited or Shared
  7. credit earned for each Rating
  8. credit earned for each Suggestions
  9. credit earned for each problem Reporting
  10. credit earned for each creation of a Category PUB or PRI
  11. credit earned for each Postings/Replies/Forwards for PUB/NP (Non-Private) Categories
  12. credit earned for each Person invited to PRI Category
  13. credit earned for reading sponsored Ad in a Category
  14. credit earned for accepting to receive Ads in INBOX from sponsors
  12. for each category
  1. new categories and date/time it was created, type, scope, etc.
  2. number of posted articles
  3. number of read articles
  4. number of replies and forwards
  5. number of unique users participating
  6. number of average daily postings/replies
  7. number of users have this category in their Favorites
  8. number of users following this category
  9. number of DS
  10. Rating and user comments
  11. Ranking—based on the sum of the ranking of each article in that category
  13. for each theme
  1. fee for the theme
  2. credits required to subscribe
  3. # of users/participants
  4. # of categories
  5. # of articles
  6. # of new articles

TABLE 2

Example list of possible themes.

THEMES:
PEOPLE
NEWS
POLITICAL
ENTERTAINMENT-
MOVIES, THEATER, CONCERTS
TECHNOLOGY
HEALTH
TRAVEL
MONEY
SPORTS
LEGAL
REAL ESTATE
INVESTMENTS
BUSINESS
CAREER
MUSIC
MOVIES
IMAGES
PICTURES
VIDEO
HISTORY
GEOGRAPHY
FASHION
FAMILY
EDUCATION
RELIGION
FOOD
DRINKS
JOKES
QUOTES
IDIOMS
EXPERTS
EMAIL
TEXT MESSAGE
AUDIO MESSAGE
VIDEO MESSAGE
FILES
LINKS (URL)
TWITTER
FACEBOOK
MYSPACE
FLICKR
. . .

TABLE 3

Features, Advantages, and Benefits
SUMMARY OF FEATURES, ADVANTAGES, AND BENEFITS OF THE PROPOSED SYSTEM AND METHOS 1. system to communicate and share ideas, opinions, etc. in a single user interface/environment
2. system to simplify communication among friends, family, and around the world
3. system to simplify the management of information and data, saving time and make people more efficient
4. system that connects friends, families, and people all around the world that share common interest and goals and want to communicate instantaneously
5. system to enable communication from one-to-one and one-to-many
6. system to enable communication in a secure and public or private settings
7. system to track and give incentives/credits
8. system to earn credits and use it toward subscribing to more Themes
9. system to follow (read/post/reply/participate) many themes, categories in a single user interface/environment
10. system to create categories, public or private and invite only those selected by the user
11. system to allow user to invite anyone to join a category
12. system to allow user to un-invite anyone to a category
13. system to send private message to anyone or to any group you create in the system

TABLE 3-continued

Features, Advantages, and Benefits
SUMMARY OF FEATURES, ADVANTAGES, AND BENEFITS OF THE PROPOSED SYSTEM AND METHOS 14. system to block any user sending any message to another user
15. system to allow a secure environment where only those selected to communicate and share. No one else can read or post
16. system to organize all data into Themes, Categories, and Articles for easy access to any data
17. system to organize navigation to Categories, Top Articles, Favorites, Personal and Search for easy access to any data
18. system to allow interface to blogs, twitter, facebook, linkedin, and other social networks
19. system to allow setting alerts to follow certain categories and users
20. system to allow easy navigation to previous page, next page, top or bottom
21. system to store and recover information for a subscriber like, Theme subscriptions, all Settings for each Theme, Favorites for each Theme, Personal Folder in for each Theme, all DS selections for Categories and Articles, statistics
22. system to allow extraction of any data stored in the database at a later time
23. system to calculate rankings of articles and categories based on user behaviors
24. system to enable ratings of articles, categories and users by other users
25. system to enable search of any data exist in the database
26. system to enable sponsors to sponsor themes and categories
27. system to enable sponsors to give credits to users as incentives for users to participate in activities
28. system to search articles, categories, users, sponsors
29. system that enables people to access to real time information and data
30. a system based on a subscription and registered user community of user
31. you do not have to go to different web sites to access to blogs
32. you do not have to use different applications to access to social networks
33. you do not have the difficulties of managing email, like
 1. too much email, junk emails, lost emails, lack of a good confirmation of receipt, anyone can send you an unwanted email
34. easy access and management of information and data
 1. access to blogs, social networks to share info, ideas, discussions, etc.
35. anyone can start a topic/category/discussion and share with others
36. system to encourage people to participate through credits/bonuses
37. system to enable users to provide feedback/rate articles/discussions/topics/categories/users/sponsors
38. system to enable sponsors target users based on their interest and demographics
39. Ability to follow different subjects and people
40. Ability to communicate and participate in blog like manner in discussion, where content is shared with others in a central location
41. Ability to share with others using email, where content can be distributed to anyone in the network
42. facebook, twitter, instant message, etc.
43. Ability to send instant text message, where it can be directed to any one instantly
44. Ability to communicate and share data/info privately in a secure environment
45. Integrated and comprehensive communication environment (like a browser) with extensive capabilities for categorizing, organizing, accessing, searching and sharing info with others.
46. ability to support smart phones
47. easy access to management of info and messages
48. system to encourage participation through reward/credit system
49. system to enable people provide comment, feedback, review, rate categories, articles, users, etc.
50. system to encourage anyone to start topics, discussions, communications with others easily and instantly
51. It is a non intrusive way to communicate company info/news to all employees in a timely manner from HR, sales, engineering, etc.
52. Users can easily monitor new messages/information about any topic in the company.
53. It is based on participation and subscription
54. Easy way to solicit feedback and participation
55. A unified communication tool to interface with all employees with the company
56. Integrated communication environment. Still integrated to web site through links
57. fast, easy, secure, private communication environment to create and share info and data

TABLE 3-continued

Features, Advantages, and Benefits
SUMMARY OF FEATURES, ADVANTAGES, AND BENEFITS OF
THE PROPOSED SYSTEM AND METHOS 58. fast, easy environment to read, write opinion or comment, search, organize, find, learn, ask questions, and communicate
59. single interface to reach blogs and social networks
60. system that promotes content creation, participation, sharing, self management, etc.
61. system that allows creation and participation in broad as well as very specific topics and interest points
62. system that allows communication and creation of topics that are geographically focused, like city, state, country and International
63. system that enables access to community created content as well as content created outside the community
64. system that brings community of users in different topics into a single location with a single interface
65. system that simplifies communication and management of information and saves time and makes people more efficient
66. system that connects, friends, families and people all around the world that share common interest, goals, etc. and want to communicate one-to-one or one-to-many, in a secure and public or private settings
67. communication management
  1. communication environment with one or many people
  2. private and secure communication environment
  3. send message to one place/person, instead of multiple
  4. access/receive multiple messages from one place/location, instead of multiple
68. Communication system that can be setup for only internal use and
  1. minimizes distractions because email inbox is full of junk and unwanted email
  2. no more missed/lost emails
  3. no more junk email
  4. no outside the company email
  5. reduces the number of emails to be read
  1. if there are 10 people in the team, and everyone copying everyone else, then everyone gets 10 emails, total of 100 emails in the system. Instead everyone goes to one location where all the 10 messages are captured and everyone see the same messages.
69. Secure and private communication
  1. messages from only those designated
  2. no one else can access
70. Reliable communication
  1. you do not miss messages
  2. no need for confirmation
71. Fast, easy, and efficient way to access to live information and data
  1. simple and efficient navigation
  2. extensive sorting, searching, and find capabilities
72. Save time communicating with others
  1. communicate using
  1. Public or Private categories
  2. Private messages
  3. email, text message, and posting to social networks
73. save time organizing all communications
  1. organize data in Favorite and Personal folders

TABLE 4

Definitions
DEFINITIONS

1. APPS is an application software that runs on electronic hardware device.
2. THEME is high level topic like PEOPLE, NEWS, TRAVEL, etc. See Table 2. for more examples of themes.
3. ARTICLE is content like messages, data, information, knowledge.
4. An article considered READ (R) if article was open equal or greater then the the number of words in the article divided by six. For example, if article has 60 words, article must be kept open minimum 10 seconds to qualify to be marked as READ.
5. SCREEN is what you see on screen
6. PAGE is where the data is displayed that is scrollable
7. FOLDER is used for Category, Top USA, Favorites, Personal and Search buttons at the bottom of the screens
8. AUTHOR is a user who has created the content, article, category
9. USERID is unique identification code for registered users

TABLE 4-continued

Definitions
DEFINITIONS

10. An Article or Category changes from NEW to NR when exiting the Application, and if the Category or Article List was open at least 10 sec.
11. PARTICIPANT is a user posted or replied in a category
12. The MOST ACTIVE category for a user means the category where user has posted and replied the most among the categories that the user is participating.
13. READER is a user that read at least one article in a category
14. FOLLOWER is a user that set alert for a category or user
15. PRI means private
16. PUB means public
17. PUBLIC means anyone can see and participate,
18. PRIVATE means only those who have been invited will be able to see and participate.
19. CAT means category
20. ART means article
21. DATA—Raw, unsummarized and unanalyzed facts. Data is of very little use to decision makers as it contains far too much detail. Before it can be used it must be converted in to information.
22. INFORMATION—Data that has been processed in to a meaningful form.
23. KNOWLEDGE—The capacity to use information-requires education and experience
24. REGISTERED USER is same as subscribed user. A unique USERID and unique eMAIL address are used to identify all the registered/subscribed users.
25. CLICKING means selecting a button or link
26. LINK also means BUTTON or ARROW.
27. FOLDERS means CATEGORY, TOP USA, FAVORITE, PERSONAL, SEARCH links at the bottom of most screens.
28. USER means CLIENT

What is claimed is:

1. A system comprising:
a processor;
a memory;
a one-way trust lists datastore loaded in the memory including a first one-way trust list of a first member and a second one-way trust list of a second member, wherein the first one-way trust list stores information identifying a first set of members related to the first member that reciprocally trust each other, wherein the second one-way trust list information identifying a second set of members related to the second member that reciprocally trust each other, and wherein in order to become a reciprocal trusted member between two members, both members have to send a specific message to the other counterpart member to specifically agree to be a trusted member of the other counterpart member;
a master reciprocated trust folders datastore loaded in the memory to store a plurality of reciprocated trusted folders, each of the reciprocated trusted folders storing content exchanged amongst corresponding members that reciprocally trust each other; and
a reciprocated trust management engine loaded in the memory and executed by the processor, the reciprocated trust management engine being coupled to the one-way trust lists datastore and to the master reciprocated trust folders datastore; wherein, the reciprocated trust management engine:
receives first content exchanged between the first member and the second member;
in response to the first content, matches a first entry in the first one-way trust list with the second member to determine whether the first member trusts the second member, wherein the first entry includes identifying information of the second member if the first member trusts the second member;

matches a second entry in the second one-way trust list with the first member to determine whether the second member trusts the first member, wherein the second entry includes identifying information of the first member if the second member trusts the first member;
creates a first reciprocated trust folder for a group of members including the first member and the second member only if the first entry of the first one-way trust list matches the second member and the second entry of the second one-way trust list matches the first member;
stores the first content as trusted content in the first reciprocated trust folder;
maintains the first reciprocated trust folder in the master reciprocated trust folders datastore as one of the plurality of reciprocated trust folders stored therein;
only both the first member and the second member have access to the trusted content from the first reciprocated trust folder, including modifying the trusted content stored in the first reciprocated trust folder; and
the first reciprocated trust folder stores a single instance of the trusted content that is shared between the first member and the second member.

2. The system of claim 1, further comprising:
a contact information input engine;
a one-way trust list creation engine coupled to the contact information input engine and the one-way trust lists datastore;
wherein, in operation:
the contact information input engine receives contact information associated with the first member;
the one-way trust list creation engine creates the first one-way trust list for the first member including at least some of the contact information, wherein the at least some of the contact information includes data sufficient for the reciprocated trust management engine to match the first entry in the first one-way trust list with the second member,
wherein the one-way trust lists datastore stores a plurality of one-way trust lists, each corresponding to one of a plurality of members of a social network, the plurality of members of the social network including the first member and the second member, wherein the plurality of one-way trust lists includes the first one-way trust list associated with the first member and the second one-way trust list associated with the second member.

3. The system of claim 1, wherein the first member and the second member are members of a first subnetwork, further comprising: a social network aggregation engine configured to aggregate the first subnetwork and a second subnetwork including a third member into a trusted social network including the first member, the second member, and a third member, wherein the first member and the second member are members of the first subnetwork and the third member is a member of the second subnetwork after aggregation.

4. The system of claim 2, further comprising:
a members datastore;
a trusted party identification engine coupled to the members datastore;
a social network invitation engine coupled to the trusted party identification engine;
a member registration engine coupled to the social network invitation engine;
wherein; in operation:
prior to the second member becoming a member of the social network, the first member receives a first message from the second member;
in response to the first message, the trusted party identification engine determines whether the second member initially has an associated entry in the members datastore to determine whether the second member is a member of the social network;
in response to determining that the second member initially does not have an associated entry in the members database, the social network invitation engine sends a second message as an invitation to the second member on behalf of the first member to invite the second member to join the social network, wherein the second message includes identifying information of the first member that is obtained from the first one-way trust list of the first member;
the social network invitation engine receives a third message from the second member, the third message having information indicating that the second member has accented the invitation to become a member of the social network; and
in response to the third message, the member registration engine registers by creating an associated entry of the second member in the members datastore to indicate that the second member is now a member of the social network.

5. The system of claim 4, further comprising:
a reciprocal trust confirmation engine,
wherein, in operation:
in response to the associated entry of the second member created in the members datastore, the reciprocal trust confirmation engine sends on behalf of the first member a fourth message to the second member to confirm whether the second member would like to become a reciprocal trusted member with respect to the first member;
the reciprocal trust confirmation engine receives a fifth message as a confirmation from the second member confirming that the second member agrees to become a reciprocal trusted member to the first member;
in response to the fifth message, the reciprocal trust confirmation engine extracts one-way trust list data of the second member from the fifth message;
the reciprocal trust confirmation engine creates the second one-way trust list for the second member based on the extracted one-way trust list data; and
the reciprocal trust confirmation engine stores the second one-way trust list in the one-way trust lists datastore.

6. The system of claim 1, further comprising: an administrative engine, wherein, in operation, the administrative engine identifies a source as constructively trusted by the first member.

7. The system of claim 5, further comprising:
a trust folder creation engine;
a trusted source identification engine;
a content management engine;
a trusted destination identification engine;
a trust folders datastore coupled to the trust folder creation engine, the trusted source identification engine, the content management engine, and the trusted destination identification engine;
wherein, in operation:
the trust folder creation engine creates a plurality of member trust folders corresponding to a plurality of trusted members identified in the first one-way trust list respectively, including a first member trust folder for a first content source identifiable as trusted from the first one-way trust list, wherein each of the member trust folders stores content exchanged between the first member and a corresponding trusted member;

in response to receiving content from a remote source, the trusted source identification engine determines whether received content is from the first content source based on the first one-way trust list;

the content management engine stores the received content in the first member trust folder if the received content is from the first content source;

in response to outgoing content sent by the first member, the trusted destination identification engine determines whether the outgoing content from the first member is to the first content source based on the first one-way trust list;

the content management engine stores the outgoing content in the first member trust folder if the outgoing content is to the content source.

8. The system of claim 7, wherein when the reciprocated trust management engine creates the first reciprocated trust folder for the group of members, the reciprocated trust management engine converts the first member trust folder into the first reciprocated trust folder, after the members of the group indicate they trust each other reciprocally, wherein the trusted content stored in the first reciprocated trust folder includes first content transmitted by the first member and received by the second member and second content transmitted by the second member and received by the second member.

9. The system of claim 1, further comprising:
a content management engine configured to store a message directed to the group of members in the first reciprocated trust folder;
an access control engine configured to limit access to the message to members of the group of members.

10. The system of claim 1, further comprising:
coupled to the master reciprocated trust folders datastore, a content management engine configured to enable one-to-many communication from the first member to other members of the group of members by putting a message in the first reciprocated trust folder; and
coupled to the master reciprocated trust folders datastore, an access control engine configured to limit access to the message in accordance with time-constrained or file characteristic-constrained access control settings.

11. The system of claim 1, further comprising: an access control engine configurable to control group member dissemination of content from a trust folder.

12. The system of claim 1, further comprising: a content management engine configurable to enable a content blocking rule sliding scale ranging from blocking no content sources at a first end point of the sliding scale to blocking all content sources that are not identifiable from the first one-way trust list at a second end point of the sliding scale.

13. The system of claim 1, further comprising:
a content management engine configured to enable one-to-many communication from the first member to other members of the group of members by putting a message in the first reciprocated trust folder;
an access certification engine configured to indicate that a member of the group of members has received the message in the first reciprocated trust folder.

14. The system of claim 1, further comprising a content management engine, wherein, in operation, the content management engine:

puts content directed to the group of members in the first reciprocated trust folder;
forwards content directed to the group of members to destinations that the content management engine cannot identify as corresponding to members of the group of members;
puts replies to forwarded messages in the first reciprocated trust folder.

15. The system of claim 7, further comprising:
a member certification engine configured to establish a global trust level for the first member based upon quality of data provided by the first member;
a member monitoring engine configured to obtain data regarding activity of the first member;
a ranking engine configured to adjust the global trust level of the first member based upon the activity of first member;
a rating engine configured to adjust the global trust level of the first member based upon input from a third member;
a global trust level indication engine configured to provide an indication of the global trust level for the first member to assist a fourth member in a determining whether to trust the first member.

16. The system of claim 1, further comprising:
an access certification engine configured to check credentials of the first member to access certified content in the first reciprocated trust folder;
an access control engine configured to grant the first member access to the certified content only after the access certification engine checks the credentials of the first member.

17. The system of claim 1, wherein the first reciprocated trust folder includes temporary data and historical data.

18. The system of claim 1, further comprising: a server-client synchronization engine configured to synchronize a client with a server including the reciprocated trust management engine.

19. A system comprising:
means for maintaining a one-way trust lists datastore including a first one-way trust list of a first member and a second one-way trust list of a second member, wherein the first one-way trust list stores information identifying a first set of members related to the first member that reciprocally trust each other, wherein the second one-way trust list information identifying a second set of members related to the second member that reciprocally trust each other, and wherein in order to become a reciprocal trusted member between two members, both members have to send a specific message to the other counterpart member to specifically agree to be a trusted member of the other counterpart member;
means for maintaining a master reciprocated trust folders datastore to store a plurality of reciprocated trusted folders, each of the reciprocated trusted folders storing content exchanged amongst corresponding members that reciprocally trust each other;
means for receiving first content exchanged between the first member and the second members;
in response to the first content, means for matching a first entry in a first one-way trust list with a second member to determine whether the first member trusts the second member, wherein the first entry includes identifying information of the second member if the first member trusts the second member;
means for matching a second entry in a second one-way trust list with a first member to determine whether the second member trusts the first member, wherein the second entry includes identifying information of the first
member if the second member trusts the first member;

means for creating a first reciprocated trust folder for a
group of members including the first member and the
second member only if the first entry of the first one-way
trust list matches the second member and the second
entry of the second one-way trust list matches the first
member;

means for storing the first content as trusted content in the
first reciprocated trusted folder, wherein only both the
first member and the second member have access to the
trusted content from the first reciprocated trust folder,
including modifying the trusted content stored in the
first reciprocal trusted folder, and the reciprocated trust
folder stores a single instance of the trusted content that
is shared between the first member and the second member;

means for maintaining the first reciprocated trust folder in
a master reciprocated trust folders datastore as one of the
plurality of reciprocated trusted folders stored therein;
and coupled to the master reciprocated trust folders datastore, a
content management engine configured to accept third
party content into a reciprocated trust folder only when
said third party has been awarded certification to input
content into said reciprocated trust folder.

20. A method comprising:

maintaining a one-way trust lists datastore in a memory, the
one-way trust lists datastore including a first one-way
trust list of a first member and a second one-way trust list
of a second member, wherein the first one-way trust list
stores information identifying a first set of members
related to the first member that reciprocally trust each
other, wherein the second one-way trust list information
identifying a second set of members related to the second member that reciprocally trust each other, and
wherein in order to become a reciprocal trusted member
between two members, both members have to send a
specific message to the other counterpart member to
specifically agree to be a trusted member of the other
counterpart member;

maintaining a master reciprocated trust folders datastore in
the memory to store a plurality of reciprocated trusted
folders, each of the reciprocated trusted folders storing
content exchanged amongst corresponding members
that reciprocally trust each other;

receiving, by a reciprocated trusted management engine
loaded in the memory and executed by a processor, first
content exchanged between the first member and the
second members;

in response to the first content, the reciprocated trusted
management engine matching a first entry in a first one-way trust list with a second member to determine
whether the first member trusts the second member,
wherein the first entry includes identifying information
of the second member if the first member trusts the
second member;

matching by the reciprocated trusted management engine a
second entry in a second one-way trust list with a first
member to determine whether the second member trusts
the first member, wherein the second entry includes
identifying information of the first member if the second
member trusts the first member;

creating a first reciprocated trust folder for a group of
members including the first member and the second
member only if the first entry of the first one-way trust
list matches the second member and the second entry of
the second one-way trust list matches the first member;

storing the first content as trusted content in the first reciprocated trusted folder, wherein only both the first member and the second member have access to the trusted
content from the first reciprocated trust folder, including
modifying the trusted content stored in the first reciprocal trusted folder, and the reciprocated trust folder stores
a single instance of the trusted content that is shared
between the first member and the second member;

maintaining the first reciprocated trust folder in a master
reciprocated trust folders datastore as one of the plurality of reciprocated trusted folders stored therein;

establishing a global trust level for the first member based
upon quality of data provided by the first member;

obtaining data regarding activity of the first member;

adjusting the global trust level of the first member based
upon activity of the first member;

adjusting the global trust level of the first member based
upon input from a third member; and providing an indication of the global trust level for the first
member to assist a fourth member in determining
whether to trust the first member.

\* \* \* \* \*